United States Patent [19]

Jost et al.

[11] Patent Number: 5,361,201
[45] Date of Patent: Nov. 1, 1994

[54] REAL ESTATE APPRAISAL USING PREDICTIVE MODELING

[75] Inventors: Allen Jost; Jennifer Nelson; Krishna Gopinathan, all of San Diego, Calif.; Craig Smith, Seattle, Wash.

[73] Assignee: HNC, Inc., San Diego, Calif.

[21] Appl. No.: 963,908

[22] Filed: Oct. 19, 1992

[51] Int. Cl.5 ........................ G06F 15/18; G06F 15/40
[52] U.S. Cl. ............................... 364/401; 364/419.19; 395/23
[58] Field of Search .......................... 364/401, 419.19; 395/21, 23, 50, 54, 76

[56] References Cited

U.S. PATENT DOCUMENTS 5,235,673 8/1993 Austvold et al. ..................... 395/76

OTHER PUBLICATIONS

Borst, Richard A., "Artificial Neural Networks: The Next Modeling/Calibration Technology for the Assessment Community?", Property Tax Journal, vol. 10 No. 1, Mar. 1991, pp. 69–94.

Carlson, E., "Self-Organizing Features Maps for Appraisal of Land Value of Shore Parcels", Conference: Artificial Neural Networks, vol. 2 Jun. 1991, pp. 1309–1312.

Jackson, Howard F. Jr., "Artificial Int. Appl. for the Real Estate and Financial Industries", Real Estate Finance Journal, vol. v3n3, Winter 1988; pp. 83–84.

Cannaday, R. E., et al., "Weighting Schemes for Adjustment Grid Methods of Appraisal", Appraisal Review Journal.

Bruce, R. W. and Sundell, D. J., "Multiple Regression Analysis: History and Applications in the Appraisal Profession", The Real Estate Appraiser.

Andrews, R. L. and Ferguson, J. T., "Integrating Judgment with a Regression Appraisal", The Real Estate Appraiser and Analyst, Spring 1986.

Gain, K. J. "Appraising by Probability Analysis", The Appraisal Journal, Jan. 1990.

O'Toole, J., "Appraisal Procedures and Real Estate Lending", The Appraisal Journal, Jan. 1989.

Weirick, W. N. and Ingram. F. J., "Functional Form Choice in Applied Real Estate Analysis", The Appraisal Journal, Jan. 1990.

Cronan, et al., "Production System Development for Expert Systems Using a Recursive Partitioning Induction Approach: An Application to Mortgage, Commercial, and Consumer Lending", Decision Sciences, vol. 22 (1991).

Collins, et al., "An Application of a Multiple Neural Network Learning System to Emulation of Mortgage Underwriting Judgements".

Carlson, E, "Self-Organizing Feature Maps for Appraisal of Land Value of Shore Parcels", Artificial Neural Networks, 1991.

Primary Examiner—Donald E. McElheny, Jr.
Attorney, Agent, or Firm—Amir H. Raubvogel; Edward J. Radlo; Judson D. Cary

[57] ABSTRACT

An automated real estate appraisal system (100) and method generates estimates of real estate value using a predictive model such as a neural network (908). The predictive model (908) generates these estimates based on learned relationships among variables describing individual property characteristics (905) as well as general neighborhood characteristics at various levels of geographic specificity (906). The system (100) may also output reason codes indicating relative contributions (1009) of various variables to a particular result, and may generate reports (701) describing property valuations, market trend analyses, property conformity information, and recommendations regarding loans based on risk related to a property.

20 Claims, 17 Drawing Sheets

―201

| — | Microsoft Excel·URAR.XLS | ▼ |
|---|---|---|
| — | File  Region  Section  Analysis  Options  Help | |

R5C10

[ New Record ]   [ Find Record ]   [ Enter Record ]   [ Delete Record ]

Property Description & Analysis

| | | | | |
|---|---|---|---|---|
| SUBJECT | Property Address | | Census Tract | LENDER |
| | City | County  State  Zip Code | | Sale Price |
| | Legal Description ⟍202  APN: | | | Date |
| | Owner/Occupant  Map Reference | | | Mortgage |
| | Sale Price: $  Date of Sale | | PROPERTY RIGHTS | Discount |
| | Loan charges/paid by seller $ | | ☐ Fee | Paid by |
| | R.E.Taxes $  Tax year  HOA $/Mo.Y | | ☐ Leasehold | |
| | Lender/Client ―202― | | ☐ Condominium | |
| | | | ☐ De Minimis | Source |

| | LOCATION | Urban | Suburban | Rural | NEIGHBORHOOD |
|---|---|---|---|---|---|
| NEIGHBORHOOD | BUILT UP | Over 75% | 25-75% | Under 25% | Employment |
| | GROWTH RATE | Rapid | Stable | Slow | Convenience |
| | PROPERTY VALUES | Increasing | Stable | Declining | Adequency |
| | DEMAND/SUPPLY | Shortage | In Balance | Over Supply | Recreation |
| | MARKETING TIME | Under 3Mos | 3-6 Mos. | Over 6 Mos. | Property |
| | PRESENT LAND USE | LAND USE CHG | PREDOM- INANT | SINGLE FAMILY HOUSING | Protection |
| | % Single Family ― | Not Likely ☐ | Owner ☐ | PRICE  AGE $ (000)  (yrs) | Police & Fire |
| | 2-4 Family ― | Likely ☐ | Tenant ☐ | ___ Low ___ | |
| | Multi-family ― | In process ☐ | Vacant ☐ | ___ High ___ | |
| | Comercial ― | To: ___ | | | |

INPUTS.XLS (301, 302)

- Address
- City
- Zip
- APN
- Thomas Bros. Map
- Census Tract
- Date of Sale
- Bath Wainscot
- Cooling Type
- Sq. Ft. Living Area
- Bath Floor
- Floor Materials
- Number of Rooms
- Fireplaces
- Exterior Walls
- Number of Bedrooms
- House Style
- Home Owner Assoc.
- Number of Bathrooms
- Type (Det./Att.)
- Manufactured House
- Number of Stories
- Ownership Type
- Foundation Settlement
- Site Area
- Car Storage Cond.
- Foundation Infestation
- Relative Site Size
- Number of Car Space
- Roof Type
- Site Shape
- Car Storage Type
- Pool Type
- View
- Electric Garage Open.
- Age
- Topography
- Street Type
- Remaing Economic Life
- Landscaping
- Street Maintenan.
- Sale Price
- Flood Hazard

[ Enter Record ]  [ Appraise ]  [ Close ]

FIG. 4

Microsoft Excel REFDATA.XLS (401, 411, 403, 404, 405, 406, 407, 408, 409)

File  Region  Section  Analysis  Options  Help

| Property Address | City | Map Refer | Sale Price | APN | Zip | Sale Date |
|---|---|---|---|---|---|---|
| 1939 White Birch Drive | Vista | 01584 | 230000 | 169-432-22 | 92083 | 02/01 |

(402, 410)

REAL ESTATE APPRAISAL USING PREDICTIVE MODELING

CROSS-REFERENCE TO RELATED APPLICATION

The subject matter of this application is related to the subject matter of pending U.S. application Ser. No. 07/814,179, for "Neural Network Having Expert System Functionality", by Curt A. Levey, filed Dec. 30, 1991, the disclosure of which is incorporated herein by reference.

The subject matter of this application is further related to the subject matter of pending U.S. application Ser. No. 07/941,971, for "Fraud Detection Using Predictive Modeling", by Krishna M. Gopinathan et al., filed Sep. 8, 1992, the disclosure of which is incorporated herein by reference.

37 C.F.R.1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND OF THE INVENTION

1. Field Invention

This invention relates generally to real estate appraisals and sales price predictions. In particular, the invention relates to an automated real estate appraisal system and method that uses predictive modeling to perform pattern recognition and classification in order to provide accurate sales price predictions.

2. Description of Related Art

The "appraised value" of a real estate parcel, or property, comprises some estimate of the full market value of the property on a specified date. A property's appraised value is of great importance in many types of real estate transactions, including sales and loans.

Conventionally, appraised value is determined by a professional appraiser using both objective and subjective factors. One disadvantage of such a method is the difficulty in ensuring that the appraiser conducts a neutral, unbiased analysis in arriving at the appraised value. This difficulty is often compounded by the fact that the appraiser may be retained and paid by an interested party in the contemplated transaction, such as a lender, mortgage broker, buyer, or seller.

In order to reduce bias and provide more accurate appraisals, statistical techniques may be used to obtain an independent, consistent, mathematically derived estimate of a property's value to assist an appraiser in generating an appraised value. Traditional statistical techniques, such as multiple linear regression and logistic regression, have been tried, but such techniques typically suffer from a number of deficiencies. One deficiency is the inability of traditional regression models to capture complex behavior in predictor variables resulting from nonlinearities and interactions among predictor variables. In addition, traditional regression models do not adapt well to changing trends in the data, so that automated model redevelopment is difficult to implement.

One example of the difficulty of applying a regression model to appraisal problems is the uncertainty as to the optimal temporal and geographical sample size for model development. A model developed using all homes in one square city block might theoretically be an effective predictor for that particular neighborhood, but it may not be possible to develop such a model with sufficient stability and reliability, due to the relatively small sample size. On the other hand, a model developed using all homes sold in the United States in the past month might have a sufficiently large sample size, but might be unable to capture local, neighborhood characteristics to provide an accurate appraisal. Thus, a significant deficiency of traditional regression modeling techniques when applied to real estate appraisals is the inability to successfully model neighborhood characteristics while including a sufficiently large sample size to develop a robust, stable statistical model.

It is desirable, therefore, to have an automated system that uses available information regarding real estate properties to provide accurate estimates of value. Preferably, such a system should be flexible enough to allow model development in a relatively small geographic area, it should be able to handle nonlinearities and interactions among predictor variables without advance specification, it should have high predictive accuracy, and it should have capability for redevelopment of the underlying system model as new patterns of real estate pricing emerge.

SUMMARY OF THE INVENTION

In accordance with the present invention, there is provided an automated system (100) and method for real estate appraisals, which uses one or more predictive models such as neural networks (908) to generate estimates of real estate value. The predictive models (908) generate these estimates based on learned relationships among variables describing individual property characteristics (905). The models (908) also learn relationships between individual property characteristics (905) and area characteristics (906). Area characteristics (906) are stored and applied at a level of geographic specificity that varies according to the amount of data available at each of several successively larger geographic areas. In this way the models (908) are able to capture local neighborhood characteristics without unduly reducing sample sizes, which would reduce reliability and predictability.

The learned relationships among individual property characteristics (905) and area characteristics (906) enable the system (100) to estimate the value of the property being appraised. Error models (909) may also be provided to generate an estimated value range or error interval for the sales price. The appraised value and error estimate may then be provided as output (907) to a human decision-maker, along with other related information such as: reason codes that reveal the relative contributions of various factors to the appraised value; and various measures of market trends. Finally, the system (100) periodically monitors its performance, and redevelops the models (908,909) when performance drops below a predetermined level.

BRIEF DESCRIPTION OF THE DRAWINGS

FIG. 2 is a sample data entry screen that forms part of a typical input/output interface for the present invention.

FIG. 3 is a sample quick data entry screen that forms part of a typical input/output interface for the present invention.

FIG. 4 is a sample record selection screen that forms part of a typical input/output interface for the present invention.

DETAILED DESCRIPTION OF THE PREFERRED EMBODIMENTS

The Figures depict preferred embodiments of the present invention for purposes of illustration only. One skilled in the art will readily recognize from the following discussion that alternative embodiments of the structures and methods illustrated herein may be employed without departing from the principles of the invention described herein.

Figure 1:
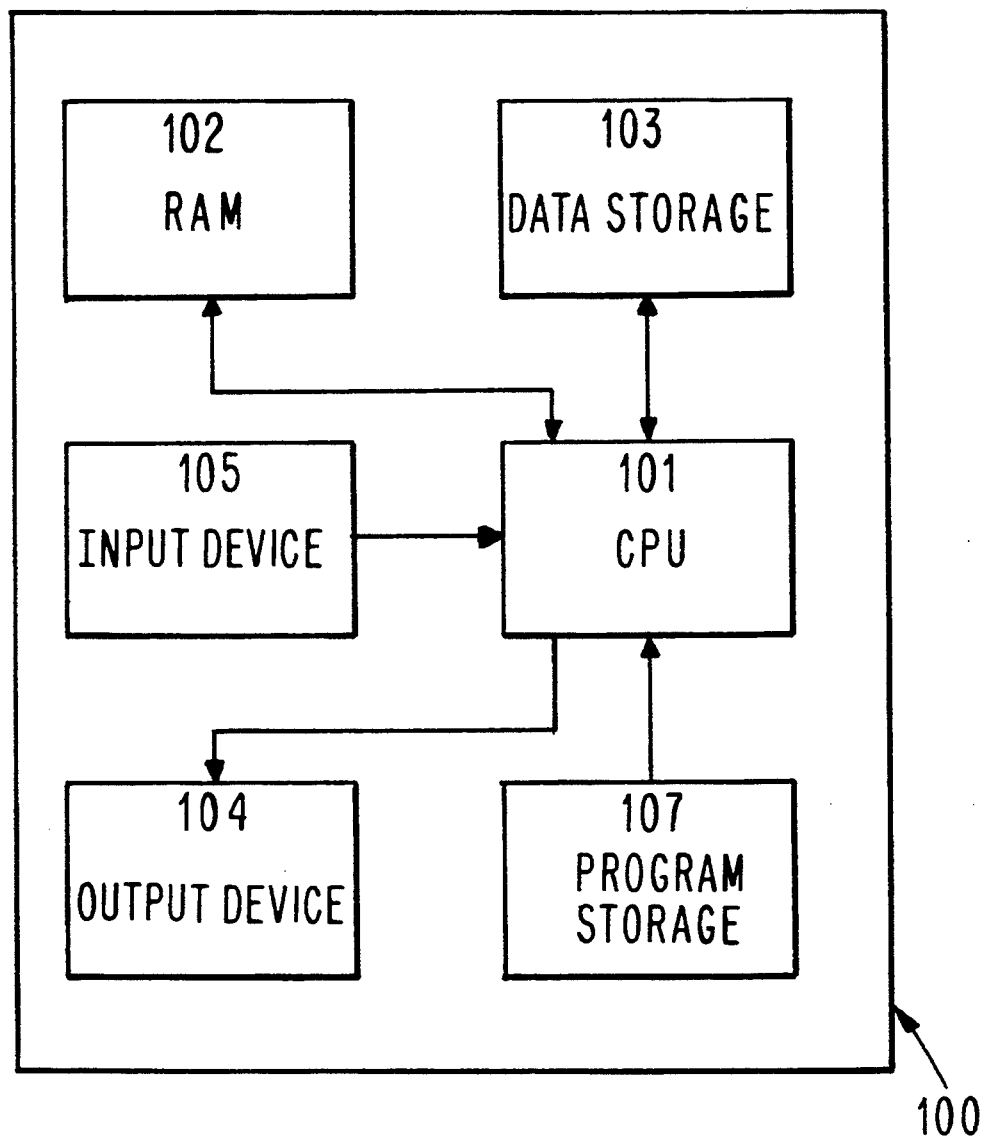
FIG. 1 is a block diagram of an implementation of the present invention.

Referring now to FIG. 1, there is shown a block diagram of a typical implementation of a system 100 in accordance with the present invention. The user supplies property data to system 100 via input device 105. Central processing unit (CPU) 101 runs software program instructions, stored in program storage 107, which direct CPU 101 to perform the various functions of system 100. In the embodiment illustrated herein, the software program is written in the Microsoft Excel macro language and the ANSI C language. Each of these languages may be run on a variety of conventional hardware platforms. Data storage 103 contains data describing real estate properties, as well as regional data. It also contains model parameters. In accordance with the software program instructions, CPU 101 accepts input from input device 105, accesses data storage 103, and uses RAM 102 in a conventional manner as a workspace. CPU 101, data storage 103, and program storage 107 operate together to provide predictive neural network models 908 for real estate appraisal, as well as error models 909 for generating error ranges for the appraised values. If desired, multiple models 908 and 909 may be used (for example, one for each geographic region), particularly when property pricing characteristics vary widely from region to region. After neural network models 908 and error models 909 process the information, as described below, to obtain estimates of property value and error range, a signal indicative of the estimate and error range is sent from CPU 101 to output device 104.

In the embodiment illustrated herein, CPU 101 can be a mainframe computer or a powerful personal computer; RAM 102 and data storage 103 are conventional RAM, ROM and disk storage devices for the CPU; and output device 104 is a conventional means for either printing results based on the signals generated by neural network models 908 and error models 909, displaying the results on a video screen using a window-based interface system, or sending the results to a database for later access.

Referring now also to FIGS. 2 through 7, there are shown sample screens from a conventional window-based interface system (not shown) that forms part of output device 104. FIG. 2 shows data entry form 201 that allows the user to enter data describing a property for appraisal. Form 201 is also known as a Uniform Residential Appraisal Report (URAR) form. It contains a number of data fields 202. Scroll bars 203 are provided to allow navigation throughout form 201.

FIG. 3 shows quick data entry form 301 that allows quick entry of property data without using a complete URAR form 201. This form is intended for use when a quick estimate of property value is required. A number of fields 302 are provided, which represent a subset of the fields 202 in URAR form 201. Data entered on URAR form 201 for a particular property is automatically transferred to quick form 301, and vice versa.

FIG. 4 shows record selection screen 401 that allows the user to select among previously-entered property records in order to view URAR form 201 for the selected record. Record selection screen 401 lists a plurality of records 402, showing the address 403, city 404, map reference 405, sale price 406, assessor parcel number (APN) group 407, ZIP code 408, and sale date 409 for each record. Scroll bars 410 are provided to allow navigation throughout the list of records, and selected records are indicated by highlighting 411.

Figures 5, 6:
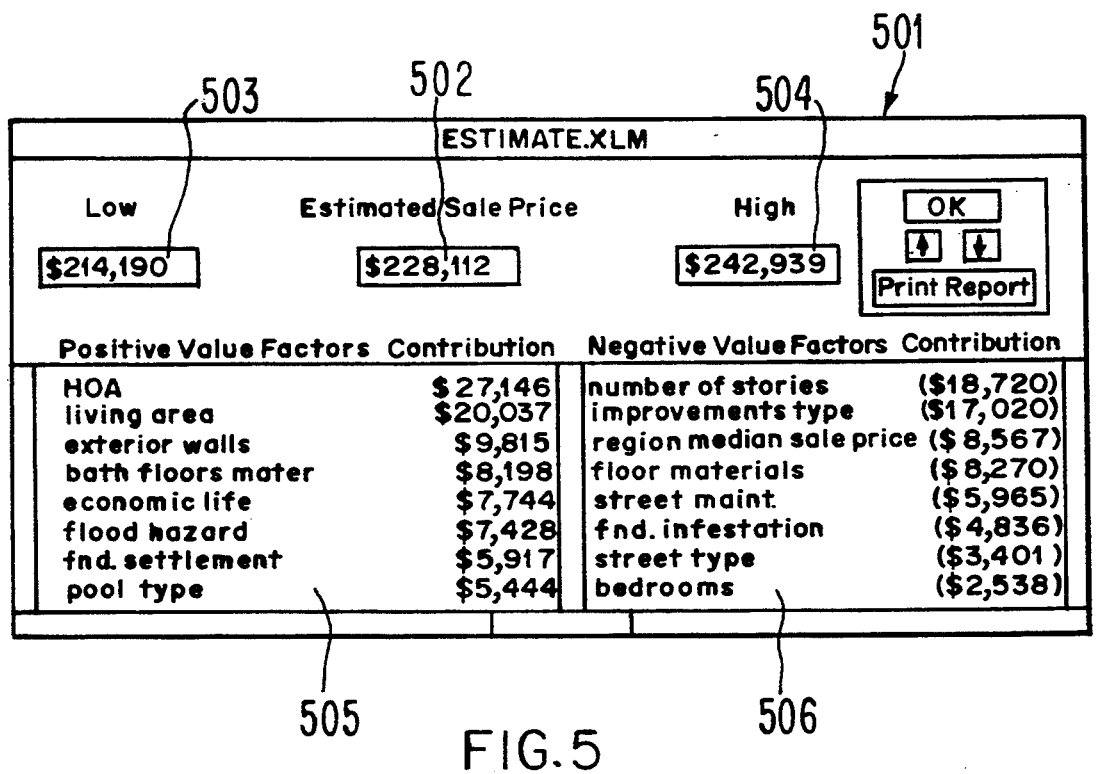
FIG. 5 is a sample sales price estimate screen that forms part of a typical input/output interface for the present invention.
FIG. 6 is a sample area averages screen that forms part of a typical input/output interface for the present invention.

FIG. 5 shows sales price estimate screen 501 that provides appraisal information. Estimated sales price 502 is shown, along with lowest typical sales price 503 and highest typical sales price 504. Also shown are positive contribution factors 505 that tend to drive the price of the property up, and negative contribution factors 506 that tend to drive the price of the property down.

FIG. 6 shows area averages screen 601 that shows average values 602 for several property criteria 603 for a selected geographic area, alongside comparative values for a selected property 605. Clicking arrow buttons 606 changes the level of geographic specificity, according to the following sequence: neighborhood, local, extended, region, and county. The example shows neighborhood values, representing the average values for all properties sold in the same neighborhood as the selected property, over a period of time prior to the selected sale.

Figure 7:
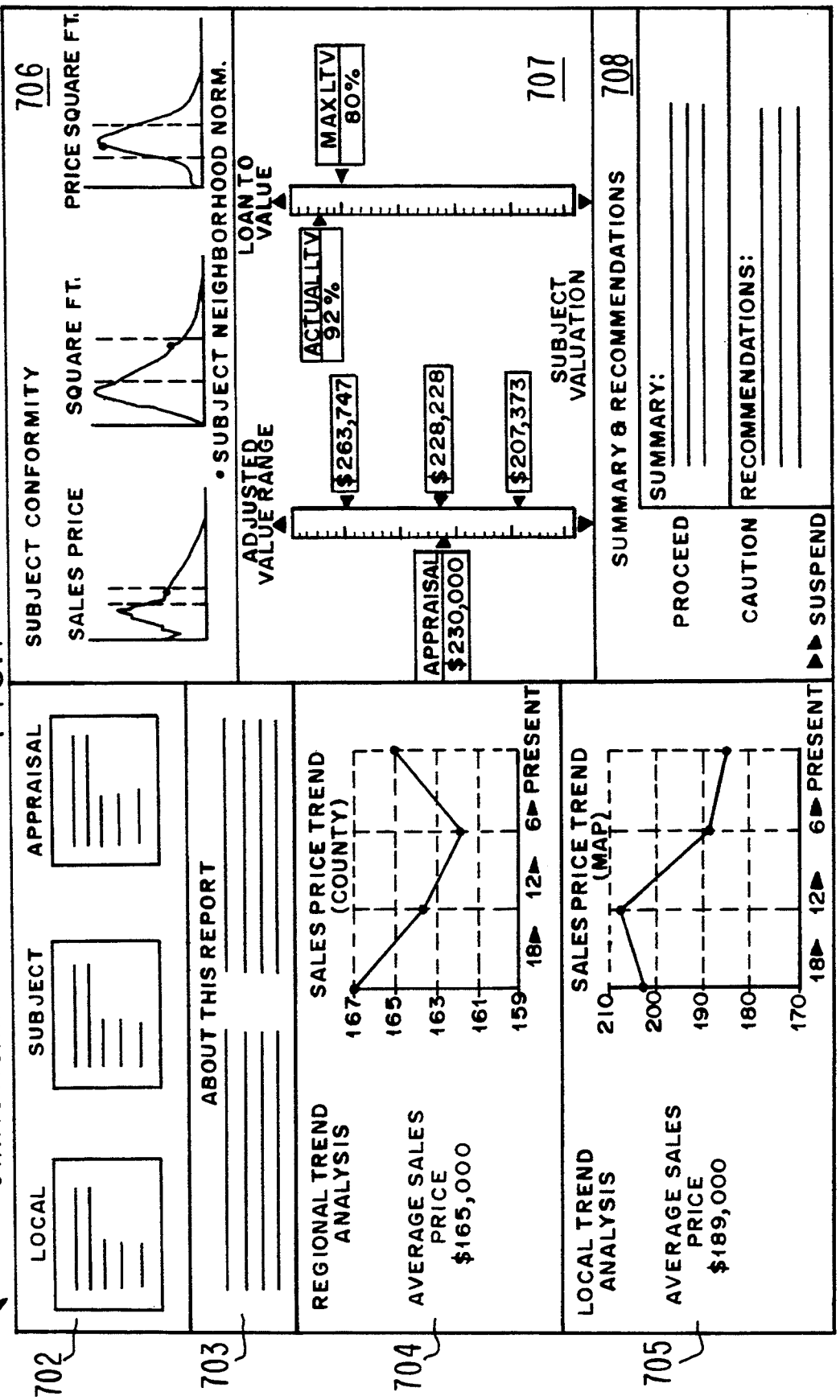
FIG. 7 is a sample report produced by the present invention.

Referring now to FIG. 7, there is shown statistical review report 701 summarizing property information and estimated value, and providing recommendations regarding loan processing with respect to the property. This type of report would typically be used when system 100 of the present invention is employed to appraise properties in connection with loan processing. Identification portion 702 identifies the loan, property, and appraisal to which report 701 pertains. Explanatory portion 703 gives general explanatory information concerning the report. Regional trend analysis portion 704 reports average sales prices for the county and ZIP code in the four preceding semiannual periods, indicating market stability and providing a broad foundation for valuation and risk analysis. Local trend analysis portion 705 reports average sales prices for smaller geographic areas, such as the census tract, map grid, and assessor parcel number (APN) group, in the four preceding semiannual periods, indicating local market stability and providing a further information useful for valuation and risk analysis. Subject conformity portion 706 compares sales price, square footage, and price per square foot for the property with the norms for the neighborhood. Subject valuation portion 707 provides a value range for the property based on the characteristics of the property and the region, and compares the value range with an appraisal value determined by an independent human appraiser. Subject valuation portion 707 also provides an indication of the loan-to-value (LTV) ratio of the loan, and a comparison with a user-supplied maximum LTV ratio. Summary and recommendations portion 708 summarizes the information given in the other portions and recommends one of "Proceed", "Caution", or "Suspend".

Figure 8:
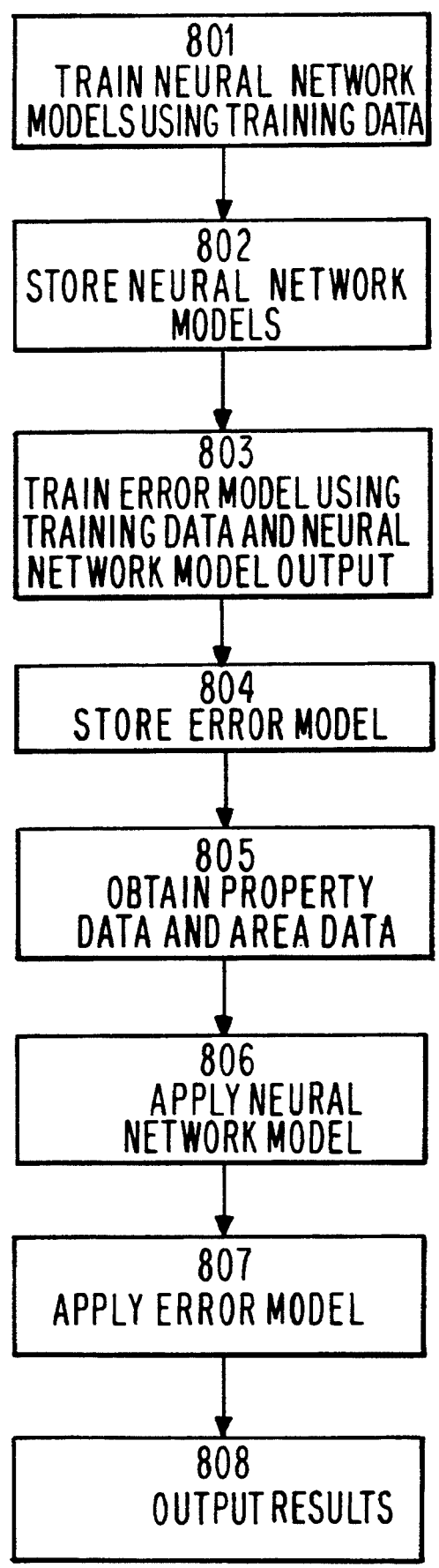
FIG. 8 is a flowchart illustrating the major functions and operation of the present invention.

Referring now to FIG. 8, there is shown an overall flowchart illustrating the major functions and operation of system 100. First neural network models 908 are trained 801 using training data describing a number of individual real estate properties, characteristics, and prices, as well as area characteristics. If real estate pricing characteristics vary widely from region to region, it may be advantageous to use different models 908 for the different regions (counties, for example). Once neural network models 908 are trained, neural network model parameters are stored 802. Error models 909, which are typically regression models, are then trained 803 using additional training data and output from neural network models 908. Once error models 909 are trained, error model parameters are stored 804, and system 100 is able to estimate prices and pricing errors for a subject property. System 100 obtains 805 property data describing the subject property 905, as well as data describing the area in which the subject property is situated 906. System 100 then applies 806 property data 905 and area data 906 to the appropriate stored neural network model 908. It then applies 807 property data 905 and area data 906 to the appropriate stored error model 909. The models 908 and 909 estimate sales price, reason codes (described below), and estimated error, which are output 805 to the user, or to a database, or to another system via output device 104.

Figure 9:
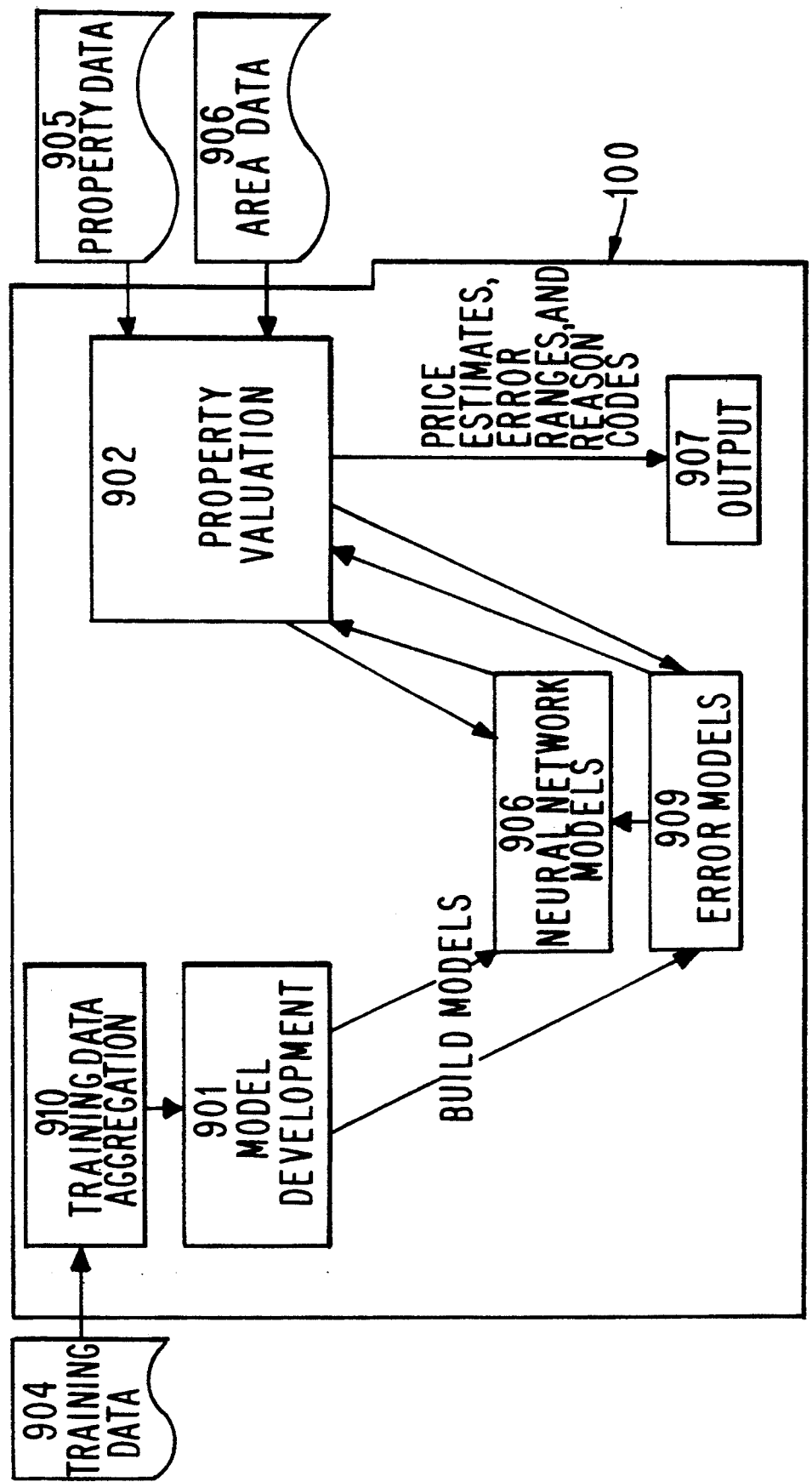
FIG. 9 is a block diagram showing the overall functional architecture of the present invention.

Referring now to FIG. 9, the overall functional architecture of system 100 is shown. System 100 is broken down into two major components: model development component 901 and property valuation component 902. Model development component 901 uses training data 904 describing a number of real estate properties, characteristics, and prices to build neural network models 908 containing information representing learned relationships among a number of variables. Together, the learned relationships form models 908 of the behavior of the variables. Although neural network models 908 are used in the embodiment illustrated herein, any type of predictive modeling technique may be used, such as regression modeling. For purposes of illustration, the invention is described here in terms of neural network statistical models 908. Model development component 901 also uses training data 904 to develop error models 909, which are typically regression models used to estimate error in predicted sales prices generated by neural network models 908.

Property valuation component 902 feeds input data describing the subject property 905 and its geographic area 906 to neural network models 908 and error models 909. It obtains results from models 908 and 909 and generates price estimates, error ranges, and reason codes. A report is prepared using this information, and the report is output 907 either to a screen display, printer, or stored in a database for future access.

Each of the two components 901 and 902 of system 100 will be described in turn.

Model Development Component 901

Neural networks employ a technique of "learning" relationships through repeated exposure to data and adjustment of internal weights. They allow rapid model development and automated data analysis. Essentially, such networks represent a statistical modeling technique that is capable of building models 908 from data containing both linear and non-linear relationships. While similar in concept to regression analysis, neural networks are able to capture nonlinearity and interactions among independent variables without pre-specification. In other words, while traditional regression analysis requires that nonlinearities and interactions be detected and specified manually, neural networks perform these tasks automatically. For a more detailed description of neural networks, see D. E. Rumelhart et al, "Learning Representations by Back-Propagating Errors", Nature v. 323, pp. 533–36 (1986), and R. Hecht-Nielsen, "Theory of the Backpropagation Neural Network", in Neural Networks for Perception, pp. 65–93 (1992), the teachings of which are incorporated herein by reference.

Figure 20:
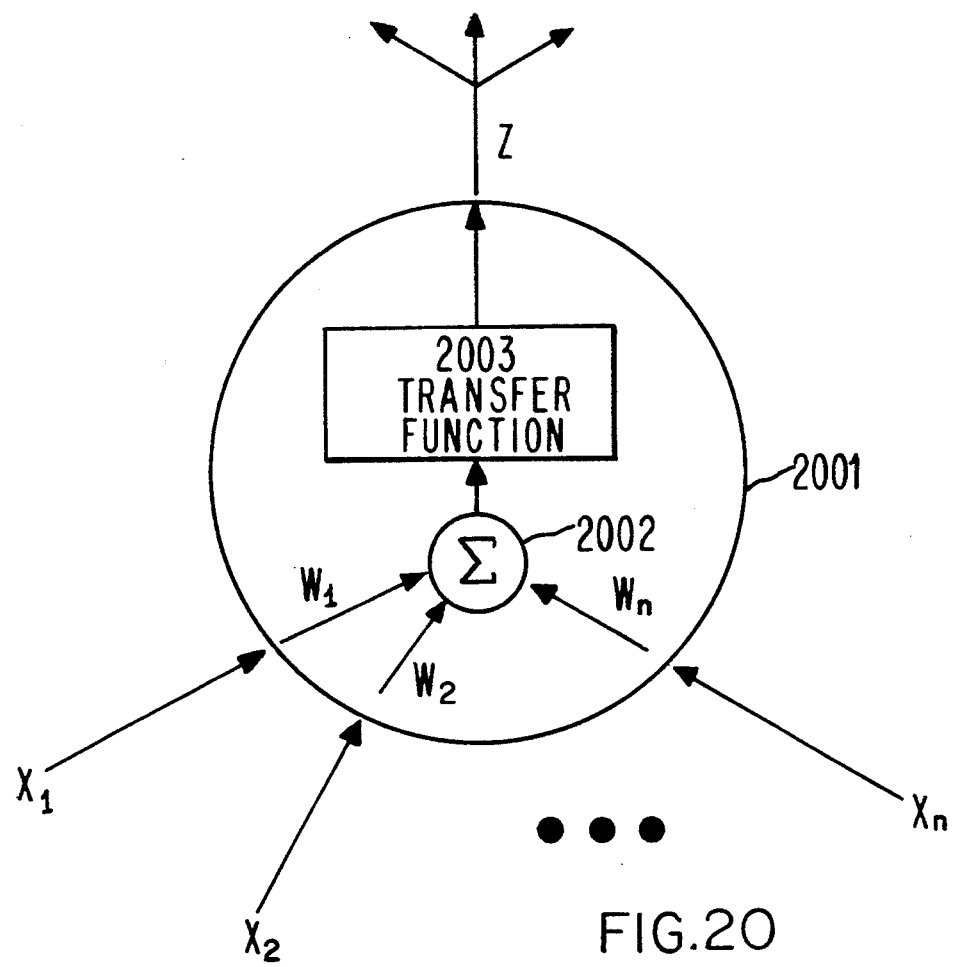
FIG. 20 is a diagram of a single processing element within a neural network.

Neural networks comprise a number of interconnected neuron-like processing elements that send data to each other along connections. The strengths of the connections among the processing elements are represented by weights. Referring now to FIG. 20, there is shown a diagram of a single processing element 2001. The processing element receives inputs $X_1, X_2, \ldots X_n$, either from other processing elements or directly from inputs to the system. It multiplies each of its inputs by a corresponding weight $w_1, w_2, \ldots w_n$ and adds the results together to form a weighted sum 2002. It then applies a transfer function 2003 (which is typically non-linear) to the weighted sum, to obtain a value Z known as the state of the element. The state Z is then either passed on to another element along a weighted connection, or provided as an output signal. Collectively, states are used to represent information in the short term, while weights represent long-term information or learning.

Figure 21:
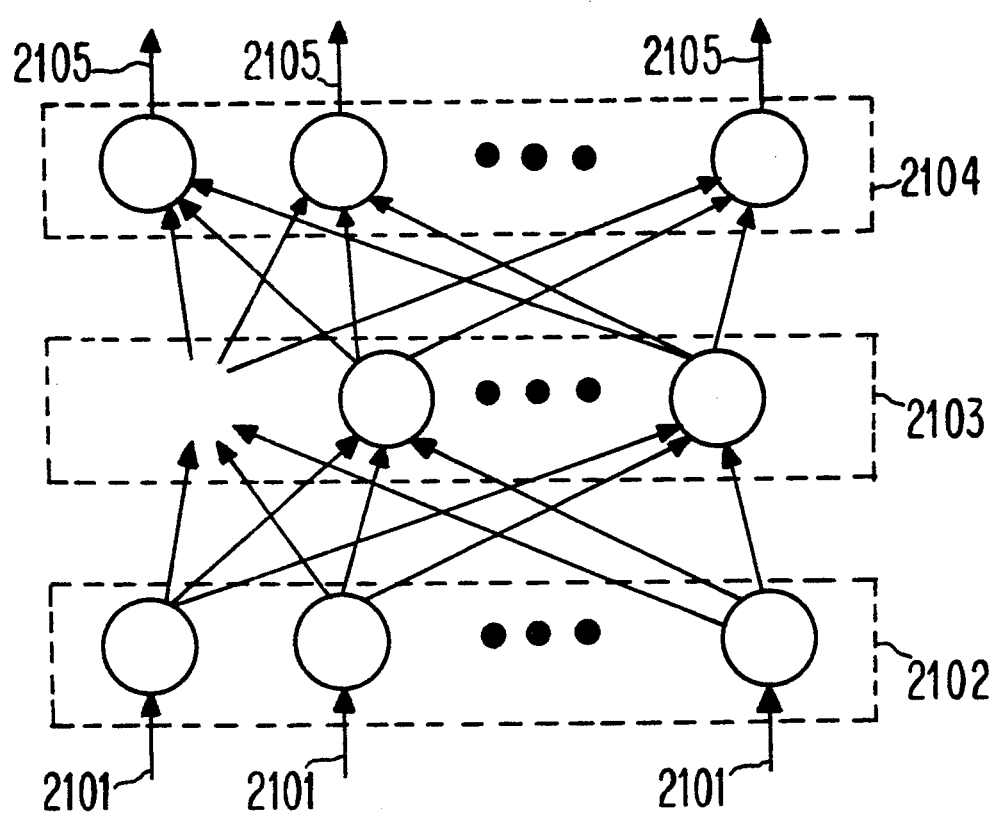
FIG. 21 is a diagram illustrating hidden processing elements in a neural network.

Processing elements in a neural network can be grouped into three categories: input processing elements (those which receive input data values); output processing elements (those which produce output values); and hidden processing elements (all others). The purpose of hidden processing elements is to allow the neural network to build intermediate representations that combine input data in ways that help the model learn the desired mapping with greater accuracy. Referring now to FIG. 21, there is shown a diagram illustrating the concept of hidden processing elements. Inputs 2101 are supplied to a layer of input processing elements 2102. The outputs of the input elements are passed to a layer of hidden elements 2103. Typically there are several such layers of hidden elements. Eventually, hidden elements pass outputs to a layer of output elements 2104, and the output elements produce output values 2105.

Neural networks learn from examples by modifying their weights. The "training" process, the general techniques of which are well known in the art, involves the following steps:

(1) Repeatedly presenting examples of a particular input/output task to the neural network model;
(2) Comparing the model output and desired output to measure error; and
(3) Modifying model weights to reduce the error.

This set of steps is repeated until further iteration fails to decrease the error. Then, the network is said to be "trained." Once training is completed, the network can predict outcomes for new data inputs.

In the present invention, data used to train models 908 are drawn from various database files containing data on individual properties. These data are aggregated to obtain medians and variances across geographic areas. Thus, models 908 are able to capture relationships among individual property characteristics, as well as relationships between individual property characteristics and the characteristics of the surrounding geographic area.

Figure 19:
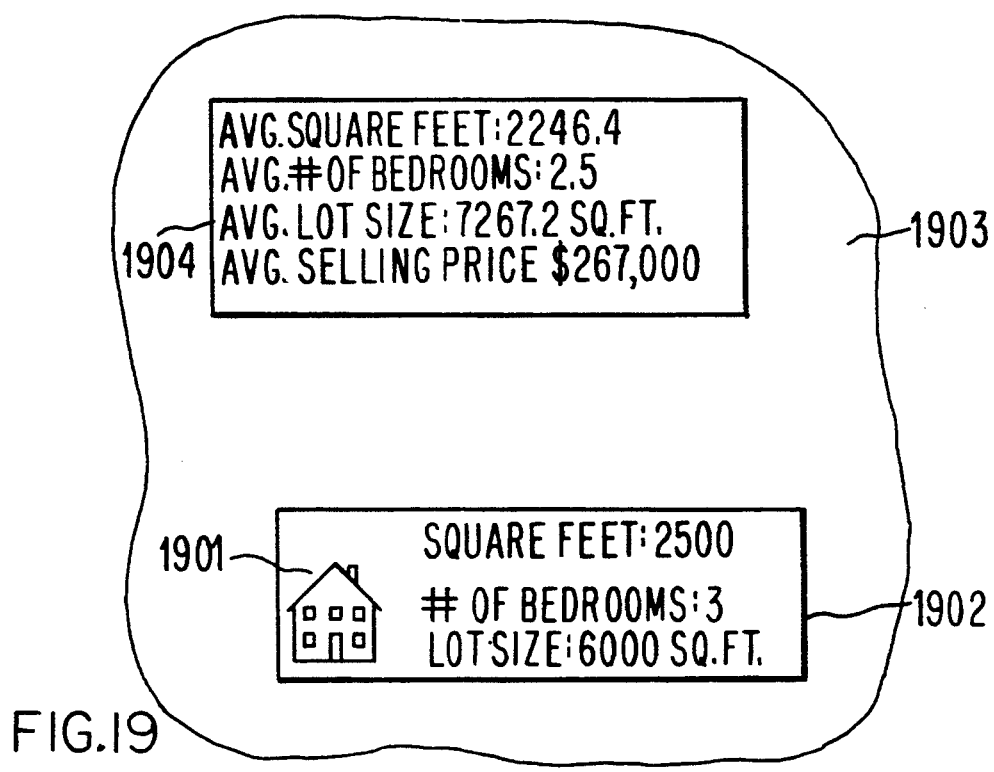
FIG. 19 is a diagram showing an example of the relationship between individual property characteristics and area characteristics.

Referring now to FIG. 19, there is shown an example of this technique. House 1901 has associated with it individual property characteristics 1902, namely 2500 square feet, 3 bedrooms, and a 6000 square foot lot. In order to provide effective predictive modeling of the estimated selling price of house 1901, neural network models 908 use area characteristics 1904 for geographic area 1903. The area characteristics 1904 are 2246.4 average square feet, 2.5 average bedrooms, 7267.2 average square foot lot size, and $267,000 average selling price. These represent averages for homes sold in area 1903 in the last x months, where x is a predetermined time period. By comparing individual property characteristics 1902 with area characteristics 1904, neural network models 908 are able to more effectively estimate the selling price of house 1901.

An important factor in the effectiveness of neural network models 908 is the sample size used to train models 908. Conventional regression models and model designs for real estate appraisal generally use small samples in an attempt to provide a homogeneous group of properties in the developmental sample. See J. Mark & M. Goldberg, "Multiple Regression Analysis and Mass Assessment: A Review of the Issues", *The Appraisal Journal* v. 56(1)., pp. 89–109 (1988), and H.-B. Kang & A. Reichert, "An Empirical Analysis of Hedonic Regression and Grid-Adjustment Techniques in Real Estate Appraisal", *AREUEA Journal* v. 19, no. 1, pp. 70–91 (1991), the teachings of which are incorporated herein by reference. For example, properties within a single city block would generally provide effective predictor models for capturing neighborhood characteristics within the block. A problem with this approach is that a large number of distinct models must be built. Since each model is created using a set of training data describing properties within the associated city block, an extremely large number of properties is required to effectively train all the models.

On the other hand, use of larger geographic areas such as ZIP codes results in diminished ability to capture local neighborhood characteristics.

The method of the present invention provides effective predictor variables that preserve information describing neighborhood characteristics without unduly increasing the number of models and predictor variables required for training. It accomplishes this by aggregating individual property data in the training data set into area characteristics in a flexible manner, using the smallest geographic areas containing sufficient data to produce reliable models 908. The models 908 are thus able to capture area characteristics for relatively small geographic areas where the data describing these characteristics are available.

Figure 17A:
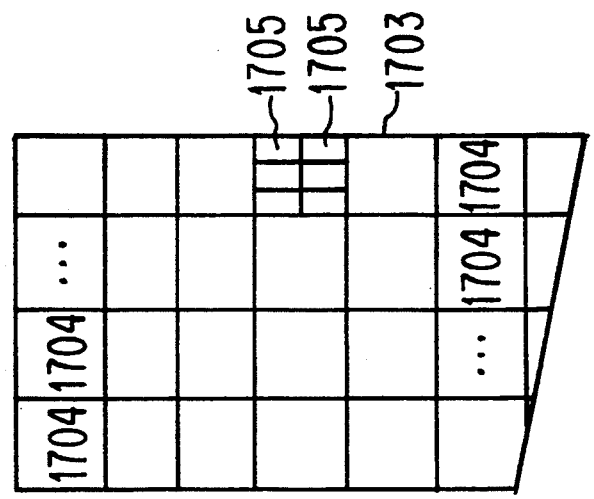
FIG. 17 is a diagram showing an example of geographic subdivision according to the present invention.
Figure 17:
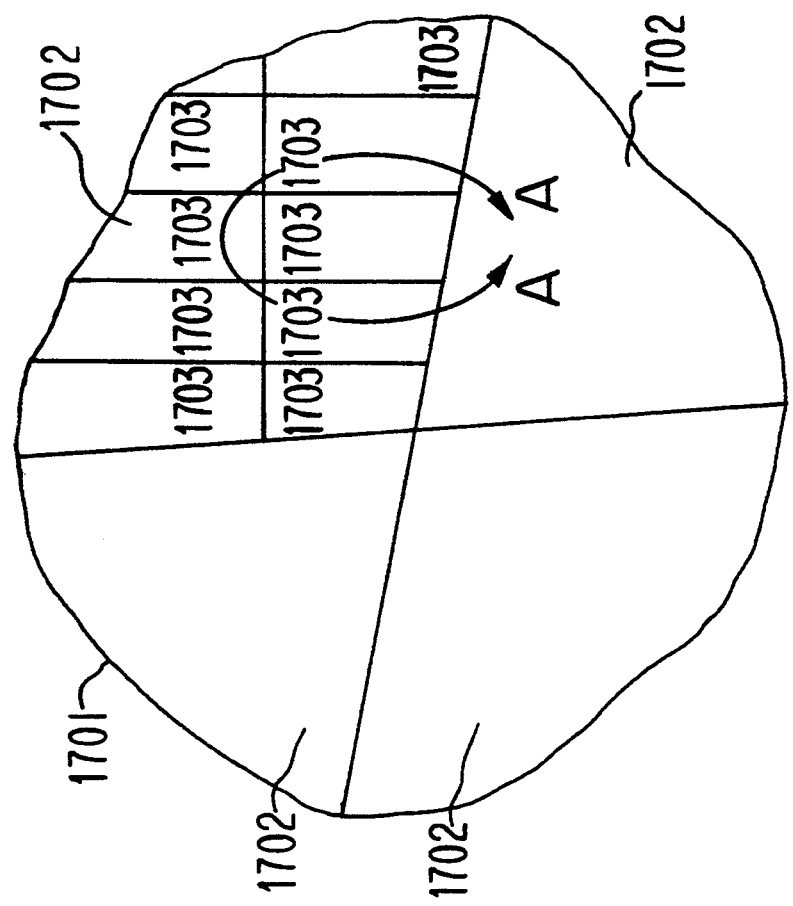

Referring now to FIG. 17, there is shown an example of geographic subdivision according to the present invention. Each region 1701 is divided into successively smaller geographic areas. In the example shown, the geographic areas are ZIP codes 1702, census tracts 1703, map coordinates 1704, and assessor parcel number (APN) groups 1705. Other geographic areas, such as census blocks, or lot blocks, may also be used.

Figure 18:
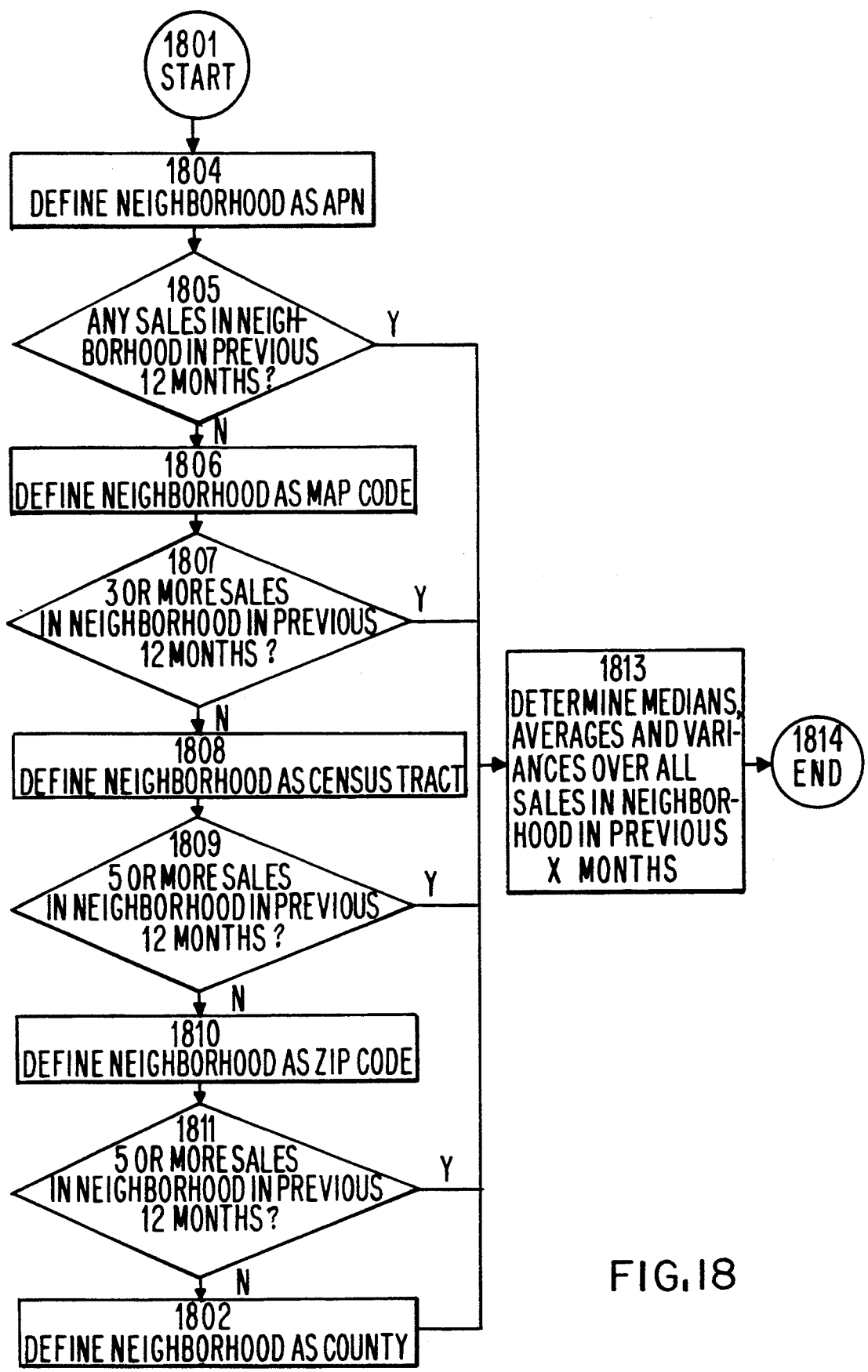
FIG. 18 is a flowchart showing a method of aggregating individual property data into successively larger geographical areas according to the present invention.

Referring now also to FIG. 18, there is shown a flowchart of the aggregation method. System 100 uses data describing real estate sales activity for each month of a user-specified training period, such as eighteen months. For each month within the training period, system 100 performs the steps shown in FIG. 18. System 100 initially defines 1804 the "neighborhood" as the smallest geographical area, such as the APN group 1705. If there have been any sales in the previous 12 months 1805, system 100 proceeds to step 1813. If not, it defines 1806 the neighborhood as the next larger geographic area, the map code 1704. If there have been at least 3 sales in the previous 12 months 1807, system 100 proceeds to step 1813. System 100 continues to enlarge the definition of the neighborhood until a predetermined minimum number of sales have occurred within a predetermined period of time. The minimum number of sales and the period of time in steps 1805, 1807, 1809, and 1811 may vary according to the optimal sample size and geographic specificity required. In addition, the number and size of the geographic areas may vary. Once the predetermined minimum number of sales for a particular geographic area has been met, system 100 determines 1813 medians, averages, and variances for various property characteristics such as sales price, square feet, number of bedrooms, etc.

Property characteristics used as predictor variables in the embodiment illustrated herein include, for example:

PREDICTOR VARIABLES IN AREAS MODEL

AIR_COND: type of air conditioning
BA_FLCND: condition of bathroom floor
BA_FLMAT: bathroom floor material
BA_NUM: number of bathrooms
BA_WNCON: condition of bathroom wainscot
BA_WNMAT: bathroom wainscot material
BEDRMS_N: number of bedrooms
FRPL_NUM: number of fireplaces
FRPL_TYP: type of fireplace
FL_ZONE: flood zone?
FLR_MAT: main floor material
FND_INF: foundation infestation?
FND_SETL: foundation settlement?
IMP_TYPE: improvement type (attached, townhouse, etc.)
LANDSCAP: adequate landscaping?
MAN_HOME: manufactured house?
OWN_TYPE: ownership type (condo, single family residence, etc.)
P_COND: condition of parking structure
P_SPACES: number of parking spaces
P_STRAGE: type of parking (garage, carport, etc.)
P_DOROPN: electric garage door opener?
ROOFTYPE: type of roofing material
R_TOT_N: number of rooms
LOT_SHAP: lot shape
SITE_INF: site influence (ocean, mountains, etc.)
SL_STM: public or private street maintenance?
SL_STT: street surface material
PARCLSIZ: size of parcel (typical, undersized or oversized)
SQ_FT_LA: square footage of living area
STRYSFDU: number of stories
STYLECOD: style of house (colonial, ranch, etc.)
TOPOCODE: topography of lot (level, hilly, etc.)
WAL_EXTT: exterior wall material
POOLTYPE: pool, spa, both, or none
AGE: age of home
HOA: home owner's dues?
ECONLIFE: economic life (remaining years) of house
LN_LOT: natural log of lot size
APN_COMP: median comps price (local neighborhood)
ZIP_COMP: median comps price (zip code or county wide)
ZIPCMPBE: median # of bedrooms in comps (zip code or county-wide)
ZIPCMPBA: median # of bathrooms in comps (zip code or county-wide)
ZIPCMPSQ: median square footage in comps (zip code or county-wide)
ZIPCMPAG: median age in comps (zip code or county-wide)
ZIPCMPRM: median # of rooms in comps (zip code or county-wide)
ZIPCMPGA: median # of parking spaces in comps (zip code or county-wide)
ZIPCMPFP: median # of fireplaces in comps (zip code or county-wide)
APNDIFAG: age differential (current property minus local comps)
APNDIFBA: # bathrooms differential (current property minus local comps)
APNDIFBE: # bedrooms differential (current property minus local comps)
APNDIFFP: # fireplaces differential (current property minus local comps)
APNDIFGA: # park spaces differential (current property minus local comps)
APNDIFRM: # rooms differential (current property minus local comps)
APNDIFSQ: sq. footage differential (current property minus local comps)

Once system 100 has obtained predictor variables as described above for each month in the training period, the predictor variables are fed to networks 908 and networks 908 are trained. The embodiment illustrated herein uses a modeling technique known as a backpropagation neural network 908. This type of network 908 estimates parameters which define relationships among variables using a training method. The preferred training method, well known to those skilled in the art, is called "backpropagation gradient descent optimization" and is described in Gopinathan et al., although other well-known neural network training techniques may also be used.

Once the neural networks have been trained using training data, the network model definitions are stored in data files in a conventional manner. These data files describe the neural network architecture, weights, the data configuration, data dictionary, and file format.

In addition to developing and storing neural network models 908 as described above, model development component 901 also develops error models 909. Typically, these error models 909 are implemented as conventional regression models, known to those skilled in the art, although other predictive modeling-techniques, such as neural networks, may be used. As with neural network models 908, different error models 909 may be provided for different regions.

To develop error models 909, system 100 determines the absolute percent error of the neural network model estimate for each record in the training data set. Based on a set of input parameters, error model 909 is trained to forecast the absolute percent error of the neural network model estimate. Training methods for regression models are well known in the art. An example of a set of input parameters used in the embodiment illustrated herein is given below:

PREDICTOR VARIABLES IN AREAS ERROR MODEL

PRED_SP: predicted sales price
PRED_SP2: square of PRED_SP
PRED_SP3: cube of PRED_SP
APNPDIF: normalized difference between PRED_SP and local median price
APNPDIF2: square of APNPDIF
APNPDIF3: cube of APNPDIF
ZIPPDIF: normalized difference between PRED_SP and zip code median price
APNSRC: size of local neighborhood
AIR_COND: type of air conditioning
BA_FLMAT: bathroom floor material
BA_WNCON: bathroom wainscot condition
FND_INF: foundation infestation?
FRPL_TYP: type of fireplace
IMP_TYPE: improvement type (attached, townhouse, etc.)
MAN_HOME: manufactured house?
OWN_TYPE: ownership type (condo, single family residence, etc.)

PARCLSIZ: size of parcel (typical, undersized or oversized)
POOLTYPE: pool, spa, both, or none
P_COND: condition of parking structure
P_DOROPN: electric garage door opener?
P_STRAGE: type of parking (garage, carport, etc.)
SL_STM: public or private street maintenance?
TOPOCODE: topography of lot (level, hilly, etc.)
WAL_EXTT: exterior wall material
AGE: age of home
AGE2: square of AGE
AGE3: cube of AGE
APNDIFAG: difference between age of home and local median age
APNDFAG2: square of APNDIFAG
APNDFAG3: cube of APNDIFAG
APNDFBE3: cube of difference between # bedrooms and local median
APNDFFP2: square of difference between # fireplaces and local median
APNDFFP3: cube of difference between # fireplaces and local median
APNDIFGA: difference between # parking places and local median
APNDFGA2: square of APNDIFGA
APNDFRM2: square of difference between # rooms and local median
APNDFSQ3: cube of difference between square footage and local median
BA_NUM: number of bathrooms
ECONLIFE: economic life (remaining years) of house
ECONLIF3: cube of ECONLIFE
PSPACES3: cube of number of parking spaces
R_TOT N: total number of rooms
R_TOT N2: square of R_TOT_N
R_TOT N3: cube of R_TOT_N
SQ_FT_LA: square footage
ZIPCMPAG: difference between age of home and zip code median age
ZIPCMAG3: cube of ZIPCMPAG
ZIPCMPBA: difference between # bathrooms and zip code median
ZIPCMBA2: square of ZIPCMPBA
ZIPCMPBE: difference between # bedrooms and zip code median
ZIPCMBE2: square of ZIPCMPBE
ZIPCMBE3: cube of ZIPCMPBE
ZIPCMFP2: square of difference between # fireplaces and zip code median
ZIPCMFP3: cube of difference between # fireplaces and zip code median
ZIPCMGA2: square of difference between # parking places and zip code median
ZIPCMSQ2: square of difference between square footage and zip code median
ZIPCMSQ3: cube of difference between square footage and zip code median
ZIP_COMP: median sales price across zip code
ZIPCOMP2: square of ZIP_COMP
ZIPCOMP3: cube of ZIP_COMP Property Valuation Component 902

As seen in FIG. 9, property valuation component 902 reads data 905 describing the property to be appraised (known as subject property) and data 906 describing the surrounding geographical area 906, and generates as output 907 a price estimate for the subject property. Furthermore, property valuation component 902 outputs a range of values based on the estimated maximum error of the price estimate, as well as a list of contributing variables, or reason codes, for the price estimate.

Property data 905 are generally entered by the user on a data entry form such as those shown in FIGS. 2 and 3. The data may be entered either interactively, or in batch mode using tape or disk storage devices. Property data 905 describe the particular property to be appraised, and they typically include the same types of predictor variables as listed above for training data 904.

Area data 906 are collected from databases describing properties in geographical areas surrounding the subject property. The method by which area data 906 are collected is described below. Typically, area data 906 include averages of the same types of predictor variables as listed above for training data 904.

Figure 10:
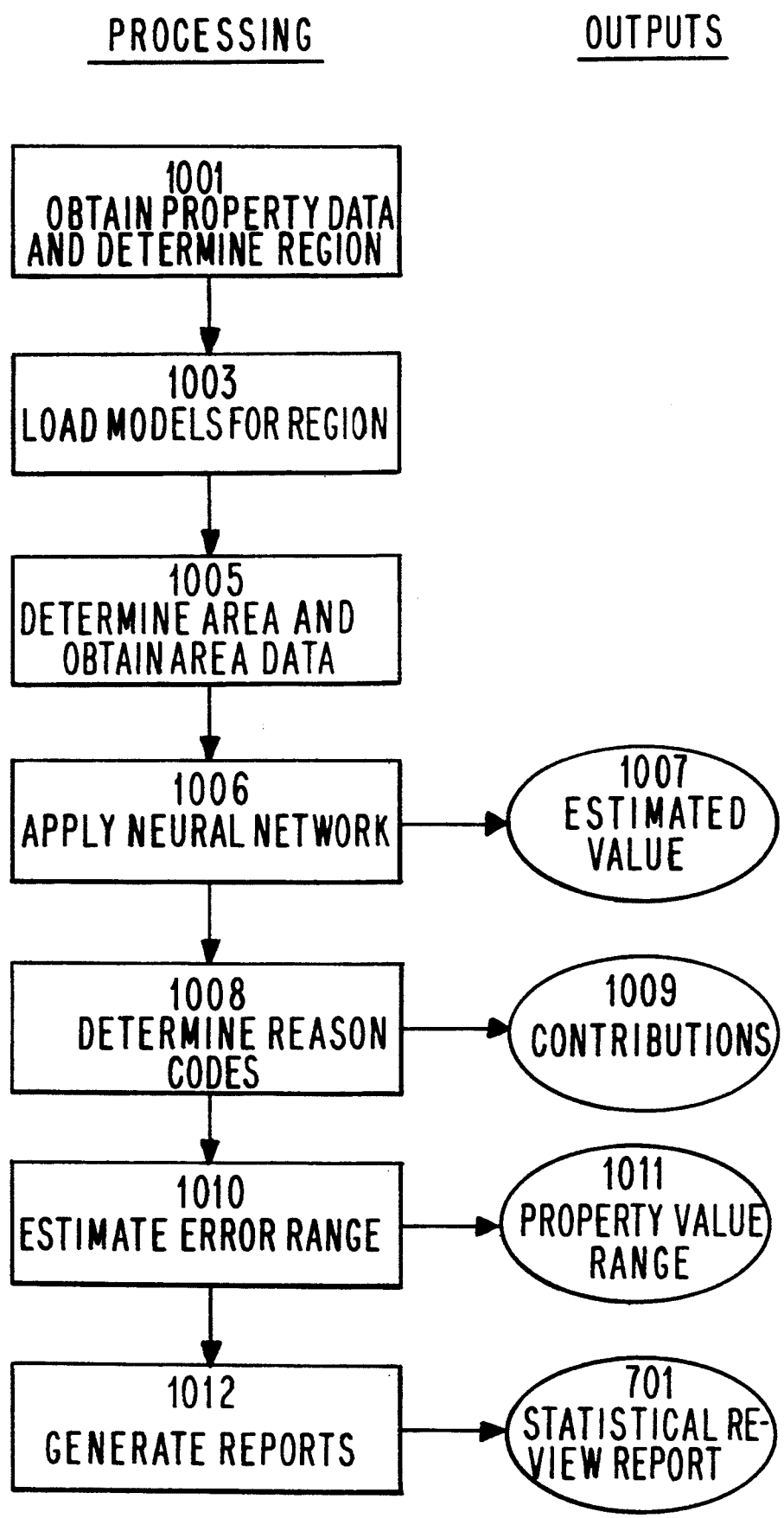
FIG. 10 is a block diagram showing the property valuation process of the present invention.

Referring now to FIG. 10, there is shown a flowchart of the property valuation process of the present invention. System 100 obtains 1001 property data 905 from user input or batch input. Based on property data 905, it determines 1001 the appropriate region to be used for the analysis. As shown in FIG. 17, a region 1701 is a relatively large geographic area containing a number of smaller geographic areas. Each region 1701 may be associated with a separate neural network model 908, as well as a separate error model 909. System 100 then loads 1003 neural network model 908 and error model 909 for the region 1701 containing the subject property.

System 100 then determines 1005 which area to use in the analysis and obtains area data 906. In determining 1005 the optimal area for the analysis, system 100 uses a technique that captures local neighborhood characteristics while including a sufficiently large sample size to preserve predictability and reliability. Generally, system 100 accomplishes this by seeking the smallest geographic area containing both the subject property and at least one other property that was sold within the past x months, where x is a predetermined time period.

Figure 11:
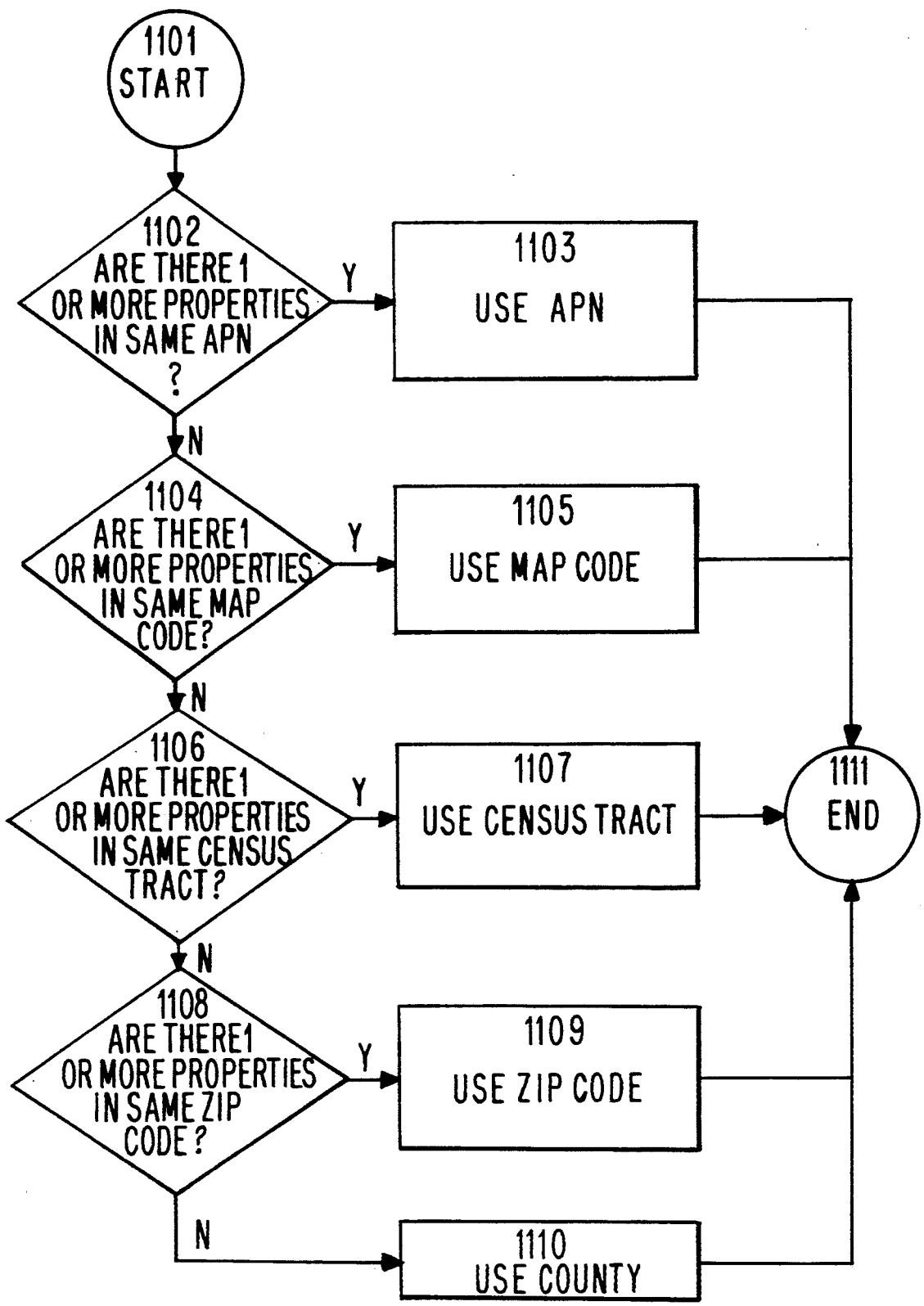
FIG. 11 is a flowchart showing a method of determining area and obtaining area data according to the present invention.

Referring now also to FIG. 11, there is shown the method of determining 1005 the optimal area to use. As shown in the flowchart, system 100 uses the smallest geographic area containing at least one property that was sold within the past x months, in addition to the subject property. The minimum number of properties, the time period, and the particular areas available for use, may vary depending on the level of geographic specificity and sample size desired.

System 100 applies 1006 the appropriate neural network 908 to subject property data 905 and area data 906. Neural network 908 generates estimated value 1007. System 100 then determines 1008 reason codes indicating which inputs to model 908 are most important in determining estimated value 1007. Any technique to generate such reason codes may be used. In the embodiment illustrated herein, the technique set forth in co-pending U.S. application Ser. No. 07/814,179, for "Neural Network Having Expert System Functionality", by Curt A. Levey, filed Dec. 30, 1991, the disclosure of which is hereby incorporated by reference, is used. System 100 uses the reason codes to generate 1009 a list of contribution factors to the estimated value, shown in FIG. 5 as positive contribution factors 505 and negative contribution factors 506.

System 100 also estimates 1010 the error range of its appraisal. In the embodiment illustrated herein, error estimation is performed by applying error model 909, typically a regression model, to subject property data 905 and area data 906. Error model 909 uses conventional regression techniques to generate an absolute percent error estimate E. System 100 generates a lower bound and an upper bound for the error range by applying the following formulas:

$$\text{Lower bound} = P/(1+E) \qquad \text{(Eq. 1)}$$

$$\text{Upper bound} = P/(1-E) \qquad \text{(Eq. 2)}$$

where P is the estimated property value and E is the absolute percent error estimate.

Alternatively, system 100 may estimate the error range using a technique known in the art as robust backpropagation, as described in H. White, "Supervised Learning as Stochastic Approximation", *International Joint Conference on Neural Networks*, San Diego, Calif. (1990), the teachings of which are incorporated herein by reference.

When robust backpropagation is used, system 100 does not require error model 909. Rather, two additional secondary neural network models 908 are used. Each of the two secondary models 908 is trained to estimate a specified percentile of the conditional distribution of sales prices. For example, the first secondary model 908 may be trained to estimate the 10th percentile of the conditional distribution, while the second secondary model 908 estimates the 90th percentile. These models 908 are trained and implemented in the same technique and using the same predictor values as described above for neural network model 908. When estimating a sales price for a subject property, the property data is sent to secondary models 908 in addition to primary neural network model 908. Secondary models 908 produce lower and upper bounds L and U for the error range.

Whichever technique is used to generate the lower and upper bounds L and U, system 100 then outputs 1011 the estimated property value, as well as the range defined by L and U designated in FIG. 5 as a lowest typical sales price 503 and a highest typical sales price 504.

Finally, system 100 generates 1012 reports as appropriate and as requested by the user. A typical report is statistical review report 701 shown in FIG. 7.

Figure 12:
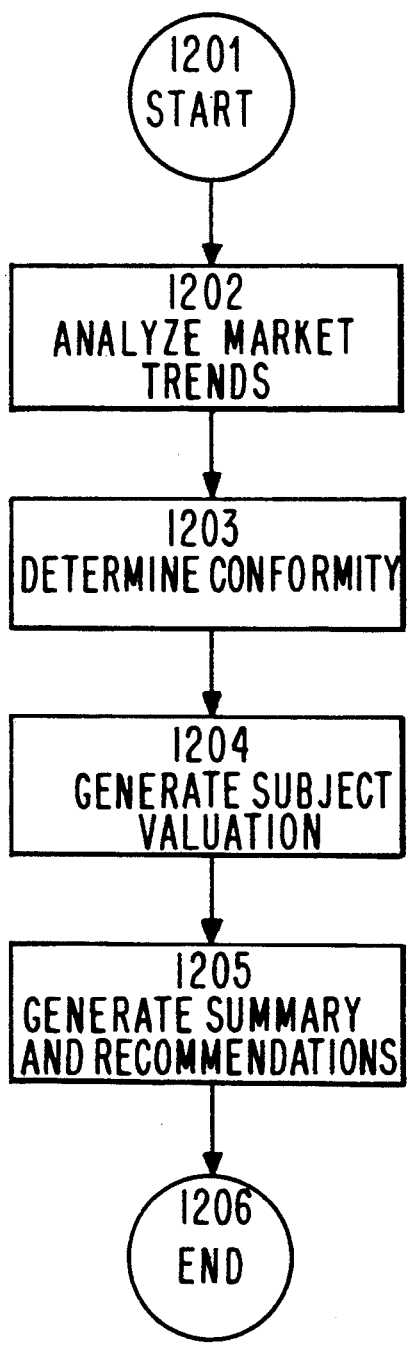
FIG. 12 is a flowchart showing a method of generating reports according to the present invention.
Figure 13:
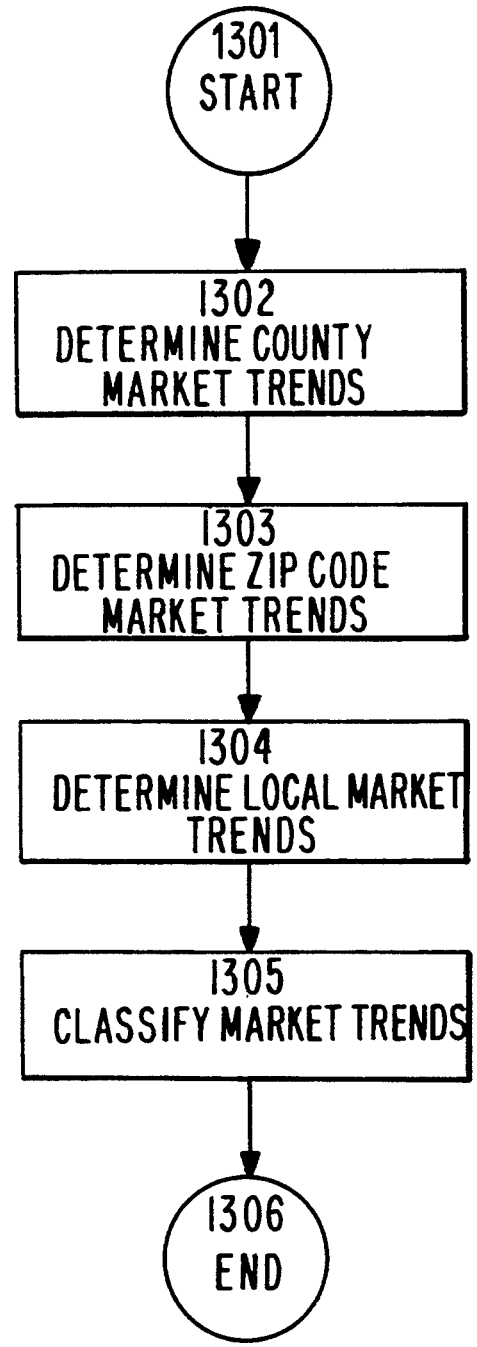
FIG. 13 is a flowchart showing a method of performing market trend analysis according to the present invention.

Referring now to FIG. 12, there is shown a method of generating 1012 reports according to the present invention. System 100 analyzes 1202 market trends as shown in FIG. 13. It first determines 1302 and 1303 county and ZIP code sales price trends over the past 24 months. Then it determines 1304 local sales price trends by census tract, map code, and APN group over the past 24 months. It classifies 1305 trends as stable, moderate upward or downward trend, or steep upward or downward trend. The trends and their classifications are used in generating regional trend analysis portion 704 and local trend analysis portion 705 of statistical review report 701 shown in FIG. 7. If alternative geographical subdivisions are used, the above-described method of market trend analysis is altered accordingly.

Figure 14:
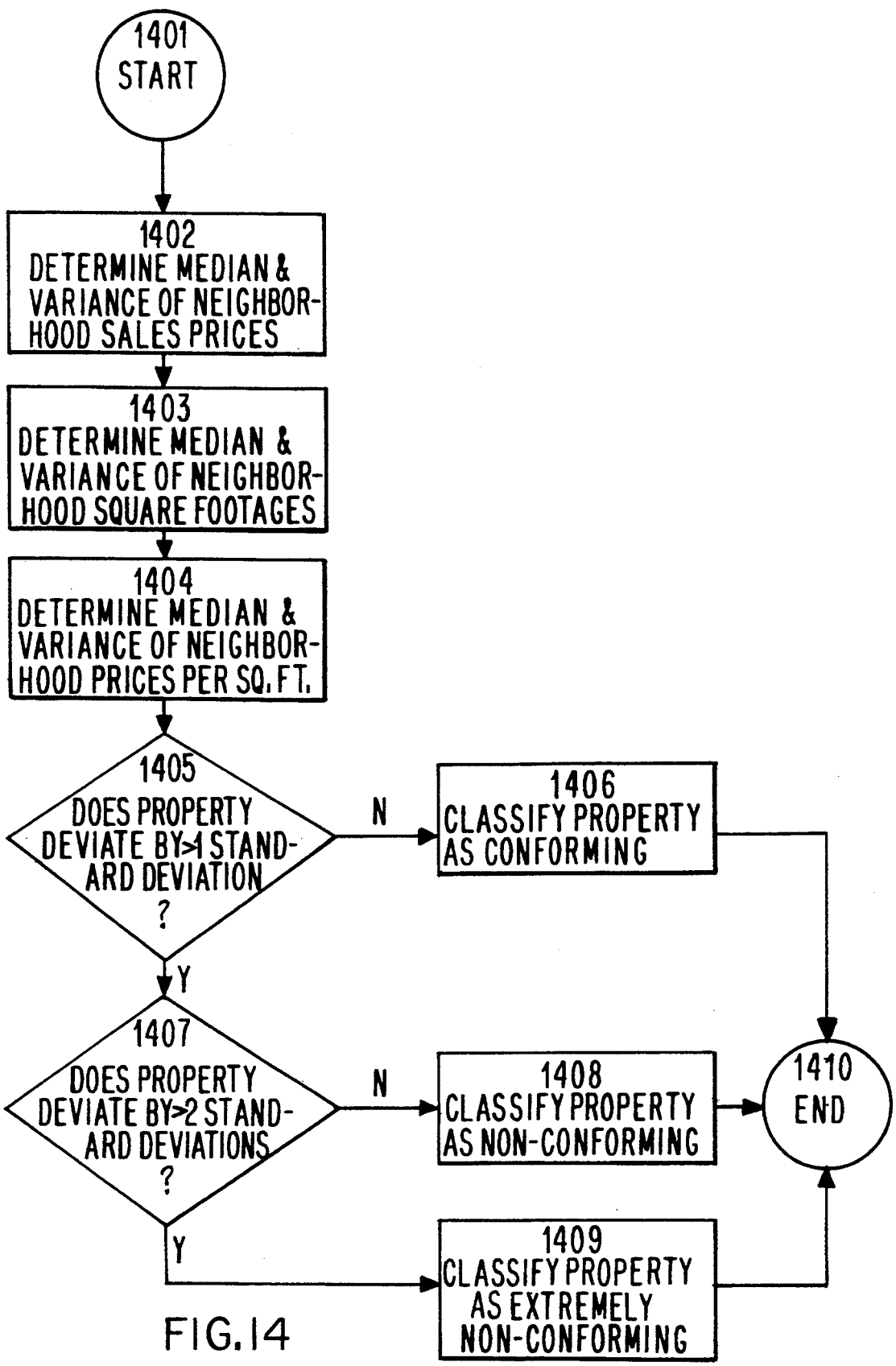
FIG. 14 is a flowchart showing a method of determining property conformity according to the present invention.

System 100 then determines 1203 the degree of conformity of the subject property with regard to the neighborhood. This is done according to the method shown in FIG. 14. System 100 determines the median and variance of neighborhood sales prices 1402, square footages 1403, and prices per square footage 1404. Medians and variances for other variables may be collected as well, if desired. The distribution within the neighborhood is used in generating subject conformity portion 706 of statistical review report 701. System 100 determines 1405 whether the property deviates by more than one standard deviation from the neighborhood norm. If not, system 100 classifies 1406 the property as conforming. If the property deviates by more than one standard deviation, system 100 determines 1407 if the property deviates by more than two standard deviations. If not, system 100 classifies 1408 the property as non-conforming. If the property deviates by more than two standard deviations, system 100 classifies 1409 the property as extremely non-conforming. Additional levels of conformity classification may be provided. System 100 uses the conformity classification in generating summary and recommendations portion 708 of statistical review report 701.

System 100 generates 1204 subject valuation portion 707 based on the estimated value determined by neural network 108.

Figure 15:
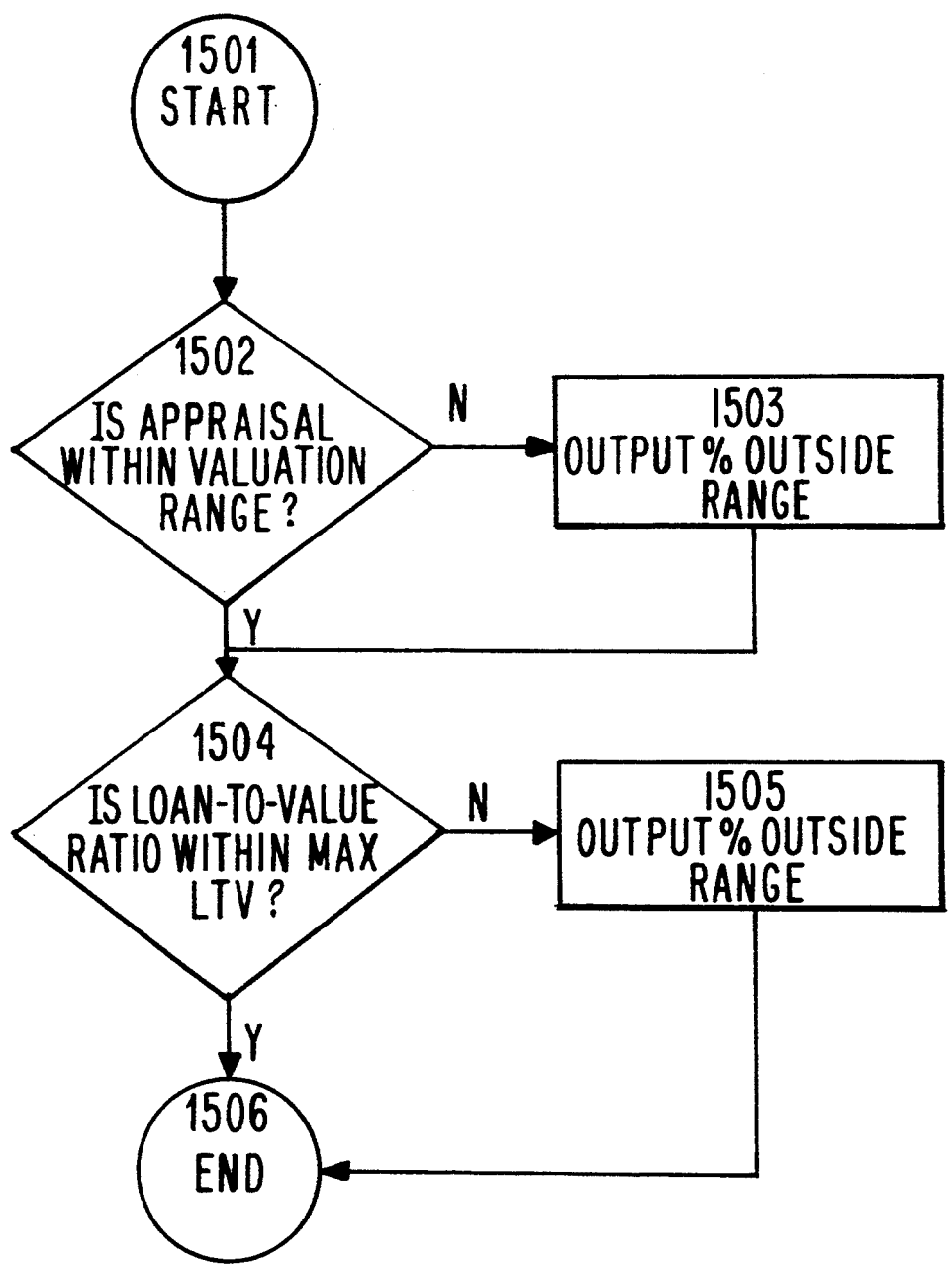
FIG. 15 is a flowchart showing a method of comparing an estimated property value to user-specified values according to the present invention.
Figure 16:
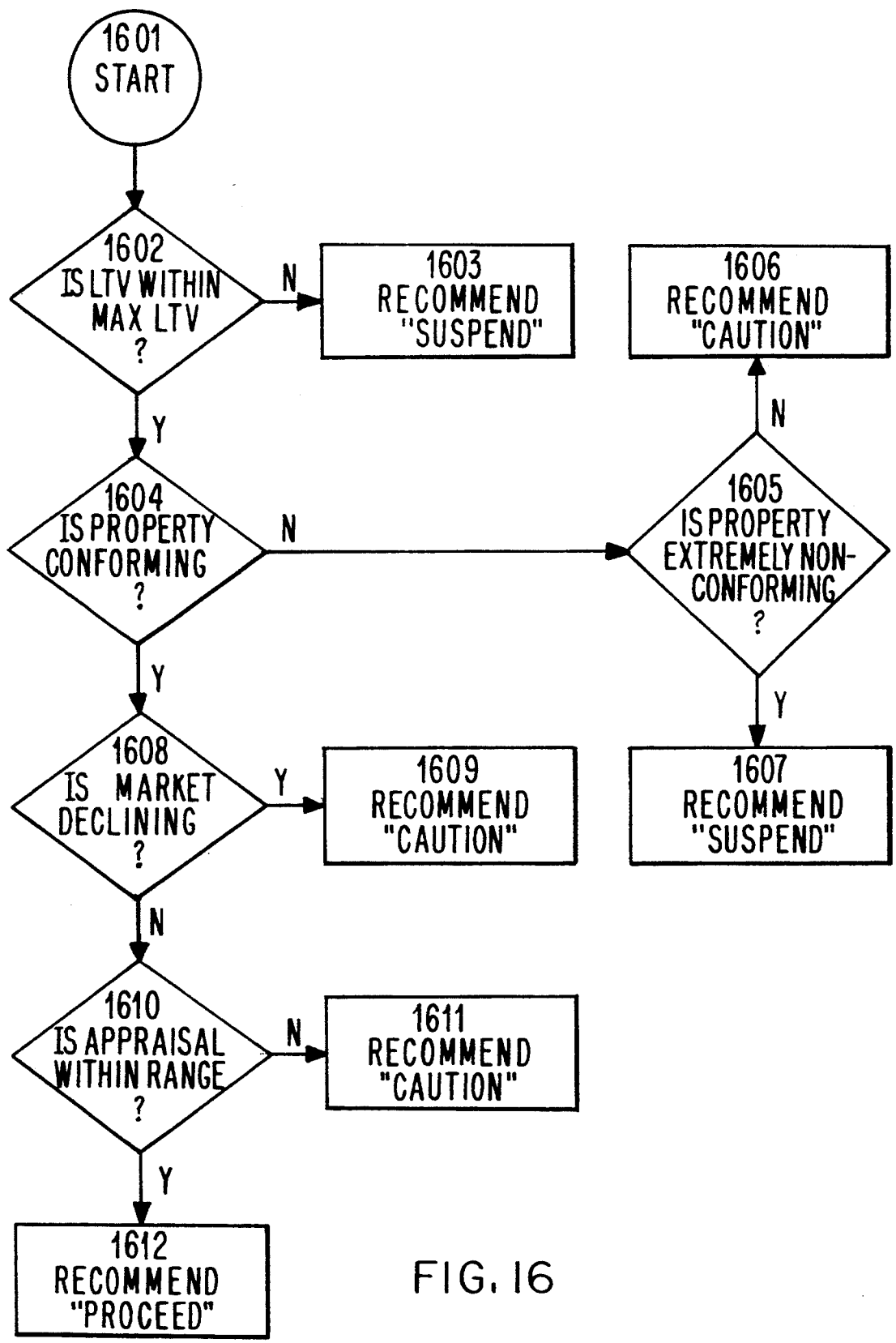
FIG. 16 is a flowchart showing a method of generating recommendations according to the present invention.

System 100 generates 1205 summary and recommendations portion 708 using the method shown in FIGS. 15 and 16. Referring now to FIG. 15, there is shown the method of comparing an estimated property value to user-specified values. System 100 determines 1502 whether the appraised value as determined by a human appraiser falls within the valuation range generated by neural network model 908 and error model 909. If not, system 100 determines the percent outside the range and outputs 1503 this value in summary and recommendations portion 708. System 100 then determines 1504 if the loan-to-value (LTV) ratio, based on the estimated value of the property and the amount of the contemplated loan, is within a user-specified maximum LTV. If not, system 100 determines the percent above the maximum and outputs 1505 this value in summary and recommendations portion 708.

Referring now to FIG. 16, there is shown the method of generating recommendations. System 100 determines 1602 whether the LTV is within the maximum LTV. If not, it recommends suspension of the loan 1603. If the LTV is within the maximum LTV, system 100 determines 1604 whether the property is conforming. If the property is not conforming, system 100 determines 1605 whether the property is extremely non-conforming. If the property is not extremely non-conforming, system 100 recommends caution with regard to the contemplated loan 1606. If the property is extremely non-conforming, system 100 recommends suspension of the loan 1607. If the property is conforming, system 100 determines 1608 whether the market is declining. If so, it recommends caution 1609. If the market is not declining, system 100 determines 1610 whether the appraisal as performed by the human appraiser falls within the range generated by neural network model 908 and error model 909. If the appraisal does not fall within the range, system 100 recommends caution 1611. If the appraisal falls within the range, system 100 recommends that the loan proceed 1612. System 100 outputs its recommendation as part of summary and recommendation portion 708 of statistical review report 701.

As an additional disclosure, the source code for the embodiment illustrated herein of the invention is included below as an appendix. It should be noted that terminology in the source code may differ slightly from that in the remainder of the specification. Any differences in terminology, however, will be easily understood by one skilled in the art.

From the above description, it will be apparent that the invention disclosed herein provides a novel and advantageous method of real estate appraisal. The foregoing discussion discloses and describes merely exemplary methods and embodiments of the present invention. As will be understood by those familiar with the art, the invention may be embodied in many other specific forms without departing from the spirit or essential characteristics thereof. For example, other predictive modeling techniques besides neural networks might be used. In addition, other variables, geographic subdivisions, and report generation techniques might be used.

Accordingly, the disclosure of the present invention is intended to be illustrative of the preferred embodiments and is not meant to limit the scope of the invention. The scope of the invention is to be limited only by the following claims.

Jost, et al:
REAL ESTATE APPRAISAL USING PREDICTIVE MODELING

APPENDIX:

SOURCE CODE

MICROSOFT EXCEL SOURCE CODE

[AREAS.XLW]INTRFACE.XLM

| names | commands | | comments |
|---|---|---|---|
| | Summary Information | | |
| Title: | intrface.xlm | | |
| Version: | v1.0 | | |
| Author | Will Ferguson, Craig Smith | | |
| Corporation: | HNC Inc. | | |
| Creation Date: | Wednesday, September 25, 1991 | | |
| | Globals | | |
| PreviousActiveCell | | | |
| PriceStdDev | 0.39859714 | | |
| PriceMean | 11.85315 | | |
| AdvanceCell | FALSE | | |
| PriceMax | 999000 | | |
| PriceMin | 60000 | | |
| ApnPage | 6 | | |
| ApnBlock | 7 | | |
| ApnNew | TRUE | | No longer used when all models use |
| | Auto_Open | | |
| | =ERROR(FALSE) | | |
| | =HIDE() | | |
| | =ACTIVATE("[AREAS.XLW]INTRFACE.XLM") | | |
| | =HIDE() | | |
| | =SizeApp() | | |
| | =ECHO(FALSE) | | |
| | =MESSAGE(TRUE," ") | | |
| resolution | =GET.WORKSPACE(13) | | horizontal resolution (of workspace) |
| | =ON.WINDOW(,"NewWindow") | | |
| | =SET.NAME("AppraisedFlag",FALSE) | | |
| | =SET.NAME("NewMenuActive",FALSE) | | |
| | =SET.NAME("MenusDisabled",FALSE) | | AREAS menu |
| | =NewMenu() | | Manual calculation |
| | =CALCULATION(3) | | |
| | =FORMULA(TRUE,AdvanceCell) | | |
| | =Init_Keys() | | |
| | =ERROR(FALSE) | | |
| ao.areaPath | =GetAreaPath() | | |
| | =DIRECTORY(ao.areaPath) | | |
| | =ACTIVATE("[AREAS.XLW]REFDATA.XLS") | | |
| | =HIDE() | | |
| | =ACTIVATE("[AREAS.XLW]MEDIAN.XLS") | | |
| | =HIDE() | | |
| | =ACTIVATE("[AREAS.XLW]estimate.xlm") | | |
| | =HIDE() | | |
| | =ACTIVATE("[AREAS.XLW]cell.xlm") | | |
| | =HIDE() | | |
| | =ACTIVATE("[AREAS.XLW]celltext.xlm") | | |
| | =HIDE() | | |
| | =ACTIVATE("[AREAS.XLW]celldlg.xlm") | | |
| | =HIDE() | | |
| | =ACTIVATE("[AREAS.XLW]DBM.XLM") | | |
| | =HIDE() | | |
| | =ACTIVATE("[AREAS.XLW]statrev.xlm") | | |
| | =HIDE() | | |
| | =ACTIVATE("[AREAS.XLW]QI.XLS") | | |
| | =UNHIDE("[AREAS.XLW]QI.XLS") | | |
| | =PROTECT.DOCUMENT(FALSE,FALSE,,FALSE) | | |
| | =WORKSPACE(FALSE,FALSE,TRUE,FALSE,TRUE,FALSE,"",FALSE,FALSE,1,FALSE,FA | | |
| | =DISPLAY(FALSE,FALSE,FALSE,TRUE,0,,FALSE,FALSE,1) | | |
| | =FULL(TRUE) | | |
| | =PROTECT.DOCUMENT(TRUE,TRUE,,TRUE) | | |
| | =ERROR(TRUE) | | |
| | =MESSAGE(FALSE) | | |
| | =CALCULATE.NOW() | | |
| | =[AREAS.XLW]DBM.XLM!InitDbm() | | |
| | =UpdateQI() | | |
| | =BEEP() | | |
| | =HomeKey() | | |
| | =ECHO(TRUE)+ECHO(FALSE) | | |
| | =DIALOG.BOX(StartDialog) | | |
| | =CallGroupDlg() | | |
| | =RETURN() | | |

| Auto_Close | DEBUG! |
|---|---|
| =[AREAS.XLW]DBM.XLM!CloseDbm()<br>=FreeKnet()<br>=RETURN() | |

| EnableAllMenus |
|---|
| =SET.NAME("MenusDisabled",FALSE)<br>=ENABLE.COMMAND(1,"Exit",0,TRUE)<br>=ENABLE.COMMAND(1,"Edit",0,TRUE)<br>=ENABLE.COMMAND(1,"Analysis",0,TRUE)<br>=ENABLE.COMMAND(1,"Reports",0,TRUE)<br>=RETURN() |

| DisableAllMenus |
|---|
| =IF(NewMenuActive)<br>=  SET.NAME("MenusDisabled",TRUE)<br>=  ENABLE.COMMAND(1,"Exit",0,FALSE)<br>=  ENABLE.COMMAND(1,"Edit",0,FALSE)<br>=  ENABLE.COMMAND(1,"Analysis",0,FALSE)<br>=  ENABLE.COMMAND(1,"Reports",0,FALSE)<br>=END.IF()<br>=RETURN() |

| NewWindow | |
|---|---|
| =IF(NewMenuActive=FALSE)<br>=  RETURN()<br>=END.IF()<br>=ERROR(FALSE)+ECHO(FALSE)<br>=PROTECT.DOCUMENT(FALSE,FALSE,,FALSE)<br>=IF(GET.CELL(32,ACTIVE.CELL())="[AREAS.XLW]QI.XLS")<br>=  WORKSPACE(FALSE,FALSE,TRUE,FALSE,TRUE,FALSE,"r",FALSE,FALSE,1,FALSE,F<br>=  DISPLAY(FALSE,FALSE,FALSE,TRUE,0,,FALSE,FALSE,1)<br>=  FULL(TRUE)+ECHO(TRUE)+ECHO(FALSE)<br>=  PROTECT.DOCUMENT(TRUE,TRUE,,TRUE)<br>=  Init_Keys()<br>=  FORMULA(TRUE,AdvanceCell)<br>=  CallGroupDlg()<br>=ELSE.IF(GET.CELL(32,ACTIVE.CELL())="[AREAS.XLW]MEDIAN.XLS")<br>=  WORKSPACE(FALSE,FALSE,TRUE,FALSE,TRUE,FALSE,"r",FALSE,FALSE,1,FALSE,F<br>=  DISPLAY(FALSE,FALSE,FALSE,TRUE,0,,FALSE,FALSE,1)<br>=  FULL(TRUE)<br>=  PROTECT.DOCUMENT(TRUE,TRUE,,TRUE)<br>=  Init_Keys()<br>=ELSE.IF(GET.CELL(32,ACTIVE.CELL())="[AREAS.XLW]ESTIMATE.XLM")<br>=  WORKSPACE(FALSE,FALSE,TRUE,FALSE,TRUE,FALSE,"r",FALSE,FALSE,1,FALSE,F<br>=  DISPLAY(FALSE,FALSE,FALSE,TRUE,0,,FALSE,FALSE,1)<br>=  FULL(TRUE)<br>=  PROTECT.DOCUMENT(TRUE,TRUE,,TRUE)<br>=  Init_Keys()<br>=ELSE.IF(GET.CELL(32,ACTIVE.CELL())="refdata.xls")<br>=  WORKSPACE(FALSE,FALSE,TRUE,TRUE,TRUE,FALSE,"r",FALSE,FALSE,1,TRUE,FA<br>=  DISPLAY(FALSE,FALSE,FALSE,TRUE,0,,FALSE,FALSE,1)<br>=  FULL(TRUE)<br>=  PROTECT.DOCUMENT(TRUE,TRUE,,TRUE)<br>=ELSE()<br>=  Clear_Keys()<br>=  WORKSPACE(FALSE,FALSE,TRUE,TRUE,TRUE,TRUE,"r",FALSE,FALSE,1,TRUE,FAL<br>=  MESSAGE(FALSE)<br>=END.IF()<br>=RETURN() | never display blanks as zeros<br>if active sheet is inputs.XLS<br><br><br><br><br>if active sheet is MEDIAN.XLS<br><br><br><br><br><br><br><br><br><br><br><br><br><br><br><br>full workspace |

| Init_Keys | |
|---|---|
| =ON.KEY("{TAB}","qinext")<br>=ON.KEY("+{TAB}","qiprev")<br>=ON.KEY("{RETURN}","qinext")<br>=ON.KEY("{ENTER}","qinext")<br>=ON.KEY("{RIGHT}","qinext")<br>=ON.KEY("^{RIGHT}","qinext")<br>=ON.KEY("{LEFT}","qiprev")<br>=ON.KEY("^{LEFT}","qiprev")<br>=ON.KEY("{UP}","qiprev")<br>=ON.KEY("^{UP}","qiprev")<br>=ON.KEY("{DOWN}","qinext")<br>=ON.KEY("^{DOWN}","qinext")<br>=ON.KEY("{PGUP}","deadkey") | allow arrowing only to edit cells |

```
=ON.KEY("{PGDN}","deadkey")
=ON.KEY("{DELETE}","deadkey")
=ON.KEY("{HOME}","homekey")
=ON.KEY("^{HOME}","homekey")
=ON.KEY("{END}","endkey")
=ON.KEY("^{END}","endkey")
=ON.KEY("+^{F1}","PrintHNCReport")
=ON.KEY("{F3}","DeadKey")
=ON.KEY("{F5}","DeadKey")
=ON.KEY("{F7}","DeadKey")
=ON.KEY("+{F1}","DeadKey")
=ON.KEY("+{F2}","DeadKey")
=ON.KEY("+{F3}","DeadKey")
=ON.KEY("+{F5}","DeadKey")
=ON.KEY("+{F7}","DeadKey")
=ON.KEY("{escape}")                           clear redefine of escape
=RETURN()
```

Clear_Keys

```
=ON.KEY("{TAB}")                              TAB mimicks right arrow
=ON.KEY("+{TAB}")                             Shift-TAB mimicks left arrow
=ON.KEY("{RETURN}")
=ON.KEY("{ENTER}")                            allow arrowing only to edit cells
=ON.KEY("{RIGHT}")
=ON.KEY("^{RIGHT}")
=ON.KEY("{LEFT}")
=ON.KEY("^{LEFT}")
=ON.KEY("{UP}")
=ON.KEY("^{UP}")
=ON.KEY("{DOWN}")
=ON.KEY("^{DOWN}")
=ON.KEY("{PGUP}")
=ON.KEY("{PGDN}")
=ON.KEY("{DELETE}")
=ON.KEY("{HOME}")
=ON.KEY("^{HOME}")
=ON.KEY("{END}")
=ON.KEY("^{END}")
=ON.KEY("+^{F1}")
=ON.KEY("{F3}")
=ON.KEY("{F5}")
=ON.KEY("{F7}")
=ON.KEY("+{F1}")
=ON.KEY("+{F2}")
=ON.KEY("+{F3}")
=ON.KEY("+{F5}")
=ON.KEY("+{F7}")
=ON.KEY("{escape}")
=RETURN()
```

CellFilter

| | | |
|---|---|---|
| | =MESSAGE(TRUE," ") | |
| CellName | =GetCellName() | |
| | =IF(ISERROR(CellName)) | |
| | = SET.VALUE(CellName,HomeKey()) | |
| | =END.IF() | |
| CellFunction | ="F_"&CellName&"()" | build Cell Function name |
| | =FORMULA("=[AREAS.XLW]cell.xlm!"&CellFunction,CellFunctionCall) | put formula in line below |
| CellFunctionCall | =[AREAS.XLW]CELL.XLM!F_SUBJ_BORROWER() | this line changes with each new cell |
| | =IF(CellFunctionCall="INVALID",RETURN("INVALID"),) | Note that the cell bordered in blue |
| | '=FormatActiveURARCell() | above gets its formula from the active |
| | =RETURN("VALID") | URAR cell name. |

DeadKey

| | |
|---|---|
| =RETURN() | used to assign null meaning to a key or key sequence |

HomeKey

```
=IF(GET.CELL(32,ACTIVE.CELL())="[AREAS.XLW]QI.XLS")
= FORMULA.GOTO(TEXTREF("[AREAS.XLW]QI.XLS!"&GET.FORMULA(OFFSET([AREA
=END.IF()
=RETURN(GET.FORMULA(OFFSET([AREAS.XLW]QI.XLS!QI_TRAVEL,0,0)))
```

| | EndKey |
|---|---|
| | =IF(GET.CELL(32,ACTIVE.CELL())="[AREAS.XLW]QI.XLS") |
| | = FORMULA.GOTO(TEXTREF("[AREAS.XLW]QI.XLS!"&GET.FORMULA(OFFSET([AREA |
| | =END.IF() |
| | =RETURN(GET.FORMULA(OFFSET([AREAS.XLW]QI.XLS!QI_TRAVEL,ROWS([AREAS.X |

| | QiNext | |
|---|---|---|
| | =IF(GET.CELL(32,ACTIVE.CELL())="[AREAS.XLW]QI.XLS") | |
| | = ECHO(FALSE) | |
| qin.cellName | = GetCellName() | |
| | = IF(ISERROR(qin.cellName)) | |
| | = HomeKey() | |
| | = ELSE() | |
| | = IF(AdvanceCell) | |
| | = FORMULA.GOTO([AREAS.XLW]QI.XLS!QI_TRAVEL) | |
| | = IF(NOT(FORMULA.FIND(qin.cellName,1,1,2,1,TRUE))) | |
| | = ALERT("INTRFACE.XLM!QINEXT: Can't find next cell to move to") | |
| | = RETURN() | |
| | = END.IF() | |
| | = IF(qin.cellName=GET.FORMULA(OFFSET([AREAS.XLW]QI.XLS!QI_TRAVEL,ROWS | check to see if at end of travel list |
| | = HomeKey() | |
| | = ELSE() | |
| | = FORMULA.GOTO(TEXTREF("[AREAS.XLW]QI.XLS!"&GET.FORMULA(OFFSET(A | |
| | = END.IF() | |
| | = ELSE() | |
| | = FORMULA(TRUE,AdvanceCell) | |
| | = END.IF() | |
| | = END.IF() | |
| | = VSCROLL(1,TRUE) | |
| | = HSCROLL(1,TRUE) | |
| | = ECHO(TRUE) | |
| | = ECHO(FALSE) | |
| | = SET.VALUE(qin.Valid,"INVALID") | |
| | = WHILE(qin.Valid="INVALID") | |
| | = CallGroupDlg() | |
| | = CellFilter() | |
| qin.Valid | = NEXT() | |
| | =END.IF() | |
| | =RETURN() | |

| | QiPrev |
|---|---|
| | =IF(GET.CELL(32,ACTIVE.CELL())="[AREAS.XLW]QI.XLS") |
| | = ECHO(FALSE) |
| qip.cellName | = GetCellName() |
| | = IF(ISERROR(qip.cellName)) |
| | = HomeKey() |
| | = ELSE() |
| | = FORMULA.GOTO([AREAS.XLW]QI.XLS!QI_TRAVEL) |
| | = IF(NOT(FORMULA.FIND(qip.cellName,1,1,2,1,TRUE))) |
| | = ALERT("INTRFACE.XLM!QINEXT: Can't find next cell to move to") |
| | = RETURN() |
| | = END.IF() |
| | = IF(qip.cellName=GET.FORMULA(OFFSET([AREAS.XLW]QI.XLS!QI_TRAVEL,0,0))) |
| | = EndKey() |
| | = ELSE() |
| | = FORMULA.GOTO(TEXTREF("[AREAS.XLW]QI.XLS!"&GET.FORMULA(OFFSET(AC |
| | = END.IF() |
| | = END.IF() |
| | = VSCROLL(1,TRUE) |
| | = HSCROLL(1,TRUE) |
| | = ECHO(TRUE) |
| | = ECHO(FALSE) |
| | = SET.VALUE(qip.Valid,"INVALID") |
| | = WHILE(qip.Valid="INVALID") |
| | = CallGroupDlg() |
| qip.Valid | = CellFilter() |
| | = NEXT() |
| | =END.IF() |
| | =RETURN() |

| | URARValueToRefData | |
|---|---|---|
| | '=FORMULA(IF(ISBLANK(ACTIVE.CELL()),"",ACTIVE.CELL()),TEXTREF("refdata.xls!"&Get | put value in refdata cell |
| | =RETURN() | |

| | CellGroupDlg | |
|---|---|---|
| NewCellName | =GetCellName() | build Dialog Function name |
| DlgFunction | ="C_"&NewCellName&"()" | place function call in blue bordered c |
| | =FORMULA("=[AREAS.XLW]celldlg.xlm!"&DlgFunction,DlgFunctionCall) | ignore error if following line fails(i.e.fu |
| | =ERROR(FALSE) | |
| DlgFunctionCall | =[AREAS.XLW]CELLDLG.XLM!C_SUBJ_BORROWER() | this line changes with each new cell |
| | =CellFilter() | if dialog exists and OK clicked |
| | =IF(NOT(ISERROR(DlgFunctionCall))) | |
| | = QiNext() | |
| | =END.IF() | |
| | =ERROR(TRUE) | |
| | =RETURN() | |

| | GetCellName | |
|---|---|---|
| | =ECHO(FALSE) | |
| | =PROTECT.DOCUMENT(FALSE,FALSE,,FALSE) | |
| CellNameString | =GET.DEF(SUBSTITUTE(REFTEXT(ACTIVE.CELL(),FALSE),"[AREAS.XLW]QI.XLS!",""),"[/ | |
| | =PROTECT.DOCUMENT(TRUE,TRUE,,TRUE) | |
| | =RETURN(CellNameString) | |

| | NewMenu | |
|---|---|---|
| | =IF(NewMenuActive) | |
| | = RETURN() | |
| | =END.IF() | |
| | =SET.NAME("NewMenuActive",TRUE) | |
| | =ECHO(FALSE)+ERROR(FALSE) | |
| | =WORKSPACE(FALSE,FALSE,TRUE,FALSE,TRUE,FALSE,"/",FALSE,FALSE,1,FALSE,FA | |
| | =DELETE.MENU(1,"File") | |
| | =DELETE.MENU(1,"Data") | |
| | =DELETE.MENU(1,"Window") | |
| | =DELETE.MENU(1,"Options") | |
| | =DELETE.MENU(1,"Format") | |
| | =DELETE.MENU(1,"Formula") | |
| | =DELETE.MENU(1,"Edit") | |
| | =DELETE.MENU(1,"Macro") | |
| | =ADD.MENU(1,ExitMnu,1) | |
| | =ADD.MENU(1,EditMnu,2) | |
| | =ADD.MENU(1,AnalysisMnu,3) | |
| | =ADD.MENU(1,ReportMnu,4) | |
| | =Init_Keys() | |
| | =RETURN() | |

| | OldMenu | |
|---|---|---|
| | =IF(NewMenuActive=FALSE) | |
| | = RETURN() | |
| | =END.IF() | |
| | =SET.NAME("NewMenuActive",FALSE) | |
| | =ECHO(FALSE)+ERROR(FALSE) | |
| | =WORKSPACE(FALSE,FALSE,TRUE,TRUE,TRUE,TRUE,"/",FALSE,FALSE,1,TRUE,FALS | full workspace |
| | =DELETE.MENU(1,"Exit") | |
| | =DELETE.MENU(1,"Edit") | |
| | =DELETE.MENU(1,"Analysis") | |
| | =DELETE.MENU(1,"Reports") | |
| | =ADD.MENU(1,"File") | |
| | =ADD.MENU(1,"Edit") | |
| | =ADD.MENU(1,"Formula") | |
| | =ADD.MENU(1,"Format") | |
| | =ADD.MENU(1,"Data") | |
| | =ADD.MENU(1,"Options") | |
| | =ADD.MENU(1,"Macro") | |
| | =ADD.MENU(1,"Window") | |
| | =Clear_Keys() | |
| | =ECHO(TRUE) | |
| | =RETURN() | |

```
PrintReport
=ARGUMENT("pr.filename",2)
=DIALOG.BOX(InitPrintDialog)
initPrintReturn  =IF(initPrintReturn)
    =  [AREAS.XLW]STATREV.XLM!UpdateStatrev1()
    =  [AREAS.XLW]STATREV.XLM!UpdateStatrev2()
=END.IF()
=ECHO(FALSE)
=ACTIVATE("[AREAS.XLW]ESTIMATE.XLM")
=SELECT(!R200C1)
=VSCROLL(0)
=ECHO(TRUE)
=RETURN(TRUE)
```

```
ExitAreas
=ECHO(FALSE)
=Auto_Close()
=ACTIVATE("[AREAS.XLW]QI.XLS")+HIDE()
=ACTIVATE("[AREAS.XLW]CELL.XLM")+HIDE()
=ACTIVATE("[AREAS.XLW]CELLDLG.XLM")+HIDE()
=ACTIVATE("[AREAS.XLW]CELLTEXT.XLM")+HIDE()
=ACTIVATE("[AREAS.XLW]DBM.XLM")+HIDE()
=ACTIVATE("[AREAS.XLW]ESTIMATE.XLM")+HIDE()
=ACTIVATE("[AREAS.XLW]INTRFACE.XLM")+HIDE()
=ACTIVATE("[AREAS.XLW]MEDIAN.XLS")+HIDE()
=ACTIVATE("[AREAS.XLW]REFDATA.XLS")+HIDE()
=ACTIVATE("[AREAS.XLW]STATREV.XLM")+HIDE()
=ACTIVATE("AREAS.XLW")+HIDE()
=SAVE.WORKBOOK(,,,FALSE,,)                    no save, just avoids save message b
=QUIT()
=RETURN()
```

```
BuildContribution
=[AREAS.XLW]ESTIMATE.XLM!Net.Contribution()
=RETURN()
```

```
BuildDecision
=Net.Decision()
=RETURN()
```

```
ShowAppraisal
=MESSAGE(TRUE,"Sale price estimation in progress")
PrevActiveSheetA  =GET.CELL(32,ACTIVE.CELL())              find what sheet is active
=[AREAS.XLW]DBM.XLM!GetInputComps()
=IF(OR(ISERROR([AREAS.XLW]REFDATA.XLS!A7CNT),ISBLANK([AREAS.XLW]REFDAT
=  ALERT("Warning! No Comp Data Found!",3)
=  RETURN()
=END.IF()
=CALL("EXUISL","EXPUTITER","AJIPP",dNetsId,0,[AREAS.XLW]REFDATA.XLS!Input_Arra  New Version
=CALL("EXUISL","EXGETOUTPUTSTATE","EJ",dNetsId)
MbpnOutput      =TEXT(EXP(MbpnOutput"PriceStdDev+PriceMean),"#,###")
AppraiseValue   =CALL("EXUISL","EXERRSCORE","I")
ErrorCode       =IF(OR([AREAS.XLW]ESTIMATE.XLM!SalePrice(AppraiseValue)<PriceMin,[AREAS.XLW]E
=  ALERT("Insufficient Sales Comp Data For an Estimate.",2)
=ELSE()
=  IF(DetailedExplFlag=TRUE)
=    SET.NAME("AppraisedFlag",TRUE)
=    DisableAllMenus()
=    BuildContribution()
=    BuildDecision()
=    MESSAGE(TRUE," ")
=    ShowAprsDialog()
=  ELSE()
=    BuildDecision()
=    MESSAGE(TRUE,"AREAS appraised value = "&TEXT(EXP(MbpnOutput"PriceStdDev+  put appraisal in status bar
=  END.IF()
=END.IF()
=RETURN()
```

```
ShowAprsDialog
=ERROR(FALSE)
=ECHO(FALSE)
=DisableAllMenus()
=  WORKSPACE(FALSE,FALSE,TRUE,FALSE,TRUE,FALSE,"/",FALSE,FALSE,1,FALSE,F
=ERROR(FALSE)
```

```
=UNHIDE("[AREAS.XLW]ESTIMATE.XLM")
=ACTIVATE("[AREAS.XLW]ESTIMATE.XLM")
=PROTECT.DOCUMENT(FALSE,FALSE,,FALSE)
=WORKSPACE(FALSE,,TRUE,TRUE,TRUE,FALSE,"r",FALSE,FALSE,1,FALSE,FALSE,FA
=FREEZE.PANES(FALSE)
=SPLIT(,7.05882352941176)
=SPLIT(,6.83333333333333)
=FREEZE.PANES(TRUE)
=WORKSPACE(FALSE,,TRUE,FALSE,TRUE,FALSE,"r",FALSE,FALSE,1,FALSE,FALSE,FA
=PROTECT.DOCUMENT(TRUE,TRUE,,TRUE)
=SELECT("R59C9:R69C9")

=ERROR(FALSE)
'=PROTECT.DOCUMENT(FALSE,FALSE,,FALSE)
=[AREAS.XLW]ESTIMATE.XLM!CopyPropValue()
=[AREAS.XLW]ESTIMATE.XLM!CopyPropHigh()
=[AREAS.XLW]ESTIMATE.XLM!CopyPropLow()
=[AREAS.XLW]ESTIMATE.XLM!CopySupportFactors()
=[AREAS.XLW]ESTIMATE.XLM!CopySupportContrib()
=[AREAS.XLW]ESTIMATE.XLM!CopyOpposeFactors()
=[AREAS.XLW]ESTIMATE.XLM!CopyOpposeContrib()
=SELECT(!R200C1)
=VSCROLL(0)
=RETURN()
```

*freeze the top pane*

*get the active cell off viewing area*
*scroll back to top*

HideAprsDialog
```
=ERROR(FALSE)
=HIDE()
=ACTIVATE("[AREAS.XLW]QI.XLS")
'=IF(GET.CELL(32,ACTIVE.CELL())="URAR.XLS")
=   EnableAllMenus()
'=  FULL(TRUE)
'=  WORKSPACE(FALSE,FALSE,TRUE,TRUE,TRUE,FALSE,"r",FALSE,FALSE,1,FALSE,F
'=END.IF()
=RETURN()
```

*return to original sheet*
*if active sheet is URAR.XLS*

*maximize urar*
*urar custom workspace*

ScrollAprsDown

AprsScrollPos
```
=INDEX(GET.WINDOW(14),1,3)
=IF(AprsScrollPos<52)
=   VLINE(5)
=END.IF()
=RETURN()
```

ScrollAprsUp
```
=VLINE(-5)
=RETURN()
```

ShowAreaComp
```
=DisableAllMenus()
=ERROR(FALSE)
=[AREAS.XLW]DBM.XLM!GetInputComps()
=ECHO(FALSE)
=UNHIDE("[AREAS.XLW]MEDIAN.XLS")
=FORMULA.GOTO([AREAS.XLW]MEDIAN.XLS!HideSelectedCell)
=HSCROLL(0)
=ECHO(TRUE)
=ERROR(TRUE)
=RETURN()
```

HideAreaComp
```
=EnableAllMenus()
=ERROR(FALSE)
=HIDE()
=ACTIVATE("[AREAS.XLW]QI.XLS")
'=FULL(TRUE)
'=WORKSPACE(FALSE,FALSE,TRUE,TRUE,TRUE,TRUE,"r",FALSE,FALSE,1,FALSE,FAL
=RETURN()
```

*maximize urar*
*urar custom workspace*

ScrollCompRight scroll position
```
=INDEX(GET.WINDOW(13),1,2)
=IF(scroll_position<COLUMNS([AREAS.XLW]MEDIAN.XLS!AREA_COMPS))
=   HLINE(1)
=END.IF()
=RETURN()
```

ScrollCompLeft
```
=HLINE(-1)
=RETURN()
```

|  | Net.Decision |
| --- | --- |
|  | =CALL("exuisl","exgetdecision",">pj",#REF!,dNetsId) |
|  | =CALL("exuisl","exgetdecision",">pj",#REF!,dNetsId) |
| certainty | =CALL("exuisl","exgetdecision",">pj",#REF!,dNetsId) |
| decisiveness | =CALL("exuisl","exgetdecision",">pj",#REF!,dNetsId) |
|  | =CALL("exuisl","exgetdecision",">pj",#REF!,dNetsId) |
|  | =RETURN() |

| | | |
| --- | --- | --- |
| INDENT | INDENT | |
|  | =ECHO(FALSE)+CANCEL.KEY(TRUE,indent.exit)+ERROR(FALSE) | |
| indent.step | 3 | spaces to indent per level |
| indent.cells | =COUNTA(SELECTION()) | cells to process |
|  | =SET.VALUE(indent.shift,0)+SET.VALUE(indent.cell,1) | |
|  | =SET.NAME("indent.oldselect",SELECTION()) | |
|  | =ERROR(FALSE) | |
|  | =FOR.CELL("indent.current_ref",TRUE) | |
|  | = MESSAGE(TRUE,"indenting cells: "&TEXT(indent.cell/indent.cells,"0%")) | show progress |
| indent.cell | = indent.cell+1 | |
| indent.raw | = GET.FORMULA(indent.current_ref) | |
|  | = SELECT(indent.current_ref) | select cell to test for array |
|  | = IF(LEFT(indent.raw)="=") | |
|  | = indent.unindent_one(indent.raw) | |
| indent.command | = NOT(ISERROR(MATCH(LEFT(indent.command,FIND("(",indent.command)-1),"=ELSE | |
| indent.leftshift | = NOT(ISERROR(MATCH(LEFT(indent.command,FIND("(",indent.command)-1),"=ELSE | |
| indent.rightshift | = IF(LEFT(indent.command,4)="=IF(") | |
| indent.testif | = ISERROR(FORMULA("=if(true,true,"&MID(indent.command,5,LEN(indent.command) | handle ifs |
|  | = IF(NOT(indent.testif),SET.VALUE(indent.rightshift,TRUE)) | |
|  | = END.IF() | |
| indent.shift | = IF(indent.leftshift,MAX(indent.shift-indent.step,0),indent.shift) | |
|  | = IF(ISERROR(SELECT.SPECIAL(6)),FORMULA("="&REPT(" ",indent.shift)&RIGHT(inde | handle arrays |
|  | = IF(indent.rightshift,SET.VALUE(indent.shift,indent.shift+indent.step)) | |
|  | = END.IF() | |
|  | =NEXT() | |
| indent.exit | =MESSAGE(FALSE)+SELECT(indent.oldselect) | |
|  | =CUSTOM.REPEAT("INDENT","&Repeat indent") | |
|  | =RETURN() | halt in case of cancel.key() |
| indent.graveyard | =IF(TRUE,TRUE,bi.summFlag=TRUE) | scratch area |
|  | indent.unindent_one | |
| indent.unindent_o | =ARGUMENT("indent.arg",2) | |
|  | =SET.VALUE(indent.index,2) | |
|  | =WHILE(MID(indent.arg,indent.index,1)=" ") | |
| indent.index | = indent.index+1 | |
|  | =NEXT() | |
|  | =RETURN("="&MID(indent.arg,indent.index,LEN(indent.arg)-indent.index+1)) | |

| | | |
| --- | --- | --- |
|  | UN.INDENT | remove leading spaces |
| Un.indent | =ECHO(FALSE)+CANCEL.KEY(TRUE,unindent.exit)+ERROR(FALSE) | |
|  | =SET.NAME("unindent.oldselect",SELECTION())+SET.VALUE(unindent.cell,1) | init |
| unindent.cells | =COUNTA(SELECTION()) | cells to process |
|  | =FOR.CELL("indent.current_ref",TRUE) | |
|  | = MESSAGE(TRUE,"Un-indenting cells: "&TEXT(unindent.cell/unindent.cells,"0%")) | show progress |
| unindent.cell | = unindent.cell+1 | |
| indent.unindent_ra | = GET.FORMULA(indent.current_ref) | |
|  | = SELECT(indent.current_ref) | |
|  | = IF(LEFT(indent.unindent_raw,1)="=",IF(ISERROR(SELECT.SPECIAL(6)),FORMULA(inde | |
|  | =NEXT() | |
| unindent.exit | =MESSAGE(FALSE)+SELECT(unindent.oldselect) | clean up |
|  | =CUSTOM.REPEAT("UN.INDENT","&Repeat Un-indent") | |
|  | =HALT() | |

| | |
| --- | --- |
| turnToComment | |
| =ERROR(FALSE) | |
| =IF(ROWS(SELECTION())>1) | |
| = FORMULA.REPLACE("=","%=",2,1,FALSE,FALSE) | |
| =ELSE() | |
| = FORMULA.REPLACE("=","%=",2,1,TRUE,FALSE) | |
| =END.IF() | |
| =FORMAT.FONT("Helv",8,FALSE,FALSE,FALSE,FALSE,3) | |
| =RETURN() | |

| | |
| --- | --- |
| turnToCode | |
| =ERROR(FALSE) | |
| =IF(ROWS(SELECTION())>1) | |

| | CheckRegion | |
|---|---|---|
| | %=SET.NAME("i",1)<br>%=WHILE(NOT(ISNA(GET.BAR(1,"Region",i))))<br>%=  CHECK.COMMAND(1,"Region",i,FALSE)<br>%=  SET.NAME("i",i+1)<br>%=NEXT()<br>%=CHECK.COMMAND(1,"Region",[AREAS.XLW]DBM.XLM!RegionID,TRUE)<br>=RETURN() | |

| | EnableRegions | |
|---|---|---|
| er.CurrentDir | %=DIRECTORY() | get current directory |
| | %=ERROR(FALSE) | |
| | %=SET.NAME("id",1) | |
| | %=FOR.CELL("regName",regionDirs) | disable regions that don't have direct |
| | %=   IF(ISERROR(DIRECTORY([AREAS.XLW]DBM.XLM!AreaPath®Name))) | |
| | %=     ENABLE.COMMAND(1,"Region",id,FALSE) | |
| | %=   END.IF() | |
| | %=   SET.NAME("id",id+1) | |
| | %=NEXT() | |
| | %=DIRECTORY(er.CurrentDir) | restore directory |
| | =RETURN() | |

| | LoadKnet | |
|---|---|---|
| | =IF([AREAS.XLW]DBM.XLM!DebugFlag>=2,ECHO(TRUE)+STEP()) | |
| | =DIRECTORY([AREAS.XLW]DBM.XLM!AreaPath&[AREAS.XLW]DBM.XLM!RegionName) | |
| | =CALL("EXUISL","EXINIT","I") | |
| dNetsId | =CALL("EXUISL","EXLOADDBMWKNET","JC",[AREAS.XLW]DBM.XLM!RegionPath()&"MO | load knet |
| | =DIRECTORY(ao.areaPath) | |
| | =RETURN() | |

| | FreeKnet | |
|---|---|---|
| | =CALL("EXUISL","EXFREENET","IJ",DEREF(dNetsId))<br>=RETURN() | |

| | SizeApp | |
|---|---|---|
| | =APP.MAXIMIZE()<br>=IF(GET.WORKSPACE(13)>480)<br>=  APP.RESTORE()<br>=  APP.MOVE(0,0)<br>=  APP.SIZE(485.25,363.75)<br>=END.IF()<br>=RETURN() | |

| | SaveBatchFile | |
|---|---|---|
| bf.fName | =ARGUMENT("bf.name",2)<br>=SUBSTITUTE(bf.name,[AREAS.XLW]DBM.XLM!bi.path&"\","")<br>=ACTIVATE("REPORT.XLS")<br>=SAVE.AS(bf.name)<br>=OPEN([AREAS.XLW]DBM.XLM!AreaPath&"REPORT.XLS")<br>=COPY()<br>=ACTIVATE(bf.fName)<br>=SELECT("R1C1")<br>=PASTE.SPECIAL(3,1,FALSE,FALSE)<br>=SAVE()<br>=CLOSE()<br>=ACTIVATE("REPORT.XLS")<br>=RETURN() | |

| | SaveHNCBatchFile | |
|---|---|---|
| bhf.fName | =ARGUMENT("bhf.name",2)<br>=SUBSTITUTE(bhf.name,[AREAS.XLW]DBM.XLM!bi.path&"\","")<br>=ACTIVATE("HNCREPRT.XLS")<br>=SAVE.AS(bhf.name)<br>=OPEN([AREAS.XLW]DBM.XLM!AreaPath&"HNCREPRT.XLS")<br>=COPY()<br>=ACTIVATE(bhf.fName)<br>=SELECT("R1C1")<br>=PASTE.SPECIAL(3,1,FALSE,FALSE)<br>=SAVE()<br>=CLOSE()<br>=ACTIVATE("HNCREPRT.XLS")<br>=RETURN() | |

| | UpdateQI | |
|---|---|---|
| | =MESSAGE(TRUE,"Updating Input Form")<br>=ACTIVATE("[AREAS.XLW]QI.XLS")<br>=PROTECT.DOCUMENT(FALSE,FALSE,,FALSE)<br>=FOR.CELL("fld",[AREAS.XLW]QI.XLS!QI_TRAVEL)<br>=  FORMULA.GOTO("[AREAS.XLW]QI.XLS!"&fld)<br>=  FORMULA(GET.FORMULA(ACTIVE.CELL()))<br>=NEXT()<br>=PROTECT.DOCUMENT(TRUE,TRUE,,TRUE)<br>=ECHO(TRUE)+ECHO(FALSE)<br>=MESSAGE(FALSE)<br>=RETURN() | |

| | GetAreaPath | |
|---|---|---|
| pathString | =UPPER(CALL("KERNEL","GETPROFILESTRING","FCCCFI","HNC","AreaPath","C:\AREA$<br>=RETURN(pathString) | |

| | GetCountyId | |
|---|---|---|
| gci.Return<br>gci.DocName<br>gci.EchoState | =ARGUMENT("gc.Name",2)<br>=-1<br>=GET.DOCUMENT(1)<br>=GET.WORKSPACE(40)<br>=ECHO(FALSE)<br>=FORMULA.GOTO([AREAS.XLW]CELLDLG.XLM!CountyName)<br>=ERROR(FALSE)<br>=IF(FORMULA.FIND(gc.Name,2,1,2,1,FALSE))<br>=  SET.VALUE(gci.Return,DEREF(OFFSET(ACTIVE.CELL(),0,-1,1,1)))<br>=END.IF()<br>=ERROR(TRUE)<br>=ACTIVATE(gci.DocName)<br>=ECHO(gci.EchoState)<br>=RETURN(DEREF(gci.Return)) | |

[AREAS.XLW]DBM.XLM

|  | Summary Information | |
|---|---|---|
| Title: | | |
| Version: | v1.0 | |
| Author | Craig Smith | |
| Corporation: | HNC, Inc. | |
| Creation Date: | Thursday, September 26, 1991 | |

|  | globals | |  |
|---|---|---|---|
| BuildCompsFlag | TRUE | | |
| LoadNewCounty | TRUE | | |
| AreaPath | C:\AREAS\ | | |
| RegionName | RIVERSID | | |
| RegionID | 6 | | |
| DebugFlag | 0 | | 0 to turn all debugging off, 1 for |

|  | InitDbm | |  |
|---|---|---|---|
| | =MESSAGE(TRUE,"Loading User Databases") | | |
| | =FORMULA([AREAS.XLW]INTRFACE.XLM!ao.areaPath&"\",AreaPath) | | |
| | =ERROR(FALSE) | | |
| dbm.chan | =INITIATE("QE","SYSTEM") | | |
| | =IF(ISERROR(R[-1]C)) | | |
| | = ALERT("Cannot Load QE.EXE, insure execution path includes EXCEL Directory.",3) | | |
| | = RETURN(FALSE) | | |
| | =END.IF() | | |
| | =IF(EXECUTE(dbm.chan,"[OPEN(""&AreaPath&"USER.QEF")]")) | | link to user database |
| di.nr | = REQUEST(dbm.chan,"NUMROWS") | | Check to see if conversion is re |
| di.urarYes | = ISTEXT(FILES(AreaPath&"URARDBM.DBF")) | | |
| | = IF(AND(di.nr=0,di.urarYes)) | | |
| | = IF(DIALOG.BOX(ud.ConvertQuery)<>ud.cqYes) | | |
| | = [AREAS.XLW]INTRFACE.XLM!ExitAreas() | | |
| | = ELSE() | | |
| | = Urar2User(dbm.chan) | | |
| | = END.IF() | | |
| | = END.IF() | | |
| | = IF(ISBLANK(RegionName)) | | Link to region databases and m |
| | = UpdateRegion("") | | |
| | = ELSE() | | |
| | = UpdateRegion([AREAS.XLW]REFDATA.XLS!SUBJ_COUNTY) | | |
| | = END.IF() | | |
| | =ELSE() | | |
| | = ALERT("Cannot Open USER Database! Cannot Continue!",3) | | |
| | = [AREAS.XLW]INTRFACE.XLM!ExitAreas() | | |
| | =END.IF() | | |
| | =MESSAGE(FALSE) | | |
| | =RETURN(TRUE) | | |

|  | CloseDbm | |  |
|---|---|---|---|
| | =TERMINATE(dbm.chan) | | |
| | =RETURN() | | |

|  | Enter_Record | |  |
|---|---|---|---|
| erResult | =DIALOG.BOX(ud.EnterRecordQuery) | | |
| | =SetEnv() | | |
| | =IF(erResult=FALSE) | | |
| | = RestoreEnv() | | |
| | = RETURN() | | |
| | =ELSE.IF(erResult=ud.erqYes) | | |
| | = Add_New_Record() | | |
| | = RestoreEnv() | | |
| | = RETURN() | | |
| | =END.IF() | | |
| | =InitGetCriteriaData() | | |
| | =SelectDbfRecord([AREAS.XLW]REFDATA.XLS!UserCriteria,[AREAS.XLW]REFDATA.XLS!UserCri | | |
| | =RETURN() | | |

|  | Delete_Record | |  |
|---|---|---|---|
| | =SetEnv() | | |
| | =InitGetCriteriaData() | | |
| | =SelectDbfRecord([AREAS.XLW]REFDATA.XLS!UserCriteria,[AREAS.XLW]REFDATA.XLS!UserCri | | |
| | =RETURN() | | |

| Find_Record | |
|---|---|
| | =SetEnv()<br>=InitGetCriteriaData()<br>=SelectDblRecord([AREAS.XLW]REFDATA.XLS!UserCriteria,[AREAS.XLW]REFDATA.XLS!UserCri<br>=RETURN() |

| | New_Record | |
|---|---|---|
| nrResult | =SetEnv()<br>=DIALOG.BOX(ud.NewRecordQuery)<br>=IF(nrResult=FALSE)<br>= RETURN()<br>=ELSE.IF(nrResult=ud.nrqYes)<br>= Add_New_Record()<br>=END.IF()<br>=ECHO(FALSE)<br>=IF(DebugFlag>=2,ECHO(TRUE)+STEP())<br>=SET.NAME("nrCounty",DEREF([AREAS.XLW]REFDATA.XLS!SUBJ_COUNTY))<br>=SET.NAME("nrState",DEREF([AREAS.XLW]REFDATA.XLS!SUBJ_STATE))<br>=FORMULA.GOTO([AREAS.XLW]REFDATA.XLS!Record_Get)<br>=CLEAR(3)<br>=FORMULA(nrCounty,[AREAS.XLW]REFDATA.XLS!SUBJ_COUNTY)<br>=FORMULA(nrState,[AREAS.XLW]REFDATA.XLS!SUBJ_STATE)<br>=ERROR(FALSE)+ECHO(FALSE)<br>=ACTIVATE("[AREAS.XLW]QI.XLS")<br>=PROTECT.DOCUMENT(FALSE,FALSE,,FALSE)<br>=ECHO(TRUE)<br>=FOR.CELL("rf.fld",[AREAS.XLW]QI.XLS!QI_TRAVEL)<br>= FORMULA("= [AREAS.XLW]cell.xlm!F_"&rf.fld&"()",nr.CellFilterCall) | get county and state |
| nr.CellFilterCall | = [AREAS.XLW]CELL.XLM!F_SITE_VIEW() | |
| | = FORMULA.GOTO("[AREAS.XLW]QI.XLS!"&rf.fld)<br>= FORMULA(GET.FORMULA(ACTIVE.CELL()))<br>=NEXT()<br>=PROTECT.DOCUMENT(TRUE,TRUE,,TRUE)<br>=RestoreEnv()<br>=MESSAGE(FALSE)<br>=RETURN() | |

| Add_New_Record | |
|---|---|
| | =ECHO(FALSE)<br>=Add_Urar_Record("USER.QEF",[AREAS.XLW]REFDATA.XLS!Record_Get,0)<br>=RestoreEnv()<br>=RETURN() |

| | CheckForOverwrite |
|---|---|
| | =ARGUMENT("dbfile",2)<br>=ECHO(FALSE) |
| rae.address | =[AREAS.XLW]REFDATA.XLS!SUBJ_ADDRESS |
| rae.city | =[AREAS.XLW]REFDATA.XLS!SUBJ_CITY |
| rae.county | =[AREAS.XLW]REFDATA.XLS!SUBJ_COUNTY |
| rae.state | =[AREAS.XLW]REFDATA.XLS!SUBJ_STATE |
| rae.zip | =[AREAS.XLW]REFDATA.XLS!SUBJ_ZIP |
| | =EXECUTE(dbm.chan,"[ACTIVATE("&dbfile&")]")<br>=EXECUTE(dbm.chan,"[ECHO(FALSE)]")<br>=EXECUTE(dbm.chan,"[SELECT.RESET()]")<br>=EXECUTE(dbm.chan,"[SELECT.COLUMN('ADDRESS')]")<br>=EXECUTE(dbm.chan,"[ADD.CONDITION(1,7,"&rae.address&",FALSE)]")<br>=IF(OR(ISERROR(R[-1]C),REQUEST(dbm.chan,"NUMROWS")=0))<br>= EXECUTE(dbm.chan,"[SELECT.RESET()]")<br>= EXECUTE(dbm.chan,"[ECHO(TRUE)]")<br>= RETURN(TRUE)<br>=END.IF()<br>=EXECUTE(dbm.chan,"[SELECT.COLUMN('CITY')]")<br>=EXECUTE(dbm.chan,"[ADD.CONDITION(1,7,"&rae.city&",FALSE)]")<br>=IF(OR(ISERROR(R[-1]C),REQUEST(dbm.chan,"NUMROWS")=0))<br>= EXECUTE(dbm.chan,"[SELECT.RESET()]")<br>= EXECUTE(dbm.chan,"[ECHO(TRUE)]")<br>= RETURN(TRUE)<br>=END.IF()<br>=EXECUTE(dbm.chan,"[SELECT.COLUMN('COUNTY')]")<br>=EXECUTE(dbm.chan,"[ADD.CONDITION(1,7,"&rae.county&",FALSE)]")<br>=IF(OR(ISERROR(R[-1]C),REQUEST(dbm.chan,"NUMROWS")=0))<br>= EXECUTE(dbm.chan,"[SELECT.RESET()]")<br>= EXECUTE(dbm.chan,"[ECHO(TRUE)]")<br>= RETURN(TRUE) |

|  |  |  |  |
|---|---|---|---|
|  | =END.IF() | | |
|  | =EXECUTE(dbm.chan,"[SELECT.COLUMN('STATE')]") | | |
|  | =EXECUTE(dbm.chan,"[ADD.CONDITION(1,7,"&rae.state&"",FALSE)]") | | |
|  | =IF(OR(ISERROR(R[-1]C),REQUEST(dbm.chan,"NUMROWS")=0)) | | |
|  | = EXECUTE(dbm.chan,"[SELECT.RESET()]") | | |
|  | = EXECUTE(dbm.chan,"[ECHO(TRUE)]") | | |
|  | = RETURN(TRUE) | | |
|  | =END.IF() | | |
|  | =EXECUTE(dbm.chan,"[SELECT.COLUMN('ZIP')]") | | |
|  | =EXECUTE(dbm.chan,"[ADD.CONDITION(1,7,"&rae.zip&"",FALSE)]") | | |
|  | =IF(OR(ISERROR(R[-1]C),REQUEST(dbm.chan,"NUMROWS")=0)) | | |
|  | = EXECUTE(dbm.chan,"[SELECT.RESET()]") | | |
|  | = EXECUTE(dbm.chan,"[ECHO(TRUE)]") | | |
|  | = RETURN(TRUE) | | |
|  | =END.IF() | | |
| rae.numrow | =REQUEST(dbm.chan,"NUMROWS") | | |
|  | =IF(rae.numrow = 1) | | |
|  | = SET.NAME("rae.prompt","Property with same address already exists in the database. Do you war | | |
|  | =ELSE() | | |
|  | = SET.NAME("rae.prompt",TEXT(rae.numrow,"##")&" properties with same address already exist in | | |
|  | =END.IF() | | |
| rae.overwrite | =ALERT(rae.prompt,1) | | |
|  | =IF(DEREF(rae.overwrite)) | | |
|  | = EXECUTE(dbm.chan,"[SELECT.AREA('R1:R"&TEXT(rae.numrow,"##")&"')]") | | |
|  | = EXECUTE(dbm.chan,"[DELETE.RECORDS()]") | | |
|  | = EXECUTE(dbm.chan,"[SELECT.RESET()]") | | |
|  | = EXECUTE(dbm.chan,"[ECHO(TRUE)]") | | |
|  | = RETURN(TRUE) | | |
|  | =END.IF() | | |
|  | =EXECUTE(dbm.chan,"[SELECT.RESET()]") | | |
|  | =EXECUTE(dbm.chan,"[ECHO(TRUE)]") | | |
|  | =RETURN(FALSE) | | |

|  |  |  |
|---|---|---|
|  | Add Urar Record |  |
|  | =ARGUMENT("dbm_file",2) | Name of database file |
|  | =ARGUMENT("dbm_entry",8) | Name of REFDATA array to tra |
|  | =ARGUMENT("dbm_record",1) | Record number to add, if 0, add |
|  | =ARGUMENT("dbm_column",1) |  |
|  | =ECHO(FALSE) |  |
|  | =EXECUTE(dbm.chan,"[ACTIVATE(""&dbm_file&"")]") |  |
|  | =EXECUTE(dbm.chan,"[ALLOW.EDIT(TRUE)]") |  |
|  | =FORMULA.GOTO([AREAS.XLW]REFDATA.XLS!Record_Get) |  |
|  | =COPY() |  |
|  | =IF(dbm_record=0) | if appending new record, insert |
|  | = IF(CheckForOverwrite(dbm_file)) |  |
| aur.Dde1 | = EXECUTE(dbm.chan,"[PASTE.APPEND()]") |  |
|  | = ELSE() |  |
|  | = CANCEL.COPY() |  |
|  | = EXECUTE(dbm.chan,"[ALLOW.EDIT(FALSE)]") |  |
|  | = RETURN(FALSE) |  |
|  | = END.IF() |  |
|  | =ELSE() |  |
|  | = EXECUTE(dbm.chan,"[SELECT.AREA('R"&TEXT(dbm_record,"0")&":R"&TEXT(dbm_record,"0")& |  |
| aur.Dde2 | = EXECUTE(dbm.chan,"[PASTE()]") |  |
|  | =END.IF() |  |
|  | =IF(OR(ISERROR(aur.Dde1),ISERROR(aur.Dde2))) |  |
|  | = ALERT("Enter Record DDE Error - Call HNC Customer Support, (619)546-8877",3) |  |
|  | = RETURN(FALSE) |  |
|  | =END.IF() |  |
|  | =CANCEL.COPY() |  |
|  | =EXECUTE(dbm.chan,"[ALLOW.EDIT(FALSE)]") |  |
|  | =RETURN(TRUE) |  |

|  |  |  |
|---|---|---|
|  | Delete Urar Record |  |
|  | =ARGUMENT("dbm_file",2) | Name of database file |
|  | =ARGUMENT("dbm_record",1) | Record Number to Delete |
|  | =ECHO(FALSE) |  |
| dur.row | ="R"&TEXT(dbm_record,"#") |  |
|  | =EXECUTE(dbm.chan,"[ACTIVATE(""&dbm_file&"")]") |  |
|  | =EXECUTE(dbm.chan,"[ALLOW.EDIT(TRUE)]") |  |
|  | =EXECUTE(dbm.chan,"[SELECT.AREA(""&dur.row&":"&dur.row&"")]") |  |
|  | =EXECUTE(dbm.chan,"[DELETE.RECORDS()]") |  |
|  | =FORMULA.GOTO([AREAS.XLW]REFDATA.XLS!Record_Get) |  |
|  | =CLEAR(3) |  |
|  | =EXECUTE(dbm.chan,"[ALLOW.EDIT(FALSE)]") |  |
|  | =RETURN() |  |

| | Record_Found |
|---|---|
| | =[AREAS.XLW]INTRFACE.XLM!EnableAllMenus()<br>=DATA.FIND(FALSE)<br>=[AREAS.XLW]INTRFACE.XLM!Init_Keys()<br>=MESSAGE(TRUE,"Filling URAR Form with Selected Record")<br>=ECHO(FALSE)<br>=ACTIVATE("[AREAS.XLW]REFDATA.XLS") |
| recordId | =FORMULA.GOTO("R"&TEXT(ROW(SELECTION()),"#")&"C"&TEXT(GET.CELL(3,[AREAS.XLW]RE<br>=GET.CELL(2,ACTIVE.CELL())-GET.CELL(2,[AREAS.XLW]REFDATA.XLS!ExtractUserData)+1<br>=FORMULA(TRUE,BuildCompsFlag)<br>=Get_Urar_Record("USER.QEF",[AREAS.XLW]REFDATA.XLS!Record_Get,recordId,1)<br>=ERROR(FALSE)+ECHO(FALSE)<br>=ACTIVATE("[AREAS.XLW]QI.XLS")<br>=PROTECT.DOCUMENT(FALSE,FALSE,,FALSE)<br>=ECHO(TRUE)<br>=FOR.CELL("rf.fld",[AREAS.XLW]QI.XLS!QI_TRAVEL)<br>= FORMULA("= [AREAS.XLW]cell.xlm!F_"&rf.fld&"()",CellFilterCall) |
| CellFilterCall | = [AREAS.XLW]CELL.XLM!F_COMM_ADDNL_FEATURES1() |
| | = FORMULA.GOTO("[AREAS.XLW]QI.XLS!"&rf.fld)<br>= FORMULA(GET.FORMULA(ACTIVE.CELL()))<br>=NEXT()<br>=PROTECT.DOCUMENT(TRUE,TRUE,,TRUE)<br>=CALCULATE.NOW()<br>=RestoreEnv()<br>=GetInputComps()<br>=FORMULA(FALSE,BuildCompsFlag)<br>=MESSAGE(FALSE)<br>=RETURN() |

| | Delete_Found |
|---|---|
| | =[AREAS.XLW]INTRFACE.XLM!EnableAllMenus()<br>=DATA.FIND(FALSE)<br>=ECHO(FALSE)<br>=[AREAS.XLW]INTRFACE.XLM!Init_Keys()<br>=IF(ALERT("Do you really want to delete this record?",1)=TRUE) |
| delrecordId | = ACTIVATE("[AREAS.XLW]REFDATA.XLS")<br>= FORMULA.GOTO("R"&TEXT(ROW(SELECTION()),"#")&"C"&TEXT(GET.CELL(3,[AREAS.XLW]<br>= GET.CELL(2,ACTIVE.CELL())-GET.CELL(2,[AREAS.XLW]REFDATA.XLS!ExtractUserData)+1<br>= Delete_Urar_Record("USER.QEF",delrecordId)<br>= ERROR(FALSE)+ECHO(FALSE)<br>= ACTIVATE("[AREAS.XLW]QI.XLS")<br>= PROTECT.DOCUMENT(FALSE,FALSE,,FALSE)<br>= ECHO(TRUE)<br>= FOR.CELL("rf.fld",[AREAS.XLW]QI.XLS!QI_TRAVEL)<br>= FORMULA("= [AREAS.XLW]cell.xlm!F_"&rf.fld&"()",dr.CellFilterCall) |
| dr.CellFilterCall | = [AREAS.XLW]CELL.XLM!F_COMM_ADDNL_FEATURES1() |
| | = FORMULA.GOTO("[AREAS.XLW]QI.XLS!"&rf.fld)<br>= FORMULA(GET.FORMULA(ACTIVE.CELL()))<br>= NEXT()<br>= PROTECT.DOCUMENT(TRUE,TRUE,,TRUE)<br>=END.IF()<br>=RestoreEnv()<br>=MESSAGE(FALSE)<br>=RETURN() |

| | Enter_Found |
|---|---|
| | =ECHO(FALSE)<br>=[AREAS.XLW]INTRFACE.XLM!EnableAllMenus()<br>=DATA.FIND(FALSE)<br>=[AREAS.XLW]INTRFACE.XLM!Init_Keys()<br>=IF(ALERT("Do you really want to replace this record?",1)=TRUE) |
| entrecordId | = ACTIVATE("[AREAS.XLW]REFDATA.XLS")<br>= FORMULA.GOTO("R"&TEXT(ROW(SELECTION()),"#")&"C"&TEXT(GET.CELL(3,[AREAS.XLW]<br>= GET.CELL(2,ACTIVE.CELL())-GET.CELL(2,[AREAS.XLW]REFDATA.XLS!ExtractUserData)+1<br>= Add_Urar_Record("USER.QEF",[AREAS.XLW]REFDATA.XLS!Record_Get,entrecordId) |
| | =END.IF()<br>=RestoreEnv()<br>=MESSAGE(FALSE)<br>=RETURN() |

| | Get_Urar_Record | |
|---|---|---|
| | =ARGUMENT("dbmName",2) | Name of database file |
| | =ARGUMENT("dbm_entry",8) | Range in REFDATA.XLS to put |
| | =ARGUMENT("record_id",1) | record number to select |
| | =ARGUMENT("column_id",1) | Number of first column to fetch |
| | =ECHO(FALSE) | |
| row_get | ="R"&TEXT(record_id,"#") | |
| first_column_get | ="C"&TEXT(column_id,"#") | |
| last_column_get | ="C"&TEXT(column_id+COLUMNS(dbm_entry)-1,"#") | |
| | =EXECUTE(dbm.chan,"[ACTIVATE(""&dbmName&"")]") | |
| | =EXECUTE(dbm.chan,"[SELECT.AREA(""&row_get&first_column_get&":"&row_get&last_column_get | |
| | =EXECUTE(dbm.chan,"[COPY()]") | |
| | =FORMULA.GOTO(dbm_entry) | |
| | =PASTE() | |
| | =RETURN() | |

| | SelectDbfRecord | |
|---|---|---|
| | =ARGUMENT("CriteriaRange",8) | A range of DBF column names |
| | =ARGUMENT("ExcelCriteriaRange",8) | For use by the DATA.FIND con |
| | =ARGUMENT("DatabaseName",2) | The NAME of a QEF file select |
| | =ARGUMENT("ExtractDataRange",8) | The data range of the above ex |
| | =ARGUMENT("ExcelExtractRange",8) | A range including the data rang |
| | =ARGUMENT("ReturnHandler",2) | The name of a macro to run wh |
| | =ARGUMENT("sdbDialog",8) | The range containing the criteri |
| | =ARGUMENT("ExtractColumns",1) | The number of columns to extr |
| | =ECHO(FALSE) | |
| | =MESSAGE(FALSE) | |
| | =SET.VALUE(sdr.Dlg,[AREAS.XLW]REFDATA.XLS!ud.gcc.ClearAll) | |
| | =WHILE(sdr.Dlg=[AREAS.XLW]REFDATA.XLS!ud.gcc.ClearAll) | |
| sdr.Dlg | = DIALOG.BOX(sdbDialog) | |
| | = IF(sdr.Dlg=FALSE) | |
| | = RestoreEnv() | |
| | = ECHO(TRUE) | |
| | = ECHO(FALSE) | |
| | = RETURN() | |
| | = END.IF() | |
| | = IF(sdr.Dlg=[AREAS.XLW]REFDATA.XLS!ud.gcc.ClearAll) | |
| | =FORMULA.GOTO([AREAS.XLW]REFDATA.XLS!ud.GetCompCriteriaData) | |
| | =CLEAR(3) | |
| | =END.IF() | |
| | =NEXT() | |
| | =CALCULATE.NOW() | |
| | =A1.R1C1(FALSE) | |
| | =MESSAGE(TRUE,"Performing Query") | |
| | =EXECUTE(dbm.chan,"[ACTIVATE(""&DatabaseName&"")]") | |
| | =EXECUTE(dbm.chan,"[ECHO(FALSE)]") | |
| | =EXECUTE(dbm.chan,"[SELECT.RESET()]") | |
| | =FOR.CELL("crit",CriteriaRange) | add query conditions |
| sdr.critval | = OFFSET(crit,1,0) | |
| | = IF(DEREF(sdr.critval)<>"") | |
| | = EXECUTE(dbm.chan,"[SELECT.COLUMN(""&crit&"")]") | |
| | = EXECUTE(dbm.chan,"[ADD.CONDITION(""&sdr.critval&"")]") | |
| | = END.IF() | |
| | =NEXT() | |
| | =EXECUTE(dbm.chan,"[ECHO(TRUE)]") | |
| | =FORMULA.GOTO(ExtractDataRange) | |
| | =CLEAR(3) | |
| | =MESSAGE(TRUE,"Fetching Data") | |
| | =EXECUTE(dbm.chan,"[FETCH('EXCEL','[AREAS.XLW]REFDATA.XLS',"&SUBSTITUTE(REFTEXT | |
| | =FORMULA.GOTO(ExcelExtractRange) | |
| | =ERROR(FALSE) | |
| | =PROTECT.DOCUMENT(FALSE,FALSE,,FALSE) | |
| | =SET.DATABASE() | |
| | =SET.EXTRACT() | |
| | =FORMULA.GOTO(ExcelCriteriaRange) | |
| | =SET.CRITERIA() | |
| | =PROTECT.DOCUMENT(TRUE,TRUE,,TRUE) | |
| | =ERROR(TRUE) | |
| | =ON.KEY("{RETURN}",ReturnHandler) | |
| | =ON.KEY("{ESC}",CancelHandler) | |
| | =ON.KEY("{RIGHT}") | |
| | =ON.KEY("{LEFT}") | |
| | =ON.KEY("{UP}") | |
| | =ON.KEY("{DOWN}") | |
| | =[AREAS.XLW]INTRFACE.XLM!DisableAllMenus() | |
| | =MESSAGE(TRUE,"Use Arrows to Find Record, Enter to Select") | |
| | =ERROR(FALSE) | |
| | =UNHIDE("[AREAS.XLW]REFDATA.XLS") | |

| matchFound | =DATA.FIND(TRUE) |
|---|---|
| | =FULL(TRUE) |
| | =ERROR(TRUE) |
| | =IF(matchFound=FALSE) |
| | = [AREAS.XLW]INTRFACE.XLM!EnableAllMenus() |
| | = DATA.FIND(FALSE) |
| | = [AREAS.XLW]INTRFACE.XLM!Init_Keys() |
| | = MESSAGE(FALSE) |
| | = RestoreEnv() |
| | = ECHO(TRUE) |
| | = ECHO(FALSE) |
| | =END.IF() |
| | =RETURN() |

InitGetCriteriaData

| | | |
|---|---|---|
| | =ECHO(FALSE) | |
| | =MESSAGE(TRUE,"Finding Default Criteria") | |
| | =FORMULA.GOTO([AREAS.XLW]REFDATA.XLS!ud.GetCompCriteriaData) | |
| | =CLEAR(3) | |
| | =IF(ISNUMBER([AREAS.XLW]REFDATA.XLS!SUBJ_ZIP)) | ud.PRP_ZIP |
| | = FORMULA(LEFT(TEXT([AREAS.XLW]REFDATA.XLS!SUBJ_ZIP,"#"),5),[AREAS.XLW]REFDATA | |
| | =END.IF() | |
| | =IF(NOT(ISBLANK([AREAS.XLW]REFDATA.XLS!SUBJ_APN))) | ud.PNUM6 |
| | = FORMULA([AREAS.XLW]REFDATA.XLS!SUBJ_APN,[AREAS.XLW]REFDATA.XLS!ud.PNUM6) | |
| | =END.IF() | |
| | =IF(ISTEXT([AREAS.XLW]REFDATA.XLS!SUBJ_MAPREF)) | ud.MAPSEG |
| | = FORMULA([AREAS.XLW]REFDATA.XLS!SUBJ_MAPREF,[AREAS.XLW]REFDATA.XLS!ud.MAP | |
| | =END.IF() | |
| | =IF(ISNUMBER([AREAS.XLW]REFDATA.XLS!SUBJ_TRACT)) | ud.CEN_TRCT |
| | = FORMULA([AREAS.XLW]REFDATA.XLS!SUBJ_TRACT,[AREAS.XLW]REFDATA.XLS!ud.CEN_ | |
| | =END.IF() | |
| | =IF(ISNUMBER([AREAS.XLW]REFDATA.XLS!SUBJ_SALEPRICE)) | ud.VALUE_PR_H |
| | = FORMULA(TEXT([AREAS.XLW]REFDATA.XLS!SUBJ_SALEPRICE*1.2,"#"),[AREAS.XLW]REFD | ud.VALUE_PR_L |
| | = FORMULA(TEXT([AREAS.XLW]REFDATA.XLS!SUBJ_SALEPRICE*0.8,"#"),[AREAS.XLW]REFD | |
| | =END.IF() | |
| | =IF(ISTEXT([AREAS.XLW]REFDATA.XLS!SUBJ_ADDRESS)) | ud.PRP_ST |
| | = FORMULA([AREAS.XLW]REFDATA.XLS!SUBJ_ADDRESS,[AREAS.XLW]REFDATA.XLS!ud.PR | |
| | =END.IF() | |
| | =IF(ISTEXT([AREAS.XLW]REFDATA.XLS!SUBJ_CITY)) | ud.PRP_CITY |
| | = FORMULA([AREAS.XLW]REFDATA.XLS!SUBJ_CITY,[AREAS.XLW]REFDATA.XLS!ud.PRP_CI | |
| | =END.IF() | |
| | =IF(ISNUMBER([AREAS.XLW]REFDATA.XLS!SUBJ_SALEDATE)) | ud.MONTH_YEAR |
| | = FORMULA(TEXT([AREAS.XLW]REFDATA.XLS!SUBJ_SALEDATE,"mm/d/yy"),[AREAS.XLW]RE | |
| | =END.IF() | |
| | =IF(ISNUMBER([AREAS.XLW]REFDATA.XLS!IMPR_GENDESC_AGE)) | ud.AGE |
| | = FORMULA([AREAS.XLW]REFDATA.XLS!IMPR_GENDESC_AGE,[AREAS.XLW]REFDATA.XLS! | |
| | =END.IF() | |
| | =IF(ISNUMBER([AREAS.XLW]REFDATA.XLS!ROOM_ABOVEGRADE_BEDRMS)) | ud.BEDRMS_N |
| | = FORMULA([AREAS.XLW]REFDATA.XLS!ROOM_ABOVEGRADE_BEDRMS,[AREAS.XLW]REF | |
| | =END.IF() | |
| | =IF(ISNUMBER([AREAS.XLW]REFDATA.XLS!ROOM_ABOVEGRADE_BATHS)) | ud.BA_NUM |
| | = FORMULA([AREAS.XLW]REFDATA.XLS!ROOM_ABOVEGRADE_BATHS,[AREAS.XLW]REFD | |
| | =END.IF() | |
| | '=CALCULATE.NOW() | |
| | =RETURN() | |

BuildAreaComps

| | |
|---|---|
| | =IF(BuildCompsFlag=TRUE) |
| | = IF(LoadNewCounty=TRUE,LinkRegion()) |
| | = MESSAGE(TRUE,"Finding Area Averages") |
| | = SetEnv() |
| | = ECHO(FALSE) |
| | = A1.R1C1(FALSE) |
| | = GetAreaComp([AREAS.XLW]REFDATA.XLS!CriteriaA7,"A7.QEF",[AREAS.XLW]REFDATA.XLS! |
| | = GetAreaComp([AREAS.XLW]REFDATA.XLS!CriteriaA6,"A6.QEF",[AREAS.XLW]REFDATA.XLS! |
| | = GetAreaComp([AREAS.XLW]REFDATA.XLS!CriteriaMC,"MC.QEF",[AREAS.XLW]REFDATA.XLS |
| | = GetAreaComp([AREAS.XLW]REFDATA.XLS!CriteriaC6,"C6.QEF",[AREAS.XLW]REFDATA.XLS! |
| | = GetAreaComp([AREAS.XLW]REFDATA.XLS!CriteriaZ5,"Z5.QEF",[AREAS.XLW]REFDATA.XLS! |
| | = GetAreaComp([AREAS.XLW]REFDATA.XLS!CriteriaAll,"ALL.QEF",[AREAS.XLW]REFDATA.XLS |
| | = FORMULA(FALSE,BuildCompsFlag) |
| | = RestoreEnv() |
| | = MESSAGE(FALSE) |
| | =END.IF() |
| | =RETURN() |

| | GetAreaComp | |
|---|---|---|
| | =ARGUMENT("CriteriaName",8) | |
| | =ARGUMENT("DatabaseName",2) | |
| | =ARGUMENT("DataName",8) | |
| | =ARGUMENT("SrcName",8) | |
| | =ARGUMENT("DataSource",2) | |
| | =ECHO(FALSE) | |
| critval | =OFFSET(TEXTREF(GET.CELL(1,CriteriaName)),0,1) | |
| critselect | =OFFSET(TEXTREF(GET.CELL(1,CriteriaName)),0,0) | |
| countyVal | =OFFSET(TEXTREF(GET.CELL(1,CriteriaName)),1,1) | |
| countySelect | =OFFSET(TEXTREF(GET.CELL(1,CriteriaName)),1,0) | |
| | =FORMULA.GOTO(DataName) | |
| | =CLEAR(3) | |
| | =IF(critval<>"") | |
| | =  EXECUTE(dbm.chan,"[ACTIVATE(""&DatabaseName&"")]") | |
| | =  EXECUTE(dbm.chan,"[ECHO(FALSE)]") | |
| | =  EXECUTE(dbm.chan,"[SELECT.RESET()]") | |
| | =  EXECUTE(dbm.chan,"[SELECT.COLUMN(""&critselect&"")]") | |
| | =  EXECUTE(dbm.chan,"[ADD.CONDITION(""&critval&"")]") | |
| | =  EXECUTE(dbm.chan,"[SELECT.COLUMN(""&countySelect&"")]") | |
| | =  EXECUTE(dbm.chan,"[ADD.CONDITION(""&countyVal&"")]") | |
| | =  EXECUTE(dbm.chan,"[FETCH('EXCEL',[AREAS.XLW]REFDATA.XLS',""&SUBSTITUTE(REFTE) | |
| | =  EXECUTE(dbm.chan,"[ECHO(TRUE)]") | |
| | =  FORMULA(DataSource,SrcName) | |
| | =END.IF() | |
| | =RETURN() | |

| | ConvertMapRef | |
|---|---|---|
| | =ARGUMENT("mapref",2) | |
| | =SET.NAME("mapref",UPPER(mapref)) | |
| | =SET.NAME("mapseg","") | |
| | =IF(mapref="") | |
| | =  RETURN(mapseg) | |
| | =END.IF() | |
| | | |
| | =FOR("i",1,LEN(mapref)) | parse initial numeric |
| cmrCode | =  CODE(MID(mapref,i,1)) | |
| | =  IF(AND(cmrCode>=48,cmrCode<=57)) | |
| | =    SET.NAME("mapseg",mapseg&CHAR(cmrCode)) | |
| | =  ELSE() | |
| | =    GOTO(cmrExitLoop) | |
| | =  END.IF() | |
| | =NEXT() | |
| cmrExitLoop | =SET.NAME("mapseg",TEXT(mapseg,"#")) | format numeric portion |
| | =IF(LEN(mapseg)<3) | |
| | =  SET.NAME("mapseg",""&mapseg) | |
| | =END.IF() | |
| | =IF(AND(cmrCode>=75,cmrCode<=90)) | take care of special map page |
| | =  SET.NAME("mapseg",mapseg&CHAR(cmrCode)) | |
| | =  SET.NAME("i",i+1) | |
| | =ELSE() | |
| | =  SET.NAME("mapseg",mapseg&"") | |
| | =END.IF() | |
| | '=FOR("i",i,LEN(mapref)) | |
| | '=  CODE(MID(mapref,i,1)) | |
| | '=  IF(AND(R[-1]C>=65,R[-1]C<=90)) | |
| | '=    GOTO(cmrExitLoop2) | |
| | '=  END.IF() | |
| | '=NEXT() | |
| cmrExitLoop2 | '=SET.NAME("mapseg",mapseg&MID(mapref,i,100)) | |
| | =FOR("i",i,LEN(mapref)) | |
| | =  CODE(MID(mapref,i,1)) | |
| | =  IF(OR(AND(R[-1]C>=48,R[-1]C<=57),AND(R[-1]C>=65,R[-1]C<=90))) | |
| | =    SET.NAME("mapseg",mapseg&MID(mapref,i,1)) | |
| | =  ELSE.IF(RIGHT(mapseg)<>"") | |
| | =    SET.NAME("mapseg",mapseg&"") | |
| | =  END.IF() | |
| | =NEXT() | |
| | =RETURN(mapseg) | |

| | ConvertMapToComp | |
|---|---|---|
| | =ARGUMENT("cmapref",2) | |
| cmWild | =ConvertMapRef(cmapref) | |
| cmNumStart | =SUBSTITUTE(cmWild," ","") | |

| | | |
|---|---|---|
| cmCode | =SET.NAME("cmPage","")<br>=FOR("cnt",1,LEN(cmNumStart))<br>=  CODE(MID(cmNumStart,cnt,1))<br>=  IF(AND(cmCode>=48,cmCode<=57))<br>=    SET.NAME("cmPage",cmPage&MID(cmNumStart,cnt,1))<br>=  ELSE()<br>=    SET.NAME("cmPageLen",LEN(cmPage))<br>=    BREAK()<br>=  END.IF()<br>=NEXT()<br>=SET.NAME("cmSquare",MID(cmNumStart,cnt,LEN(cmNumStart)))<br>=IF(LEN(cmSquare)<3,SET.NAME("cmSquare"," "&cmSquare))<br>=SET.NAME("cmPage",REPT("0",3-cmPageLen)&cmPage)<br>=RETURN(cmPage&cmSquare) | |

ConvertAPNtoRegex

| | | |
|---|---|---|
| capnCode | =ARGUMENT("urarapn",2)<br>=SET.NAME("apn","")<br>=SET.NAME("aFlg",TRUE)<br>=FOR("i",1,LEN(urarapn))<br>=  CODE(MID(urarapn,i,1))<br>=  IF(AND(capnCode>=48,capnCode<=57))<br>=    SET.NAME("apn",apn&CHAR(capnCode))<br>=    SET.NAME("aFlg",TRUE)<br>=  ELSE.IF(aFlg)<br>=    SET.NAME("apn",apn&" ")<br>=    SET.NAME("aFlg",FALSE)<br>=  END.IF()<br>=NEXT()<br>=RETURN(apn) | |

ConvertAPNtoNum

| | | |
|---|---|---|
| c.capnCode<br><br><br><br><br>capn.toChar | =ARGUMENT("c.urarapn",2)<br><br>=IF([AREAS.XLW]INTRFACE.XLM!ApnNew<>TRUE)<br>=  SET.NAME("c.apn","")<br>=  FOR("i",1,LEN(c.urarapn))<br>=    CODE(MID(c.urarapn,i,1))<br>=    IF(AND(c.capnCode>=48,c.capnCode<=57))<br>=      SET.NAME("c.apn",c.apn&CHAR(c.capnCode))<br>=    END.IF()<br>=  NEXT()<br>=ELSE()<br>=  SET.NAME("c.Book","")<br>=  SET.NAME("c.Block","")<br>=  SET.NAME("c.Parcel","")<br>=  SET.NAME("c.Extra","")<br>=  SET.NAME("c.seg",1)<br>=  FOR("i",1,LEN(c.urarapn))<br>=    MID(c.urarapn,i,1)<br>=    IF([AREAS.XLW]CELLDLG.XLM!TestDelim(capn.toChar))<br>=      SET.NAME("c.seg",c.seg+1)<br>=    ELSE()<br>=      IF(c.seg=1)<br>=        SET.NAME("c.Book",c.Book&capn.toChar)<br>=      ELSE.IF(c.seg=2)<br>=        SET.NAME("c.Block",c.Block&capn.toChar)<br>=      ELSE.IF(c.seg=3)<br>=        SET.NAME("c.Parcel",c.Parcel&capn.toChar)<br>=      ELSE()<br>=        SET.NAME("c.Extra",c.Parcel&capn.toChar)<br>=      END.IF()<br>=    END.IF()<br>=  NEXT()<br>=  IF(c.Parcel="")<br>=    SET.NAME("c.Block",c.Book)<br>=    SET.NAME("c.Book","")<br>=  ELSE.IF(c.Extra<>"")<br>=    SET.NAME("c.Block",c.Parcel)<br>=  END.IF()<br>=  IF([AREAS.XLW]INTRFACE.XLM!ApnBlock=9)<br>=    SET.NAME("c.apn",REPT("0",4-LEN(c.Book))&c.Book&REPT("0",5-LEN(c.Block))&c.Block)<br>=  ELSE.IF([AREAS.XLW]INTRFACE.XLM!ApnBlock=12)<br>=    SET.NAME("c.apn",REPT("0",6-LEN(c.Book))&c.Book&REPT("0",6-LEN(c.Block))&c.Block)<br>=  ELSE()<br>=    SET.NAME("c.apn",REPT("0",4-LEN(c.Book))&c.Book&REPT("0",3-LEN(c.Block))&c.Block) | This block is the old way of gen<br><br><br><br><br>new way<br><br><br><br><br><br><br><br><br><br><br><br><br><br><br><br><br><br><br><br>take care of case with no book<br><br>take care of case with extra se |

```
- END.IF()
=END.IF()
=RETURN(c.apn)
```

GetInputComps

```
=ECHO(FALSE)
=CALCULATE.NOW()
=IF(BuildCompsFlag=TRUE)
=   SetEnv()
=   BuildAreaComps()
=   ECHO(FALSE)
=   IF([AREAS.XLW]REFDATA.XLS!Z5CNT<5)
=      FORMULA.GOTO("[AREAS.XLW]REFDATA.XLS!DataAllToZ5")
=      COPY()
=      FORMULA.GOTO("[AREAS.XLW]REFDATA.XLS!DataZ5")
=      PASTE.SPECIAL(3,1,FALSE,FALSE)
=   END.IF()
=   FillCompFields([AREAS.XLW]REFDATA.XLS!DataAllToZ5,[AREAS.XLW]REFDATA.XLS!DataZ5)
=   IF([AREAS.XLW]REFDATA.XLS!CCNT<5)
=      FORMULA.GOTO("[AREAS.XLW]REFDATA.XLS!DataZ5")
=      COPY()
=      FORMULA.GOTO("[AREAS.XLW]REFDATA.XLS!DataC6")
=      PASTE.SPECIAL(3,1,FALSE,FALSE)
=   END.IF()
=   FillCompFields([AREAS.XLW]REFDATA.XLS!DataZ5,[AREAS.XLW]REFDATA.XLS!DataC6)
=   IF([AREAS.XLW]REFDATA.XLS!MCCNT<3)
=      FORMULA.GOTO("[AREAS.XLW]REFDATA.XLS!DataC6")
=      COPY()
=      FORMULA.GOTO("[AREAS.XLW]REFDATA.XLS!DataMC")
=      PASTE.SPECIAL(3,1,FALSE,FALSE)
=   END.IF()
=   FillCompFields([AREAS.XLW]REFDATA.XLS!DataC6,[AREAS.XLW]REFDATA.XLS!DataMC)
=   IF([AREAS.XLW]REFDATA.XLS!A6CNT<1)
=      FORMULA.GOTO("[AREAS.XLW]REFDATA.XLS!DataMC")
=      COPY()
=      FORMULA.GOTO("[AREAS.XLW]REFDATA.XLS!DataA6")
=      PASTE.SPECIAL(3,1,FALSE,FALSE)
=   END.IF()
=   FillCompFields([AREAS.XLW]REFDATA.XLS!DataMC,[AREAS.XLW]REFDATA.XLS!DataA6)
=   IF([AREAS.XLW]REFDATA.XLS!A7CNT<1)
=      FORMULA.GOTO("[AREAS.XLW]REFDATA.XLS!DataA6")
=      COPY()
=      FORMULA.GOTO("[AREAS.XLW]REFDATA.XLS!DataA7")
=      PASTE.SPECIAL(3,1,FALSE,FALSE)
=   END.IF()
=   FillCompFields([AREAS.XLW]REFDATA.XLS!DataA6,[AREAS.XLW]REFDATA.XLS!DataA7)
=   CALCULATE.NOW()
=   RestoreEnv()
=END.IF()
=RETURN()
```

CancelHandler

```
=ECHO(FALSE)
=[AREAS.XLW]INTRFACE.XLM!EnableAllMenus()
=DATA.FIND(FALSE)
=RestoreEnv()
=[AREAS.XLW]INTRFACE.XLM!Init_Keys()
=MESSAGE(FALSE)
=TERMINATE(sdr.chan)
=RETURN()
```

QESelectCondition

```
=ARGUMENT("numCrit",18)
=ARGUMENT("op",1)
=ARGUMENT("qe.type",1)
``` this is text formatted according relational operator specified by type of value, 1 - number, 2 - st

| | | |
|---|---|---|
| | =ARGUMENT("case_sense",4) | |
| | =IF(ISERROR(case_sense)) | |
| | =   SET.NAME("case_sense",FALSE) | |
| | =END.IF() | |
| | =IF(ISERROR(numCrit)) | |
| | =   SET.NAME("addCond","") | determine value |
| | =ELSE.IF(numCrit="") | |
| | =   SET.NAME("addCond","") | |
| | =ELSE.IF(qe.type=1) | |
| qesc.val | =VALUE(numCrit) | |
| | =   IF(NOT(ISERROR(qesc.val))) | |
| | =     SET.NAME("addCond","1,"&TEXT(op,"#")&","&qesc.val&","&case_sense) | |
| | =   ELSE() | |
| | =     SET.NAME("addCond","") | |
| | =   END.IF() | |
| | =ELSE.IF(qe.type=2) | |
| | =   SET.NAME("addCond","1,"&TEXT(op,"#")&","""&numCrit&"""&","&case_sense) | |
| | =ELSE.IF(qe.type=3) | |
| | =   SET.NAME("addCond","1,"&TEXT(op,"#")&",{"&numCrit&"}"&","&case_sense) | |
| | =ELSE() | |
| | =   SET.NAME("addCond","") | |
| | =END.IF() | |
| | =RETURN(addCond) | |

| | SetEnv | |
|---|---|---|
| | =ERROR(FALSE) | |
| | =PROTECT.DOCUMENT(TRUE,FALSE,,TRUE) | |
| er.Worksheet | =GET.CELL(32,ACTIVE.CELL()) | |
| er.FullFlag | =GET.WINDOW(20) | |
| | =PROTECT.DOCUMENT(TRUE,TRUE,,TRUE) | |
| | =ERROR(TRUE) | |
| | =RETURN() | |

| | RestoreEnv | |
|---|---|---|
| | =ERROR(FALSE) | |
| | =PROTECT.DOCUMENT(TRUE,FALSE,,TRUE) | |
| | =IF(GET.WINDOW(1)="[AREAS.XLW]REFDATA.XLS") | |
| | =   HIDE() | |
| | =END.IF() | |
| | =ACTIVATE(er.Worksheet) | |
| | =FULL(DEREF(er.FullFlag)) | |
| | =PROTECT.DOCUMENT(TRUE,TRUE,,TRUE) | |
| | =ERROR(TRUE) | |
| | =RETURN() | |

| | FillCompFields | |
|---|---|---|
| | =ARGUMENT("fcf.FromArray",8) | arrays must be same size |
| | =ARGUMENT("fcf.ToArray",8) | |
| fcf.numFields | =COLUMNS(fcf.FromArray) | |
| | =FOR("i",2,fcf.numFields) | |
| | =   SET.NAME("fcf.toField",TEXTREF(GET.CELL(1,OFFSET(fcf.ToArray,0,i)))) | |
| | =   SET.NAME("fcf.fromField",TEXTREF(GET.CELL(1,OFFSET(fcf.FromArray,0,i)))) | |
| | =   IF(ISBLANK(DEREF(fcf.toField)=0)) | |
| | =     FORMULA(DEREF(fcf.fromField),fcf.toField) | |
| | =   END.IF() | |
| | =NEXT() | |
| | =RETURN() | |

| | MergeUserWithVars | |
|---|---|---|
| | | reads vars.qef & user.qef |
| | =EXECUTE(dbm.chan,"[OPEN('VARS.QEF')]") | creates res.qef |
| | =EXECUTE(dbm.chan,"[ACTIVATE('VARS.QEF')]") | |
| | =EXECUTE(dbm.chan,"[ALLOW.EDIT()]") | |
| | =EXECUTE(dbm.chan,"[SELECT.RESET()]") | |
| muwv.varrows | =REQUEST(dbm.chan,"NUMROWS") | |
| | =EXECUTE(dbm.chan,"[ACTIVATE('USER.QEF')]") | |
| | =EXECUTE(dbm.chan,"[SELECT.RESET()]") | |
| | =EXECUTE(dbm.chan,"[ALLOW.EDIT()]") | |
| muwv.usrrows | =REQUEST(dbm.chan,"NUMROWS") | |
| muwv.curvar | 23 | |
| | =EXECUTE(dbm.chan,"[OPEN('res.QEF')]") | |
| | =EXECUTE(dbm.chan,"[ACTIVATE('reS.QEF')]") | |
| | =EXECUTE(dbm.chan,"[SELECT.RESET()]") | |
| | =EXECUTE(dbm.chan,"[ALLOW.EDIT()]") | |
| | =EXECUTE(dbm.chan,"[SELECT.AREA('ALL')]") | |

| | | |
|---|---|---|
| | =EXECUTE(dbm.chan,"[DELETE.RECORDS()]") | |
| | =FOR("muwv.ur",1,muwv.usrrows) | for each user record |
| | = MESSAGE(TRUE,"Merging record "&TEXT(muwv.ur,"#")&" of "&TEXT(muwv.usrrows,"#")) | |
| | = FOR("muwv.vr",1,muwv.varrows) | for each variable value |
| muwv.varrow | = "R"&TEXT(muwv.vr,"#") | |
| | = EXECUTE(dbm.chan,"[ACTIVATE('VARS.QEF')]") | |
| | = EXECUTE(dbm.chan,"[FETCH('EXCEL',[AREAS.XLW]DBM.XLM',"&REFTEXT(muwv.curvar)& | get the col # of the var |
| | = EXECUTE(dbm.chan,"[ACTIVATE('USER.QEF')]") | |
| | = EXECUTE(dbm.chan,"[SELECT.AREA('R"&TEXT(muwv.ur,"#")&"')]") | select the row from user.qef |
| | = EXECUTE(dbm.chan,"[COPY()]") | put it in the clipboard |
| | = EXECUTE(dbm.chan,"[ACTIVATE('RES.QEF')]") | |
| | = EXECUTE(dbm.chan,"[PASTE.APPEND()]") | put it in the res dbf file |
| muwv.resrow | = REQUEST(dbm.chan,"NUMROWS") | |
| | = EXECUTE(dbm.chan,"[ACTIVATE('VARS.QEF')]") | |
| | = EXECUTE(dbm.chan,"[SELECT.AREA(""&muwv.varrow&"C3"&"')]") | select the var value |
| | = EXECUTE(dbm.chan,"[COPY()]") | put it in the clipboard |
| | = EXECUTE(dbm.chan,"[ACTIVATE('RES.QEF')]") | |
| | = EXECUTE(dbm.chan,"[SELECT.AREA('R"&TEXT(muwv.resrow,"#")&"C"&TEXT(muwv.curvar," | select the rc in res.dbf |
| | = EXECUTE(dbm.chan,"[PASTE()]") | paste in var value |
| | = NEXT() | |
| | =NEXT() | |
| | =RETURN() | |

| | AnalyzeBehavior | |
|---|---|---|
| | | goes thru every record in user.dbf and calcs an estimate puts results in analysis.xls |
| | =EXECUTE(dbm.chan,"[OPEN('VARS.QEF')]") | |
| | =EXECUTE(dbm.chan,"[ACTIVATE('VARS.QEF')]") | |
| | =EXECUTE(dbm.chan,"[SELECT.RESET()]") | |
| | =EXECUTE(dbm.chan,"[ALLOW.EDIT()]") | |
| | =SET.NAME("BatchFlag",TRUE) | |
| | =ERROR(FALSE) | |
| | =EXECUTE(dbm.chan,"[ACTIVATE(USER.QEF)]") | |
| | =EXECUTE(dbm.chan,"[SELECT.RESET()]") | |
| ab.start | =1 | always start at record #1 |
| | =SetEnv() | |
| | =ERROR(FALSE)+ECHO(FALSE) | |
| | =UNHIDE("[AREAS.XLW]ESTIMATE.XLM") | |
| | =ACTIVATE("[AREAS.XLW]ESTIMATE.XLM") | |
| | =PROTECT.DOCUMENT(FALSE,FALSE,,FALSE) | |
| | =FORMULA("=SalePrice([AREAS.XLW]DBM.XLM!AppraiseValue)",[AREAS.XLW]ESTIMATE.XLM!C | |
| | =FORMULA("=HighSalePrice([AREAS.XLW]DBM.XLM!AppraiseValue,[AREAS.XLW]DBM.XLM!Erro | |
| | =FORMULA("=LowSalePrice([AREAS.XLW]DBM.XLM!AppraiseValue,[AREAS.XLW]DBM.XLM!Error | |
| | =PROTECT.DOCUMENT(TRUE,TRUE,,TRUE) | |
| | =HIDE() | |
| | =ERROR(TRUE) | |
| | =IF(ab.summFlag'=TRUE) | |
| | = NEW(1) | |
| | = FORMULA("Record Number",!R1C1) | |
| | = FORMULA("Address",!R1C2) | |
| | = FORMULA("City",!R1C3) | |
| | = FORMULA("Zip",!R1C4) | |
| | = FORMULA("Var Name",!R1C5) | |
| | = FORMULA("Var Value",!R1C6) | |
| | = FORMULA("Estimate",!R1C7) | |
| | = FORMULA("% Change",!R1C7) | |
| | = SAVE.AS("analysis.xls",1) | |
| | =END.IF() | |
| | =ACTIVATE("[AREAS.XLW]QI.XLS") | |
| | =EXECUTE(dbm.chan,"[ACTIVATE(USER.QEF)]") | |
| ab.rows | =REQUEST(dbm.chan,"NUMROWS") | |
| | =FOR("ab.r",ab.start,ab.rows) | For each record |
| | = MESSAGE(TRUE,"Estimating record "&TEXT(ab.r,"#")&" of "&TEXT(ab.rows,"#")) | |
| | = FORMULA(TRUE,BuildCompsFlag) | |
| | = Get_Urar_Record("USER.QEF",[AREAS.XLW]REFDATA.XLS!Record_Get,ab.r,1) | Fetch it |
| | = ERROR(FALSE)+ECHO(FALSE) | |
| | = ACTIVATE("[AREAS.XLW]QI.XLS") | |
| | = PROTECT.DOCUMENT(FALSE,FALSE,,FALSE) | |
| | = FOR.CELL("fld",[AREAS.XLW]QI.XLS!QI_TRAVEL) | |
| | = FORMULA("= [AREAS.XLW]cell.xlm!F_"&fld&"()",ab.CellFilterCall) | |
| ab.CellFilterCall | = [AREAS.XLW]CELL.XLM!F_COMM_ADDNL_FEATURES1() | |
| | = FORMULA.GOTO("[AREAS.XLW]QI.XLS!"&fld) | |
| | = FORMULA(GET.FORMULA(ACTIVE.CELL())) | |
| | = NEXT() | |
| | = PROTECT.DOCUMENT(TRUE,TRUE,,TRUE) | |
| | = GetInputComps() | Find Area Comps |
| | = FORMULA(FALSE,BuildCompsFlag) | |
| ab.good | = CalculateAppraisal() | |

```
=    IF(ab.good=TRUE)
=      ERROR(TRUE)
=      UpdateAppraisal()
=      UpdateAnalysis(ab.r)
=      IF(ab.stdReportFlag'=TRUE,SaveReport(ab.r,ab.path))
=      IF(ab.dbgReportFlag'=TRUE,SaveHNCReport(ab.r,ab.path))
=    END.IF()
=NEXT()
=ACTIVATE("analysis.xls")
=CalculateVarDifferences()
=SAVE()+CLOSE()
=RestoreEnv()
=ERROR(FALSE)
=UNHIDE("[AREAS.XLW]ESTIMATE.XLM")
=ACTIVATE("[AREAS.XLW]ESTIMATE.XLM")
=PROTECT.DOCUMENT(FALSE,FALSE,,FALSE)
=FORMULA("=SalePrice([AREAS.XLW]INTRFACE.XLM!AppraiseValue)",[AREAS.XLW]ESTIMATE.
=FORMULA("=HighSalePrice([AREAS.XLW]INTRFACE.XLM!AppraiseValue,[AREAS.XLW]INTRFAC
=FORMULA("=LowSalePrice([AREAS.XLW]INTRFACE.XLM!AppraiseValue,[AREAS.XLW]INTRFAC
=PROTECT.DOCUMENT(TRUE,TRUE,,TRUE)
=HIDE()
=ERROR(TRUE)
=SET.NAME("BatchFlag",FALSE)
=MESSAGE(TRUE,"Batch Finished!")
=RETURN()
```

UpdateAnalysis

```
=ARGUMENT("ua.row",1)
=ACTIVATE("[AREAS.XLW]DBM.XLM")
=PROTECT.DOCUMENT(FALSE,FALSE,,FALSE)
```
ua.rowref      ="ANALYSIS.XLS!R"&TEXT(ua.row-ab.start+2,"#")
ua.curaddr     =[AREAS.XLW]REFDATA.XLS!SUBJ_ADDRESS
ua.curvarname  FND_SETL
ua.curvarval   N
```
=FORMULA(ua.row,TEXTREF(ua.rowref&"C1"))
=FORMULA([AREAS.XLW]REFDATA.XLS!SUBJ_ADDRESS,TEXTREF(ua.rowref&"C2"))
=FORMULA([AREAS.XLW]REFDATA.XLS!SUBJ_CITY,TEXTREF(ua.rowref&"C3"))
=FORMULA([AREAS.XLW]REFDATA.XLS!SUBJ_ZIP,TEXTREF(ua.rowref&"C4"))
=FORMULA(IF(ISERROR([AREAS.XLW]ESTIMATE.XLM!CopyPropValue),"",[AREAS.XLW]ESTIMA
=IF(ua.row = 1)
=    SET.NAME("ua.lastaddr","")
=    SET.NAME("ua.curvarrow",1)
=END.IF()
=IF(NOT(ua.lastaddr = ua.curaddr))
=    SET.NAME("ua.curvarrow",1)
=    SET.NAME("ua.lastaddr",DEREF(ua.curaddr))
=ELSE()
=    SET.NAME("ua.curvarrow",ua.curvarrow+1)
=END.IF()
=EXECUTE(dbm.chan,"[ACTIVATE('VARS.QEF')]")
=EXECUTE(dbm.chan,"[FETCH('EXCEL','[AREAS.XLW]DBM.XLM',"&REFTEXT(ua.curvarval)&"',"&   get the val of the var
=EXECUTE(dbm.chan,"[FETCH('EXCEL','[AREAS.XLW]DBM.XLM',"&REFTEXT(ua.curvarname)&"'   get the name of the var
=FORMULA(ua.curvarname,TEXTREF(ua.rowref&"C5"))
=FORMULA(ua.curvarval,TEXTREF(ua.rowref&"C6"))
=RETURN()
```

CalculateVarDifferences

```
=SET.NAME("cvd.currow",2)
=SET.NAME("cvd.done",FALSE)
=ACTIVATE("analysis.xls")
=SET.NAME("cvd.lastvar","")
=SET.NAME("cvd.lastaddr","")
=WHILE(NOT(cvd.done))
```
cvd.rowref   ="ANALYSIS.XLS!R"&TEXT(cvd.currow,"#")
cvd.curvar   =DEREF(TEXTREF(cvd.rowref&"C5"))                                         get the val of the var
cvd.curaddr  =DEREF(TEXTREF(cvd.rowref&"C2"))
```
=IF(OR(DEREF(cvd.curvar) = "",DEREF(cvd.curvar)=0))
=    SET.NAME("cvd.done",TRUE)
=ELSE.IF(OR( NOT(cvd.curaddr = cvd.lastaddr),NOT(cvd.curvar = cvd.lastvar)))          get the name of the var
```
cvd.curbase  =    DEREF(TEXTREF(cvd.rowref&"C7"))
```
=    SELECT(DEREF(cvd.rowref))
=    INSERT(2)
=    SET.NAME("cvd.lastvar",DEREF(cvd.curvar))
=    SET.NAME("cvd.lastaddr",DEREF(cvd.curaddr))
=    SET.NAME("cvd.currow",cvd.currow+2)
=ELSE()
```

| | | |
|---|---|---|
| cvd.val | = DEREF(TEXTREF(cvd.rowref&"C7")) | |
| cvd.percent | = (cvd.val-cvd.curbase)/cvd.curbase | |
| | = FORMULA(cvd.percent,cvd.rowref&"C8") | |
| | = SET.NAME("cvd.currow",cvd.currow+1) | |
| | = SET.NAME("cvd.lastvar",DEREF(cvd.curvar)) | |
| | = SET.NAME("cvd.lastaddr",DEREF(cvd.curaddr)) | |
| | =END.IF() | |
| | =NEXT() | |
| | | |
| | =SET.NAME("cvd.numbad",0) | |
| | =ACTIVATE("analysis.xls") | |
| | =SELECT.LAST.CELL() | |
| cvd.rows | =ROW(ACTIVE.CELL()) | |
| | =FOR("cvd.r",1,cvd.rows) | For each record |
| cvd.rr | = "ANALYSIS.XLS!R"&TEXT(cvd.r,"#") | |
| cvd.p | = DEREF(TEXTREF(cvd.rr&"C8")) | |
| | = IF( cvd.p >0 ) | |
| | =    SET.NAME("cvd.numbad",cvd.numbad+1) | |
| | = END.IF() | |
| | =NEXT() | |
| | | |
| | =FORMULA("TOTAL NON-INTUITIVE RESULTS",TEXTREF("ANALYSIS.XLS!R"&TEXT(cvd.rows+ | |
| | =FORMULA(cvd.numbad,TEXTREF("ANALYSIS.XLS!R"&TEXT(cvd.rows+4,"#")&"C8")) | |
| | =RETURN() | |

| | BatchIt | This routine walk through all of |
|---|---|---|
| | =SET.NAME("BatchFlag",TRUE) | |
| | =ERROR(FALSE) | |
| | =SET.NAME("bi.validPath",FALSE) | |
| | =WHILE(bi.validpath=FALSE) | |
| bi.result | = DIALOG.BOX(ud.BatchMode) | |
| | = IF(bi.result=FALSE) | |
| | =    SET.NAME("BatchFlag",FALSE) | |
| | =    RETURN() | |
| | = END.IF() | |
| | = IF(ISERROR(DIRECTORY(bi.path)),ALERT("Invalid Directory!",3),SET.NAME("bi.validpath",TRU | Check validity of path |
| | =NEXT() | |
| | =IF(bi.selectFlag=TRUE) | |
| | = EXECUTE(dbm.chan,"[ACTIVATE(USER.QEF)]") | |
| | = EXECUTE(dbm.chan,"[SELECT.RESET()]") | |
| | =END.IF() | |
| bi.start | =IF(AND(NOT(ISBLANK(bi.startRecNum)),bi.startRecNum>0),bi.startRecNum,1) | |
| | =SetEnv() | |
| | =ERROR(FALSE)+ECHO(FALSE) | |
| | =UNHIDE("[AREAS.XLW]ESTIMATE.XLM") | |
| | =ACTIVATE("[AREAS.XLW]ESTIMATE.XLM") | |
| | =PROTECT.DOCUMENT(FALSE,FALSE,,FALSE) | |
| | =FORMULA("=SalePrice([AREAS.XLW]DBM.XLM!AppraiseValue)",[AREAS.XLW]ESTIMATE.XLM!C | |
| | =FORMULA("=HighSalePrice([AREAS.XLW]DBM.XLM!AppraiseValue,[AREAS.XLW]DBM.XLM!Erro | |
| | =FORMULA("=LowSalePrice([AREAS.XLW]DBM.XLM!AppraiseValue,[AREAS.XLW]DBM.XLM!Error | |
| | =PROTECT.DOCUMENT(TRUE,TRUE,,TRUE) | |
| | =HIDE() | |
| | =ERROR(TRUE) | |
| | =IF(bi.summFlag'=TRUE) | |
| | = NEW(1) | |
| | = FORMULA("Record Number",!R1C1) | |
| | = FORMULA("Address",!R1C2) | |
| | = FORMULA("City",!R1C3) | |
| | = FORMULA("Zip",!R1C4) | |
| | = FORMULA("Appraisal",!R1C5) | |
| | = FORMULA("Low",!R1C6) | |
| | = FORMULA("Estimate",!R1C7) | |
| | = FORMULA("High",!R1C8) | |
| | = FORMULA("% Difference",!R1C9) | |
| | = SAVE.AS("summary.xls",1) | |
| | =END.IF() | |
| | =ACTIVATE("[AREAS.XLW]QI.XLS") | |
| | =EXECUTE(dbm.chan,"[ACTIVATE(USER.QEF)]") | |
| bi.rows | =REQUEST(dbm.chan,"NUMROWS") | |
| | =FOR("bi.r",bi.start,bi.rows) | For each record |
| | = MESSAGE(TRUE,"Estimating record "&TEXT(bi.r,"#")&" of "&TEXT(bi.rows,"#")) | |
| | = FORMULA(TRUE,BuildCompsFlag) | |
| | = Get_Urar_Record("USER.QEF",[AREAS.XLW]REFDATA.XLS!Record_Get,bi.r,1) | Fetch it |
| | = ERROR(FALSE)+ECHO(FALSE) | |
| | = ACTIVATE("[AREAS.XLW]QI.XLS") | |
| | = PROTECT.DOCUMENT(FALSE,FALSE,,FALSE) | |

|  |  |  |
|---|---|---|
|  | = FOR.CELL("fld",[AREAS.XLW]QI.XLS!QI_TRAVEL) |  |
|  | = FORMULA("= [AREAS.XLW]cell.xlm!F_"&fld&"()",bi.CellFilterCall) |  |
| bi.CellFilterCall | = [AREAS.XLW]CELL.XLM!F_COMM_ADDNL_FEATURES1() |  |
|  | = FORMULA.GOTO("[AREAS.XLW]QI.XLS!"&fld) |  |
|  | = FORMULA(GET.FORMULA(ACTIVE.CELL())) |  |
|  | = NEXT() |  |
|  | = PROTECT.DOCUMENT(TRUE,TRUE,,TRUE) | Find Area Comps |
|  | = GetInputComps() |  |
|  | = FORMULA(FALSE,BuildCompsFlag) |  |
| bi.good | = CalculateAppraisal() |  |
|  | = IF(bi.good=TRUE) |  |
|  | = ERROR(TRUE) |  |
|  | = UpdateAppraisal() |  |
|  | = UpdateSummary(bi.r) |  |
|  | = IF(bi.stdReportFlag'=TRUE,SaveReport(bi.r,bi.path)) |  |
|  | = IF(bi.dbgReportFlag'=TRUE,SaveHNCReport(bi.r,bi.path)) |  |
|  | = END.IF() |  |
|  | =NEXT() |  |
|  | =IF(bi.summFlag=TRUE) |  |
|  | = ACTIVATE("summary.xls") |  |
|  | = SAVE()+CLOSE() |  |
|  | =END.IF() |  |
|  | =RestoreEnv() |  |
|  | =ERROR(FALSE) |  |
|  | =UNHIDE("[AREAS.XLW]ESTIMATE.XLM") |  |
|  | =ACTIVATE("[AREAS.XLW]ESTIMATE.XLM") |  |
|  | =PROTECT.DOCUMENT(FALSE,FALSE,,FALSE) |  |
|  | =FORMULA("=SalePrice([AREAS.XLW]INTRFACE.XLM!AppraiseValue",[AREAS.XLW]ESTIMATE. |  |
|  | =FORMULA("=HighSalePrice([AREAS.XLW]INTRFACE.XLM!AppraiseValue,[AREAS.XLW]INTRFAC |  |
|  | =FORMULA("=LowSalePrice([AREAS.XLW]INTRFACE.XLM!AppraiseValue,[AREAS.XLW]INTRFAC |  |
|  | =PROTECT.DOCUMENT(TRUE,TRUE,,TRUE) |  |
|  | =HIDE() |  |
|  | =ERROR(TRUE) |  |
|  | =IF(bi.printFlag=TRUE,PrintBatch(bi.path)) |  |
|  | =SET.NAME("BatchFlag",FALSE) |  |
|  | =MESSAGE(TRUE,"Batch Finished!") |  |
|  | =RETURN() |  |

| SaveReport |
|---|
| =ARGUMENT("sr.recordid",1) |
| =ARGUMENT("sr.bipath",2) |
| =SET.NAME("sr.fname",TEXT(sr.recordid,"#")) |
| =SET.NAME("sr.fname",UPPER(sr.bipath&"\"&sr.fname&".xls")) |
| =[AREAS.XLW]INTRFACE.XLM!PrintReport(sr.fname) |
| =RETURN() |

|  | UpdateSummary |
|---|---|
|  | =ARGUMENT("us.row",1) |
|  | =IF(bi.summFlag=TRUE) |
| us.rowref | = "SUMMARY.XLS!R"&TEXT(us.row-bi.start+2,"#") |
|  | = FORMULA(us.row,TEXTREF(us.rowref&"C1")) |
|  | = FORMULA([AREAS.XLW]REFDATA.XLS!SUBJ_ADDRESS,TEXTREF(us.rowref&"C2")) |
|  | = FORMULA([AREAS.XLW]REFDATA.XLS!SUBJ_CITY,TEXTREF(us.rowref&"C3")) |
|  | = FORMULA([AREAS.XLW]REFDATA.XLS!SUBJ_ZIP,TEXTREF(us.rowref&"C4")) |
|  | = FORMULA([AREAS.XLW]REFDATA.XLS!SUBJ_APPR_PRICE,TEXTREF(us.rowref&"C5")) |
|  | = FORMULA(IF(ISERROR([AREAS.XLW]ESTIMATE.XLM!CopyPropLow),"",[AREAS.XLW]ESTIMA |
|  | = FORMULA(IF(ISERROR([AREAS.XLW]ESTIMATE.XLM!CopyPropValue),"",[AREAS.XLW]ESTIM |
|  | = FORMULA(IF(ISERROR([AREAS.XLW]ESTIMATE.XLM!CopyPropHigh),"",[AREAS.XLW]ESTIMA |
|  | = FORMULA("=((RC[-2]-RC[-4])/RC[-4])*100",TEXTREF(us.rowref&"C9")) |
|  | =END.IF() |
|  | =RETURN() |

| PrintBatch |
|---|
| =ARGUMENT("pb.path",2) |
| =IF(ISNA(pb.path)) |
| = SET.NAME("pb.path",INPUT("Enter Path from which to print files",2,"Batch Mode",bi.path)) |
| = IF(NOT(pb.path),RETURN()) |
| =END.IF() |
| =IF(ISERROR(DIRECTORY(pb.path))) |
| = ALERT("Invalid Directory!",3) |
| = RETURN() |
| =END.IF() |
| =SET.NAME("pb.files",FILES(pb.path&"\*.xls")) |
| =IF(ISERROR(COLUMNS(pb.files))) |

| | | | |
|---|---|---|---|
| pb.nextFile | = ALERT("No files match directory text",3)<br>= RETURN()<br>=END.IF()<br>=ERROR(FALSE)<br>=FOR("i",1,COLUMNS(pb.files))<br>= INDEX(pb.files,1,i)<br>= OPEN(pb.nextFile)<br>= UNHIDE(pb.nextFile)<br>= DISPLAY(,,,TRUE)<br>= PRINT()<br>= CLOSE()<br>=NEXT()<br>=RETURN() | | |

| | CalculateAppraisal | |
|---|---|---|
| MbpnOutput<br>AppraiseValue<br>ErrorCode | =ARGUMENT("ca.perfectdata",4)<br>=MESSAGE(TRUE,"Sale price estimation in progress")<br>=IF(OR(ISERROR([AREAS.XLW]REFDATA.XLS!A7CNT),ISBLANK([AREAS.XLW]REFDATA.XLS!A<br>= RETURN(FALSE)<br>=END.IF()<br>=IF(ISNA(ca.perfectdata))<br>= CALL("EXUISL","EXPUTITER","AJIPP",[AREAS.XLW]INTRFACE.XLM!idNetsId,0,[AREAS.XLW]F<br>=ELSE()<br>= CALL("EXUISL","EXPUTITER","AJIPP",[AREAS.XLW]INTRFACE.XLM!idNetsId,0,[AREAS.XLW]F<br>=END.IF()<br>=CALL("EXUISL","EXGETOUTPUTSTATE","EJ",[AREAS.XLW]INTRFACE.XLM!idNetsId)<br>=TEXT(EXP(MbpnOutput*[AREAS.XLW]INTRFACE.XLM!PriceStdDev+[AREAS.XLW]INTRFACE.XL<br>=CALL("EXUISL","EXERRSCORE","I")<br>=IF(OR([AREAS.XLW]ESTIMATE.XLM!SalePrice(AppraiseValue)<[AREAS.XLW]INTRFACE.XLM!Pr<br>= SET.VALUE(AppraiseValue,0)<br>= SET.NAME("ca.estimateFlag",FALSE)<br>=ELSE()<br>= SET.NAME("ca.estimateFlag",TRUE)<br>= IF(bi.summFlag="N")<br>= [AREAS.XLW]INTRFACE.XLM!BuildContribution()<br>= END.IF()<br>=END.IF()<br>=RETURN(TRUE) | |

| | UpdateAppraisal | |
|---|---|---|
| | =[AREAS.XLW]ESTIMATE.XLM!CopyPropValue()<br>=[AREAS.XLW]ESTIMATE.XLM!CopyPropHigh()<br>=[AREAS.XLW]ESTIMATE.XLM!CopyPropLow()<br>=[AREAS.XLW]ESTIMATE.XLM!CopySupportFactors()<br>=[AREAS.XLW]ESTIMATE.XLM!CopySupportContrib()<br>=[AREAS.XLW]ESTIMATE.XLM!CopyOpposeFactors()<br>=[AREAS.XLW]ESTIMATE.XLM!CopyOpposeContrib()<br>=RETURN() | |

| | ElimRefErrs | |
|---|---|---|
| | =FOR.CELL("m",SELECTION())<br>= MESSAGE(TRUE,"checking "&DEREF(m))<br>= GET.NAME("T"&m)<br>= IF(R[-1]C="=#REF!",DELETE.NAME(m))<br>=NEXT()<br>=MESSAGE(TRUE,"Done!")+MESSAGE(FALSE)<br>=RETURN() | |

| | RegionPath | |
|---|---|---|
| | =RETURN(AreaPath&RegionName&"\") | |

| | UpdateRegion | |
|---|---|---|
| ur.Id | =ARGUMENT("ur.Name",2)<br>=FORMULA(TRUE,LoadNewCounty)+FORMULA(TRUE,BuildCompsFlag)<br>=[AREAS.XLW]INTRFACE.XLM!GetCountyId(ur.Name)<br>=FORMULA(ur.Id,RegionID)<br>=FORMULA(DEREF(INDEX([AREAS.XLW]CELLDLG.XLM!RegionName,RegionID)),RegionName) | update various references to th |

| | | | |
|---|---|---|---|
| | =FORMULA(DEREF(INDEX([AREAS.XLW]CELLDLG.XLM!CountyCode,RegionID)),[AREAS.XLW]R | | |
| | =FOR.CELL("i",[AREAS.XLW]INTRFACE.XLM!RegionName) | Load region constants | |
| | =  IF(i=RegionName) | | |
| | =    FORMULA(OFFSET(i,0,1),[AREAS.XLW]INTRFACE.XLM!PriceMean) | | |
| | =    FORMULA(OFFSET(i,0,2),[AREAS.XLW]INTRFACE.XLM!PriceStdDev) | | |
| | =    FORMULA(OFFSET(i,0,3),[AREAS.XLW]INTRFACE.XLM!PriceMax) | | |
| | =    FORMULA(OFFSET(i,0,4),[AREAS.XLW]INTRFACE.XLM!PriceMin) | | |
| | =    FORMULA(OFFSET(i,0,5),[AREAS.XLW]INTRFACE.XLM!ApnPage) | | |
| | =    FORMULA(OFFSET(i,0,6),[AREAS.XLW]INTRFACE.XLM!ApnBlock) | | |
| | =    FORMULA(OFFSET(i,0,7),[AREAS.XLW]CELLDLG.XLM!TestAPNRef) | | |
| | =    FORMULA(OFFSET(i,0,8),[AREAS.XLW]CELLDLG.XLM!TestMapRef) | | |
| | =    FORMULA(OFFSET(i,0,9),[AREAS.XLW]CELLDLG.XLM!TestCensusRef) | | |
| | =    FORMULA(OFFSET(i,0,10),[AREAS.XLW]INTRFACE.XLM!ApnNew) | | |
| | =    BREAK() | | |
| | =  END.IF() | | |
| | =NEXT() | | |
| | =RETURN(TRUE) | | |

| | LinkRegion | | |
|---|---|---|---|
| | =ECHO(FALSE) | | |
| regionMenuName | =GET.BAR(1,"Region",RegionID) | Determine region name | |
| nameOfRegion | =DEREF(INDEX([AREAS.XLW]CELLDLG.XLM!CountyName,RegionID)) | | |
| | =MESSAGE(TRUE,"Loading model for "&nameOfRegion) | | |
| | =CloseDatabases() | Load region databases | |
| | =OpenDatabases() | | |
| | =ACTIVATE("[AREAS.XLW]INTRFACE.XLM") | | |
| | =DEFINE.NAME("idName",GET.NAME("[AREAS.XLW]INTRFACE.XLM!idName."&RegionName)) | Load id table | |
| | =[AREAS.XLW]INTRFACE.XLM!LoadKnet() | Load network | |
| | =FORMULA(TRUE,BuildCompsFlag)+FORMULA(FALSE,LoadNewCounty) | set flags | |
| | =ACTIVATE("[AREAS.XLW]QI.XLS") | | |
| | =MESSAGE(FALSE)+ECHO(TRUE) | | |
| | =RETURN() | | |

| | CloseDatabases | | |
|---|---|---|---|
| | =ERROR(FALSE) | | |
| | =IF(NOT(ISERROR(EXECUTE(dbm.chan,"[ACTIVATE(A6.QEF)]")))) | | |
| | =  EXECUTE(dbm.chan,"[CLOSE()]") | | |
| | =  EXECUTE(dbm.chan,"[ACTIVATE(A7.QEF)]") | | |
| | =  EXECUTE(dbm.chan,"[CLOSE()]") | | |
| | =  EXECUTE(dbm.chan,"[ACTIVATE(MC.QEF)]") | | |
| | =  EXECUTE(dbm.chan,"[CLOSE()]") | | |
| | =  EXECUTE(dbm.chan,"[ACTIVATE(C6.QEF)]") | | |
| | =  EXECUTE(dbm.chan,"[CLOSE()]") | | |
| | =  EXECUTE(dbm.chan,"[ACTIVATE(Z5.QEF)]") | | |
| | =  EXECUTE(dbm.chan,"[CLOSE()]") | | |
| | =  EXECUTE(dbm.chan,"[ACTIVATE(ALL.QEF)]") | | |
| | =  EXECUTE(dbm.chan,"[CLOSE()]") | | |
| | =END.IF() | | |
| | =ERROR(TRUE) | | |
| | =RETURN() | | |

| | OpenDatabases | | |
|---|---|---|---|
| | =EXECUTE(dbm.chan,"[ECHO(FALSE)]") | | |
| | =EXECUTE(dbm.chan,"[OPEN(""&RegionPath()&"A6.QEF")]") | | |
| | =EXECUTE(dbm.chan,"[OPEN(""&RegionPath()&"A7.QEF")]") | | |
| | =EXECUTE(dbm.chan,"[OPEN(""&RegionPath()&"C6.QEF")]") | | |
| | =EXECUTE(dbm.chan,"[OPEN(""&RegionPath()&"MC.QEF")]") | | |
| | =EXECUTE(dbm.chan,"[OPEN(""&RegionPath()&"Z5.QEF")]") | | |
| | =EXECUTE(dbm.chan,"[OPEN(""&RegionPath()&"ALL.QEF")]") | | |
| | =EXECUTE(dbm.chan,"[ECHO(TRUE)]") | | |
| | =RETURN() | | |

*Conversion Routines*

| | FirstSlash | | |
|---|---|---|---|
| | =ARGUMENT("fsStr",2) | | |
| fsSlashPos | =SEARCH("/",fsStr) | | |
| | =IF(ISERROR(fsSlashPos)) | | |
| | =  IF(LEN(fsStr)<>1,SET.NAME("fsReturn",""),SET.NAME("fsReturn",fsStr)) | | |
| | =ELSE.IF(fsSlashPos=1) | | |
| | =  SET.NAME("fsReturn","") | | |
| | =ELSE.IF(fsSlashPos=2) | | |
| | =  SET.NAME("fsReturn",UPPER(LEFT(fsStr,1))) | | |
| | =ELSE() | | |

```
=   SET.NAME("fsReturn","")
=END.IF()
=RETURN(fsReturn)
```

| | SecondSlash | |
|---|---|---|
| ssSlashPos | `=ARGUMENT("ssStr",2)`<br>`=SEARCH("/",ssStr)`<br>`=IF(ISERROR(ssSlashPos))`<br>`=   SET.NAME("ssReturn","")`<br>`=ELSE.IF(AND(ssSlashPos>=1,LEN(MID(ssStr,ssSlashPos,LEN(ssStr)))=2))`<br>`=   SET.NAME("ssReturn",UPPER(RIGHT(ssStr,1)))`<br>`=ELSE()`<br>`=   SET.NAME("ssReturn","")`<br>`=END.IF()`<br>`=RETURN(ssReturn)` | |

| | SiteArea | |
|---|---|---|
| saNum | `=ARGUMENT("saStr",2)`<br>`=IF(ISBLANK(saStr))`<br>`=   SET.NAME("saReturn","")`<br>`=ELSE()`<br>`=   SET.NAME("saReturn","")`<br>`=   FOR("i",1,LEN(saStr))`<br>`=     MID(saStr,i,1)`<br>`=     IF(OR(NOT(ISERROR(VALUE(saNum))),saNum=".",saNum=","))`<br>`=       SET.NAME("saReturn",saReturn&TEXT(saNum,"0"))`<br>`=     ELSE()`<br>`=       BREAK()`<br>`=     END.IF()`<br>`=   NEXT()`<br>`=END.IF()`<br>`=RETURN(saReturn)` | |

| | SiteType | |
|---|---|---|
| | `=ARGUMENT("stStr",2)`<br>`=IF(ISBLANK(stStr))`<br>`=   SET.NAME("stReturn","")`<br>`=ELSE()`<br>`=   IF(ISNUMBER(SEARCH("A",stStr)))`<br>`=     SET.NAME("stReturn","A")`<br>`=   ELSE()`<br>`=     SET.NAME("stReturn","S")`<br>`=   END.IF()`<br>`=END.IF()`<br>`=RETURN(stReturn)` | |

*Transfer Routines*

| | Urar2User | |
|---|---|---|
| | `=ARGUMENT("u2u.chan",1)`<br>`=ERROR(FALSE)+ECHO(FALSE)`<br>`=FORMULA.GOTO(ConversionErrors)`<br>`=CLEAR(3)`<br>`=SET.NAME("ceCount",0)`<br>`=EXECUTE(u2u.chan,"[OPEN(""&[AREAS.XLW]DBM.XLM!AreaPath&"URAR2USR.QEF")]")`<br>`=EXECUTE(u2u.chan,"[ACTIVATE('URAR2USR.QEF')]")` | |
| u2u.numRecords | `=REQUEST(u2u.chan,"NUMROWS")`<br>`=EXECUTE(u2u.chan,"[ACTIVATE('USER.QEF')]")`<br>`=EXECUTE(u2u.chan,"[ALLOW.EDIT(TRUE)]")`<br>`=FOR("rec",1,u2u.numRecords)` | |
| u2u.rowNum | `=   TEXT(rec,"0")`<br>`=   MESSAGE(TRUE,"Converting Record "&u2u.rowNum)`<br>`=   EXECUTE(u2u.chan,"[ACTIVATE('URAR2USR.QEF')]")`<br>`=   EXECUTE(u2u.chan,"[SELECT.AREA('R"&u2u.rowNum&":R"&u2u.rowNum&"')]")`<br>`=   EXECUTE(u2u.chan,"[COPY()]")`<br>`=   FORMULA.GOTO([AREAS.XLW]REFDATA.XLS!FromURAR)`<br>`=   PASTE()`<br>`=   CALCULATE.DOCUMENT()`<br>`=   FORMULA.GOTO([AREAS.XLW]REFDATA.XLS!ToUser)`<br>`=   COPY()`<br>`=   EXECUTE(u2u.chan,"[ACTIVATE('USER.QEF')]")`<br>`=   IF(ISERROR(EXECUTE(u2u.chan,"[PASTE.APPEND()]")))`<br>`=     FORMULA.GOTO([AREAS.XLW]REFDATA.XLS!FromURAR)`<br>`=     CLEAR(3)`<br>`=     COPY()` | if an error occurs, build error |

|                  | = EXECUTE(u2u.chan,"[PASTE.APPEND()]") |
|------------------|----|
|                  | = FORMULA(u2u.rowNum,OFFSET(TEXTREF(GET.CELL(1,ConversionErrors)),ceCount,0)) |
|                  | = SET.NAME("ceCount",ceCount+1) |
|                  | = END.IF() |
|                  | = CANCEL.COPY() |
|                  | = IF(NOT(AND(R[-12]C,R[-11]C,R[-10]C,R[-4]C,R[-3]C))) |
|                  | = FORMULA("Problem converting record "&u2u.rowNum&" in user database!",ud.DdeErrorMessa |
| u2u.dialogReturn | = DIALOG.BOX(ud.DdeError) |
|                  | = IF(u2u.dialogReturn'=1) |
|                  | = BREAK() |
|                  | = END.IF() |
|                  | = END.IF() |
|                  | =NEXT() |
|                  | =EXECUTE(u2u.chan,"[ACTIVATE('URAR2USR.QEF')]") |
|                  | =EXECUTE(u2u.chan,"[CLOSE()]") |
|                  | =MESSAGE(FALSE) |
|                  | =IF(ceCount>0) |
|                  | = FORMULA(GET.CELL(1,ConversionErrors)&":"&REFTEXT(OFFSET(TEXTREF(GET.CELL(1,Co |
|                  | = DIALOG.BOX(ud.DdeError) |
|                  | =END.IF() |
|                  | =ACTIVATE("[AREAS.XLW]OI.XLS") |
|                  | =EXECUTE(u2u.chan,"[ACTIVATE('USER.QEF')]") |
|                  | =EXECUTE(u2u.chan,"[ALLOW.EDIT(FALSE)]") |
|                  | =RETURN() |

| ConvertDateToMonth |
|---|
| =ARGUMENT("date2M",1) |
| =IF(date2M=0,SET.NAME("date2M",NOW())) |
| =IF(date2M>MaxDate) |
| = SET.NAME("D2month",MONTH(MaxDate)) |
| =ELSE.IF(date2M<MinDate) |
| = SET.NAME("D2month",MONTH(MinDate)) |
| =ELSE() |
| = SET.NAME("D2month",MONTH(date2M)) |
| =END.IF() |
| =RETURN(D2month) |

| ConvertDateToYear |
|---|
| =ARGUMENT("date2Y",1) |
| =IF(date2Y=0,SET.NAME("date2Y",NOW())) |
| =IF(date2Y>MaxDate) |
| = SET.NAME("D2year",YEAR(MaxDate)) |
| =ELSE.IF(date2Y<MinDate) |
| = SET.NAME("D2year",YEAR(MinDate)) |
| =ELSE() |

··· [AREAS.XLW]CELLDLG.XLM

Cell Dialogs

| item | x | y | width | height | text | init/result | names |
|---|---|---|---|---|---|---|---|
| D_SUBJ_ADDRESS | | | | | | | |
|   | 18  | 13  | 510 | 216 |   |   |   |
| 6 | 13  | 94  | 449 |   |   | 1931 Lexington Drive | Address |
| 5 | 13  | 118 |     |   | City |   |   |
| 6 | 13  | 133 | 241 |   |   | Fullerton | City |
| 3 | 159 | 166 | 88  |   | OK |   |   |
| 2 | 254 | 166 | 88  |   | Cancel |   |   |
| 5 | 12  | 73  |     |   | Street |   |   |
| 14 | 10 | 12  | 483 | 52 | Notes |   |   |
| 5 | 20  | 24  |     |   | Enter street address and ci |   |   |
| 5 | 20  | 42  |     |   | abbreviations. Leave blank |   |   |
| D_SUBJ_BORROWER | | | | | | | |
|   | 18  | 13  | 471 | 149 |   |   |   |
| 6 | 25  | 77  | 410 |   |   | TEST | Borrower |
| 3 | 136 | 110 | 88  |   | OK |   |   |
| 2 | 231 | 110 | 88  |   | Cancel |   |   |
| 5 | 23  | 57  |     |   | Borrower Name |   |   |
| 14 | 21 | 12  | 416 | 38 | Note |   |   |
| 5 | 31  | 24  |     |   | You MUST fill in this field. |   |   |

D_SUBJ_LOAN

| | | | | | | | |
|---|---|---|---|---|---|---|---|
| | 18 | 13 | 471 | 149 | | | |
| 6 | 25 | 77 | 410 | | | TEST | Loan |
| 3 | 136 | 110 | 88 | | OK | | |
| 2 | 231 | 110 | 88 | | Cancel | | |
| 5 | 23 | 57 | | | Loan Number | | |
| 14 | 21 | 12 | 416 | 38 | Note | | |
| 5 | 31 | 24 | | | You MUST fill in this field | | |

D_SUBJ_COUNTY_STATE

| | | | | | | | |
|---|---|---|---|---|---|---|---|
| | 18 | 12 | 498 | 246 | | | |
| 15 | 27 | 29 | 230 | 137 | CountyName | 5 | CountyID |
| 5 | 26 | 5 | | | County | | |
| 5 | 280 | 5 | | | State | | |
| 14 | 280 | 23 | 178 | 75 | State | | |
| 11 | | | | | | 1 | |
| 212 | | | | | California | TRUE | |
| 212 | | | | | Georgia | FALSE | |
| 212 | | | | | Washington, D.C. | FALSE | |
| 3 | 155 | 192 | 88 | | OK | | |
| 2 | 250 | 192 | 88 | | Cancel | | |

| County | CountyName | CountyCode | RegionName |
|---|---|---|---|
| 1 | Alameda | CA01 | ALAMEDA |
| 2 | Contra Costa | CA07 | CONTRACO |
| 3 | Los Angeles | CA19 | LA |
| 4 | Marin | CA21 | SFCOAST |
| 5 | Orange | CA30 | ORANGE |
| 6 | Riverside | CA33 | RIVERSID |
| 7 | Sacramento | CA34 | SACRAMEN |
| 8 | San Bernadino | CA36 | SANBERN |
| 9 | San Diego | CA37 | SANDIEGO |
| 10 | San Francisco | CA38 | SFCOAST |
| 11 | San Mateo | CA41 | SFCOAST |
| 12 | Santa Clara | CA43 | STCLARA |
| 13 | Ventura | CA56 | VENTURA |

D_SUBJ_SALE

| | | | | | | | |
|---|---|---|---|---|---|---|---|
| | 18 | 13 | 434 | 131 | | | |
| 5 | 27 | 52 | | | Date of Sale | | |
| 8 | 27 | 66 | 160 | | | | Date |
| 5 | 248 | 51 | | | Sale Price | | |
| 8 | 248 | 66 | 160 | | | | Price |
| 3 | 128 | 95 | 88 | | OK | | |
| 2 | 223 | 95 | 88 | | Cancel | | |
| 14 | 9 | 7 | 416 | 33 | Note | | |
| 5 | 19 | 19 | | | Leave blank if unsure of da | | |

D_SUBJ_APPRAISE

| | | | | | | | |
|---|---|---|---|---|---|---|---|
| | 18 | 13 | 434 | 190 | | | |
| 5 | 27 | 55 | | | Date of Appraisal | | |
| 8 | 27 | 69 | 160 | | | 33756 | ap.Date |
| 5 | 248 | 54 | | | Appraised Value | | |
| 8 | 248 | 69 | 160 | | | 445000 | ap.Price |
| 5 | 66 | 98 | | | Appraised By | | |
| 6 | 66 | 117 | 285 | | | JCS | ap.By |
| 3 | 129 | 149 | 88 | | OK | | |
| 2 | 224 | 149 | 88 | | Cancel | | |
| 14 | 12 | 7 | 408 | 38 | Note | | |
| 5 | 22 | 19 | | | You MUST fill in these field | | |

D_SUBJ_LOAN_REQ

| | | | | | | | |
|---|---|---|---|---|---|---|---|
| | 18 | 13 | 470 | 293 | | | |
| 14 | 18 | 70 | 224 | 167 | Loan Type | | |
| 11 | | | | | | 1 | lr.Type |
| 12 | | | | | (&P) Conv. Purchase | | |
| 12 | | | | | (&U) FHA/VA Purchase | | |
| 12 | | | | | (&R) Conv. Refi. | | |
| 12 | | | | | (&C) Conv. Refi. C.O. | | |
| 12 | | | | | (&E) FHA/VA Refi. | | |
| 12 | | | | | (&J) Jr. Lien Purchase | | |
| 12 | | | | | (&L) Jr. Lien Refi. | | |
| 12 | | | | | (&X) Other | | |
| 12 | | | | | (&0) Unknown | | |
| 5 | 249 | 76 | | | Loan To Value | | |
| 8 | 249 | 91 | 200 | | | 0.8 | lr.Ltv |
| 5 | 249 | 124 | | | Loan Amount | | |
| 8 | 249 | 139 | 198 | | | 250000 | lr.Amt |
| 14 | 17 | 7 | 431 | 50 | Note | | |
| 5 | 27 | 19 | | | Leave Loant To Value and/ | | |

| | | | | | | | |
|---|---|---|---|---|---|---|---|
| 5 | | 27 | 37 | | unsure of data. | | |
| 3 | | 110 | 249 | 88 | OK | | |
| 2 | | 273 | 249 | 88 | Cancel | | |

D_SUBJ_APN

| | | | | | | | |
|---|---|---|---|---|---|---|---|
| | | 18 | 13 | 456 | 149 | | |
| 6 | | 21 | 79 | 410 | | | 285-271-044 | Apn |
| 3 | | 132 | 108 | 88 | | OK | | |
| 2 | | 227 | 108 | 88 | | Cancel | | |
| 14 | | 20 | 7 | 412 | 42 | Note | | |
| 5 | | 30 | 19 | | | Leave blank if unsure of da | | |
| 5 | | 19 | 62 | | | Assessor Parcel Number ( | | |

D_SUBJ_MAPREF

| | | | | | | | |
|---|---|---|---|---|---|---|---|
| | | 18 | 13 | 458 | 139 | | |
| 6 | | 24 | 71 | 410 | | | 0738 H4 | MapRef |
| 5 | | 24 | 53 | | | Map Coordinate | | |
| 14 | | 24 | 10 | 409 | 34 | Group | | |
| 5 | | 34 | 22 | | | Leave blank if unsure of da | | |
| 3 | | 136 | 102 | 88 | | OK | | |
| 2 | | 231 | 102 | 88 | | Cancel | | |

D_SUBJ_TRACT

| | | | | | | | |
|---|---|---|---|---|---|---|---|
| | | 18 | 13 | 469 | 147 | | |
| 8 | | 24 | 79 | 410 | | | 18.02 | Tract |
| 3 | | 136 | 111 | 88 | | OK | | |
| 2 | | 231 | 111 | 88 | | Cancel | | |
| 5 | | 23 | 59 | | | Censust Tract Number | | |
| 14 | | 23 | 11 | 410 | 39 | Group | | |
| 5 | | 33 | 23 | | | Leave blank if unsure of da | | |

D_SUBJ_ZIP

| | | | | | | | |
|---|---|---|---|---|---|---|---|
| | | 18 | 13 | 469 | 145 | | |
| 6 | | 23 | 72 | 410 | | | 92635 | Zip |
| 5 | | 23 | 51 | | | Zip Code | | |
| 14 | | 23 | 10 | 410 | 34 | Note | | |
| 5 | | 33 | 22 | | | Leave blank if unsure of da | | |
| 3 | | 135 | 105 | 88 | | OK | | |
| 2 | | 230 | 105 | 88 | | Cancel | | |

D_IMPR_GENDESC_STORIES

| | | | | | | | |
|---|---|---|---|---|---|---|---|
| | | 18 | 13 | 329 | 138 | | |
| 14 | | 18 | 13 | 280 | 34 | Note | | |
| 5 | | 28 | 25 | | | Leave blank if unsure of da | | |
| 5 | | 18 | 51 | | | Number of Stories | | |
| 7 | | 18 | 67 | 280 | | | 1 | Stories |
| 3 | | 68 | 98 | 88 | | OK | | |
| 2 | | 163 | 98 | 88 | | Cancel | | |

D_SUBJ_OWN

| | | | | | | | |
|---|---|---|---|---|---|---|---|
| | | 18 | 13 | 427 | 171 | | |
| 14 | | 10 | 6 | 196 | 91 | Home Owner's Assoc. | | |
| 11 | | | | | | | 2 | Hoa |
| 12 | | | | | | (&Y) Yes | | |
| 12 | | | | | | (&N) No | | |
| 12 | | | | | | (&0) Unknown | | |
| 14 | | 216 | 7 | 185 | 119 | Ownership Type | | |
| 11 | | | | | | | 6 | Condo |
| 12 | | | | | | (&D) Duplex | | |
| 12 | | | | | | (&P) PUD | | |
| 12 | | | | | | [&C] Condo | | |
| 12 | | | | | | [&O] Coop | | |
| 12 | | | | | | (&S) Single Family | | |
| 12 | | | | | | (&0) Unknown | | |
| 3 | | 105 | 138 | 88 | | OK | | |
| 2 | | 215 | 138 | 88 | | Cancel | | |

D_SITE_AREA

| | | | | | | | |
|---|---|---|---|---|---|---|---|
| | | 18 | 13 | 414 | 165 | | |
| 5 | | 27 | 59 | | | Lot Area | | |
| 14 | | 27 | 12 | 351 | 36 | Note | | |
| 5 | | 37 | 24 | | | Leave Lot Area blank if uns | | |
| 8 | | 26 | 75 | 160 | | Lot | 20100 | SiteArea |
| 14 | | 219 | 59 | 158 | 55 | Units | | |

| | | | | | | | |
|---|---|---|---|---|---|---|---|
| 11 | | | | | | 1 | SiteAreaType |
| 12 | | | | | &Square Feet | | |
| 12 | | | | | &Acres | | |
| 3 | | 105 | 126 | 88 | OK | | |
| 2 | | 213 | 126 | 88 | Cancel | | |

D_IMPR_GENDESC_DESIGN

| | | | | | | | |
|---|---|---|---|---|---|---|---|
| | | 18 | 13 | 257 | 284 | | |
| 14 | | 18 | 13 | 216 | 213 | House Design | |
| 11 | | | | | | 3 | DesignSelected |
| 12 | | | | | (&B) Bungalow | | |
| 12 | | | | | (&M) Mediterranean | | |
| 12 | | | | | (&N) Conventional | | |
| 12 | | | | | (&O) Contemporary | | |
| 12 | | | | | (&R) Ranch | | |
| 12 | | | | | (&S) Spanish | | |
| 12 | | | | | (&T) Tudor | | |
| 12 | | | | | (&V) Victorian | | |
| 12 | | | | | (&A) A-Frame | | |
| 12 | | | | | (&X) Other | | |
| 12 | | | | | (&0) Unknown | | |
| 1 | | 33 | 241 | 88 | OK | | |
| 2 | | 128 | 241 | 88 | Cancel | | |

D_AUTO_GARAGE

| | | | | | | | |
|---|---|---|---|---|---|---|---|
| | | 18 | 13 | 253 | 201 | | |
| 14 | | 18 | 13 | 208 | 131 | Parking Space Type | |
| 11 | | | | | | 2 | ParkTypeSelected |
| 12 | | | | | (&C) Carport | | |
| 12 | | | | | (&G) Garage | | |
| 12 | | | | | (&O) Open | | |
| 12 | | | | | (&N) None | | |
| 12 | | | | | (&X) Other | | |
| 12 | | | | | (&0) Unknown | | |
| 1 | | 21 | 155 | 88 | OK | | |
| 2 | | 131 | 155 | 88 | Cancel | | |

D_AUTO_ELECDOOR

| | | | | | | | |
|---|---|---|---|---|---|---|---|
| | | 18 | 13 | 251 | 149 | | |
| 14 | | 18 | 13 | 199 | 80 | Garage Door Opener | |
| 11 | | | | | | 2 | DoorOpenSelected |
| 12 | | | | | (&Y) Yes | | |
| 12 | | | | | (&N) No | | |
| 12 | | | | | (&0) Unknown | | |
| 1 | | 22 | 103 | 88 | OK | | |
| 2 | | 117 | 103 | 88 | Cancel | | |

D_IMPR_EXTDESC_ROOF

| | | | | | | | |
|---|---|---|---|---|---|---|---|
| | | 18 | 13 | 282 | 270 | | |
| 14 | | 18 | 13 | 236 | 196 | Type of Roof | |
| 11 | | | | | | 1 | RoofTypeSelected |
| 12 | | | | | (&A) Wood Shake | | |
| 12 | | | | | (&B) Built Up | | |
| 12 | | | | | (&C) Composite Shingle | | |
| 12 | | | | | (&I) Wood Shingle | | |
| 12 | | | | | (&K) Rock | | |
| 12 | | | | | (&S) Slate | | |
| 12 | | | | | (&T) Tile | | |
| 12 | | | | | (&E) Asbestos | | |
| 12 | | | | | (&X) Other | | |
| 12 | | | | | (&0) Unknown | | |
| 1 | | 32 | 221 | 88 | OK | | |
| 2 | | 145 | 221 | 88 | Cancel | | |

D_SITE_SHAPE

| | | | | | | | |
|---|---|---|---|---|---|---|---|
| | | 18 | 13 | 238 | 171 | | |
| 14 | | 18 | 13 | 184 | 112 | Shape of Parcel | |
| 11 | | | | | | 1 | SiteShapeSelected |
| 12 | | | | | (&I) Irregular | | |
| 12 | | | | | (&R) Rectangular | | |
| 12 | | | | | (&S) Square | | |
| 12 | | | | | (&X) Other | | |
| 12 | | | | | (&0) Unknown | | |
| 1 | | 17 | 134 | 88 | OK | | |
| 2 | | 115 | 134 | 88 | Cancel | | |

D_SITE_VIEW

|    |     |     |     |     |                  |   |                  |
|----|-----|-----|-----|-----|------------------|---|------------------|
|    | 18  | 13  | 232 | 279 |                  |   |                  |
| 14 | 18  | 13  | 186 | 211 | Site Influence   |   |                  |
| 11 |     |     |     |     |                  | 6 | SiteViewSelected |
| 12 |     |     |     |     | (&B) Bay         |   |                  |
| 12 |     |     |     |     | (&C) Canal       |   |                  |
| 12 |     |     |     |     | (&G) Golf        |   |                  |
| 12 |     |     |     |     | (&L) Lake/Pond   |   |                  |
| 12 |     |     |     |     | (&M) Mountains   |   |                  |
| 12 |     |     |     |     | (&N) None        |   |                  |
| 12 |     |     |     |     | (&O) Ocean       |   |                  |
| 12 |     |     |     |     | (&V) View        |   |                  |
| 12 |     |     |     |     | (&W) Wooded      |   |                  |
| 12 |     |     |     |     | (&X) Other       |   |                  |
| 12 |     |     |     |     | (&0) Unknown     |   |                  |
| 1  | 19  | 237 | 88  |     | OK               |   |                  |
| 2  | 117 | 237 | 88  |     | Cancel           |   |                  |

D_IMPR_GENDESC_AGE

|    |     |     |     |     |                           |   |     |
|----|-----|-----|-----|-----|---------------------------|---|-----|
|    | 18  | 13  | 293 | 163 |                           |   |     |
| 14 | 18  | 13  | 253 | 37  | Note                      |   |     |
| 5  | 28  | 25  |     |     | Leave blank if unsure of da |   |     |
| 5  | 21  | 61  |     |     | Age                       |   |     |
| 8  | 18  | 80  | 256 |     |                           | 1 | Age |
| 3  | 54  | 112 | 88  |     | OK                        |   |     |
| 2  | 154 | 112 | 88  |     | Cancel                    |   |     |

D_SITE_SIZE

|    |     |     |     |     |                    |   |                  |
|----|-----|-----|-----|-----|--------------------|---|------------------|
|    | 18  | 13  | 226 | 171 |                    |   |                  |
| 14 | 18  | 13  | 186 | 106 | Relative Site Size |   |                  |
| 11 |     |     |     |     |                    | 2 | SiteSizeSelected |
| 12 |     |     |     |     | (&O) Oversize      |   |                  |
| 12 |     |     |     |     | (&T) Typical       |   |                  |
| 12 |     |     |     |     | (&U) Undersize     |   |                  |
| 12 |     |     |     |     | (&X) Other         |   |                  |
| 12 |     |     |     |     | (&0) Unknown       |   |                  |
| 1  | 19  | 129 | 88  |     | OK                 |   |                  |
| 2  | 117 | 129 | 88  |     | Cancel             |   |                  |

D_SITE_IMPROV_STR

|    |     |     |     |     |                    |   |            |
|----|-----|-----|-----|-----|--------------------|---|------------|
|    | 18  | 13  | 415 | 193 |                    |   |            |
| 1  | 107 | 149 | 88  |     | OK                 |   |            |
| 2  | 206 | 149 | 88  |     | Cancel             |   |            |
| 14 | 16  | 13  | 177 | 77  | Street Maintenance |   |            |
| 11 |     |     |     |     |                    | 1 | StrMaint   |
| 12 |     |     |     |     | (&R) Private       |   |            |
| 12 |     |     |     |     | (&U) Public        |   |            |
| 12 |     |     |     |     | (&0) Unknown       |   |            |
| 14 | 207 | 14  | 183 | 123 | Street Type        |   |            |
| 11 |     |     |     |     |                    | 1 | StreetType |
| 12 |     |     |     |     | (&A) Asphalt       |   |            |
| 12 |     |     |     |     | (&C) Concrete      |   |            |
| 12 |     |     |     |     | (&D) Dirt          |   |            |
| 12 |     |     |     |     | (&G) Gravel        |   |            |
| 12 |     |     |     |     | (&X) Other         |   |            |
| 12 |     |     |     |     | (&0) Unknown       |   |            |

D_SITE_TOPOGRAPHY

|    |     |     |     |     |                     |   |                    |
|----|-----|-----|-----|-----|---------------------|---|--------------------|
|    | 18  | 13  | 242 | 188 |                     |   |                    |
| 14 | 18  | 13  | 202 | 123 | Topography          |   |                    |
| 11 |     |     |     |     |                     | 2 | TopographySelected |
| 12 |     |     |     |     | (&H) Hilly          |   |                    |
| 12 |     |     |     |     | (&L) Level          |   |                    |
| 12 |     |     |     |     | (&R) Slope to Rear  |   |                    |
| 12 |     |     |     |     | (&S) Slope to Street |   |                    |
| 12 |     |     |     |     | (&X) Other          |   |                    |
| 12 |     |     |     |     | (&0) Unknown        |   |                    |
| 1  | 18  | 147 | 88  |     | OK                  |   |                    |
| 2  | 134 | 147 | 88  |     | Cancel              |   |                    |

D_IMPR_EXTDESC_EXTWALLS

|    |    |    |     |     |               |   |                 |
|----|----|----|-----|-----|---------------|---|-----------------|
|    | 18 | 13 | 255 | 285 |               |   |                 |
| 14 | 18 | 13 | 217 | 213 | Exterior Walls |   |                 |
| 11 |    |    |     |     |               | 3 | ExtWallSelected |
| 12 |    |    |     |     | (&A) Aluminum |   |                 |
| 12 |    |    |     |     | (&B) Brick    |   |                 |
| 12 |    |    |     |     | (&C) Stucco   |   |                 |
| 12 |    |    |     |     | (&H) Shingle  |   |                 |

|    |     |     |     |     |                        |   |                      |
|----|-----|-----|-----|-----|------------------------|---|----------------------|
| 12 |     |     |     |     | (&L) Log               |   |                      |
| 12 |     |     |     |     | (&O) Stone             |   |                      |
| 12 |     |     |     |     | (&T) Stucco/Wood       |   |                      |
| 12 |     |     |     |     | (&V) Brick Veneer      |   |                      |
| 12 |     |     |     |     | (&W) Wood Siding       |   |                      |
| 12 |     |     |     |     | (&X) Other             |   |                      |
| 12 |     |     |     |     | (&0) Unknown           |   |                      |
| 1  | 33  | 240 | 88  |     | OK                     |   |                      |
| 2  | 134 | 240 | 88  |     | Cancel                 |   |                      |

D_COMM_ADDNL_FEATURES1

|    |     |     |     |     |                |   |                  |
|----|-----|-----|-----|-----|----------------|---|------------------|
|    | 18  | 13  | 243 | 189 |                |   |                  |
| 14 | 18  | 13  | 198 | 114 | Pool Type      | 1 | PoolTypeSelected |
| 11 |     |     |     |     |                |   |                  |
| 12 |     |     |     |     | (&P) Pool      |   |                  |
| 12 |     |     |     |     | (&S) Spa       |   |                  |
| 12 |     |     |     |     | (&B) Both      |   |                  |
| 12 |     |     |     |     | (&N) None      |   |                  |
| 12 |     |     |     |     | (&0) Unknown   |   |                  |
| 1  | 26  | 138 | 88  |     | OK             |   |                  |
| 2  | 120 | 138 | 88  |     | Cancel         |   |                  |

D_SUBJ_HOA

|    |     |    |    |     |                         |   |             |
|----|-----|----|----|-----|-------------------------|---|-------------|
|    |     |    | 265| 110 | Home Owner's Association|   |             |
| 11 |     |    |    |     |                         | 3 | HOASelected |
| 12 | 93  | 9  |    |     | &Yes                    |   |             |
| 12 | 93  | 30 |    |     | &No                     |   |             |
| 12 | 93  | 51 |    |     | &Unknown                |   |             |
| 1  | 27  | 80 | 88 |     | OK                      |   |             |
| 2  | 152 | 80 | 88 |     | Cancel                  |   |             |

D_INTR_COOL_CENTRAL

|    |     |     |     |     |                   |   |                 |
|----|-----|-----|-----|-----|-------------------|---|-----------------|
|    | 18  | 13  | 264 | 225 |                   |   |                 |
| 14 | 18  | 13  | 220 | 144 | Air Conditioning  | 4 | AirCondSelected |
| 11 |     |     |     |     |                   |   |                 |
| 12 |     |     |     |     | (&A) Wall         |   |                 |
| 12 |     |     |     |     | (&C) Central      |   |                 |
| 12 |     |     |     |     | (&I) Window       |   |                 |
| 12 |     |     |     |     | (&N) None         |   |                 |
| 12 |     |     |     |     | (&S) Swamp Cooler |   |                 |
| 12 |     |     |     |     | (&X) Other        |   |                 |
| 12 |     |     |     |     | (&0) Unknown      |   |                 |
| 1  | 37  | 175 | 88  |     | OK                |   |                 |
| 2  | 134 | 175 | 88  |     | Cancel            |   |                 |

D_INTR_SURF_BATHFLOOR

|    |     |     |     |     |                     |   |                    |
|----|-----|-----|-----|-----|---------------------|---|--------------------|
|    | 18  | 13  | 398 | 158 |                     |   |                    |
| 14 | 207 | 7   | 169 | 105 | Bath Floor Condition| 4 | BathFlrCondSelected|
| 11 |     |     |     |     |                     |   |                    |
| 12 |     |     |     |     | (&G) Good           |   |                    |
| 12 |     |     |     |     | (&A) Average        |   |                    |
| 12 |     |     |     |     | (&F) Fair           |   |                    |
| 12 |     |     |     |     | (&P) Poor           |   |                    |
| 12 |     |     |     |     | (&0) Unknown        |   |                    |
| 14 | 17  | 7   | 164 | 105 | Bath Floor Material | 2 | BathFlrMatSelected |
| 11 |     |     |     |     |                     |   |                    |
| 12 |     |     |     |     | (&C) Carpet         |   |                    |
| 12 |     |     |     |     | (&V) Vinyl          |   |                    |
| 12 |     |     |     |     | (&X) Other          |   |                    |
| 12 |     |     |     |     | (&0) Unknown        |   |                    |
| 1  | 94  | 127 | 88  |     | OK                  |   |                    |
| 2  | 205 | 127 | 88  |     | Cancel              |   |                    |

D_INTR_SURF_BATHWAINSCOT

|    |     |    |     |     |                        |   |                    |
|----|-----|----|-----|-----|------------------------|---|--------------------|
|    | 18  | 13 | 493 | 200 |                        |   |                    |
| 14 | 20  | 12 | 223 | 142 | Batch Wainscot Material| 3 | BathWainSelected   |
| 11 |     |    |     |     |                        |   |                    |
| 12 |     |    |     |     | (&C) Ceramic           |   |                    |
| 12 |     |    |     |     | (&E) Ceramic/Fiberglass|   |                    |
| 12 |     |    |     |     | (&F) Fiberglass        |   |                    |
| 12 |     |    |     |     | (&M) Marble            |   |                    |
| 12 |     |    |     |     | (&O) Formica           |   |                    |
| 12 |     |    |     |     | (&X) Other             |   |                    |
| 12 |     |    |     |     | (&0) Unknown           |   |                    |
| 14 | 265 | 12 | 206 | 142 | Bath Wainscot Condition| 4 | BathWainCondSelected|
| 11 |     |    |     |     |                        |   |                    |
| 12 |     |    |     |     | (&G) Good              |   |                    |
| 12 |     |    |     |     | (&A) Average           |   |                    |
| 12 |     |    |     |     | (&F) Fair              |   |                    |

|    |     |     |     |     |                |   |                    |
|----|-----|-----|-----|-----|----------------|---|--------------------|
| 12 |     |     |     |     | (&P) Poor      |   |                    |
| 12 |     |     |     |     | (&0) Unknown   |   |                    |
| 1  | 142 | 168 | 88  |     | OK             |   |                    |
| 2  | 250 | 168 | 88  |     | Cancel         |   |                    |

D_SITE_FEMAFLOODYES

|    |     |     |     |     |                   |   |                   |
|----|-----|-----|-----|-----|-------------------|---|-------------------|
|    | 18  | 13  | 229 | 149 |                   |   |                   |
| 14 | 18  | 13  | 185 | 78  | Flood Hazard Zone |   |                   |
| 11 |     |     |     |     |                   | 2 | FloodZoneSelected |
| 12 |     |     |     |     | (&Y) Yes          |   |                   |
| 12 |     |     |     |     | (&N) No           |   |                   |
| 12 |     |     |     |     | (&0) Unknown      |   |                   |
| 1  | 18  | 104 | 88  |     | OK                |   |                   |
| 2  | 117 | 104 | 88  |     | Cancel            |   |                   |

D_INTR_SURF_FLOORS

|    |     |     |     |     |                       |   |                     |
|----|-----|-----|-----|-----|-----------------------|---|---------------------|
|    | 18  | 13  | 271 | 226 |                       |   |                     |
| 14 | 18  | 13  | 230 | 160 | Interior Floor Surface|   |                     |
| 11 |     |     |     |     |                       | 2 | InteriorFloorSelected |
| 12 |     |     |     |     | (&A) Hardwood/Carpet  |   |                     |
| 12 |     |     |     |     | (&C) Carpet           |   |                     |
| 12 |     |     |     |     | (&S) Carpet/Slab      |   |                     |
| 12 |     |     |     |     | (&T) Tile             |   |                     |
| 12 |     |     |     |     | (&V) Carpet/Vinyl     |   |                     |
| 12 |     |     |     |     | (&W) Hardwood         |   |                     |
| 12 |     |     |     |     | (&X) Other            |   |                     |
| 12 |     |     |     |     | (&0) Unknown          |   |                     |
| 1  | 28  | 180 | 88  |     | OK                    |   |                     |
| 2  | 152 | 181 | 88  |     | Cancel                |   |                     |

D_IMPR_FOUNDATION

|    |     |     |     |     |                       |   |           |
|----|-----|-----|-----|-----|-----------------------|---|-----------|
|    | 18  | 13  | 440 | 128 |                       |   |           |
| 14 | 10  | 6   | 201 | 74  | Foundation Settlement |   |           |
| 11 |     |     |     |     |                       | 2 | FndSettle |
| 12 |     |     |     |     | (&Y) Yes              |   |           |
| 12 |     |     |     |     | (&N) No               |   |           |
| 12 |     |     |     |     | (&0) Unknown          |   |           |
| 14 | 230 | 7   | 197 | 73  | Foundation Infestation|   |           |
| 11 |     |     |     |     |                       | 2 | FndInfest |
| 12 |     |     |     |     | (&Y) Yes              |   |           |
| 12 |     |     |     |     | (&N) No               |   |           |
| 12 |     |     |     |     | (&0) Unknown          |   |           |
| 1  | 126 | 90  | 88  |     | OK                    |   |           |
| 2  | 229 | 90  | 88  |     | Cancel                |   |           |

D_IMPR_GENDESC_TYPE

|    |     |     |     |     |                     |   |                  |
|----|-----|-----|-----|-----|---------------------|---|------------------|
|    | 18  | 13  | 285 | 226 |                     |   |                  |
| 14 | 18  | 13  | 241 | 156 | Type of Improvement |   |                  |
| 11 |     |     |     |     |                     | 1 | ImprTypeSelected |
| 12 |     |     |     |     | (&A) Attached       |   |                  |
| 12 |     |     |     |     | (&D) Detached       |   |                  |
| 12 |     |     |     |     | (&E) Elevator       |   |                  |
| 12 |     |     |     |     | (&R) Row/Townhouse  |   |                  |
| 12 |     |     |     |     | (&W) Walk-up        |   |                  |
| 12 |     |     |     |     | (&Z) Zero Lot Line  |   |                  |
| 12 |     |     |     |     | (&X) Other          |   |                  |
| 12 |     |     |     |     | (&0) Unknown        |   |                  |
| 1  | 45  | 180 | 88  |     | OK                  |   |                  |
| 2  | 149 | 180 | 88  |     | Cancel              |   |                  |

D_SITE_LANDSCAPE

|    |     |     |     |     |                |   |                   |
|----|-----|-----|-----|-----|----------------|---|-------------------|
|    | 18  | 13  | 235 | 138 |                |   |                   |
| 14 | 18  | 13  | 192 | 83  | Site Landscape |   |                   |
| 11 |     |     |     |     |                | 1 | LandscapeSelected |
| 12 |     |     |     |     | (&A) Adequate  |   |                   |
| 12 |     |     |     |     | (&I) Inadequate|   |                   |
| 12 |     |     |     |     | (&X) Other     |   |                   |
| 12 |     |     |     |     | (&0) Unknown   |   |                   |
| 1  | 14  | 101 | 88  |     | OK             |   |                   |
| 2  | 122 | 101 | 88  |     | Cancel         |   |                   |

D_IMPR_EXTDESC_MANUFAC

|    |     |     |     |     |                  |   |                 |
|----|-----|-----|-----|-----|------------------|---|-----------------|
|    | 18  | 13  | 242 | 150 |                  |   |                 |
| 14 | 18  | 13  | 195 | 77  | Manufactured Home|   |                 |
| 11 |     |     |     |     |                  | 2 | ManufacSelected |
| 12 |     |     |     |     | (&Y) Yes         |   |                 |
| 12 |     |     |     |     | (&N) No          |   |                 |
| 12 |     |     |     |     | (&0) Unknown     |   |                 |
| 1  | 19  | 103 | 88  |     | OK               |   |                 |
| 2  | 125 | 103 | 88  |     | Cancel           |   |                 |

D_SUBJ_CONDO

| | | | | | | | |
|---|---|---|---|---|---|---|---|
| | | | 224 | 145 | Ownership Type | | |
| 1 | | 15 | 120 | 88 | OK | | |
| 11 | | | | | | 3 | OwnTypeSelected |
| 12 | | 65 | 12 | | &Duplex | | |
| 12 | | 65 | 29 | | &PUD | | |
| 12 | | 65 | 46 | | &Condo | | |
| 12 | | 65 | 63 | | C&oop | | |
| 12 | | 65 | 80 | | &Single Family | | |
| 12 | | 65 | 97 | | &Unknown | | |
| 2 | | 122 | 120 | 88 | Cancel | | |

D_AUTO_COND

| | | | | | | | |
|---|---|---|---|---|---|---|---|
| | | 18 | 13 | 292 | 184 | | |
| 14 | | 18 | 13 | 248 | 112 | Condition of Parking Space | |
| 11 | | | | | | 4 | AutoCondSelected |
| 12 | | | | | (&G) Good | | |
| 12 | | | | | (&A) Average | | |
| 12 | | | | | (&F) Fair | | |
| 12 | | | | | (&P) Poor | | |
| 12 | | | | | (&0) Unknown | | |
| 1 | | 40 | 137 | 88 | OK | | |
| 2 | | 148 | 137 | 88 | Cancel | | |

D_INTR_FIREPLACE

| | | | | | | | |
|---|---|---|---|---|---|---|---|
| | | 18 | 13 | 338 | 330 | | |
| 14 | | 18 | 81 | 295 | 157 | Fireplace Type | |
| 11 | | | | | | 1 | FireplaceSelected |
| 12 | | | | | (&B) Brick | | |
| 12 | | | | | (&G) Gas only | | |
| 12 | | | | | (&S) Swedish | | |
| 12 | | | | | (&W) Wood-burning | | |
| 12 | | | | | (&Y) Yes | | |
| 12 | | | | | (&X) Other | | |
| 12 | | | | | (&N) None | | |
| 12 | | | | | (&0) Unknown | | |
| 5 | | 18 | 250 | | Number of Fireplaces | | |
| 7 | | 190 | 247 | 123 | | 1 | NumFireplacesInDlg |
| 3 | | 77 | 279 | 88 | OK | | |
| 2 | | 179 | 279 | 88 | Cancel | | |
| 14 | | 18 | 14 | 293 | 55 | Note | |
| 5 | | 28 | 26 | | Leave Number of Fireplace | | |
| 5 | | 28 | 44 | | if unsure of data. | | |

D_ROOM_ABOVEGRADE_ROOMS

| | | | | | | | |
|---|---|---|---|---|---|---|---|
| | | 18 | 13 | 363 | 209 | | |
| 14 | | 18 | 13 | 315 | 57 | Note | |
| 5 | | 28 | 25 | | Leave Bedrooms, Bathroom | | |
| 5 | | 28 | 43 | | Total Rooms blank if unsur | | |
| 5 | | 35 | 83 | | Total Rooms | | |
| 8 | | 150 | 83 | 160 | Total Rooms | 8 | Rooms |
| 5 | | 35 | 105 | | Bedrooms | | |
| 8 | | 150 | 105 | 160 | Bedrooms | 3 | Beds |
| 5 | | 35 | 127 | | Bathrooms | | |
| 8 | | 150 | 127 | 160 | Bathrooms | 3 | Baths |
| 3 | | 82 | 160 | 88 | OK | | |
| 2 | | 195 | 160 | 88 | Cancel | | |

D_ROOM_ABOVEGRADE_SQFT

| | | | | | | | |
|---|---|---|---|---|---|---|---|
| | | 18 | 13 | 320 | 151 | | |
| 14 | | 18 | 13 | 274 | 40 | Note | |
| 5 | | 28 | 25 | | Leave blank if unsure of da | | |
| 5 | | 18 | 65 | | Living Area | | |
| 8 | | 18 | 81 | 160 | | 3000 | Sqft |
| 5 | | 190 | 85 | | Square Feet | | |
| 3 | | 63 | 111 | 88 | OK | | |
| 2 | | 161 | 111 | 88 | Cancel | | |

D_INTR_IMPROV_ECONLIFE

| | | | | | | | |
|---|---|---|---|---|---|---|---|
| | | 18 | 13 | 319 | 156 | | |
| 8 | | 18 | 78 | 262 | | 45 | EconLife |
| 5 | | 18 | 62 | | Remaining Economic Life | | |
| 3 | | 56 | 110 | 88 | OK | | |
| 2 | | 151 | 110 | 88 | Cancel | | |
| 14 | | 18 | 13 | 262 | 38 | Note | |
| 5 | | 28 | 25 | | Leave blank if unsure of da | | |

D_AUTO_NUMCARS

| | | 18 | 13 | 319 | 165 | | | | |
|---|---|---|---|---|---|---|---|---|---|
| 7 | | 18 | 80 | 273 | | | | 2 | NumCars |
| 5 | | 18 | 64 | | | Number of Car Spaces | | | |
| 3 | | 67 | 122 | 88 | | OK | | | |
| 2 | | 162 | 122 | 88 | | Cancel | | | |
| 14 | | 18 | 13 | 272 | 40 | Note | | | |
| 5 | | 28 | 25 | | | Leave blank if unsure of da | | | |

[AREAS.XLW]CELLTEXT.XLM

| names | commands | comments |
|---|---|---|

| | Summary Information | |
|---|---|---|
| Title: | celltext.xlm | |
| Version: | v1.0 | |
| Author | Will Ferguson, Craig Smith | |
| Corporation: | HNC Inc. | |
| Creation Date: | Wednesday, October 23, 1991 | |

*TEXT EXPANSION FUNCTIONS*

| | T SUBJ ADDRESS | |
|---|---|---|
| | =IF(ISBLANK([AREAS.XLW]REFDATA.XLS!SUBJ_ADDRESS),SET.NAME("stStr",""),SET.NA<br>=IF(ISBLANK([AREAS.XLW]REFDATA.XLS!SUBJ_CITY),SET.NAME("cityStr",""),SET.NAME(<br>=SET.NAME("addStr",stStr)<br>=IF(AND(addStr<>"",cityStr<>""),SET.NAME("addStr",addStr&", "))<br>=SET.NAME("addStr",addStr&cityStr)<br>=RETURN(addStr) | |

| | T SUBJ BORROWER | |
|---|---|---|
| | =IF(ISBLANK([AREAS.XLW]REFDATA.XLS!SUBJ_BORROWER))<br>= RETURN("")<br>=ELSE()<br>= RETURN([AREAS.XLW]REFDATA.XLS!SUBJ_BORROWER)<br>=END.IF()<br>=RETURN(#N/A) | |

| | T SUBJ LOAN | |
|---|---|---|
| | =IF(ISBLANK([AREAS.XLW]REFDATA.XLS!SUBJ_LOAN))<br>= RETURN("")<br>=ELSE()<br>= RETURN([AREAS.XLW]REFDATA.XLS!SUBJ_LOAN)<br>=END.IF()<br>=RETURN(#N/A) | |

| | T SUBJ CITY | |
|---|---|---|
| | =RETURN(#N/A) | |

| | T SUBJ COUNTY STATE | |
|---|---|---|
| | =IF(ISBLANK([AREAS.XLW]REFDATA.XLS!SUBJ_COUNTY))<br>= SET.NAME("County","")<br>=ELSE()<br>= SET.NAME("County",[AREAS.XLW]REFDATA.XLS!SUBJ_COUNTY)<br>=END.IF()<br><br>=IF(ISBLANK([AREAS.XLW]REFDATA.XLS!SUBJ_STATE))<br>= SET.NAME("State","")<br>=ELSE()<br>= SET.NAME("State",[AREAS.XLW]REFDATA.XLS!SUBJ_STATE)<br>=END.IF()<br><br>=IF(AND(County<>"",State<>""),SET.NAME("County",County&", "))<br>=RETURN(County&State) | |

T SUBJ_SALE

```
=SET.NAME("SaleStr","")
=IF(NOT(ISBLANK([AREAS.XLW]REFDATA.XLS!SUBJ_SALEDATE)))
=   SET.NAME("SaleStr",""&TEXT([AREAS.XLW]REFDATA.XLS!SUBJ_SALEDATE,"mm/yy"))
=END.IF()
=IF(NOT(ISBLANK([AREAS.XLW]REFDATA.XLS!SUBJ_SALEPRICE)))
=   IF(SaleStr<>"",SET.NAME("SaleStr",SaleStr&", "))
=   SET.NAME("SaleStr",SaleStr&TEXT([AREAS.XLW]REFDATA.XLS!SUBJ_SALEPRICE,"$#
=END.IF()
=RETURN(SaleStr)
```

T SUBJ_APPRAISE

```
=SET.NAME("ApprStr","")
=IF(NOT(ISBLANK([AREAS.XLW]REFDATA.XLS!SUBJ_APPR_DATE)))
=   SET.NAME("ApprStr",""&TEXT([AREAS.XLW]REFDATA.XLS!SUBJ_APPR_DATE,"mm/yy"
=END.IF()
=IF(NOT(ISBLANK([AREAS.XLW]REFDATA.XLS!SUBJ_APPR_PRICE)))
=   IF(ApprStr<>"",SET.NAME("ApprStr",ApprStr&", "))
=   SET.NAME("ApprStr",ApprStr&TEXT([AREAS.XLW]REFDATA.XLS!SUBJ_APPR_PRICE,"
=END.IF()
=IF(NOT(ISBLANK([AREAS.XLW]REFDATA.XLS!APP_BY)))
=   IF(ApprStr<>"",SET.NAME("ApprStr",ApprStr&", "))
=   SET.NAME("ApprStr",ApprStr&", By:"&[AREAS.XLW]REFDATA.XLS!APP_BY)
=END.IF()
=RETURN(ApprStr)
```

T SUBJ_LOAN_REQ

```
=SET.NAME("LrStr","")

=IF([AREAS.XLW]REFDATA.XLS!LOAN_TYP="P")
=   SET.NAME("LrType","Conv. Purch.")
=ELSE.IF([AREAS.XLW]REFDATA.XLS!LOAN_TYP="U")
=   SET.NAME("LrType","FHA/VA Purch.")
=ELSE.IF([AREAS.XLW]REFDATA.XLS!LOAN_TYP="R")
=   SET.NAME("LrType","Conv. Refi.")
=ELSE.IF([AREAS.XLW]REFDATA.XLS!LOAN_TYP="C")
=   SET.NAME("LrType","Cash Out Refi.")
=ELSE.IF([AREAS.XLW]REFDATA.XLS!LOAN_TYP="E")
=   SET.NAME("LrType","FHA/VA Refi.")
=ELSE.IF([AREAS.XLW]REFDATA.XLS!LOAN_TYP="J")
=   SET.NAME("LrType","Jr. Lien Purch.")
=ELSE.IF([AREAS.XLW]REFDATA.XLS!LOAN_TYP="L")
=   SET.NAME("LrType","Jr. Lien Refi.")
=ELSE.IF([AREAS.XLW]REFDATA.XLS!LOAN_TYP="X")
=   SET.NAME("LrType","Other")
=ELSE()
=   SET.NAME("LrType","")
=END.IF()

=IF(NOT(ISBLANK([AREAS.XLW]REFDATA.XLS!LTV)))
=   SET.NAME("LrLtv","LTV: "&TEXT([AREAS.XLW]REFDATA.XLS!LTV,"#%;;0;"))
=ELSE()
=   SET.NAME("LrLtv","")
=END.IF()

=IF(NOT(ISBLANK([AREAS.XLW]REFDATA.XLS!LOAN_AMT)))
=   SET.NAME("LrAmt","Ln: "&TEXT([AREAS.XLW]REFDATA.XLS!LOAN_AMT,"$#,###;;0;"))
=ELSE()
=   SET.NAME("LrAmt","")
=END.IF()

=SET.NAME("LrStr",LrType)
=IF(LrLtv<>"")
=   IF(LrStr<>"",SET.NAME("LrStr",LrStr&", "))
=   SET.NAME("LrStr",LrStr&LrLtv)
=END.IF()
=IF(LrAmt<>"")
=   IF(LrStr<>"",SET.NAME("LrStr",LrStr&", "))
=   SET.NAME("LrStr",LrStr&LrAmt)
=END.IF()

=RETURN(LrStr)
```

| | 91 | 92 |
|---|---|---|
| | T SUBJ_APN<br><br>=SET.NAME("ApnStr","")<br>=IF(NOT(ISBLANK([AREAS.XLW]REFDATA.XLS!SUBJ_APN)))<br>= SET.NAME("ApnStr",[AREAS.XLW]REFDATA.XLS!SUBJ_APN)<br>=END.IF()<br>=RETURN(ApnStr) | |
| | T SUBJ_MAPREF<br><br>=SET.NAME("MapRefStr","")<br>=IF(NOT(ISBLANK([AREAS.XLW]REFDATA.XLS!SUBJ_MAPREF)))<br>= SET.NAME("MapRefStr",[AREAS.XLW]REFDATA.XLS!SUBJ_MAPREF)<br>=END.IF()<br>=RETURN(MapRefStr) | |
| | T SUBJ_TRACT<br><br>=SET.NAME("TractStr","")<br>=IF(NOT(ISBLANK([AREAS.XLW]REFDATA.XLS!SUBJ_TRACT)))<br>= SET.NAME("TractStr",[AREAS.XLW]REFDATA.XLS!SUBJ_TRACT)<br>=END.IF()<br>=RETURN(TractStr) | |
| | T SUBJ_ZIP<br><br>=SET.NAME("ZipStr","")<br>=IF(NOT(ISBLANK([AREAS.XLW]REFDATA.XLS!SUBJ_ZIP)))<br>= SET.NAME("ZipStr",[AREAS.XLW]REFDATA.XLS!SUBJ_ZIP)<br>=END.IF()<br>=RETURN(ZipStr) | |
| | T IMPR_GENDESC_STORIES<br><br>=VOLATILE()<br>=SET.NAME("StoriesStr","")<br>=IF(NOT(ISBLANK([AREAS.XLW]REFDATA.XLS!IMPR_GENDESC_STORIES)))<br>= SET.NAME("StoriesStr",[AREAS.XLW]REFDATA.XLS!IMPR_GENDESC_STORIES)<br>=RETURN(StoriesStr) | |
| | T SUBJ_OWN<br><br>=IF([AREAS.XLW]REFDATA.XLS!SUBJ_CONDO="D")<br>= SET.NAME("CondoStr","Duplex")<br>=ELSE.IF([AREAS.XLW]REFDATA.XLS!SUBJ_CONDO="P")<br>= SET.NAME("CondoStr","PUD")<br>=ELSE.IF([AREAS.XLW]REFDATA.XLS!SUBJ_CONDO="C")<br>= SET.NAME("CondoStr","Condo")<br>=ELSE.IF([AREAS.XLW]REFDATA.XLS!SUBJ_CONDO="O")<br>= SET.NAME("CondoStr","Coop")<br>=ELSE.IF([AREAS.XLW]REFDATA.XLS!SUBJ_CONDO="S")<br>= SET.NAME("CondoStr","Single Family")<br>=ELSE()<br>= SET.NAME("CondoStr","")<br>=END.IF()<br>=IF(NOT(CondoStr=""),SET.NAME("CondoStr",""&CondoStr))<br><br>=IF([AREAS.XLW]REFDATA.XLS!SUBJ_HOA="Y")<br>= SET.NAME("HoaStr","Yes")<br>=ELSE.IF([AREAS.XLW]REFDATA.XLS!SUBJ_HOA="N")<br>= SET.NAME("HoaStr","No")<br>=ELSE()<br>= SET.NAME("HoaStr","")<br>=END.IF()<br>=IF(NOT(HoaStr=""),SET.NAME("HoaStr","HOA: "&HoaStr))<br>=IF(CondoStr="")<br>= RETURN(HoaStr)<br>=ELSE.IF(HoaStr="")<br>= RETURN(CondoStr)<br>=ELSE()<br>= RETURN(CondoStr&", "&HoaStr)<br>=END.IF()<br>=RETURN() | CONDO<br><br><br><br><br><br><br><br><br><br><br><br><br>HOA |

```
T_SITE_AREA

=IF(NOT(ISBLANK([AREAS.XLW]REFDATA.XLS!SITE_AREA)))
=   SET.NAME("LotStr",TEXT([AREAS.XLW]REFDATA.XLS!SITE_AREA,"#,###"))
=   IF([AREAS.XLW]REFDATA.XLS!SITE_AREA_TYPE="A")
=      SET.NAME("LotStr",LotStr&" Acres")
=   ELSE()
=      SET.NAME("LotStr",LotStr&" Sq. Feet")
=   END.IF()
=ELSE()
=   SET.NAME("LotStr","")
=END.IF()
=RETURN(LotStr)
```

```
T_SITE_IMPROV_STR

=IF([AREAS.XLW]REFDATA.XLS!SITE_IMPROV_STR_PUB="R")
=   SET.NAME("PubStr","Private")
=ELSE.IF([AREAS.XLW]REFDATA.XLS!SITE_IMPROV_STR_PUB="U")
=   SET.NAME("PubStr","Public")
=ELSE.IF(ISBLANK([AREAS.XLW]REFDATA.XLS!SITE_IMPROV_STR_PUB))
=   SET.NAME("PubStr","")
=END.IF()
=IF(PubStr<>"",SET.NAME("PubStr",""&PubStr))
=IF([AREAS.XLW]REFDATA.XLS!SITE_IMPROV_STR_TYPE="A")
=   SET.NAME("TypeStr","Asphalt")
=ELSE.IF([AREAS.XLW]REFDATA.XLS!SITE_IMPROV_STR_TYPE="C")
=   SET.NAME("TypeStr","Concrete")
=ELSE.IF([AREAS.XLW]REFDATA.XLS!SITE_IMPROV_STR_TYPE="D")
=   SET.NAME("TypeStr","Dirt")
=ELSE.IF([AREAS.XLW]REFDATA.XLS!SITE_IMPROV_STR_TYPE="G")
=   SET.NAME("TypeStr","Gravel")
=ELSE.IF([AREAS.XLW]REFDATA.XLS!SITE_IMPROV_STR_TYPE="X")
=   SET.NAME("TypeStr","Other")
=ELSE.IF(ISBLANK([AREAS.XLW]REFDATA.XLS!SITE_IMPROV_STR_TYPE))
=   SET.NAME("TypeStr","")
=END.IF()
=SET.NAME("StrStr",PubStr)
=IF(StrStr<>"")
=   SET.NAME("StrStr",StrStr&", ")
=END.IF()
=IF(TypeStr<>"")
=   SET.NAME("StrStr",StrStr&""&TypeStr)
=END.IF()
=RETURN(StrStr)
```

```
T_IMPR_GENDESC_DESIGN

=IF([AREAS.XLW]REFDATA.XLS!IMPR_GENDESC_DESIGN="B")
=   RETURN("Bungalow")
=ELSE.IF([AREAS.XLW]REFDATA.XLS!IMPR_GENDESC_DESIGN="M")
=   RETURN("Mediterranean")
=ELSE.IF([AREAS.XLW]REFDATA.XLS!IMPR_GENDESC_DESIGN="N")
=   RETURN("Conventional")
=ELSE.IF([AREAS.XLW]REFDATA.XLS!IMPR_GENDESC_DESIGN="O")
=   RETURN("Contemporary")
=ELSE.IF([AREAS.XLW]REFDATA.XLS!IMPR_GENDESC_DESIGN="R")
=   RETURN("Ranch")
=ELSE.IF([AREAS.XLW]REFDATA.XLS!IMPR_GENDESC_DESIGN="S")
=   RETURN("Spanish")
=ELSE.IF([AREAS.XLW]REFDATA.XLS!IMPR_GENDESC_DESIGN="T")
=   RETURN("Tudor")
=ELSE.IF([AREAS.XLW]REFDATA.XLS!IMPR_GENDESC_DESIGN="V")
=   RETURN("Victorian")
=ELSE.IF([AREAS.XLW]REFDATA.XLS!IMPR_GENDESC_DESIGN="A")
=   RETURN("A-Frame")
=ELSE.IF([AREAS.XLW]REFDATA.XLS!IMPR_GENDESC_DESIGN="X")
=   RETURN("Other")
=ELSE.IF(ISBLANK([AREAS.XLW]REFDATA.XLS!IMPR_GENDESC_DESIGN))
=   RETURN("")
=END.IF()
=RETURN("")
```

| T_IMPR_GENDESC_AGE |
|---|
| =SET.NAME("ageStr","")
=IF(NOT(ISBLANK([AREAS.XLW]REFDATA.XLS!IMPR_GENDESC_AGE)))
= SET.NAME("ageStr",[AREAS.XLW]REFDATA.XLS!IMPR_GENDESC_AGE)
=END.IF()
=RETURN(ageStr) |

| T_AUTO_GARAGE |
|---|
| =IF([AREAS.XLW]REFDATA.XLS!AUTO_GARAGE="C")
= RETURN("Carport")
=ELSE.IF([AREAS.XLW]REFDATA.XLS!AUTO_GARAGE="G")
= RETURN("Garage")
=ELSE.IF([AREAS.XLW]REFDATA.XLS!AUTO_GARAGE="O")
= RETURN("Open")
=ELSE.IF([AREAS.XLW]REFDATA.XLS!AUTO_GARAGE="N")
= RETURN("None")
=ELSE.IF([AREAS.XLW]REFDATA.XLS!AUTO_GARAGE="X")
= RETURN("Other")
=ELSE()
= RETURN("")
=END.IF()
=RETURN("") |

| T_AUTO_ELECDOOR |
|---|
| =IF([AREAS.XLW]REFDATA.XLS!AUTO_ELECDOOR="Y")
= RETURN("Yes")
=ELSE.IF([AREAS.XLW]REFDATA.XLS!AUTO_ELECDOOR="N")
= RETURN("No")
=ELSE()
= RETURN("")
=END.IF()
=RETURN("") |

| T_IMPR_EXTDESC_ROOF |
|---|
| =IF([AREAS.XLW]REFDATA.XLS!IMPR_EXTDESC_ROOF="A")
= RETURN("Wood Shake")
=ELSE.IF([AREAS.XLW]REFDATA.XLS!IMPR_EXTDESC_ROOF="B")
= RETURN("Built Up")
=ELSE.IF([AREAS.XLW]REFDATA.XLS!IMPR_EXTDESC_ROOF="C")
= RETURN("Composite Shingle")
=ELSE.IF([AREAS.XLW]REFDATA.XLS!IMPR_EXTDESC_ROOF="I")
= RETURN("Wood Shingle")
=ELSE.IF([AREAS.XLW]REFDATA.XLS!IMPR_EXTDESC_ROOF="K")
= RETURN("Rock")
=ELSE.IF([AREAS.XLW]REFDATA.XLS!IMPR_EXTDESC_ROOF="S")
= RETURN("Slate")
=ELSE.IF([AREAS.XLW]REFDATA.XLS!IMPR_EXTDESC_ROOF="T")
= RETURN("Tile")
=ELSE.IF([AREAS.XLW]REFDATA.XLS!IMPR_EXTDESC_ROOF="E")
= RETURN("Asbestos")
=ELSE.IF([AREAS.XLW]REFDATA.XLS!IMPR_EXTDESC_ROOF="X")
= RETURN("Other")
=ELSE.IF(ISBLANK([AREAS.XLW]REFDATA.XLS!IMPR_EXTDESC_ROOF))
= RETURN("")
=END.IF()
=RETURN("") |

| T_SITE_SHAPE |
|---|
| =IF([AREAS.XLW]REFDATA.XLS!SITE_SHAPE="I")
= RETURN("Irregular")
=ELSE.IF([AREAS.XLW]REFDATA.XLS!SITE_SHAPE="R")
= RETURN("Rectangular")
=ELSE.IF([AREAS.XLW]REFDATA.XLS!SITE_SHAPE="S")
= RETURN("Square")
=ELSE.IF([AREAS.XLW]REFDATA.XLS!SITE_SHAPE="X")
= RETURN("Other")
=ELSE()
= RETURN("")
=END.IF()
=RETURN("") |

T SITE_VIEW

```
=IF([AREAS.XLW]REFDATA.XLS!SITE_VIEW="B")
=  RETURN("Bay")
=ELSE.IF([AREAS.XLW]REFDATA.XLS!SITE_VIEW="C")
=  RETURN("Canal")
=ELSE.IF([AREAS.XLW]REFDATA.XLS!SITE_VIEW="G")
=  RETURN("Golf")
=ELSE.IF([AREAS.XLW]REFDATA.XLS!SITE_VIEW="L")
=  RETURN("Lake/Pond")
=ELSE.IF([AREAS.XLW]REFDATA.XLS!SITE_VIEW="M")
=  RETURN("Mountains")
=ELSE.IF([AREAS.XLW]REFDATA.XLS!SITE_VIEW="N")
=  RETURN("None")
=ELSE.IF([AREAS.XLW]REFDATA.XLS!SITE_VIEW="O")
=  RETURN("Ocean")
=ELSE.IF([AREAS.XLW]REFDATA.XLS!SITE_VIEW="V")
=  RETURN("View")
=ELSE.IF([AREAS.XLW]REFDATA.XLS!SITE_VIEW="W")
=  RETURN("Wooded")
=ELSE.IF([AREAS.XLW]REFDATA.XLS!SITE_VIEW="X")
=  RETURN("Other")
=ELSE()
=  RETURN("")
=END.IF()
=RETURN("")
```

T SITE_SIZE

```
=IF([AREAS.XLW]REFDATA.XLS!SITE_SIZE="O")
=  RETURN("Oversize")
=ELSE.IF([AREAS.XLW]REFDATA.XLS!SITE_SIZE="T")
=  RETURN("Typical")
=ELSE.IF([AREAS.XLW]REFDATA.XLS!SITE_SIZE="U")
=  RETURN("Undersize")
=ELSE.IF([AREAS.XLW]REFDATA.XLS!SITE_SIZE="X")
=  RETURN("Other")
=ELSE()
=  RETURN("")
=END.IF()
=RETURN("")
```

T SITE_TOPOGRAPHY

```
=IF([AREAS.XLW]REFDATA.XLS!SITE_TOPOGRAPHY="H")
=  RETURN("Hilly")
=ELSE.IF([AREAS.XLW]REFDATA.XLS!SITE_TOPOGRAPHY="L")
=  RETURN("Level")
=ELSE.IF([AREAS.XLW]REFDATA.XLS!SITE_TOPOGRAPHY="R")
=  RETURN("Slope to Rear")
=ELSE.IF([AREAS.XLW]REFDATA.XLS!SITE_TOPOGRAPHY="S")
=  RETURN("Slope to Street")
=ELSE.IF([AREAS.XLW]REFDATA.XLS!SITE_TOPOGRAPHY="X")
=  RETURN("Other")
=ELSE()
=  RETURN("")
=END.IF()
=RETURN("")
```

T IMPR_EXTDESC_EXTWALLS

```
=IF([AREAS.XLW]REFDATA.XLS!IMPR_EXTDESC_EXTWALLS="A")
=  RETURN("Aluminum")
=ELSE.IF([AREAS.XLW]REFDATA.XLS!IMPR_EXTDESC_EXTWALLS="B")
=  RETURN("Brick")
=ELSE.IF([AREAS.XLW]REFDATA.XLS!IMPR_EXTDESC_EXTWALLS="C")
=  RETURN("Stucco")
=ELSE.IF([AREAS.XLW]REFDATA.XLS!IMPR_EXTDESC_EXTWALLS="H")
=  RETURN("Shingle")
=ELSE.IF([AREAS.XLW]REFDATA.XLS!IMPR_EXTDESC_EXTWALLS="L")
=  RETURN("Log")
=ELSE.IF([AREAS.XLW]REFDATA.XLS!IMPR_EXTDESC_EXTWALLS="O")
=  RETURN("Stone")
=ELSE.IF([AREAS.XLW]REFDATA.XLS!IMPR_EXTDESC_EXTWALLS="T")
=  RETURN("Stucco/Wood")
```

```
=ELSE.IF([AREAS.XLW]REFDATA.XLS!IMPR_EXTDESC_EXTWALLS="V")
=   RETURN("Brick Veneer")
=ELSE.IF([AREAS.XLW]REFDATA.XLS!IMPR_EXTDESC_EXTWALLS="W")
=   RETURN("Wood Siding")
=ELSE.IF([AREAS.XLW]REFDATA.XLS!IMPR_EXTDESC_EXTWALLS="X")
=   RETURN("Other")
=ELSE.IF(ISBLANK([AREAS.XLW]REFDATA.XLS!IMPR_EXTDESC_EXTWALLS))
=   RETURN("")
=END.IF()
=RETURN("")
```

T_COMM_ADDNL_FEATURES1

```
=IF([AREAS.XLW]REFDATA.XLS!COMM_ADDNL_FEATURES1="P")
=   RETURN("Pool")
=ELSE.IF([AREAS.XLW]REFDATA.XLS!COMM_ADDNL_FEATURES1="S")
=   RETURN("Spa")
=ELSE.IF([AREAS.XLW]REFDATA.XLS!COMM_ADDNL_FEATURES1="B")
=   RETURN("Pool & Spa")
=ELSE.IF([AREAS.XLW]REFDATA.XLS!COMM_ADDNL_FEATURES1="N")
=   RETURN("None")
=ELSE()
=   RETURN("")
=END.IF()
=RETURN("")
```

T_INTR_COOL_CENTRAL

```
=IF([AREAS.XLW]REFDATA.XLS!INTR_COOL_CENTRAL="A")
=   RETURN("Wall")
=ELSE.IF([AREAS.XLW]REFDATA.XLS!INTR_COOL_CENTRAL="C")
=   RETURN("Central")
=ELSE.IF([AREAS.XLW]REFDATA.XLS!INTR_COOL_CENTRAL="I")
=   RETURN("Window")
=ELSE.IF([AREAS.XLW]REFDATA.XLS!INTR_COOL_CENTRAL="N")
=   RETURN("None")
=ELSE.IF([AREAS.XLW]REFDATA.XLS!INTR_COOL_CENTRAL="S")
=   RETURN("Swamp Cooler")
=ELSE.IF([AREAS.XLW]REFDATA.XLS!INTR_COOL_CENTRAL="X")
=   RETURN("Other")
=ELSE()
=   RETURN("")
=END.IF()
=RETURN("")
```

T_INTR_SURF_BATHFLOOR

```
=IF([AREAS.XLW]REFDATA.XLS!INTR_SURF_BATHFLOOR_MAT="C")
=   SET.NAME("bfMat","Carpet")
=ELSE.IF([AREAS.XLW]REFDATA.XLS!INTR_SURF_BATHFLOOR_MAT="V")
=   SET.NAME("bfMat","Vinyl")
=ELSE.IF([AREAS.XLW]REFDATA.XLS!INTR_SURF_BATHFLOOR_MAT="X")
=   SET.NAME("bfMat","Other")
=ELSE()
=   SET.NAME("bfMat","")
=END.IF()
=IF(bfMat<>"",SET.NAME("bfMat",""&bfMat))
=IF([AREAS.XLW]REFDATA.XLS!INTR_SURF_BATHFLOOR_COND="G")
=   SET.NAME("bfCond","Good")
=ELSE.IF([AREAS.XLW]REFDATA.XLS!INTR_SURF_BATHFLOOR_COND="A")
=   SET.NAME("bfCond","Average")
=ELSE.IF([AREAS.XLW]REFDATA.XLS!INTR_SURF_BATHFLOOR_COND="F")
=   SET.NAME("bfCond","Fair")
=ELSE.IF([AREAS.XLW]REFDATA.XLS!INTR_SURF_BATHFLOOR_COND="P")
=   SET.NAME("bfCond","Poor")
=ELSE()
=   SET.NAME("bfCond","")
=END.IF()
=IF(bfCond<>"",SET.NAME("bfCond",""&bfCond))
=IF(AND(bfCond<>"",bfMat<>""),SET.NAME("bfMat",bfMat&", "))
=RETURN(bfMat&bfCond)
```

101  102

| T INTR_SURF_BATHWAINSCOT |
|---|

```
=IF([AREAS.XLW]REFDATA.XLS!INTR_SURF_BATHWAINSCOT_MAT="C")
=  SET.NAME("bwMat","Ceramic")
=ELSE.IF([AREAS.XLW]REFDATA.XLS!INTR_SURF_BATHWAINSCOT_MAT="E")
=  SET.NAME("bwMat","Ceramic/Fiberglass")
=ELSE.IF([AREAS.XLW]REFDATA.XLS!INTR_SURF_BATHWAINSCOT_MAT="F")
=  SET.NAME("bwMat","Fiberglass")
=ELSE.IF([AREAS.XLW]REFDATA.XLS!INTR_SURF_BATHWAINSCOT_MAT="M")
=  SET.NAME("bwMat","Marble")
=ELSE.IF([AREAS.XLW]REFDATA.XLS!INTR_SURF_BATHWAINSCOT_MAT="O")
=  SET.NAME("bwMat","Formica")
=ELSE.IF([AREAS.XLW]REFDATA.XLS!INTR_SURF_BATHWAINSCOT_MAT="X")
=  SET.NAME("bwMat","Other")
=ELSE()
=  SET.NAME("bwMat","")
=END.IF()
=IF(bwMat<>"",SET.NAME("bwMat",""&bwMat))
=IF([AREAS.XLW]REFDATA.XLS!INTR_SURF_BATHWAINSCOT_COND="G")
=  SET.NAME("bwCond","Good")
=ELSE.IF([AREAS.XLW]REFDATA.XLS!INTR_SURF_BATHWAINSCOT_COND="A")
=  SET.NAME("bwCond","Average")
=ELSE.IF([AREAS.XLW]REFDATA.XLS!INTR_SURF_BATHWAINSCOT_COND="F")
=  SET.NAME("bwCond","Fair")
=ELSE.IF([AREAS.XLW]REFDATA.XLS!INTR_SURF_BATHWAINSCOT_COND="P")
=  SET.NAME("bwCond","Poor")
=ELSE()
=  SET.NAME("bwCond","")
=END.IF()
=IF(bwCond<>"",SET.NAME("bwCond",""&bwCond))
=IF(AND(bwMat<>"",bwCond<>""),SET.NAME("bwMat",bwMat&", "))
=RETURN(bwMat&bwCond)
```

| T INTR_FIREPLACE |
|---|

*argument specifying material or conditi*

```
=IF([AREAS.XLW]REFDATA.XLS!INTR_FIREPLACE_TYPE="B")
=  SET.NAME("fireType","Brick")
=ELSE.IF([AREAS.XLW]REFDATA.XLS!INTR_FIREPLACE_TYPE="G")
=  SET.NAME("fireType","Gas only")
=ELSE.IF([AREAS.XLW]REFDATA.XLS!INTR_FIREPLACE_TYPE="S")
=  SET.NAME("fireType","Swedish")
=ELSE.IF([AREAS.XLW]REFDATA.XLS!INTR_FIREPLACE_TYPE="W")
=  SET.NAME("fireType","Wood-burning")
=ELSE.IF([AREAS.XLW]REFDATA.XLS!INTR_FIREPLACE_TYPE="Y")
=  SET.NAME("fireType","Yes")
=ELSE.IF([AREAS.XLW]REFDATA.XLS!INTR_FIREPLACE_TYPE="X")
=  SET.NAME("fireType","Other")
=ELSE.IF([AREAS.XLW]REFDATA.XLS!INTR_FIREPLACE_TYPE="N")
=  SET.NAME("fireType","None")
=ELSE()
=  SET.NAME("fireType","")
=END.IF()
=IF(fireType<>"",SET.NAME("fireType",""&fireType))
=SET.NAME("fireNum",IF(ISNUMBER([AREAS.XLW]REFDATA.XLS!INTR_FIREPLACE_NUM
=IF(AND(fireType<>"",fireNum<>""),SET.NAME("fireType",fireType&", "))
=RETURN(fireType&fireNum)
```

| T SITE_FEMAFLOODYES |
|---|

```
=IF([AREAS.XLW]REFDATA.XLS!SITE_FEMAFLOODYES="Y")
=  RETURN("Yes")
=ELSE.IF([AREAS.XLW]REFDATA.XLS!SITE_FEMAFLOODYES="N")
=  RETURN("No")
=ELSE()
=  RETURN("")
=END.IF()
=RETURN("")
```

| T INTR_SURF_FLOORS |
|---|

```
=IF([AREAS.XLW]REFDATA.XLS!INTR_SURF_FLOORS="A")
=   RETURN("Hardwood/Carpet")
=ELSE.IF([AREAS.XLW]REFDATA.XLS!INTR_SURF_FLOORS="C")
=   RETURN("Carpet")
=ELSE.IF([AREAS.XLW]REFDATA.XLS!INTR_SURF_FLOORS="S")
=   RETURN("Carpet/Slab")
=ELSE.IF([AREAS.XLW]REFDATA.XLS!INTR_SURF_FLOORS="T")
=   RETURN("Tile")
=ELSE.IF([AREAS.XLW]REFDATA.XLS!INTR_SURF_FLOORS="V")
=   RETURN("Carpet/Vinyl")
=ELSE.IF([AREAS.XLW]REFDATA.XLS!INTR_SURF_FLOORS="W")
=   RETURN("Hardwood")
=ELSE.IF([AREAS.XLW]REFDATA.XLS!INTR_SURF_FLOORS="X")
=   RETURN("Other")
=ELSE()
=   RETURN("")
=END.IF()
=RETURN("")
```

T IMPR FOUNDATION

```
=SET.NAME("Infest","")
=IF([AREAS.XLW]REFDATA.XLS!IMPR_FOUNDATION_INFEST="Y")
=   SET.NAME("Infest","Yes")
=ELSE.IF([AREAS.XLW]REFDATA.XLS!IMPR_FOUNDATION_INFEST="N")
=   SET.NAME("Infest","No")
=END.IF()
=IF(Infest<>"",SET.NAME("Infest","Infested: "&Infest))
=SET.NAME("Settle","")
=IF([AREAS.XLW]REFDATA.XLS!IMPR_FOUNDATION_SETTLEMENT="Y")
=   SET.NAME("Settle","Yes")
=ELSE.IF([AREAS.XLW]REFDATA.XLS!IMPR_FOUNDATION_SETTLEMENT="N")
=   SET.NAME("Settle","No")
=END.IF()
=IF(Settle<>"",SET.NAME("Settle","Settled: "&Settle))
=IF(AND(Settle<>"",Infest<>""),SET.NAME("Settle",Settle&", "))
=IF(Settle<>"",SET.NAME("FoundCond",Settle&Infest),SET.NAME("FoundCond",Infest))
=RETURN(FoundCond)
```

T IMPR GENDESC TYPE

```
=IF([AREAS.XLW]REFDATA.XLS!IMPR_GENDESC_TYPE="A")
=   RETURN("Attached")
=ELSE.IF([AREAS.XLW]REFDATA.XLS!IMPR_GENDESC_TYPE="D")
=   RETURN("Detached")
=ELSE.IF([AREAS.XLW]REFDATA.XLS!IMPR_GENDESC_TYPE="E")
=   RETURN("Elevator")
=ELSE.IF([AREAS.XLW]REFDATA.XLS!IMPR_GENDESC_TYPE="R")
=   RETURN("Row/Townhouse")
=ELSE.IF([AREAS.XLW]REFDATA.XLS!IMPR_GENDESC_TYPE="W")
=   RETURN("Walk-up")
=ELSE.IF([AREAS.XLW]REFDATA.XLS!IMPR_GENDESC_TYPE="Z")
=   RETURN("Zero Lot Line")
=ELSE.IF([AREAS.XLW]REFDATA.XLS!IMPR_GENDESC_TYPE="X")
=   RETURN("Other")
=ELSE()
=   RETURN("")
=END.IF()
=RETURN("")
```

T SITE LANDSCAPE

```
=IF([AREAS.XLW]REFDATA.XLS!SITE_LANDSCAPE="A")
=   RETURN("Adequate")
=ELSE.IF([AREAS.XLW]REFDATA.XLS!SITE_LANDSCAPE="I")
=   RETURN("Inadequate")
=ELSE.IF([AREAS.XLW]REFDATA.XLS!SITE_LANDSCAPE="X")
=   RETURN("Other")
=ELSE.IF(ISBLANK([AREAS.XLW]REFDATA.XLS!SITE_LANDSCAPE))
=   RETURN("")
=END.IF()
=RETURN("")
```

105

T IMPR_EXTDESC_MANUFAC

```
=IF([AREAS.XLW]REFDATA.XLS!IMPR_EXTDESC_MANUFAC="Y")
=   RETURN("Yes")
=ELSE.IF([AREAS.XLW]REFDATA.XLS!IMPR_EXTDESC_MANUFAC="N")
=   RETURN("No")
=ELSE.IF(ISBLANK([AREAS.XLW]REFDATA.XLS!IMPR_EXTDESC_MANUFAC))
=   RETURN("")
=END.IF()
=RETURN("")
```

T AUTO_COND

```
=IF([AREAS.XLW]REFDATA.XLS!AUTO_COND="G")
=   RETURN("Good")
=ELSE.IF([AREAS.XLW]REFDATA.XLS!AUTO_COND="A")
=   RETURN("Average")
=ELSE.IF([AREAS.XLW]REFDATA.XLS!AUTO_COND="F")
=   RETURN("Fair")
=ELSE.IF([AREAS.XLW]REFDATA.XLS!AUTO_COND="P")
=   RETURN("Poor")
=ELSE.IF(ISBLANK([AREAS.XLW]REFDATA.XLS!AUTO_COND))
=   RETURN("")
=END.IF()
=RETURN("")
```

T ROOM_ABOVEGRADE_ROOMS

```
=SET.NAME("Beds","")
=SET.NAME("Baths","")
=SET.NAME("Rooms","")
=IF(ISNUMBER([AREAS.XLW]REFDATA.XLS!ROOM_ABOVEGRADE_BEDRMS))
=   SET.NAME("Beds","Bd: "&TEXT([AREAS.XLW]REFDATA.XLS!ROOM_ABOVEGRADE_B
=END.IF()
=IF(ISNUMBER([AREAS.XLW]REFDATA.XLS!ROOM_ABOVEGRADE_BATHS))
=   SET.NAME("Baths","Bth: "&TEXT([AREAS.XLW]REFDATA.XLS!ROOM_ABOVEGRADE_E
=END.IF()
=IF(ISNUMBER([AREAS.XLW]REFDATA.XLS!ROOM_ABOVEGRADE_ROOMS))
=   SET.NAME("Rooms","Tot: "&TEXT([AREAS.XLW]REFDATA.XLS!ROOM_ABOVEGRADE_
=END.IF()
=SET.NAME("RoomReturn",Beds)
=IF(RoomReturn<>"",SET.NAME("RoomReturn",RoomReturn&", "&Baths),SET.NAME("Room
=IF(RoomReturn<>"",SET.NAME("RoomReturn",RoomReturn&", "&Rooms),SET.NAME("Roon
=RETURN(RoomReturn)
```

T ROOM_ABOVEGRADE_SQFT

```
=SET.NAME("Sqft","")
=IF(ISNUMBER([AREAS.XLW]REFDATA.XLS!ROOM_ABOVEGRADE_SQFT))
=   SET.NAME("Sqft",[AREAS.XLW]REFDATA.XLS!ROOM_ABOVEGRADE_SQFT)
=END.IF()
=RETURN(Sqft)
```

T INTR_IMPROV_ECONLIFE

```
=SET.NAME("econLifeStr","")
=IF(NOT(ISBLANK([AREAS.XLW]REFDATA.XLS!INTR_IMPROV_ECONLIFE)))
=   SET.NAME("econLifeStr",[AREAS.XLW]REFDATA.XLS!INTR_IMPROV_ECONLIFE)
=END.IF()
=RETURN(econLifeStr)
```

T AUTO_NUMCARS

```
=SET.NAME("numCarsStr","")
=IF(NOT(ISBLANK([AREAS.XLW]REFDATA.XLS!AUTO_NUMCARS)))
=   SET.NAME("numCarsStr",[AREAS.XLW]REFDATA.XLS!AUTO_NUMCARS)
=END.IF()
=RETURN(numCarsStr)
```

| names | commands | comments |
|---|---|---|
| | Summary Information | |
| Title: | cell.xlm | |
| Version: | v1.0 | |
| Author | Will Ferguson, Craig Smith | |
| Corporation: | HNC Inc. | |
| Creation Date: | Wednesday, October 23, 1991 | |

Cell Filter Functions

| names | commands | comments |
|---|---|---|
| | F_AUTO_COND | |
| | =IF(ISBLANK([AREAS.XLW]REFDATA.XLS!AUTO_COND))<br>= FORMULA("",[AREAS.XLW]REFDATA.XLS!P_COND)<br>=ELSE()<br>= IF([AREAS.XLW]REFDATA.XLS!AUTO_COND="P")<br>= FORMULA("F",[AREAS.XLW]REFDATA.XLS!P_COND)<br>= ELSE.IF([AREAS.XLW]REFDATA.XLS!AUTO_COND="X")<br>= FORMULA("",[AREAS.XLW]REFDATA.XLS!P_COND)<br>= ELSE()<br>= FORMULA([AREAS.XLW]REFDATA.XLS!AUTO_COND,[AREAS.XLW]REFDATA.XLS!P_CO<br>= END.IF()<br>=END.IF()<br>=RETURN("VALID") | set input to blank<br>check for valid entry |
| | F_AUTO_ELECDOOR | |
| | =IF(ISBLANK([AREAS.XLW]REFDATA.XLS!AUTO_ELECDOOR))<br>= FORMULA("",[AREAS.XLW]REFDATA.XLS!P_DOROPN)<br>=ELSE()<br>= FORMULA([AREAS.XLW]REFDATA.XLS!AUTO_ELECDOOR,[AREAS.XLW]REFDATA.XLS!P<br>=END.IF()<br>=RETURN("VALID") | check for valid entry |
| | F_AUTO_GARAGE | |
| | =IF(ISBLANK([AREAS.XLW]REFDATA.XLS!AUTO_GARAGE))<br>= SET.NAME("gar","")<br>= FORMULA(gar,[AREAS.XLW]REFDATA.XLS!P_STRAGE)<br>=ELSE()<br>= IF(OR([AREAS.XLW]REFDATA.XLS!AUTO_GARAGE="C",[AREAS.XLW]REFDATA.XLS!AUT<br>= SET.NAME("gar","X")<br>= ELSE()<br>= SET.NAME("gar",[AREAS.XLW]REFDATA.XLS!AUTO_GARAGE)<br>= END.IF()<br>= FORMULA(gar,[AREAS.XLW]REFDATA.XLS!P_STRAGE)<br>=END.IF()<br>=RETURN("VALID") | check for valid entry |
| | F_AUTO_NUMCARS | |
| | =IF(ISNUMBER(VALUE([AREAS.XLW]REFDATA.XLS!AUTO_NUMCARS)))<br>= FORMULA(VALUE([AREAS.XLW]REFDATA.XLS!AUTO_NUMCARS),[AREAS.XLW]REFDATA<br>=ELSE()<br>= FORMULA(".",[AREAS.XLW]REFDATA.XLS!P_SPACES)<br>=END.IF()<br>=RETURN() | |
| | F_COMM_ADDNL_FEATURES1 | |
| | =IF(ISBLANK([AREAS.XLW]REFDATA.XLS!COMM_ADDNL_FEATURES1))<br>= FORMULA("",[AREAS.XLW]REFDATA.XLS!POOLTYPE)<br>=ELSE()<br>= IF([AREAS.XLW]REFDATA.XLS!COMM_ADDNL_FEATURES1="N")<br>= FORMULA("",[AREAS.XLW]REFDATA.XLS!POOLTYPE)<br>= ELSE()<br>= FORMULA([AREAS.XLW]REFDATA.XLS!COMM_ADDNL_FEATURES1,[AREAS.XLW]REF<br>= END.IF()<br>=END.IF()<br>=RETURN("VALID") | None is same as missing |
| | F_IMPR_EXTDESC_EXTWALLS | |
| | =IF(ISBLANK([AREAS.XLW]REFDATA.XLS!IMPR_EXTDESC_EXTWALLS))<br>= SET.NAME("ExtWalls","")<br>= FORMULA(ExtWalls,[AREAS.XLW]REFDATA.XLS!WAL_EXTT)<br>=ELSE()<br>= IF([AREAS.XLW]REFDATA.XLS!IMPR_EXTDESC_EXTWALLS="A")<br>= SET.NAME("ExtWalls","Z") | check for valid entry |

```
=   ELSE.IF([AREAS.XLW]REFDATA.XLS!!MPR_EXTDESC_EXTWALLS="B")
=     SET.NAME("ExtWalls","Z")
=   ELSE.IF([AREAS.XLW]REFDATA.XLS!!MPR_EXTDESC_EXTWALLS="H")
=     SET.NAME("ExtWalls","Z")
=   ELSE.IF([AREAS.XLW]REFDATA.XLS!!MPR_EXTDESC_EXTWALLS="L")
=     SET.NAME("ExtWalls","Z")
=   ELSE.IF([AREAS.XLW]REFDATA.XLS!!MPR_EXTDESC_EXTWALLS="O")
=     SET.NAME("ExtWalls","Z")
=   ELSE.IF([AREAS.XLW]REFDATA.XLS!!MPR_EXTDESC_EXTWALLS="V")
=     SET.NAME("ExtWalls","Z")
=   ELSE()
=     SET.NAME("ExtWalls",[AREAS.XLW]REFDATA.XLS!!MPR_EXTDESC_EXTWALLS)
=   END.IF()
=   FORMULA(ExtWalls,[AREAS.XLW]REFDATA.XLS!WAL_EXTT)
=END.IF()
=RETURN("VALID")
```

F_IMPR_EXTDESC_MANUFAC

```
=IF(ISBLANK([AREAS.XLW]REFDATA.XLS!!MPR_EXTDESC_MANUFAC))
=   FORMULA("",[AREAS.XLW]REFDATA.XLS!MAN_HOME)
=ELSE()
=   FORMULA([AREAS.XLW]REFDATA.XLS!!MPR_EXTDESC_MANUFAC,[AREAS.XLW]REFDA
=END.IF()
=RETURN("VALID")
```
*blank out the cell*

F_IMPR_EXTDESC_ROOF

```
=IF(ISBLANK([AREAS.XLW]REFDATA.XLS!!MPR_EXTDESC_ROOF))
=   FORMULA("",[AREAS.XLW]REFDATA.XLS!ROOFTYPE)
=ELSE()
=   IF(OR([AREAS.XLW]REFDATA.XLS!!MPR_EXTDESC_ROOF="E",[AREAS.XLW]REFDATA.X
=     SET.NAME("roof","X")
=   ELSE()
=     SET.NAME("roof",[AREAS.XLW]REFDATA.XLS!!MPR_EXTDESC_ROOF)
=   END.IF()
=   FORMULA(roof,[AREAS.XLW]REFDATA.XLS!ROOFTYPE)
=END.IF()
=RETURN("VALID")
```
*blank out the cell*

F_IMPR_FOUNDATION

```
=SET.NAME("ValidReturn","VALID")
=IF(ISBLANK([AREAS.XLW]REFDATA.XLS!!MPR_FOUNDATION_INFEST))
=   FORMULA("",[AREAS.XLW]REFDATA.XLS!FND_INF)
=ELSE()
=     FORMULA([AREAS.XLW]REFDATA.XLS!!MPR_FOUNDATION_INFEST,[AREAS.XLW]REF
=END.IF()
=IF(ISBLANK([AREAS.XLW]REFDATA.XLS!!MPR_FOUNDATION_SETTLEMENT))
=   FORMULA("",[AREAS.XLW]REFDATA.XLS!FND_SETL)
=ELSE()
=     FORMULA([AREAS.XLW]REFDATA.XLS!!MPR_FOUNDATION_SETTLEMENT,[AREAS.XLW
=END.IF()
=RETURN(ValidReturn)
```

F_IMPR_GENDESC_AGE

```
=IF(ISNUMBER(VALUE([AREAS.XLW]REFDATA.XLS!!MPR_GENDESC_AGE)))
=   FORMULA(VALUE([AREAS.XLW]REFDATA.XLS!!MPR_GENDESC_AGE),[AREAS.XLW]REF
=ELSE()
=   FORMULA(".",[AREAS.XLW]REFDATA.XLS!AGE)
=END.IF()
=RETURN()
```

F_IMPR_GENDESC_DESIGN

```
=IF(ISBLANK([AREAS.XLW]REFDATA.XLS!!MPR_GENDESC_DESIGN))
=   FORMULA("",[AREAS.XLW]REFDATA.XLS!STYLECOD)
=ELSE()
=   IF([AREAS.XLW]REFDATA.XLS!!MPR_GENDESC_DESIGN="V")
=     FORMULA("T",[AREAS.XLW]REFDATA.XLS!STYLECOD)
=   ELSE()
=     FORMULA([AREAS.XLW]REFDATA.XLS!!MPR_GENDESC_DESIGN,[AREAS.XLW]REFDA
=   END.IF()
=END.IF()
=RETURN("VALID")
```
*check for valid entry*

| F IMPR_GENDESC_STORIES |
|---|
| =SET.NAME("StoriesMissing","FALSE")
=IF(ISBLANK([AREAS.XLW]REFDATA.XLS!IMPR_GENDESC_STORIES))
=   SET.NAME("StoriesMissing","TRUE")
=ELSE.IF([AREAS.XLW]REFDATA.XLS!IMPR_GENDESC_STORIES>4)
=   SET.NAME("StoriesMissing","TRUE")
=ELSE.IF([AREAS.XLW]REFDATA.XLS!IMPR_GENDESC_STORIES<1)
=   SET.NAME("NumStories",1)
=ELSE.IF([AREAS.XLW]REFDATA.XLS!IMPR_GENDESC_STORIES>2)
=   SET.NAME("NumStories",3)
=ELSE.IF(ISNUMBER([AREAS.XLW]REFDATA.XLS!IMPR_GENDESC_STORIES))
=   SET.NAME("NumStories",[AREAS.XLW]REFDATA.XLS!IMPR_GENDESC_STORIES)
=ELSE()
=   SET.NAME("StoriesMissing","TRUE")
=END.IF()
=IF(StoriesMissing="TRUE")
=   FORMULA("",[AREAS.XLW]REFDATA.XLS!STRYSFDU)
=ELSE()
=   FORMULA("=CHAR("&TEXT(NumStories+48,"#")&")",[AREAS.XLW]REFDATA.XLS!STRYSFD)
=END.IF()
=RETURN() |

| F IMPR_GENDESC_TYPE | |
|---|---|
| =IF(ISBLANK([AREAS.XLW]REFDATA.XLS!IMPR_GENDESC_TYPE))
=   FORMULA("",[AREAS.XLW]REFDATA.XLS!IMP_TYPE)
=ELSE()
=   IF(OR([AREAS.XLW]REFDATA.XLS!IMPR_GENDESC_TYPE="E",[AREAS.XLW]REFDATA.XI
=       SET.NAME("HouseType","X")
=   ELSE.IF(OR([AREAS.XLW]REFDATA.XLS!IMPR_GENDESC_TYPE="Z",[AREAS.XLW]REFDA
=       SET.NAME("HouseType","A")
=   ELSE()
=       SET.NAME("HouseType",[AREAS.XLW]REFDATA.XLS!IMPR_GENDESC_TYPE)
=   END.IF()
=   FORMULA(HouseType,[AREAS.XLW]REFDATA.XLS!IMP_TYPE)
=END.IF()
=RETURN("VALID") | |

| F INTR_COOL_CENTRAL | |
|---|---|
| =SET.NAME("EditQual","VALID")
=IF(ISBLANK([AREAS.XLW]REFDATA.XLS!INTR_COOL_CENTRAL))
=   SET.NAME("cool","")
=ELSE()
=   IF(OR([AREAS.XLW]REFDATA.XLS!INTR_COOL_CENTRAL="1",[AREAS.XLW]REFDATA.XL$
=       SET.NAME("cool","X")
=   ELSE()
=       SET.NAME("cool",[AREAS.XLW]REFDATA.XLS!INTR_COOL_CENTRAL)
=   END.IF()
=END.IF()
=FORMULA(cool,[AREAS.XLW]REFDATA.XLS!AIR_COND)
=RETURN(EditQual) | *check for valid entry* |

| F INTR_FIREPLACE | |
|---|---|
| =IF(ISBLANK([AREAS.XLW]REFDATA.XLS!INTR_FIREPLACE_NUM))
=   FORMULA("",[AREAS.XLW]REFDATA.XLS!FRPL_NUM)
=ELSE.IF(ISNUMBER([AREAS.XLW]REFDATA.XLS!INTR_FIREPLACE_NUM))
=   IF([AREAS.XLW]REFDATA.XLS!INTR_FIREPLACE_NUM<10)
=       FORMULA([AREAS.XLW]REFDATA.XLS!INTR_FIREPLACE_NUM,[AREAS.XLW]REFDATA
=   END.IF()
=ELSE()
=   FORMULA("",[AREAS.XLW]REFDATA.XLS!FRPL_NUM)
=END.IF()
=IF(ISBLANK([AREAS.XLW]REFDATA.XLS!INTR_FIREPLACE_TYPE))
=   FORMULA("",[AREAS.XLW]REFDATA.XLS!FRPL_TYP)
=ELSE()
=   IF([AREAS.XLW]REFDATA.XLS!INTR_FIREPLACE_TYPE="S")
=       FORMULA("",[AREAS.XLW]REFDATA.XLS!FRPL_TYP)
=   ELSE()
=       FORMULA([AREAS.XLW]REFDATA.XLS!INTR_FIREPLACE_TYPE,[AREAS.XLW]REFDATA
=   END.IF()
=END.IF()
=RETURN("VALID") | *send number of fireplaces*

*check for valid entry*

*send fireplace type*

*give median comp value for nun* |

| F INTR IMPROV ECONLIFE | |
|---|---|
| =IF(ISNUMBER(VALUE([AREAS.XLW]REFDATA.XLS!INTR_IMPROV_ECONLIFE))=FALSE)<br>= FORMULA(".",[AREAS.XLW]REFDATA.XLS!ECONLIFE)<br>=ELSE.IF(ISBLANK([AREAS.XLW]REFDATA.XLS!INTR_IMPROV_ECONLIFE))<br>= FORMULA(".",[AREAS.XLW]REFDATA.XLS!ECONLIFE)<br>=ELSE()<br>= FORMULA(VALUE([AREAS.XLW]REFDATA.XLS!INTR_IMPROV_ECONLIFE),[AREAS.XLW]F<br>=END.IF()<br>=RETURN() | |

| F INTR SURF BATHFLOOR | |
|---|---|
| =SET.NAME("bfReturn","VALID")<br>=IF(ISBLANK([AREAS.XLW]REFDATA.XLS!INTR_SURF_BATHFLOOR_MAT))<br>= FORMULA("",[AREAS.XLW]REFDATA.XLS!BA_FLMAT)<br>=ELSE()<br>= FORMULA([AREAS.XLW]REFDATA.XLS!INTR_SURF_BATHFLOOR_MAT,[AREAS.XLW]REF<br>=END.IF()<br>=IF(ISBLANK([AREAS.XLW]REFDATA.XLS!INTR_SURF_BATHFLOOR_COND))<br>= FORMULA("",[AREAS.XLW]REFDATA.XLS!BA_FLCND)<br>=ELSE()<br>= IF([AREAS.XLW]REFDATA.XLS!INTR_SURF_BATHFLOOR_COND="P")<br>= FORMULA("F",[AREAS.XLW]REFDATA.XLS!BA_FLCND)<br>= ELSE.IF([AREAS.XLW]REFDATA.XLS!INTR_SURF_BATHFLOOR_COND="X")<br>= FORMULA("",[AREAS.XLW]REFDATA.XLS!BA_FLCND)<br>= ELSE()<br>= FORMULA([AREAS.XLW]REFDATA.XLS!INTR_SURF_BATHFLOOR_COND,[AREAS.XLW]<br>= END.IF()<br>=END.IF()<br>=RETURN(bfReturn) | set BA_FLMAT input<br><br><br>if floor cond is valid<br>set BA_FLCND to "F"<br><br>set BA_FLCND to blank<br><br>set BA_FLCND to BathFloorCo |

| F INTR SURF BATHWAINSCOT | |
|---|---|
| =SET.NAME("bwReturn","VALID")<br>=IF(ISBLANK([AREAS.XLW]REFDATA.XLS!INTR_SURF_BATHWAINSCOT_MAT))<br>= FORMULA("",[AREAS.XLW]REFDATA.XLS!BA_WNMAT)<br>=ELSE()<br>= IF(OR([AREAS.XLW]REFDATA.XLS!INTR_SURF_BATHWAINSCOT_MAT="E",[AREAS.XLW]<br>= FORMULA("F",[AREAS.XLW]REFDATA.XLS!BA_WNMAT)<br>= ELSE()<br>= FORMULA([AREAS.XLW]REFDATA.XLS!INTR_SURF_BATHWAINSCOT_MAT,[AREAS.XLW<br>= END.IF()<br>=END.IF()<br>=IF(ISBLANK([AREAS.XLW]REFDATA.XLS!INTR_SURF_BATHWAINSCOT_COND))<br>= FORMULA("",[AREAS.XLW]REFDATA.XLS!BA_WNCON)<br>=ELSE()<br>= IF([AREAS.XLW]REFDATA.XLS!INTR_SURF_BATHWAINSCOT_COND="P")<br>= FORMULA("F",[AREAS.XLW]REFDATA.XLS!BA_WNCON)<br>= ELSE.IF([AREAS.XLW]REFDATA.XLS!INTR_SURF_BATHWAINSCOT_COND="X")<br>= FORMULA("",[AREAS.XLW]REFDATA.XLS!BA_WNCON)<br>= ELSE()<br>= FORMULA([AREAS.XLW]REFDATA.XLS!INTR_SURF_BATHWAINSCOT_COND,[AREAS.X<br>= END.IF()<br>=END.IF()<br>=RETURN(bwReturn) | <br><br><br><br>set BA_WNMAT input<br><br><br><br><br>if wainscot cond is valid<br>set BA_WNCON to "F"<br><br>set BA_WNCON to blank<br><br>set BA_WNCON to BathWainsc |

| F INTR SURF FLOORS | |
|---|---|
| =IF(ISBLANK([AREAS.XLW]REFDATA.XLS!INTR_SURF_FLOORS))<br>= FORMULA("",[AREAS.XLW]REFDATA.XLS!FLR_MAT)<br>=ELSE()<br>= FORMULA([AREAS.XLW]REFDATA.XLS!INTR_SURF_FLOORS,[AREAS.XLW]REFDATA.XLS<br>=END.IF()<br>=RETURN("VALID") | check for valid entry |

| F ROOM ABOVEGRADE ROOMS | |
|---|---|
| =IF(ISNUMBER(VALUE([AREAS.XLW]REFDATA.XLS!ROOM_ABOVEGRADE_BATHS))=FALSE<br>= SET.NAME("baths",".")<br>=ELSE.IF(AND(VALUE([AREAS.XLW]REFDATA.XLS!ROOM_ABOVEGRADE_BATHS)<8,VALUE<br>= SET.NAME("baths",VALUE([AREAS.XLW]REFDATA.XLS!ROOM_ABOVEGRADE_BATHS))<br>=ELSE()<br>= SET.NAME("baths",".")<br>=END.IF()<br>=FORMULA(baths,[AREAS.XLW]REFDATA.XLS!BA_NUM)<br>=IF(ISNUMBER(VALUE([AREAS.XLW]REFDATA.XLS!ROOM_ABOVEGRADE_BEDRMS))=FALS<br>= SET.NAME("beds",".") | |

|  |  |  |
|---|---|---|
|  | =ELSE.IF(VALUE([AREAS.XLW]REFDATA.XLS!ROOM_ABOVEGRADE_BEDRMS)>8)<br>= SET.NAME("beds",".")<br>=ELSE()<br>= SET.NAME("beds",VALUE([AREAS.XLW]REFDATA.XLS!ROOM_ABOVEGRADE_BEDRMS))<br>=END.IF()<br>=FORMULA(beds,[AREAS.XLW]REFDATA.XLS!BEDRMS_N)<br>=IF(ISNUMBER(VALUE([AREAS.XLW]REFDATA.XLS!ROOM_ABOVEGRADE_ROOMS))=FALSE<br>= SET.NAME("rooms",".")<br>=ELSE.IF(OR(VALUE([AREAS.XLW]REFDATA.XLS!ROOM_ABOVEGRADE_ROOMS)>14,VALU<br>= SET.NAME("rooms",".")<br>=ELSE()<br>= SET.NAME("rooms",[AREAS.XLW]REFDATA.XLS!ROOM_ABOVEGRADE_ROOMS)<br>=END.IF()<br>=FORMULA(rooms,[AREAS.XLW]REFDATA.XLS!R_TOT_N)<br>=RETURN("VALID") | if > 14 or if negative or zero, ma |

| F_ROOM_ABOVEGRADE_SQFT |
|---|
| =IF(ISNUMBER(VALUE([AREAS.XLW]REFDATA.XLS!ROOM_ABOVEGRADE_SQFT))=FALSE)<br>= FORMULA(".",[AREAS.XLW]REFDATA.XLS!SQ_FT_LA)<br>=ELSE()<br>= FORMULA(VALUE([AREAS.XLW]REFDATA.XLS!ROOM_ABOVEGRADE_SQFT),[AREAS.XLV<br>=END.IF()<br>=RETURN("VALID") |

|  | F_SITE_AREA |  |
|---|---|---|
| SiteAreaCode | =SET.NAME("InvalidSiteCode",FALSE)<br>=IF(ISBLANK([AREAS.XLW]REFDATA.XLS!SITE_AREA))<br>= FORMULA(".",[AREAS.XLW]REFDATA.XLS!LN_LOT)<br>= FORMULA("",[AREAS.XLW]REFDATA.XLS!SITE_AREA_TYPE)<br>=ELSE()<br>= [AREAS.XLW]REFDATA.XLS!SITE_AREA_TYPE<br>= IF(ISBLANK(SiteAreaCode),SET.VALUE(SiteAreaCode,"S"))<br>= IF(AND(SiteAreaCode<>"A",SiteAreaCode<>"S"))<br>= ErrorAlert("Please indicate 'acres' or 'sq. ft.' after the number.")<br>= SET.NAME("InvalidSiteCode",TRUE)<br>= END.IF()<br>= IF(AND(SiteAreaCode="A",[AREAS.XLW]REFDATA.XLS!SITE_AREA>0))<br>= SET.NAME("SqFtSiteArea",[AREAS.XLW]REFDATA.XLS!SITE_AREA*43560)<br>= ELSE.IF(AND([AREAS.XLW]REFDATA.XLS!SITE_AREA<50,[AREAS.XLW]REFDATA.XLS!SIT<br>= SET.NAME("SqFtSiteArea",[AREAS.XLW]REFDATA.XLS!SITE_AREA*43560)<br>= ELSE.IF([AREAS.XLW]REFDATA.XLS!SITE_AREA>453260)<br>= SET.NAME("SqFtSiteArea",453260)<br>= ELSE()<br>= SET.NAME("SqFtSiteArea",[AREAS.XLW]REFDATA.XLS!SITE_AREA)<br>= END.IF() | acres to sq ft<br><br>acres to sq ft |
| LnSiteArea | = LN(SqFtSiteArea)<br>= FORMULA(LnSiteArea,[AREAS.XLW]REFDATA.XLS!LN_LOT)<br>=END.IF()<br>=IF(InvalidSiteCode=TRUE)<br>= RETURN("INVALID")<br>=ELSE()<br>= RETURN("VALID")<br>=END.IF() | nat. log of site area<br>send LnSiteArea to RefData |

| F_SITE_IMPROV_STR |
|---|
| =IF(ISBLANK([AREAS.XLW]REFDATA.XLS!SITE_IMPROV_STR_PUB))<br>= FORMULA("",[AREAS.XLW]REFDATA.XLS!SI_STM)<br>=ELSE()<br>= FORMULA([AREAS.XLW]REFDATA.XLS!SITE_IMPROV_STR_PUB,[AREAS.XLW]REFDATA.<br>=END.IF()<br><br>=IF(ISBLANK([AREAS.XLW]REFDATA.XLS!SITE_IMPROV_STR_TYPE))<br>= FORMULA("",[AREAS.XLW]REFDATA.XLS!SI_STT)<br>=ELSE()<br>= IF(OR([AREAS.XLW]REFDATA.XLS!SITE_IMPROV_STR_TYPE="D",[AREAS.XLW]REFDATA<br>= FORMULA("X",[AREAS.XLW]REFDATA.XLS!SI_STT)<br>= ELSE()<br>= FORMULA([AREAS.XLW]REFDATA.XLS!SITE_IMPROV_STR_TYPE,[AREAS.XLW]REFDAT<br>= END.IF()<br>=END.IF()<br>=RETURN("VALID") |

| F_SITE_FEMAFLOODYES |
|---|
| =IF(ISBLANK([AREAS.XLW]REFDATA.XLS!SITE_FEMAFLOODYES))<br>= FORMULA("",[AREAS.XLW]REFDATA.XLS!FL_ZONE)<br>=ELSE() |

| | | |
|---|---|---|
| | = FORMULA([AREAS.XLW]REFDATA.XLS!SITE_FEMAFLOODYES,[AREAS.XLW]REFDATA.X<br>=END.IF()<br>=RETURN("VALID") | |

F_SITE_LANDSCAPE

| | | |
|---|---|---|
| | =IF(ISBLANK([AREAS.XLW]REFDATA.XLS!SITE_LANDSCAPE))<br>= FORMULA("",[AREAS.XLW]REFDATA.XLS!LANDSCAP)<br>=ELSE()<br>= FORMULA([AREAS.XLW]REFDATA.XLS!SITE_LANDSCAPE,[AREAS.XLW]REFDATA.XLS!L<br>=END.IF()<br>=RETURN("VALID") | check for valid entry |

F_SITE_SHAPE

| | | |
|---|---|---|
| | =IF(ISBLANK([AREAS.XLW]REFDATA.XLS!SITE_SHAPE))<br>= SET.NAME("shape","")<br>=ELSE()<br>= IF([AREAS.XLW]REFDATA.XLS!SITE_SHAPE="S")<br>= SET.NAME("shape","")<br>= ELSE()<br>= SET.NAME("shape",[AREAS.XLW]REFDATA.XLS!SITE_SHAPE)<br>= END.IF()<br>=END.IF()<br>=FORMULA(shape,[AREAS.XLW]REFDATA.XLS!LOT_SHAP)<br>=RETURN("VALID") | check for valid entry |

F_SITE_SIZE

| | | |
|---|---|---|
| | =IF(ISBLANK([AREAS.XLW]REFDATA.XLS!SITE_SIZE))<br>= FORMULA("",[AREAS.XLW]REFDATA.XLS!PARCLSIZ)<br>=ELSE()<br>= FORMULA([AREAS.XLW]REFDATA.XLS!SITE_SIZE,[AREAS.XLW]REFDATA.XLS!PARCLSIZ<br>=END.IF()<br>=RETURN("VALID") | check for valid entry |

F_SITE_TOPOGRAPHY

| | | |
|---|---|---|
| | =IF(ISBLANK([AREAS.XLW]REFDATA.XLS!SITE_TOPOGRAPHY))<br>= FORMULA("",[AREAS.XLW]REFDATA.XLS!TOPOCODE)<br>=ELSE()<br>= FORMULA([AREAS.XLW]REFDATA.XLS!SITE_TOPOGRAPHY,[AREAS.XLW]REFDATA.XLS<br>=END.IF()<br>=RETURN("VALID") | check for valid entry |

F_SITE_VIEW

| | | |
|---|---|---|
| | =IF(ISBLANK([AREAS.XLW]REFDATA.XLS!SITE_VIEW))<br>= SET.NAME("view","")<br>=ELSE()<br>= IF([AREAS.XLW]REFDATA.XLS!SITE_VIEW="W")<br>= SET.NAME("view","X")<br>= ELSE()<br>= SET.NAME("view",[AREAS.XLW]REFDATA.XLS!SITE_VIEW)<br>= END.IF()<br>=END.IF()<br>=FORMULA(view,[AREAS.XLW]REFDATA.XLS!SITE_INF)<br>=RETURN("VALID") | check for valid entry |

F_SUBJ_ADDRESS

| | | |
|---|---|---|
| | =RETURN("VALID") | |

F_SUBJ_APN

| | | |
|---|---|---|
| | =FORMULA(TRUE,[AREAS.XLW]DBM.XLM!BuildCompsFlag)<br>=RETURN("VALID") | |

F_SUBJ_CITY

| | | |
|---|---|---|
| | =RETURN("VALID") | |

F_SUBJ_COUNTY_STATE

| | | |
|---|---|---|
| fscs.Id | =[AREAS.XLW]INTRFACE.XLM!GetCountyId([AREAS.XLW]REFDATA.XLS!SUBJ_COUNTY)<br>=IF(fscs.Id<>[AREAS.XLW]DBM.XLM!RegionID)<br>= [AREAS.XLW]DBM.XLM!UpdateRegion([AREAS.XLW]REFDATA.XLS!SUBJ_COUNTY)<br>=END.IF()<br>=RETURN("VALID") | Check to see if region needs to |

F_SUBJ_MAPREF

| | | |
|---|---|---|
| | =FORMULA(TRUE,[AREAS.XLW]DBM.XLM!BuildCompsFlag)<br>=RETURN("VALID") | |

| F SUBJ_OWN | |
|---|---|
| =SET.NAME("OwnGood","VALID")<br>=IF(ISBLANK([AREAS.XLW]REFDATA.XLS!SUBJ_HOA))<br>= FORMULA("N",[AREAS.XLW]REFDATA.XLS!HOA)<br>=ELSE()<br>= FORMULA([AREAS.XLW]REFDATA.XLS!SUBJ_HOA,[AREAS.XLW]REFDATA.XLS!HOA)<br>=END.IF()<br><br>=IF(ISBLANK([AREAS.XLW]REFDATA.XLS!SUBJ_CONDO))<br>= FORMULA("",[AREAS.XLW]REFDATA.XLS!OWN_TYPE)<br>=ELSE.IF([AREAS.XLW]REFDATA.XLS!SUBJ_CONDO="S")<br>= FORMULA("",[AREAS.XLW]REFDATA.XLS!OWN_TYPE)<br>=ELSE()<br>= FORMULA([AREAS.XLW]REFDATA.XLS!SUBJ_CONDO,[AREAS.XLW]REFDATA.XLS!OWN_<br>=END.IF()<br>=RETURN(OwnGood) | HOA<br><br><br><br><br>CONDO |

| F SUBJ_SALE |
|---|
| =RETURN("VALID") |

| F SUBJ_TRACT |
|---|
| =FORMULA(TRUE,[AREAS.XLW]DBM.XLM!BuildCompsFlag)<br>=RETURN("VALID") |

| F SUBJ_ZIP |
|---|

| =FORMULA(TRUE,[AREAS.XLW]DBM.XLM!BuildCompsFlag)<br>=RETURN("VALID") |
|---|

| F SUBJ_BORROWER |
|---|
| =RETURN("VALID") |

| F SUBJ_APPRAISE |
|---|
| =RETURN("VALID") |

| F SUBJ_LOAN |
|---|
| =RETURN("VALID") |

| F SUBJ_LOAN_REQ |
|---|
| =RETURN("VALID") |

Cell Object Functions

| MouseClick | |
|---|---|
| =SELECT(REFTEXT(OFFSET(TEXTREF(GET.OBJECT(4,CALLER())),0,1)))<br>=VSCROLL(1,TRUE)<br>=HSCROLL(1,TRUE)<br>=ECHO(TRUE)<br>=ECHO(FALSE)<br>=[AREAS.XLW]INTRFACE.XLM!CallGroupDlg()<br>=RETURN() | MouseClick depends on a recta<br>select the cell under the object |

| MouseClickInvalid |
|---|
| =ALERT("Please click on an entry field.")<br>=RETURN() |

Utilities

| ErrorAlert | |
|---|---|
| =ARGUMENT("mes",2)<br>=IF([AREAS.XLW]DBM.XLM!BatchFlag'=FALSE)<br>= ALERT(mes,2)<br>=END.IF()<br>=RETURN() | no need to check anymore |

(AREAS.XLW)STATREV.XLM

| names | commands | comments |
|---|---|---|
| | Summary Information | |
| Title: | | |
| Version: | v1.0 | |
| Author | Craig Smith | |
| Corporation: | HNC, Inc. | |
| Creation Date: | Tuesday, May 5, 1992 | |
| | globals | |
| ConformSP | FALSE | Flags for Conformity/Non-Conformity |
| ConformSF | TRUE | |
| ConformPPSF | FALSE | |
| ThermHeight | 204.75 | |
| ThermWidth | 29.25 | |
| WindowOn | TRUE | Height of Thermometers on STATRE |
| WindowOff | FALSE | |
| LclTrendSz | 20 | (>=) Min # properties for Local Trend |
| SummaryStatics | | |
| ltvStatics | Predicted LTV is within maximum LTV for program. | |
| | Predicted LTV exceeds maximum LTV for program. | |
| | Maximum LTV for program not entered. | |
| | Loan Request not entered, system cannot predict LTV. | |
| | Maximum LTV & Loan Request not entered, system cannot predict LTV. | |
| | System cannot predict value or LTV due to subject non-conformity. | |
| | Insufficient data--system unable to predict value range. | |
| conStatics | Subject is within all neighborhood norms. | |
| | subject is non-conforming in %1%. | |
| trnStatics | Recent local trend is stable or appreciating. | |
| | recent local trend is showing moderate decline. | |
| | recent local trend is showing steep decline. | |
| RecommendStatics | No further recommendations | |
| | Confirm that subject non-conformance in %1% doesn't impact overall loan security. | |
| | NOTE: LTV is %1% max. LTV for program. 6 month trend indicates market decline at % | |
| | Confirm that LTV is adequate for loan security in a moderately declining market. | |
| | Confirm that LTV is adequate for loan security in a steeply declining market. | |
| | Confirm minimum value for subject of at least %1%; or reduce loan amount to %2%. | |
| | Confirm that LTV is within maximum LTV for program. | |
| | Confirm subject value through desk or field review. | |
| | TEST CODE | |
| | UnhideTextBoxes | |
| | | turn on regular display boxes |
| | =ACTIVATE("statrev2.XLS") | |
| | =UpperLimitBoxOnOff(WindowOn) | |
| | =PredictedValueBoxOnOff(WindowOn) | |
| | =LowerLimitBoxOnOff(WindowOn) | |
| | =PredictedLTVBoxOnOff(WindowOn) | |
| | =MaxLTVBoxOnOff(WindowOn) | |
| | =ItemOnOff("statrev2.XLS!MaxLTVError",WindowOn) | turn off error windows |
| | =ItemOnOff("statrev2.XLS!LoanRequestError",WindowOn) | |
| | =ItemOnOff("statrev2.XLS!RangeNonConformityError",WindowOn) | |
| | =ItemOnOff("statrev2.XLS!InsuffDataError",WindowOn) | |
| | =RETURN() | |
| | =InitTextBoxes() | no max ltv test |
| | =UpdateAdjustedValueRange(FALSE,FALSE) | |
| | =UpdateLoanToValue(TRUE,FALSE,FALSE,FALSE) | |
| | =RETURN() | |
| | =InitTextBoxes() | no loan request test |
| | =UpdateAdjustedValueRange(FALSE,FALSE) | |
| | =UpdateLoanToValue(FALSE,TRUE,FALSE,FALSE) | |
| | =RETURN() | |
| | =InitTextBoxes() | no loan request & no max ltvtest |
| | =UpdateAdjustedValueRange(FALSE,FALSE) | |
| | =UpdateLoanToValue(TRUE,TRUE,FALSE,FALSE) | |

```
=RETURN()
=InitTextBoxes()                                    no range/non conform test
=UpdateAdjustedValueRange(TRUE,FALSE)
=UpdateLoanToValue(FALSE,FALSE,TRUE,FALSE)
=RETURN()
=InitTextBoxes()                                    no range/conforming test
=UpdateAdjustedValueRange(TRUE,TRUE)
=UpdateLoanToValue(FALSE,FALSE,TRUE,TRUE)
=RETURN()
=InitTextBoxes()                                    no everything
=UpdateAdjustedValueRange(TRUE,TRUE)                conforming
=UpdateLoanToValue(TRUE,TRUE,TRUE,TRUE)
=RETURN()
=InitTextBoxes()                                    no everything
=UpdateAdjustedValueRange(TRUE,FALSE)               non-conforming
=UpdateLoanToValue(TRUE,TRUE,TRUE,FALSE)
=RETURN()

=UpdateSRScreens(1,1,1)
=UpdateSRScreens(1,1,2)
=UpdateSRScreens(1,1,3)
=UpdateSRScreens(1,1,4)
=UpdateSRScreens(1,1,5)
=UpdateSRScreens(1,1,6)
=UpdateSRScreens(1,2,1)
=UpdateSRScreens(1,2,2)
=UpdateSRScreens(1,2,3)
=UpdateSRScreens(1,2,4)
=UpdateSRScreens(1,2,5)
=UpdateSRScreens(1,2,6)
=UpdateSRScreens(2,1,1)
=UpdateSRScreens(2,1,2)
=UpdateSRScreens(2,1,3)
=UpdateSRScreens(2,1,4)
=UpdateSRScreens(2,1,5)
=UpdateSRScreens(2,1,6)
=UpdateSRScreens(2,2,1)
=UpdateSRScreens(2,2,2)
=UpdateSRScreens(2,2,3)
=UpdateSRScreens(2,2,4)
=UpdateSRScreens(2,2,5)
=UpdateSRScreens(2,2,6)
=UpdateSRScreens(3,1,1)
=UpdateSRScreens(3,1,2)
=UpdateSRScreens(3,1,3)
=UpdateSRScreens(3,1,4)
=UpdateSRScreens(3,1,5)
=UpdateSRScreens(3,1,6)
=UpdateSRScreens(3,2,1)
=UpdateSRScreens(3,2,2)
=UpdateSRScreens(3,2,3)
=UpdateSRScreens(3,2,4)
=UpdateSRScreens(3,2,5)
=UpdateSRScreens(3,2,6)
```

```
UpdateStatrev1
=ECHO(FALSE)
=OPEN((AREAS.XLW)DBM.XLM!AreaPath&"statrev1.xls")
=FORMULA(""&TEXT(TODAY(),"m/d/yy"),'C:\AREAS\STATREV1.XLS'!S1Date)
=FORMULA(""&(AREAS.XLW)INTRFACE.XLM!PrepName,'C:\AREAS\STATREV1.XLS'!Prep
=FORMULA(""&(AREAS.XLW)INTRFACE.XLM!PrepAddr,'C:\AREAS\STATREV1.XLS'!PrepA
=FORMULA.GOTO('C:\AREAS\STATREV1.XLS'!LoanType)+FORMULA(GET.FORMULA(A
=LocalTrend()
=RegionTrend()
=SELECT('C:\AREAS\STATREV1.XLS'!R1C1)
=CALCULATE.NOW()
=IF((AREAS.XLW)DBM.XLM!DebugFlag,ECHO(TRUE)+STEP())
```

```
=PRINT()
=CLOSE(FALSE)
=ECHO(TRUE)
=RETURN(TRUE)
```

| UpdateStatrev2 | |
|---|---|
| | =ECHO(FALSE) |
| | =OPEN((AREAS.XLW)DBM.XLM!AreaPath&"statrev2.xls") |
| | =InitTextBoxes() |
| | =FORMULA(""&TEXT(TODAY(),"m/d/yy"),"C:\AREAS\STATREV2.XLS!S2Date) |
| | =FORMULA(""&(AREAS.XLW)INTRFACE.XLM!PrepName,"C:\AREAS\STATREV2.XLS!Prep |
| | =FORMULA(""&(AREAS.XLW)INTRFACE.XLM!PrepAddr,"C:\AREAS\STATREV2.XLS!PrepA |
| | =SubjectConformity() |
| | =SubjectValuation() |
| | =SummaryAndRecommendations() |
| | =IF(AND(R(-3)C:R(-1)C)) |
| | =ACTIVATE("STATREV2.XLS")+SELECT("C:\AREAS\STATREV2.XLS!R1C1) |
| | =CALCULATE.NOW() |
| | =IF((AREAS.XLW)DBM.XLM!DebugFlag,ECHO(TRUE)+STEP()) |
| | =PRINT() |
| | =ELSE() |
| | = ALERT("WARNING!: Invalid inputs to report. Run ANALYSIS | ESTIMATE... again and |
| | =END.IF() |
| | |
| | =CLOSE(FALSE) |
| | =ECHO(TRUE) |
| | =RETURN(TRUE) |

| CountyTrendReport | | |
|---|---|---|
| | =ECHO(FALSE) | |
| | =OPEN((AREAS.XLW)DBM.XLM!AreaPath&"trndsumm.xls") | |
| | =FORMULA(""&TEXT(TODAY(),"m/d/yy"),"C:\AREAS\TRNDSUMM.XLS!S1Date) | |
| | =FORMULA(""&(AREAS.XLW)INTRFACE.XLM!PrepName,"C:\AREAS\TRNDSUMM.XLS!Pr | |
| | =FORMULA(""&(AREAS.XLW)INTRFACE.XLM!PrepAddr,"C:\AREAS\TRNDSUMM.XLS!Pre | |
| | =FOR.CELL("ctr.ctyid",(AREAS.XLW)CELLDLG.XLM!CountyIndex) | |
| ctr.ctyname | = INDEX((AREAS.XLW)CELLDLG.XLM!CountyName,ctr.ctyid) | |
| ctr.abbrevname | = INDEX((AREAS.XLW)CELLDLG.XLM!RegionName,ctr.ctyid) | |
| | = (AREAS.XLW)DBM.XLM!UpdateRegion(ctr.ctyname) | |
| | = MESSAGE(TRUE,"Loading model for "&ctr.ctyname) | |
| | = (AREAS.XLW)DBM.XLM!CloseDatabases() | |
| | = (AREAS.XLW)DBM.XLM!OpenDatabases() | Load region databases |
| | = DoCountyTrend(ctr.ctyname, ctr.abbrevname) | |
| | =NEXT() | |
| | =SELECT("C:\AREAS\TRNDSUMM.XLS!R1C1) | |
| | =CALCULATE.NOW() | |
| | =PRINT() | |
| | =CLOSE(FALSE) | |
| | =ECHO(TRUE) | |
| | =RETURN(TRUE) | |

| DoCountyTrend | | |
|---|---|---|
| | =ARGUMENT("CurCountyName",2) | |
| | =ARGUMENT("CurCountyAbbrev",2) | |
| | =FORMULA.FILL(0.001,TEXTREF("C:\AREAS\trndsumm.XLS!"&CurCountyAbbrev&"Price | Determine local price field |
| | =FORMULA.GOTO((AREAS.XLW)REFDATA.XLS!ALLsp)+COPY() | |
| | =FORMULA.GOTO(TEXTREF("TRNDSUMM.XLS!"&CurCountyAbbrev&"Prices")) | |
| | =PASTE.SPECIAL(3,4,FALSE,TRUE) | |
| | =CANCEL.COPY() | |
| dct.pstr0 | =GET.NAME("TRNDSUMM.XLS!"&CurCountyAbbrev&"Price0") | |
| dct.p0 | =TEXTREF("trndsumm.xls!"&MID(dct.pstr0,3,LEN(dct.pstr0)-3)) | |
| dct.pstr6 | =GET.NAME("TRNDSUMM.XLS!"&CurCountyAbbrev&"Price6") | |
| dct.p6 | =TEXTREF("trndsumm.xls!"&MID(dct.pstr6,3,LEN(dct.pstr6)-3)) | |
| dct.pstr18 | =GET.NAME("TRNDSUMM.XLS!"&CurCountyAbbrev&"Price18") | |
| dct.p18 | =TEXTREF("trndsumm.xls!"&MID(dct.pstr18,3,LEN(dct.pstr18)-3)) | |
| dct.Rate24 | =EXP(LN(dct.p0/dct.p18)/1.5)-1 | Update annualized rates |
| dct.rstr24 | =GET.NAME("TRNDSUMM.XLS!"&CurCountyAbbrev&"Rate24") | |
| dct.r24 | =MID(dct.rstr24,3,LEN(dct.rstr24)-3) | |
| | =ACTIVATE("trndsumm.xls") | |
| | =SELECT(DEREF(dct.r24)) | |
| | =TEXT.BOX(TEXT((AREAS.XLW)STATREV.XLM!dct.Rate24,"+0.0%;-0.0%;0")) | |
| dct.Trend24 | =HighlightTrendBox(rgn.Rate24,"TRNDSUMM.XLS!"&CurCountyAbbrev&"Trend24") | |
| dct.Rate6 | =EXP(LN(dct.p0/dct.p6)/0.5)-1 | |
| | =SELECT("TRNDSUMM.XLS!"&CurCountyAbbrev&"Rate6") | |
| | =TEXT.BOX(TEXT(CurCountyAbbrev&".Rate6","+0.0%;-0.0%;0")) | |
| dct.Trend6 | =HighlightTrendBox(CurCountyAbbrev&".Rate6","TRNDSUMM.XLS!"&CurCountyAbbre | |
| | =RETURN(TRUE) | |

| | ObjectInfo | |
|---|---|---|
| oi1 | =GET.OBJECT(4) | |
| oi2 | =GET.OBJECT(5) | |
| oi3 | =GET.OBJECT(6) | |
| oi4 | =GET.DEF(SELECTION()) | |
| oiH | =GET.OBJECT(45)+GET.OBJECT(43) | |
| oiW | =GET.OBJECT(64)+GET.OBJECT(42) | |
| | =IF(ISERROR(oi4),SET.VALUE(oi4,SELECTION())) | |
| | =NEW(1) | |
| | =FORMULA("index c=iF.",!R1C1)+FORMULA("x offset",!R2C1)+FORMULA("y offset",!R3C1) | |
| | =FORMULA(oi1,!R1C2)+FORMULA(oi2,!R2C2)+FORMULA(oi3,!R3C2)+FORMULA(oiH,!R | |
| | =DISPLAY(FALSE,FALSE,FALSE,FALSE,0,FALSE,FALSE,1) | |
| | =ERROR(FALSE) | |
| | =FULL(FALSE) | |
| | =WINDOW.SIZE(132.75,101.25) | |
| | =ERROR(TRUE) | |
| | =RETURN(TRUE) | |

| | MoveAppraisal | |
|---|---|---|
| | =GET.NAME("STATREV2.XLS!AppraisalError") | |
| aErrorBox | =MID(R(-1)C,3,LEN(R(-1)C)-3) | |
| | =GET.NAME("STATREV2.XLS!AppraiseArrow") | |
| aAppraiseArrow | =MID(R(-1)C,3,LEN(R(-1)C)-3) | |
| | =GET.NAME("STATREV2.XLS!AppraisalText") | |
| aAppraisalText | =MID(R(-1)C,3,LEN(R(-1)C)-3) | |
| | =GET.NAME("STATREV2.XLS!AppraisalLabel") | |
| aAppraisalLabel | =MID(R(-1)C,3,LEN(R(-1)C)-3) | |
| | =IF(ISBLANK((AREAS.XLW)REFDATA.XLS!SUBJ_APPR_PRICE)) | |
| | =   HIDE.OBJECT(aErrorBox,FALSE) | |
| | =   HIDE.OBJECT(aAppraiseArrow,TRUE) | |
| | =   HIDE.OBJECT(aAppraisalText,TRUE) | |
| | =   HIDE.OBJECT(aAppraisalLabel,TRUE) | |
| | =ELSE() | |
| | =   HIDE.OBJECT(aErrorBox,TRUE) | |
| | =   HIDE.OBJECT(aAppraiseArrow,FALSE) | |
| | =   HIDE.OBJECT(aAppraisalText,FALSE) | |
| | =   HIDE.OBJECT(aAppraisalLabel,FALSE) | |
| aOrg | =   DollarsToSvChart((AREAS.XLW)REFDATA.XLS!SUBJ_APPR_PRICE) | |
| | =   SELECT('C:\AREAS\STATREV2.XLS'!AppraiseArrow) | |
| | =   FORMAT.MOVE(1.5,aOrg-8,'C:\AREAS\STATREV2.XLS'!svChartOrg) | move arrow |
| | =   SELECT('C:\AREAS\STATREV2.XLS'!AppraisalText) | move text |
| | =   TEXT.BOX(TEXT((AREAS.XLW)REFDATA.XLS!SUBJ_APPR_PRICE,"$#,##0")) | |
| | =   FORMAT.MOVE(-55,aOrg,'C:\AREAS\STATREV2.XLS'!svChartOrg) | |
| | =   SELECT('C:\AREAS\STATREV2.XLS'!AppraisalLabel) | move label |
| | =   FORMAT.MOVE(-55,aOrg-15,'C:\AREAS\STATREV2.XLS'!svChartOrg) | |
| | =END.IF() | |
| | =SELECT('C:\AREAS\STATREV2.XLS'!svChartOrg) | |
| | =RETURN(TRUE) | |

| | DollarsToSvChart | |
|---|---|---|
| | =ARGUMENT("dollars",1) | |
| | =IF(ISBLANK((AREAS.XLW)REFDATA.XLS!SUBJ_APPR_PRICE)) | |
| | =   SET.NAME("svMax",1.05*(AREAS.XLW)ESTIMATE.XLM!CopyPropHigh) | |
| | =   SET.NAME("svMin",0.95*(AREAS.XLW)ESTIMATE.XLM!CopyPropLow) | |
| | =ELSE() | |
| | =   SET.NAME("svMax",1.05*MAX((AREAS.XLW)ESTIMATE.XLM!CopyPropHigh,(AREAS.XL | |
| | =   SET.NAME("svMin",0.95*MIN((AREAS.XLW)ESTIMATE.XLM!CopyPropLow,(AREAS.XLW | |
| | =END.IF() | |
| svTick | =(svMax-svMin)/ThermHeight | |
| | =IF(dollars<svMin,SET.NAME("dollars",svMin)) | |
| | =SET.NAME("points",(svMax-dollars)/svTick) | |
| | =RETURN(points+9.97) | |

| | MoveSubjectValue | |
|---|---|---|
| sFlag | =TRUE | |
| sOrg | =DollarsToSvChart((AREAS.XLW)ESTIMATE.XLM!CopyPropValue) | |
| | =IF(ISNUMBER(sOrg)) | |
| | =   SELECT('C:\AREAS\STATREV2.XLS'!SubjectValueArrow) | |
| | =   FORMAT.MOVE(50,sOrg-8,'C:\AREAS\STATREV2.XLS'!svChartOrg) | move arrow |
| | =   SELECT('C:\AREAS\STATREV2.XLS'!SubjectValueText) | move text |

| | | |
|---|---|---|
| | = TEXT.BOX(TEXT((AREAS.XLW)ESTIMATE.XLM!CopyPropValue,"$#,##0")) <br> = FORMAT.MOVE(61,sOrg-8,'C:\AREAS\STATREV2.XLS'!svChartOrg) <br> = SELECT('C:\AREAS\STATREV2.XLS'!SubjectValueLabel) <br> = FORMAT.MOVE(60,sOrg+7,'C:\AREAS\STATREV2.XLS'!svChartOrg) <br> = SELECT('C:\AREAS\STATREV2.XLS'!svChartOrg) <br> =ELSE() <br> = SET.VALUE(sFlag,FALSE) <br> =END.IF() <br> =RETURN(sFlag) | move label |

| | MoveUpperLimit | |
|---|---|---|
| uFlag <br> uOrg | =TRUE <br> =DollarsToSvChart((AREAS.XLW)ESTIMATE.XLM!CopyPropHigh) <br> =IF(ISNUMBER(uOrg)) <br> = SELECT('C:\AREAS\STATREV2.XLS'!UpperLimitArrow) <br> = FORMAT.MOVE(50,uOrg-8,'C:\AREAS\STATREV2.XLS'!svChartOrg) <br> = SELECT('C:\AREAS\STATREV2.XLS'!UpperLimitText) <br> = TEXT.BOX(TEXT((AREAS.XLW)ESTIMATE.XLM!CopyPropHigh,"$#,##0")) <br> = FORMAT.MOVE(61,uOrg-8,'C:\AREAS\STATREV2.XLS'!svChartOrg) <br> = SELECT('C:\AREAS\STATREV2.XLS'!UpperLimitLabel) <br> = FORMAT.MOVE(61,uOrg+7,'C:\AREAS\STATREV2.XLS'!svChartOrg) <br> = SELECT('C:\AREAS\STATREV2.XLS'!svChartOrg) <br> =ELSE() <br> = SET.VALUE(uFlag,FALSE) <br> =END.IF() <br> =RETURN(uFlag) | move arrow <br><br> move text <br><br><br> move label |

| | MoveLowerLimit | |
|---|---|---|
| lFlag <br> lOrg | =TRUE <br> =DollarsToSvChart((AREAS.XLW)ESTIMATE.XLM!CopyPropLow) <br> =IF(ISNUMBER(lOrg)) <br> = SELECT('C:\AREAS\STATREV2.XLS'!LowerLimitArrow) <br> = FORMAT.MOVE(50,lOrg-8,'C:\AREAS\STATREV2.XLS'!svChartOrg) <br> = SELECT('C:\AREAS\STATREV2.XLS'!LowerLimitText) <br> = TEXT.BOX(TEXT((AREAS.XLW)ESTIMATE.XLM!CopyPropLow,"$#,##0")) <br> = FORMAT.MOVE(61,lOrg-8,'C:\AREAS\STATREV2.XLS'!svChartOrg) <br> = SELECT('C:\AREAS\STATREV2.XLS'!LowerLimitLabel) <br> = FORMAT.MOVE(61,lOrg+7,'C:\AREAS\STATREV2.XLS'!svChartOrg) <br> = SELECT('C:\AREAS\STATREV2.XLS'!svChartOrg) <br> =ELSE() <br> = SET.VALUE(lOrg,FALSE) <br> =END.IF() <br> =RETURN(lOrg) | move arrow <br><br> move text <br><br><br> move label |

| | UpdateAdjustedValueRange | |
|---|---|---|
| uavrFlag | =ARGUMENT("uavrNoRange",4) <br> =ARGUMENT("uavrConforming",4) <br> =TRUE <br> =ACTIVATE("STATREV2.XLS") <br> =MoveAppraisal() <br> =IF(uavrNoRange) <br> = ShowRangeError(uavrConforming) <br> =ELSE() <br> = MoveSubjectValue() <br> = MoveUpperLimit() <br> = MoveLowerLimit() <br> = SET.VALUE(uavrFlag,AND(uavrFlag,R(-3)C:R(-1)C)) <br> =END.IF() <br> =SizeSvFill() <br> =RETURN(uavrFlag) | |

| | ShowRangeError | |
|---|---|---|
| | =ARGUMENT("sreConforming",4) <br> =UpperLimitBoxOnOff(WindowOff) <br> =PredictedValueBoxOnOff(WindowOff) <br> =LowerLimitBoxOnOff(WindowOff) <br> =IF(sreConforming) <br> = ItemOnOff("STATREV2.XLS!InsuffDataError",WindowOn) <br> =ELSE() <br> = ItemOnOff("STATREV2.XLS!RangeNonConformityError",WindowOn) <br> =END.IF() <br> =RETURN() | |

| | UpperLimitBoxOnOff | |
|---|---|---|
| | =ARGUMENT("onoff",4)<br>=ItemOnOff("STATREV2.XLS!UpperLimitArrow",onoff)<br>=ItemOnOff("STATREV2.XLS!UpperLimitText",onoff)<br>=ItemOnOff("STATREV2.XLS!UpperLimitLabel",onoff)<br>=RETURN() | |
| | PredictedValueBoxOnOff | |
| | =ARGUMENT("onoff",4)<br>=ItemOnOff("STATREV2.XLS!SubjectValueArrow",onoff)<br>=ItemOnOff("STATREV2.XLS!SubjectValueText",onoff)<br>=ItemOnOff("STATREV2.XLS!SubjectValueLabel",onoff)<br>=RETURN() | |
| | LowerLimitBoxOnOff | |
| | =ARGUMENT("onoff",4)<br>=ItemOnOff("STATREV2.XLS!LowerLimitArrow",onoff)<br>=ItemOnOff("STATREV2.XLS!LowerLimitText",onoff)<br>=ItemOnOff("STATREV2.XLS!LowerLimitLabel",onoff)<br>=RETURN() | |
| | ItemOnOff | |
| | =ARGUMENT("item",2)<br>=ARGUMENT("onoff",4)<br>=GET.NAME(item)<br>=MID(R[-1]C,3,LEN(R[-1]C)-3)<br>=IF(onoff=WindowOff)<br>= HIDE.OBJECT(R(-2)C,TRUE)<br>=ELSE()<br>= HIDE.OBJECT(R(-4)C,FALSE)<br>=END.IF()<br>=RETURN() | |
| | InitTextBoxes | *turn on regular display boxes* |
| | =ACTIVATE("STATREV2.XLS")<br>=UpperLimitBoxOnOff(WindowOn)<br>=PredictedValueBoxOnOff(WindowOn)<br>=LowerLimitBoxOnOff(WindowOn)<br>=PredictedLTVBoxOnOff(WindowOn)<br>=MaxLTVBoxOnOff(WindowOn)<br>=ItemOnOff("STATREV2.XLS!MaxLTVError",WindowOff)<br>=ItemOnOff("STATREV2.XLS!LoanRequestError",WindowOff)<br>=ItemOnOff("STATREV2.XLS!InsuffDataError",WindowOff)<br>=ItemOnOff("STATREV2.XLS!RangeNonConformityError",WindowOff)<br>=RETURN() | *turn off error windows* |
| | SizeSvFill | |
| ssfFlag<br><br>svLower<br>svUpper<br>svHeight | =TRUE<br>=SELECT("C:\AREAS\STATREV2.XLS!svChartFill)<br>=DollarsToSvChart((AREAS.XLW)ESTIMATE.XLM!CopyPropLow)<br>=DollarsToSvChart((AREAS.XLW)ESTIMATE.XLM!CopyPropHigh)<br>=svLower-svUpper<br>=IF(ISNUMBER(svHeight))<br>=FORMAT.SIZE(ThermWidth,svHeight)<br>=FORMAT.MOVE(15,svUpper,'C:\AREAS\STATREV2.XLS'!svChartOrg)<br>=SELECT("C:\AREAS\STATREV2.XLS!svChartOrg)<br>=ELSE()<br>= SET.VALUE(ssfFlag,FALSE)<br>=END.IF()<br>=RETURN(ssfFlag) | |
| | LocalTrend | *Determine local price field* |
| | =ACTIVATE("STATREV1.XLS")<br>=FORMULA.FILL(0.001,'C:\AREAS\STATREV1.XLS'!Local_Prices)<br>=SELECT('C:\AREAS\STATREV1.XLS'!LocalTrendText)<br>=IF(AND(OR((AREAS.XLW)REFDATA.XLS!A7SRC=1,(AREAS.XLW)REFDATA.XLS!A7SRC=2)<br>= TEXT.BOX("Sales Price Trend (APN)")<br>= FORMULA.GOTO((AREAS.XLW)REFDATA.XLS!A7sp)+COPY()<br>=ELSE.IF(AND((AREAS.XLW)REFDATA.XLS!MCSRC=3,(AREAS.XLW)REFDATA.XLS!MCCNT<br>= TEXT.BOX("Sales Price Trend (Map)") | |

| | | |
|---|---|---|
| | = FORMULA.GOTO((AREAS.XLW)REFDATA.XLS!MCsp)+COPY() | |
| | =ELSE.IF(AND((AREAS.XLW)REFDATA.XLS!CSRC=4,(AREAS.XLW)REFDATA.XLS!CCNT18>= | |
| | =  TEXT.BOX("Sales Price Trend (Census)") | |
| | =  FORMULA.GOTO((AREAS.XLW)REFDATA.XLS!Csp)+COPY() | |
| | =ELSE.IF(AND((AREAS.XLW)REFDATA.XLS!Z5SRC=5,(AREAS.XLW)REFDATA.XLS!Z5CNT18> | |
| | =  TEXT.BOX("Sales Price Trend (Zip)") | |
| | =  FORMULA.GOTO((AREAS.XLW)REFDATA.XLS!Z5sp)+COPY() | |
| | =ELSE() | |
| | =  TEXT.BOX("Sales Price Trend (County)") | |
| | =  FORMULA.GOTO((AREAS.XLW)REFDATA.XLS!ALLsp)+COPY() | |
| | =END.IF() | |
| | =FORMULA.GOTO('C:\AREAS\STATREV1.XLS'!Local_Prices) | |
| | =PASTE.SPECIAL(3,4,FALSE,TRUE) | |
| | =CANCEL.COPY() | |
| lcl.Rate24 | =EXP(LN('C:\AREAS\STATREV1.XLS'!LclPrice0/'C:\AREAS\STATREV1.XLS'!LclPrice18)/1.5 | Update annualized rates |
| | =SELECT('C:\AREAS\STATREV1.XLS'!LclRate24) | |
| | =TEXT.BOX(TEXT(lcl.Rate24,"+0.0%;-0.0%;0")) | |
| lcl.Trend24 | =HighlightTrendBox(lcl.Rate24,'C:\AREAS\STATREV1.XLS'!LclTrend24) | |
| lcl.Rate6 | =EXP(LN('C:\AREAS\STATREV1.XLS'!LclPrice0/'C:\AREAS\STATREV1.XLS'!LclPrice6)/0.5) | |
| | =SELECT('C:\AREAS\STATREV1.XLS'!LclRate6) | |
| | =TEXT.BOX(TEXT(lcl.Rate6,"+0.0%;-0.0%;0")) | |
| lcl.Trend6 | =HighlightTrendBox(lcl.Rate6,'C:\AREAS\STATREV1.XLS'!LclTrend6) | |
| | =RETURN(TRUE) | |

| | HighlightTrendBox | |
|---|---|---|
| | =ARGUMENT("htb.Rate",1) | |
| | =ARGUMENT("htb.boxArray",64) | |
| | =FOR("i",1,5) | |
| | =  SELECT(INDEX(htb.boxArray,1,i)) | clear all the boxes |
| | =  PATTERNS(1,1,1,1,FALSE,2,1,1,2,FALSE) | |
| | =NEXT() | |
| | =IF(htb.Rate <-0.1) | |
| | =  SET.NAME("htbIndex",5) | |
| | =ELSE.IF(AND(htb.Rate <-0.03,htb.Rate >= -0.1)) | |
| | =  SET.NAME("htbIndex",4) | |
| | =ELSE.IF(AND(htb.Rate >=-0.03,htb.Rate <=0.03)) | |
| | =  SET.NAME("htbIndex",3) | |
| | =ELSE.IF(AND(htb.Rate>0.03,htb.Rate <=0.1)) | |
| | =  SET.NAME("htbIndex",2) | |
| | =ELSE() | |
| | =  SET.NAME("htbIndex",1) | |
| | =END.IF() | |
| | =SELECT(INDEX(htb.boxArray,1,htbIndex)) | |
| | =PATTERNS(1,1,1,1,FALSE,0,1,1,2,FALSE) | |
| | =RETURN(htbIndex) | |

| | RegionTrend | |
|---|---|---|
| | =FORMULA.FILL(0.001,'C:\AREAS\STATREV1.XLS'!RegionPrices) | Determine local price field |
| | =FORMULA.GOTO((AREAS.XLW)REFDATA.XLS!ALLsp)+COPY() | |
| | =FORMULA.GOTO('C:\AREAS\STATREV1.XLS'!RegionPrices) | |
| | =PASTE.SPECIAL(3,4,FALSE,TRUE) | |
| | =CANCEL.COPY() | |
| rgn.Rate24 | =EXP(LN('C:\AREAS\STATREV1.XLS'!RgnPrice0/'C:\AREAS\STATREV1.XLS'!RgnPrice18)/ | Update annualized rates |
| | =SELECT('C:\AREAS\STATREV1.XLS'!RgnRate24) | |
| | =TEXT.BOX(TEXT(rgn.Rate24,"+0.0%;-0.0%;0")) | |
| rgn.Trend24 | =HighlightTrendBox(rgn.Rate24,'C:\AREAS\STATREV1.XLS'!RgnTrend24) | |
| rgn.Rate6 | =EXP(LN('C:\AREAS\STATREV1.XLS'!RgnPrice0/'C:\AREAS\STATREV1.XLS'!RgnPrice6)/0 | |
| | =SELECT('C:\AREAS\STATREV1.XLS'!RgnRate6) | |
| | =TEXT.BOX(TEXT(rgn.Rate6,"+0.0%;-0.0%;0")) | |
| rgn.Trend6 | =HighlightTrendBox(rgn.Rate6,'C:\AREAS\STATREV1.XLS'!RgnTrend6) | |
| | =RETURN(TRUE) | |

| | ScaleChartX | |
|---|---|---|
| | =ARGUMENT("ChartSuffix",2) | |
| | =ARGUMENT("ChartDataRef",8) | |
| scx.Ticks | =ROUND(ROWS(ChartDataRef)/4,0) | calculate x axis scale |
| ChartName | ="Chart"&ChartSuffix | |
| scx.Chart | =SUBSTITUTE(SUBSTITUTE(GET.NAME("STATREV2.XLS!"&ChartName),"=",""),"""","") | |
| | =SELECT(DEREF(scx.Chart)) | |
| | =UNHIDE("STATREV2.XLS "&scx.Chart) | |
| | =SELECT("Axis 2") | |
| | =SCALE(1,scx.Ticks,scx.Ticks,TRUE,FALSE,FALSE) | set x axis scale |
| RegionPrefix | ="STATREV2.XLS!"&(AREAS.XLW)DBM.XLM!RegionName&ChartSuffix | |
| | =EDIT.SERIES(1,"","="&RegionPrefix,"="&RegionPrefix&"2",,1) | set chart series |

```
=EDIT.SERIES(2,"","="&RegionPrefix,"="&RegionPrefix&"1",,2)
=EDIT.SERIES(3,"","="&RegionPrefix,"="&RegionPrefix&"3",,3)

=HIDE()
=RETURN(TRUE)
```

SubjectConformity

```
=IF((AREAS.XLW)DBM.XLM!DebugFlag>1,ECHO(TRUE)+STEP())
=UpdateChartData("SP",(AREAS.XLW)REFDATA.XLS!A7SPMED,(AREAS.XLW)REFDATA.X
=UpdateChartData("SF",(AREAS.XLW)REFDATA.XLS!A7SQMED,(AREAS.XLW)REFDATA.X
=IF(OR((AREAS.XLW)REFDATA.XLS!ROOM_ABOVEGRADE_SQFT=0,ISBLANK((AREAS.XLW
=  UpdateChartData("PPSF",(AREAS.XLW)REFDATA.XLS!A7PSQMED,(AREAS.XLW)REFD
=ELSE()
=  UpdateChartData("PPSF",(AREAS.XLW)REFDATA.XLS!A7PSQMED,(AREAS.XLW)REFD
=END.IF()
=FORMULA.GOTO("STATREV2.XLS!"&(AREAS.XLW)DBM.XLM!RegionName&"SP")+Scale
=FORMULA.GOTO("STATREV2.XLS!"&(AREAS.XLW)DBM.XLM!RegionName&"SF")+Scale
=FORMULA.GOTO("STATREV2.XLS!"&(AREAS.XLW)DBM.XLM!RegionName&"PPSF")+Sca

=RETURN(TRUE)
```

UpdateChartData

| | | |
|---|---|---|
| | =ARGUMENT("chartTypeName",2) | |
| | =ARGUMENT("chartMedian",1) | |
| | =ARGUMENT("chartStd",1) | |
| | =ARGUMENT("chartValue",1) | |
| chartRegionName | =(AREAS.XLW)DBM.XLM!RegionName | get region name |
| chartErrorBoxName | =GET.NAME("STATREV2.XLS!ChartError"&chartTypeName) | |
| chartErrorBox | =MID(chartErrorBoxName,3,LEN(chartErrorBoxName)-3) | |
| | =FORMULA.GOTO("STATREV2.XLS!"&chartRegionName&chartTypeName&"2")+CLEAR | clear data |
| | =FORMULA.GOTO("STATREV2.XLS!"&chartRegionName&chartTypeName&"3")+CLEAR | |
| | | insert data for conforming region |
| | =FORMULA.GOTO("STATREV2.XLS!"&chartRegionName&chartTypeName&"1") | find max value |
| usp.MaxBar | =CEILING(MAX(SELECTION()),1000) | |
| | =FORMULA.GOTO("STATREV2.XLS!"&chartRegionName&chartTypeName) | find indexes |
| usp.IntervalBar | =DEREF(OFFSET(SELECTION(),1,0,1,1))-DEREF(OFFSET(SELECTION(),0,0,1,1)) | |
| usp.LowBar | =MATCH(FLOOR(IF(chartMedian-chartStd<0,0,chartMedian-chartStd),usp.IntervalBa | |
| | =IF(ISNA(usp.LowBar)) | |
| | =   IF(chartMedian-chartStd<DEREF(OFFSET(SELECTION(),0,0,1,1)),SET.VALUE(usp.LowB | |
| | =END.IF() | |
| usp.HighBar | =MATCH(CEILING(chartMedian+chartStd,usp.IntervalBar),SELECTION(),0) | |
| | =IF(ISNA(usp.HighBar)) | |
| | =   IF(chartMedian+chartStd<DEREF(OFFSET(SELECTION(),0,0,1,1)),SET.VALUE(usp.High | |
| | =END.IF() | |
| | =FORMULA.GOTO("STATREV2.XLS!"&chartRegionName&chartTypeName&"2") | fill conforming region with max value |
| | =SELECT(OFFSET(SELECTION(),usp.LowBar-1,0,usp.HighBar-usp.LowBar+1,1)) | |
| | =FORMULA.FILL(usp.MaxBar,SELECTION()) | |
| | =IF(chartValue<>0) | insert data for property |
| | =   FORMULA.GOTO("STATREV2.XLS!"&chartRegionName&chartTypeName) | find index |
| usp.chartPoint | =   CEILING(chartValue,usp.IntervalBar) | |
| usp.PropPoint | =   MATCH(usp.chartPoint,SELECTION(),0) | |
| | =   IF(ISNA(usp.PropPoint)) | |
| | =      IF(usp.chartPoint<DEREF(OFFSET(SELECTION(),0,0,1,1)),SET.VALUE(usp.PropPoint,1 | |
| | =   END.IF() | |
| usp.PropValPoint | =   DEREF(OFFSET(SELECTION(),usp.PropPoint-1,1,1,1)) | find property value point |
| | =   FORMULA(usp.PropValPoint,OFFSET(SELECTION(),usp.PropPoint-1,3,1,1)) | fill property point with value |
| | =   FORMULA(AND(usp.PropPoint>=usp.LowBar,usp.PropPoint<=usp.HighBar),"[AREAS.X | set conform flag |
| | =   HIDE.OBJECT(chartErrorBox,TRUE) | |
| | =ELSE() | |
| | =   FORMULA("","[AREAS.XLW]STATREV.XLM!Conform"&chartTypeName) | |
| | =   HIDE.OBJECT(chartErrorBox,FALSE) | |
| | =END.IF() | |
| | =RETURN(TRUE) | |

ContributionValue

| | | |
|---|---|---|
| | =ARGUMENT("ContribName",2) | |
| | =ERROR(FALSE) | |
| | =IF((AREAS.XLW)DBM.XLM!DebugFlag>2,ERROR(TRUE)+ECHO(TRUE)+STEP()) | |
| | =SET.NAME("cV",0) | |
| | =FORMULA.GOTO((AREAS.XLW)INTRFACE.XLM!idName) | find id of name |
| | =IF(FORMULA.FIND(ContribName,1,1,1,1,TRUE)=FALSE,GOTO(cv.Egress)) | |
| cv.Id | =DEREF(OFFSET(ACTIVE.CELL(),0,0,-2,1,1)) | |
| | =FORMULA.GOTO((AREAS.XLW)ESTIMATE.XLM!Net.Contribution) | find contribution of id |
| | =IF(FORMULA.FIND(cv.Id,2,1,1,1,TRUE)=FALSE,GOTO(cv.Egress)) | |

| | |
|---|---|
| cv.Val | =DEREF(OFFSET(ACTIVE.CELL(),0,1,1,1)) |
| | =SET.NAME("cV",DEREF(cv.Val)) |
| cv.Egress | =ERROR(TRUE) |
| | =RETURN(cV) |

SubjectValuation

| | |
|---|---|
| svFlag | =TRUE |
| svNoMaxLTV | =OR(ISBLANK((AREAS.XLW)REFDATA.XLS!LTV),(AREAS.XLW)REFDATA.XLS!LTV=0) |
| svNoLoanReq | =OR(ISBLANK((AREAS.XLW)REFDATA.XLS!LOAN_AMT),(AREAS.XLW)REFDATA.XLS!LOAN |
| svNoRange | =(AREAS.XLW)INTRFACE.XLM!ErrorCode = 5 |
| svConforming | =AND(ConformPPSF,ConformSP,ConformSF) |
| | =Location() |
| | =Room_Count() |
| | =Square_Footage() |
| | =Quality() |
| | =Condition() |
| | =Age() |
| | =Economic_Life() |
| | =Site_Improvements() |
| | =Site_Amenities() |
| | =ACTIVATE("STATREV2.XLS") |
| | =FOR.CELL("i",'C:\AREAS\STATREV2.XLS'!SubjectCharacteristics) |
| | =  SELECT(i) |
| | =  FORMULA(GET.FORMULA(ACTIVE.CELL())) |
| | =NEXT() |
| | =FOR.CELL("i",'C:\AREAS\STATREV2.XLS'!VarianceToModel) |
| | =  SELECT(i) |
| | =  FORMULA(GET.FORMULA(ACTIVE.CELL())) |
| | =NEXT() |
| | =UpdateAdjustedValueRange(svNoRange,svConforming) |
| | =UpdateLoanToValue(svNoMaxLTV,svNoLoanReq,svNoRange,svConforming) |
| | =SET.VALUE(svFlag,AND(R(-2)C:R(-1)C)) |
| | =RETURN(svFlag) |

Location

| | |
|---|---|
| IVarray | =ContributionValue("APN_COMP")/(AREAS.XLW)ESTIMATE.XLM!CopyPropValue |
| IVarray | =ContributionValue("ZIP_COMP")/(AREAS.XLW)ESTIMATE.XLM!CopyPropValue |
| IVarray | =ContributionValue("ZIPCMPBE")/(AREAS.XLW)ESTIMATE.XLM!CopyPropValue |
| IVarray | =ContributionValue("ZIPCMPBA")/(AREAS.XLW)ESTIMATE.XLM!CopyPropValue |
| IVarray | =ContributionValue("ZIPCMPSQ")/(AREAS.XLW)ESTIMATE.XLM!CopyPropValue |
| IVarray | =ContributionValue("ZIPCMPAG")/(AREAS.XLW)ESTIMATE.XLM!CopyPropValue |
| IVarray | =ContributionValue("ZIPCMPRM")/(AREAS.XLW)ESTIMATE.XLM!CopyPropValue |
| IVarray | =ContributionValue("ZIPCMPGA")/(AREAS.XLW)ESTIMATE.XLM!CopyPropValue |
| IVarray | =ContributionValue("ZIPCMPFP")/(AREAS.XLW)ESTIMATE.XLM!CopyPropValue |
| IVarray | =ContributionValue("APNDIFAG")/(AREAS.XLW)ESTIMATE.XLM!CopyPropValue |
| IVarray | =ContributionValue("APNDIFBA")/(AREAS.XLW)ESTIMATE.XLM!CopyPropValue |
| IVarray | =ContributionValue("APNDIFBE")/(AREAS.XLW)ESTIMATE.XLM!CopyPropValue |
| IVarray | =ContributionValue("APNDIFFP")/(AREAS.XLW)ESTIMATE.XLM!CopyPropValue |
| IVarray | =ContributionValue("APNDIFGA")/(AREAS.XLW)ESTIMATE.XLM!CopyPropValue |
| IVarray | =ContributionValue("APNDIFRM")/(AREAS.XLW)ESTIMATE.XLM!CopyPropValue |
| IVarray | =ContributionValue("APNDIFSQ")/(AREAS.XLW)ESTIMATE.XLM!CopyPropValue |
| IV | =SUM(IVarray) |
| | =SET.NAME("LocationV",TEXT(IV,"+0.00%;-0.00%")) |
| | =IF(IV<-0.04) |
| | =  SET.NAME("LocationC","Poor") |
| | =ELSE.IF(IV>0.04) |
| | =  SET.NAME("LocationC","Good") |
| | =ELSE() |
| | =  SET.NAME("LocationC","Average") |
| | =END.IF() |
| | =RETURN(TRUE) |

Square_Footage

| | |
|---|---|
| sF | =ContributionValue("SQ_FT_LA")/(AREAS.XLW)ESTIMATE.XLM!CopyPropValue |
| | =SET.NAME("Square_FootageV",TEXT(sF,"+0.00%;-0.00%")) |
| | =SET.NAME("Square_FootageC",TEXT((AREAS.XLW)REFDATA.XLS!ROOM_ABOVEGRAD |
| | =RETURN(TRUE) |

| | Room Count | |
|---|---|---|
| r_C | =ContributionValue("BA_NUM")/(AREAS.XLW)ESTIMATE.XLM!CopyPropValue | |
| r_C | =ContributionValue("BEDRMS_N")/(AREAS.XLW)ESTIMATE.XLM!CopyPropValue | |
| r_C | =ContributionValue("R_TOT_N")/(AREAS.XLW)ESTIMATE.XLM!CopyPropValue | |
| | =SET.NAME("Room_CountV",TEXT(SUM(r_C),"+0.00%;-0.00%")) | |
| | =SET.NAME("Beds","") | |
| | =SET.NAME("Baths","") | |
| | =SET.NAME("Rooms","") | |
| | =IF(ISNUMBER([AREAS.XLW]REFDATA.XLS!ROOM_ABOVEGRADE_BEDRMS)) | |
| | =  SET.NAME("Beds",TEXT([AREAS.XLW]REFDATA.XLS!ROOM_ABOVEGRADE_BEDR | |
| | =END.IF() | |
| | =IF(ISNUMBER([AREAS.XLW]REFDATA.XLS!ROOM_ABOVEGRADE_BATHS)) | |
| | =  SET.NAME("Baths",TEXT([AREAS.XLW]REFDATA.XLS!ROOM_ABOVEGRADE_BATH | |
| | =END.IF() | |
| | =IF(ISNUMBER([AREAS.XLW]REFDATA.XLS!ROOM_ABOVEGRADE_ROOMS)) | |
| | =  SET.NAME("Rooms",TEXT([AREAS.XLW]REFDATA.XLS!ROOM_ABOVEGRADE_ROO | |
| | =END.IF() | |
| | =SET.NAME("RoomReturn",Beds) | |
| | =IF(RoomReturn<>"",SET.NAME("RoomReturn",RoomReturn&" - "&Baths),SET.NAME("Ro | |
| | =IF(RoomReturn<>"",SET.NAME("RoomReturn",RoomReturn&" - "&Rooms),SET.NAME("R | |
| | =SET.NAME("Room_CountC",RoomReturn) | |
| | =RETURN(TRUE) | |

| | Quality | |
|---|---|---|
| qYarray | =ContributionValue("BA_FLMAT")/(AREAS.XLW)ESTIMATE.XLM!CopyPropValue | |
| qYarray | =ContributionValue("BA_WNMAT")/(AREAS.XLW)ESTIMATE.XLM!CopyPropValue | |
| qYarray | =ContributionValue("FLR_MAT")/(AREAS.XLW)ESTIMATE.XLM!CopyPropValue | |
| qY | =SUM(qYarray) | |
| | =SET.NAME("QualityV",TEXT(qY,"+0.00%;-0.00%")) | |
| | =IF(qY<-0.04) | |
| | =  SET.NAME("QualityC","Poor") | |
| | =ELSE.IF(qY>0.04) | |
| | =  SET.NAME("QualityC","Good") | |
| | =ELSE() | |
| | =  SET.NAME("QualityC","Average") | |
| | =END.IF() | |
| | =RETURN(TRUE) | |

| | Condition | |
|---|---|---|
| cNarray | =ContributionValue("BA_FLCND")/(AREAS.XLW)ESTIMATE.XLM!CopyPropValue | |
| cNarray | =ContributionValue("BA_WNCON")/(AREAS.XLW)ESTIMATE.XLM!CopyPropValue | |
| cNarray | =ContributionValue("P_COND")/(AREAS.XLW)ESTIMATE.XLM!CopyPropValue | |
| cN | =SUM(cNarray) | |
| | =SET.NAME("ConditionV",TEXT(cN,"+0.00%;-0.00%")) | |
| | =IF(cN<-0.04) | |
| | =  SET.NAME("ConditionC","Poor") | |
| | =ELSE.IF(cN>0.04) | |
| | =  SET.NAME("ConditionC","Good") | |
| | =ELSE() | |
| | =  SET.NAME("ConditionC","Average") | |
| | =END.IF() | |
| | =RETURN(TRUE) | |

| | Age | |
|---|---|---|
| aE | =ContributionValue("AGE")/(AREAS.XLW)ESTIMATE.XLM!CopyPropValue | |
| | =SET.NAME("AgeV",TEXT(aE,"+0.00%;-0.00%")) | |
| | =SET.NAME("AgeC",TEXT([AREAS.XLW]REFDATA.XLS!IMPR_GENDESC_AGE,"0")) | |
| | =RETURN(TRUE) | |

| | Economic Life | |
|---|---|---|
| eL | =ContributionValue("ECONLIFE")/(AREAS.XLW)ESTIMATE.XLM!CopyPropValue | |
| | =SET.NAME("Economic_LifeV",TEXT(eL,"+0.00%;-0.00%")) | |

|  | =SET.NAME("Economic_LifeC",TEXT((AREAS.XLW)REFDATA.XLS!INTR_IMPROV_ECONLIF |  |
|---|---|---|
|  | =RETURN(TRUE) |  |

Site_Improvements

| slarray | =ContributionValue("FND_INF")/(AREAS.XLW)ESTIMATE.XLM!CopyPropValue |
|---|---|
| slarray | =ContributionValue("FND_SETL")/(AREAS.XLW)ESTIMATE.XLM!CopyPropValue |
| slarray | =ContributionValue("MAN_HOME")/(AREAS.XLW)ESTIMATE.XLM!CopyPropValue |
| slarray | =ContributionValue("ROOFTYPE")/(AREAS.XLW)ESTIMATE.XLM!CopyPropValue |
| slarray | =ContributionValue("STRYSFDU")/(AREAS.XLW)ESTIMATE.XLM!CopyPropValue |
| slarray | =ContributionValue("STYLECOD")/(AREAS.XLW)ESTIMATE.XLM!CopyPropValue |
| slarray | =ContributionValue("WAL_EXTT")/(AREAS.XLW)ESTIMATE.XLM!CopyPropValue |
| slarray | =ContributionValue("IMP_TYPE")/(AREAS.XLW)ESTIMATE.XLM!CopyPropValue |
| sI | =SUM(slarray) |
|  |  |
|  | =SET.NAME("Site_ImprovementsV",TEXT(sI,"+0.00%;-0.00%")) |
|  |  |
|  | =IF(sI<-0.04) |
|  | =   SET.NAME("Site_ImprovementsC","Poor") |
|  | =ELSE.IF(sI>0.04) |
|  | =   SET.NAME("Site_ImprovementsC","Good") |
|  | =ELSE() |
|  | =   SET.NAME("Site_ImprovementsC","Average") |
|  | =END.IF() |
|  |  |
|  | =RETURN(TRUE) |

Site_Amenities

| sAarray | =ContributionValue("POOLTYPE")/(AREAS.XLW)ESTIMATE.XLM!CopyPropValue |
|---|---|
| sAarray | =ContributionValue("P_DOROPN")/(AREAS.XLW)ESTIMATE.XLM!CopyPropValue |
| sAarray | =ContributionValue("P_STRAGE")/(AREAS.XLW)ESTIMATE.XLM!CopyPropValue |
| sAarray | =ContributionValue("AIR_COND")/(AREAS.XLW)ESTIMATE.XLM!CopyPropValue |
| sA | =SUM(sAarray) |
|  |  |
|  | =SET.NAME("Site_AmenitiesV",TEXT(sA,"+0.00%;-0.00%")) |
|  |  |
|  | =IF(sA<-0.04) |
|  | =   SET.NAME("Site_AmenitiesC","Poor") |
|  | =ELSE.IF(sA>0.04) |
|  | =   SET.NAME("Site_AmenitiesC","Good") |
|  | =ELSE() |
|  | =   SET.NAME("Site_AmenitiesC","Average") |
|  | =END.IF() |
|  |  |
|  | =RETURN(TRUE) |

UpdateLoanToValue

|  | =ARGUMENT("NoMaxLTV",4) |
|---|---|
|  | =ARGUMENT("NoLoanReq",4) |
|  | =ARGUMENT("NoRange",4) |
|  | =ARGUMENT("Conforming",4) |
|  | =ACTIVATE("STATREV2.XLS") |
|  | =IF(NoMaxLTV) |
|  | =   ShowMaxLTVError() |
|  | =ELSE() |
|  | =   MoveMaxLTV() |
|  | =END.IF() |
|  | =IF(OR(norange,NoLoanReq)) |
|  | =   ShowPredictedLTVError(NoLoanReq,norange,conforming) |
|  | =ELSE() |
|  | =   MoveActualLTV() |
|  | =END.IF() |
|  | =IF(OR(NoMaxLTV,NoLoanReq,norange)) |
|  | =ELSE() |
|  | =   SizeLtvFill() |
|  | =END.IF() |
|  | =RETURN(TRUE) |

ShowMaxLTVError

|  | =MaxLTVBoxOnOff(WindowOff) |
|---|---|
|  | =ItemOnOff("STATREV2.XLS!MaxLTVError",WindowOn) |
|  | =RETURN() |

|  | MaxLTVBoxOnOff |  |
|---|---|---|
|  | =ARGUMENT("onoff",4)<br>=ItemOnOff("STATREV2.XLS!MaxLtvArrow",onoff)<br>=ItemOnOff("STATREV2.XLS!MaxLtvLabel",onoff)<br>=ItemOnOff("STATREV2.XLS!MaxLtvText",onoff)<br>=RETURN() |  |
|  | PredictedLTVBoxOnOff |  |
|  | =ARGUMENT("onoff",4)<br>=ItemOnOff("STATREV2.XLS!ActualLtvArrow",onoff)<br>=ItemOnOff("STATREV2.XLS!ActualLtvLabel",onoff)<br>=ItemOnOff("STATREV2.XLS!ActualLtvText",onoff)<br>=RETURN() |  |
|  | ShowPredictedLTVError |  |
|  | =ARGUMENT("noloanrequest",4)<br>=ARGUMENT("norange",4)<br>=ARGUMENT("conforming",4)<br>=PredictedLTVBoxOnOff(WindowOff)<br>=IF(norange)<br>=ELSE.IF(noloanrequest)<br>=  ItemOnOff("STATREV2.XLS!LoanRequestError",WindowOn)<br>=END.IF()<br>=RETURN() |  |
|  | MoveActualLTV |  |
| actualLtv<br>al.Org | =(AREAS.XLW)REFDATA.XLS!LOAN_AMT/(AREAS.XLW)ESTIMATE.XLM!CopyPropValue<br>=PercentsToLTVChart(100*actualLtv)<br>=SELECT('C:\AREAS\STATREV2.XLS'!ActualLtvArrow)<br>=FORMAT.MOVE(1.5,al.Org-8,'C:\AREAS\STATREV2.XLS'!ltvChartOrg)<br>=SELECT('C:\AREAS\STATREV2.XLS'!ActualLtvText)<br>=TEXT.BOX(TEXT(actualLtv,"0%"))<br>=FORMAT.MOVE(-55,al.Org,'C:\AREAS\STATREV2.XLS'!ltvChartOrg)<br>=SELECT('C:\AREAS\STATREV2.XLS'!ActualLtvLabel)<br>=FORMAT.MOVE(-55,al.Org-15,'C:\AREAS\STATREV2.XLS'!ltvChartOrg)<br>=SELECT('C:\AREAS\STATREV2.XLS'!ltvChartOrg)<br>=RETURN(TRUE) | move arrow<br><br>move text<br><br>move label |
|  | PercentsToLTVChart |  |
| ltvTick | =ARGUMENT("percents",1)<br>=100/ThermHeight<br>=SET.NAME("ltvPoints",MAX((100-percents)/ltvTick,0))<br>=RETURN(ltvPoints+9.97) |  |
|  | MoveMaxLTV |  |
| ml.Org | =PercentsToLTVChart(100*(AREAS.XLW)REFDATA.XLS!LTV)<br>=SELECT('C:\AREAS\STATREV2.XLS'!MaxLtvArrow)<br>=FORMAT.MOVE(50,ml.Org-8,'C:\AREAS\STATREV2.XLS'!ltvChartOrg)<br>=SELECT('C:\AREAS\STATREV2.XLS'!MaxLtvText)<br>=TEXT.BOX(TEXT((AREAS.XLW)REFDATA.XLS!LTV,"0%"))<br>=FORMAT.MOVE(60,ml.Org,'C:\AREAS\STATREV2.XLS'!ltvChartOrg)<br>=SELECT('C:\AREAS\STATREV2.XLS'!MaxLtvLabel)<br>=FORMAT.MOVE(60,ml.Org-15,'C:\AREAS\STATREV2.XLS'!ltvChartOrg)<br>=SELECT('C:\AREAS\STATREV2.XLS'!ltvChartOrg)<br>=RETURN(TRUE) | move arrow<br><br>move text<br><br>move label |
|  | SizeLtvFill |  |
| ltvLower<br>ltvUpper<br>ltvHeight | =SELECT('C:\AREAS\STATREV2.XLS'!ltvChartFill)<br>=PercentsToLTVChart(0)<br>=PercentsToLTVChart(100*(AREAS.XLW)REFDATA.XLS!LTV)<br>=ltvLower-ltvUpper<br>=FORMAT.SIZE(ltvHeight)<br>=FORMAT.MOVE(15,ltvUpper,'C:\AREAS\STATREV2.XLS'!ltvChartOrg)<br>=SELECT('C:\AREAS\STATREV2.XLS'!ltvChartOrg)<br>=RETURN(TRUE) |  |
|  | SummaryAndRecommendations |  |
| Cat24Trend<br>Cat6Trend | =ACTIVATE("STATREV2.XLS")<br>=Update24MonthTrend()<br>=Update6MonthTrend() |  |

| | | |
|---|---|---|
| CatConform<br>CatLtv | =UpdateConformity()<br>=UpdateLoanToValueSR()<br>=UpdateSRScreens(Cat6Trend,CatConform,CatLtv)<br>=RETURN(TRUE) | |
| | Update24MonthTrend | |
| | =SELECT("C:\AREAS\STATREV2.XLS!Trend24Text")<br>=TEXT.BOX(TrendString(lcl.Trend24,lcl.Rate24))<br>=RETURN(TrendCategory(lcl.Trend24)) | Returns code indicating type of trend<br>1 - stable or appreciating<br>2 - moderate depreciation<br>3 - steep depreciation |
| | TrendString | |
| | =ARGUMENT("TrendCode",1)<br>=ARGUMENT("TrendValue",1)<br>=IF(TrendCode=1)<br>= SET.NAME("trstr","Steep Appreciation (")<br>=ELSE.IF(TrendCode=2)<br>= SET.NAME("trstr","Moderate Appreciation (")<br>=ELSE.IF(TrendCode=3)<br>= SET.NAME("trstr","Stable (")<br>=ELSE.IF(TrendCode=4)<br>= SET.NAME("trstr","Moderate Depreciation (")<br>=ELSE()<br>= SET.NAME("trstr","Steep Depreciation (")<br>=END.IF()<br>=SET.NAME("trstr",trstr&TEXT(TrendValue,"+0.0%;-0.0%;0")&")")<br>=RETURN(trstr) | |
| | TrendCategory | |
| | =ARGUMENT("tcCode",1)<br>=IF(tcCode=5)<br>= SET.NAME("tc",3)<br>=ELSE.IF(tcCode=4)<br>= SET.NAME("tc",2)<br>=ELSE()<br>= SET.NAME("tc",1)<br>=END.IF()<br>=RETURN(tc) | |
| | Update6MonthTrend | |
| | =SELECT("C:\AREAS\STATREV2.XLS!Trend6Text")<br>=TEXT.BOX(TrendString(lcl.Trend6,lcl.Rate6))<br>=RETURN(TrendCategory(lcl.Trend6)) | |
| | UpdateConformity | |
| | =SELECT("C:\AREAS\STATREV2.XLS!ConformityText")<br>=IF(AND(ConformPPSF,ConformSP,ConformSF))<br>= TEXT.BOX("Conforming")<br>= SET.NAME("uc",1)<br>=ELSE()<br>= TEXT.BOX("Nonconforming")<br>= SET.NAME("uc",2)<br>=END.IF()<br>=RETURN(uc) | Returns code indicating type of conf<br>1 - conforming<br>2 - nonconforming |
| | UpdateLoanToValueSR | |
| ltvDiff | =SELECT("C:\AREAS\STATREV2.XLS!LoanToValueText")<br>=(AREAS.XLW)REFDATA.XLS!LTV-actualLtv<br>=IF(AND(ISBLANK((AREAS.XLW)REFDATA.XLS!LTV),ISBLANK((AREAS.XLW)REFDATA.XLS!L<br>= SET.NAME("lvs",5)<br>= TEXT.BOX("Cannot be calculated")<br>=ELSE.IF(ISBLANK((AREAS.XLW)REFDATA.XLS!LTV))<br>= SET.NAME("lvs",3)<br>= TEXT.BOX("Cannot be calculated")<br>=ELSE.IF(ISBLANK((AREAS.XLW)REFDATA.XLS!LOAN_AMT))<br>= SET.NAME("lvs",4)<br>= TEXT.BOX("Cannot be calculated")<br>=ELSE.IF((AREAS.XLW)INTRFACE.XLM!ErrorCode= 5)<br>= SET.NAME("lvs",6)<br>= TEXT.BOX("Cannot be calculated")<br>=ELSE.IF(ltvDiff>0) | Returns code indicating type of actua<br>1 - at or below maximum ltv<br>2 - exceeds maximum ltv<br>3 - Max LTV not entered<br>4 - Loan Request not entered<br>5- Max LTV & Loan Req not entered<br>6 - Range cannot be calculated |

```
=    TEXT.BOX("Below Maximum LTV by "&TEXT(ABS(ItvDiff),"0%"))
=    SET.NAME("lvs",1)
=ELSE.IF(ItvDiff=0)
=    TEXT.BOX("At Maximum LTV")
=    SET.NAME("lvs",1)
=ELSE()
=    TEXT.BOX("Exceeds Maximum LTV by "&TEXT(ABS(ItvDiff),"0%"))
=    SET.NAME("lvs",2)
=END.IF()
=RETURN(lvs)
```

UpdateSRScreens

```
=ARGUMENT("ct6",1)                          Recent Trend Category code
=ARGUMENT("ctc",1)                          conformity category code
=ARGUMENT("ctl",1)                          ltv category code
=InitScreens()
=IF(     AND(ctl=1,ctc=1,ct6=1))
=    Screen10+Proceed()
=ELSE.IF(AND(ctl=1,ctc=2,ct6=1))
=    Screen20+Caution()
=ELSE.IF(AND(ctl=1,ctc=1,ct6=2))
=    Screen30+Caution()
=ELSE.IF(AND(ctl=1,ctc=1,ct6=3))
=    Screen40+Caution()
=ELSE.IF(AND(ctl=1,ctc=2,ct6=2))
=    Screen50+Caution()
=ELSE.IF(AND(ctl=1,ctc=2,ct6=3))
=    Screen60+Caution()
=ELSE.IF(AND(ctl=2,ctc=1,ct6=1))
=    Screen70+Suspend()
=ELSE.IF(AND(ctl=2,ctc=2,ct6=1))
=    Screen80+Suspend()
=ELSE.IF(AND(ctl=2,ctc=1,ct6=2))
=    Screen90+Suspend()
=ELSE.IF(AND(ctl=2,ctc=1,ct6=3))
=    Screen100+Suspend()
=ELSE.IF(AND(ctl=2,ctc=2,ct6=2))
=    Screen110+Suspend()
=ELSE.IF(AND(ctl=2,ctc=2,ct6=3))
=    Screen120+Suspend()
=ELSE.IF(AND(ctl=3,ctc=1,ct6=1))
=    Screen130+Caution()
=ELSE.IF(AND(ctl=3,ctc=2,ct6=1))
=    Screen140+Caution()
=ELSE.IF(AND(ctl=3,ctc=1,ct6=2))
=    Screen150+Caution()
=ELSE.IF(AND(ctl=3,ctc=2,ct6=2))
=    Screen160+Caution()
=ELSE.IF(AND(ctl=3,ctc=1,ct6=3))
=    Screen170+Caution()
=ELSE.IF(AND(ctl=3,ctc=2,ct6=3))
=    Screen180+Caution()
=ELSE.IF(AND(ctl=4,ctc=1,ct6=1))
=    Screen190+Caution()
=ELSE.IF(AND(ctl=4,ctc=2,ct6=1))
=    Screen200+Caution()
=ELSE.IF(AND(ctl=4,ctc=1,ct6=2))
=    Screen210+Caution()
=ELSE.IF(AND(ctl=4,ctc=2,ct6=2))
=    Screen220+Caution()
=ELSE.IF(AND(ctl=4,ctc=1,ct6=3))
=    Screen230+Caution()
=ELSE.IF(AND(ctl=4,ctc=2,ct6=3))
=    Screen240+Caution()
=ELSE.IF(AND(ctl=6,ctc=2,ct6=1))
=    Screen250+Caution()
=ELSE.IF(AND(ctl=6,ctc=2,ct6=2))
=    Screen260+Caution()
=ELSE.IF(AND(ctl=6,ctc=2,ct6=3))
=    Screen270+Caution()
=ELSE.IF(AND(ctl=6,ctc=1,ct6=1))
=    Screen280+Caution()
=ELSE.IF(AND(ctl=6,ctc=1,ct6=2))
=    Screen290+Caution()
=ELSE.IF(AND(ctl=6,ctc=1,ct6=3))
=    Screen300+Caution()
=ELSE.IF(AND(ctl=5,ctc=1,ct6=1))
```

```
=   Screen310+Caution()
=ELSE.IF(AND(ctl=5,ctc=2,ct6=1))
=   Screen320+Caution()
=ELSE.IF(AND(ctl=5,ctc=1,ct6=2))
=   Screen330+Caution()
=ELSE.IF(AND(ctl=5,ctc=2,ct6=2))
=   Screen340+Caution()
=ELSE.IF(AND(ctl=5,ctc=1,ct6=3))
=   Screen350+Caution()
=ELSE.IF(AND(ctl=5,ctc=2,ct6=3))
=   Screen360+Caution()
=END.IF()
=RETURN(TRUE)
```

InitScreens

```
=FORMULA.GOTO('C:\AREAS\STATREV2.XLS'!SummBullets)
=CLEAR(3)
=FORMULA.GOTO('C:\AREAS\STATREV2.XLS'!SummText)
=CLEAR(3)
=FORMULA.GOTO('C:\AREAS\STATREV2.XLS'!RecBullets)
=CLEAR(3)
=FORMULA.GOTO('C:\AREAS\STATREV2.XLS'!RecText)
=CLEAR(3)
=RETURN(TRUE)
```

Screen1

```
=FORMULA.GOTO('C:\AREAS\STATREV2.XLS'!SummText)+SELECT(ACTIVE.CELL())
=LtvSummStr(SELECTION(),1)
=ConSummStr(SELECTION(),1)
=TrnSummStr(SELECTION(),1)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),1)
=UpdateBullets('C:\AREAS\STATREV2.XLS'!RecBullets,1)
=RETURN(TRUE)
```

Screen2

```
=FORMULA.GOTO('C:\AREAS\STATREV2.XLS'!SummText)+SELECT(ACTIVE.CELL())
=LtvSummStr(SELECTION(),1)
=ConSummStr(SELECTION(),2,"However, ")
=UpdateBullets('C:\AREAS\STATREV2.XLS'!SummBullets,2)
=FORMULA.GOTO('C:\AREAS\STATREV2.XLS'!RecText)+SELECT(ACTIVE.CELL())
=RecommendStr(SELECTION(),2)
=UpdateBullets('C:\AREAS\STATREV2.XLS'!RecBullets,1)
=RETURN(TRUE)
```

Screen3

```
=FORMULA.GOTO('C:\AREAS\STATREV2.XLS'!SummText)+SELECT(ACTIVE.CELL())
=LtvSummStr(SELECTION(),1)
=TrnSummStr(SELECTION(),2,"However, ")
=UpdateBullets('C:\AREAS\STATREV2.XLS'!SummBullets,2)
=FORMULA.GOTO('C:\AREAS\STATREV2.XLS'!RecText)+SELECT(ACTIVE.CELL())
=RecommendStr(SELECTION(),4)
=RecommendStr(SELECTION(),3)
=UpdateBullets('C:\AREAS\STATREV2.XLS'!RecBullets,2)
=RETURN(TRUE)
```

Screen4

```
=FORMULA.GOTO('C:\AREAS\STATREV2.XLS'!SummText)+SELECT(ACTIVE.CELL())
=LtvSummStr(SELECTION(),1)
=TrnSummStr(SELECTION(),3,"However, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),5)
=RecommendStr(SELECTION(),3)
=UpdateBullets('C:\AREAS\STATREV2.XLS'!RecBullets,2)
=RETURN(TRUE)
```

Screen5

```
=FORMULA.GOTO('C:\AREAS\STATREV2.XLS'!SummText)+SELECT(ACTIVE.CELL())
=LtvSummStr(SELECTION(),1)
```

151  152

```
=ConSummStr(SELECTION(),2,"However, ")
=TmSummStr(SELECTION(),2,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),2)
=RecommendStr(SELECTION(),4)
=RecommendStr(SELECTION(),3)
=UpdateBullets('C:\AREAS\STATREV2.XLS'!RecBullets,3)
=RETURN(TRUE)
```

Screen6
```
=FORMULA.GOTO('C:\AREAS\STATREV2.XLS'!SummText)+SELECT(ACTIVE.CELL())
=LtvSummStr(SELECTION(),1)
=ConSummStr(SELECTION(),2,"However, ")
=TmSummStr(SELECTION(),3,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),2)
=RecommendStr(SELECTION(),5)
=RecommendStr(SELECTION(),3)
=UpdateBullets('C:\AREAS\STATREV2.XLS'!RecBullets,3)
=RETURN(TRUE)
```

Screen7
```
=FORMULA.GOTO('C:\AREAS\STATREV2.XLS'!SummText)+SELECT(ACTIVE.CELL())
=LtvSummStr(SELECTION(),2)
=UpdateBullets('C:\AREAS\STATREV2.XLS'!SummBullets,1)
=FORMULA.GOTO('C:\AREAS\STATREV2.XLS'!RecText)+SELECT(ACTIVE.CELL())
=RecommendStr(SELECTION(),6)
=UpdateBullets('C:\AREAS\STATREV2.XLS'!RecBullets,1)
=RETURN(TRUE)
```

Screen8
```
=FORMULA.GOTO('C:\AREAS\STATREV2.XLS'!SummText)+SELECT(ACTIVE.CELL())
=LtvSummStr(SELECTION(),2)
=ConSummStr(SELECTION(),2,"And, ")
=UpdateBullets('C:\AREAS\STATREV2.XLS'!SummBullets,2)
=FORMULA.GOTO('C:\AREAS\STATREV2.XLS'!RecText)+SELECT(ACTIVE.CELL())
=RecommendStr(SELECTION(),6)
=RecommendStr(SELECTION(),2)
=UpdateBullets('C:\AREAS\STATREV2.XLS'!RecBullets,2)
=RETURN(TRUE)
```

Screen9
```
=FORMULA.GOTO('C:\AREAS\STATREV2.XLS'!SummText)+SELECT(ACTIVE.CELL())
=LtvSummStr(SELECTION(),2)
=TmSummStr(SELECTION(),2,"And, ")
=UpdateBullets('C:\AREAS\STATREV2.XLS'!SummBullets,2)
=FORMULA.GOTO('C:\AREAS\STATREV2.XLS'!RecText)+SELECT(ACTIVE.CELL())
=RecommendStr(SELECTION(),6)
=RecommendStr(SELECTION(),4)
=RecommendStr(SELECTION(),3)
=UpdateBullets('C:\AREAS\STATREV2.XLS'!RecBullets,3)
=RETURN(TRUE)
```

Screen10
```
=FORMULA.GOTO('C:\AREAS\STATREV2.XLS'!SummText)+SELECT(ACTIVE.CELL())
=LtvSummStr(SELECTION(),2)
=TmSummStr(SELECTION(),3,"And, ")
=UpdateBullets('C:\AREAS\STATREV2.XLS'!SummBullets,2)
=FORMULA.GOTO('C:\AREAS\STATREV2.XLS'!RecText)+SELECT(ACTIVE.CELL())
=RecommendStr(SELECTION(),6)
=RecommendStr(SELECTION(),5)
=RecommendStr(SELECTION(),3)
=UpdateBullets('C:\AREAS\STATREV2.XLS'!RecBullets,3)
=RETURN(TRUE)
```

Screen11
```
=FORMULA.GOTO('C:\AREAS\STATREV2.XLS'!SummText)+SELECT(ACTIVE.CELL())
=LtvSummStr(SELECTION(),2)
=ConSummStr(SELECTION(),2,"And, ")
=TmSummStr(SELECTION(),2,"And, ")
```

```
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),6)
=RecommendStr(SELECTION(),2)
=RecommendStr(SELECTION(),4)
=RecommendStr(SELECTION(),3)
=UpdateBullets("C:\AREAS\STATREV2.XLS'!RecBullets,4)
=RETURN(TRUE)
```

Screen12

```
=FORMULA.GOTO("C:\AREAS\STATREV2.XLS'!SummText)+SELECT(ACTIVE.CELL())
=LtvSummStr(SELECTION(),2)
=ConSummStr(SELECTION(),2,"And, ")
=TrnSummStr(SELECTION(),3,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),6)
=RecommendStr(SELECTION(),2)
=RecommendStr(SELECTION(),5)
=RecommendStr(SELECTION(),3)
=UpdateBullets("C:\AREAS\STATREV2.XLS'!RecBullets,4)
=RETURN(TRUE)
```

Screen13

```
=FORMULA.GOTO("C:\AREAS\STATREV2.XLS'!SummText)+SELECT(ACTIVE.CELL())
=LtvSummStr(SELECTION(),3)
=ConSummStr(SELECTION(),1)
=TrnSummStr(SELECTION(),1,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=UpdateBullets("C:\AREAS\STATREV2.XLS'!RecBullets,1)
=RETURN(TRUE)
```

Screen14

```
=FORMULA.GOTO("C:\AREAS\STATREV2.XLS'!SummText)+SELECT(ACTIVE.CELL())
=LtvSummStr(SELECTION(),3)
=ConSummStr(SELECTION(),2)
=TrnSummStr(SELECTION(),1,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=RecommendStr(SELECTION(),2)
=UpdateBullets("C:\AREAS\STATREV2.XLS'!RecBullets,2)
=RETURN(TRUE)
```

Screen15

```
=FORMULA.GOTO("C:\AREAS\STATREV2.XLS'!SummText)+SELECT(ACTIVE.CELL())
=LtvSummStr(SELECTION(),3)
=ConSummStr(SELECTION(),1)
=TrnSummStr(SELECTION(),2,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=UpdateBullets("C:\AREAS\STATREV2.XLS'!RecBullets,1)
=RETURN(TRUE)
```

Screen16

```
=FORMULA.GOTO("C:\AREAS\STATREV2.XLS'!SummText)+SELECT(ACTIVE.CELL())
=LtvSummStr(SELECTION(),3)
=ConSummStr(SELECTION(),2)
=TrnSummStr(SELECTION(),2,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=RecommendStr(SELECTION(),2)
=UpdateBullets("C:\AREAS\STATREV2.XLS'!RecBullets,2)
=RETURN(TRUE)
```

Screen17

```
=FORMULA.GOTO("C:\AREAS\STATREV2.XLS'!SummText)+SELECT(ACTIVE.CELL())
=LtvSummStr(SELECTION(),3)
```

```
=ConSummStr(SELECTION(),1)
=TrnSummStr(SELECTION(),3,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),5)
=UpdateBullets('C:\AREAS\STATREV2.XLS'!RecBullets,2)
=RETURN(TRUE)
```

Screen18

```
=FORMULA.GOTO('C:\AREAS\STATREV2.XLS'!SummText)+SELECT(ACTIVE.CELL())
=LtvSummStr(SELECTION(),3)
=ConSummStr(SELECTION(),2)
=TrnSummStr(SELECTION(),3,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),5)
=RecommendStr(SELECTION(),2)
=UpdateBullets('C:\AREAS\STATREV2.XLS'!RecBullets,3)
=RETURN(TRUE)
```

Screen19

```
=FORMULA.GOTO('C:\AREAS\STATREV2.XLS'!SummText)+SELECT(ACTIVE.CELL())
=LtvSummStr(SELECTION(),4)
=ConSummStr(SELECTION(),1)
=TrnSummStr(SELECTION(),1,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=UpdateBullets('C:\AREAS\STATREV2.XLS'!RecBullets,1)
=RETURN(TRUE)
```

Screen20

```
=FORMULA.GOTO('C:\AREAS\STATREV2.XLS'!SummText)+SELECT(ACTIVE.CELL())
=LtvSummStr(SELECTION(),4)
=ConSummStr(SELECTION(),2)
=TrnSummStr(SELECTION(),1,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),2)
=UpdateBullets('C:\AREAS\STATREV2.XLS'!RecBullets,2)
=RETURN(TRUE)
```

Screen21

```
=FORMULA.GOTO('C:\AREAS\STATREV2.XLS'!SummText)+SELECT(ACTIVE.CELL())
=LtvSummStr(SELECTION(),4)
=ConSummStr(SELECTION(),1)
=TrnSummStr(SELECTION(),2,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=UpdateBullets('C:\AREAS\STATREV2.XLS'!RecBullets,1)
=RETURN(TRUE)
```

Screen22

```
=FORMULA.GOTO('C:\AREAS\STATREV2.XLS'!SummText)+SELECT(ACTIVE.CELL())
=LtvSummStr(SELECTION(),4)
=ConSummStr(SELECTION(),2)
=TrnSummStr(SELECTION(),2,"And, ")
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),2)
=UpdateBullets('C:\AREAS\STATREV2.XLS'!RecBullets,2)
=RETURN(TRUE)
```

Screen23

```
=FORMULA.GOTO('C:\AREAS\STATREV2.XLS'!SummText)+SELECT(ACTIVE.CELL())
=LtvSummStr(SELECTION(),4)
```

```
=ConSummStr(SELECTION(),1)
=TmSummStr(SELECTION(),3,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=RecommendStr(SELECTION(),5)
=UpdateBullets("C:\AREAS\STATREV2.XLS'!RecBullets,2)
=RETURN(TRUE)
```

Screen24

```
=FORMULA.GOTO("C:\AREAS\STATREV2.XLS'!SummText)+SELECT(ACTIVE.CELL())
=LtvSummStr(SELECTION(),4)
=ConSummStr(SELECTION(),2)
=TmSummStr(SELECTION(),3,"And, ")
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),7)
=RecommendStr(SELECTION(),5)
=RecommendStr(SELECTION(),2)
=UpdateBullets("C:\AREAS\STATREV2.XLS'!RecBullets,3)
=RETURN(TRUE)
```

Screen25

```
=FORMULA.GOTO("C:\AREAS\STATREV2.XLS'!SummText)+SELECT(ACTIVE.CELL())
=LtvSummStr(SELECTION(),6)
=ConSummStr(SELECTION(),2)
=TmSummStr(SELECTION(),1)
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),8)
=RecommendStr(SELECTION(),2)
=UpdateBullets("C:\AREAS\STATREV2.XLS'!RecBullets,2)
=RETURN(TRUE)
```

Screen26

```
=FORMULA.GOTO("C:\AREAS\STATREV2.XLS'!SummText)+SELECT(ACTIVE.CELL())
=LtvSummStr(SELECTION(),6)
=ConSummStr(SELECTION(),2)
=TmSummStr(SELECTION(),2)
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),8)
=RecommendStr(SELECTION(),2)
=UpdateBullets("C:\AREAS\STATREV2.XLS'!RecBullets,2)
=RETURN(TRUE)
```

Screen27

```
=FORMULA.GOTO("C:\AREAS\STATREV2.XLS'!SummText)+SELECT(ACTIVE.CELL())
=LtvSummStr(SELECTION(),6)
=ConSummStr(SELECTION(),2,)
=TmSummStr(SELECTION(),3)
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),8)
=RecommendStr(SELECTION(),2)
=RecommendStr(SELECTION(),5)
=UpdateBullets("C:\AREAS\STATREV2.XLS'!RecBullets,3)
=RETURN(TRUE)
```

Screen28

```
=FORMULA.GOTO("C:\AREAS\STATREV2.XLS'!SummText)+SELECT(ACTIVE.CELL())
=LtvSummStr(SELECTION(),7)
=ConSummStr(SELECTION(),1)
=TmSummStr(SELECTION(),1)
=UpdateBullets("C:\AREAS\STATREV2.XLS'!SummBullets,3)
=FORMULA.GOTO("C:\AREAS\STATREV2.XLS'!RecText)+SELECT(ACTIVE.CELL())
=RecommendStr(SELECTION(),8)
=UpdateBullets("C:\AREAS\STATREV2.XLS'!RecBullets,1)
=RETURN(TRUE)
```

Screen29

```
=FORMULA.GOTO("C:\AREAS\STATREV2.XLS'!SummText)+SELECT(ACTIVE.CELL())
=LtvSummStr(SELECTION(),7)
```

```
=ConSummStr(SELECTION(),1)
=TmSummStr(SELECTION(),2)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),8)
=RecommendStr(SELECTION(),4)
=UpdateBullets('C:\AREAS\STATREV2.XLS'!RecBullets,2)
=RETURN(TRUE)
```

Screen30

```
=FORMULA.GOTO('C:\AREAS\STATREV2.XLS'!SummText)+SELECT(ACTIVE.CELL())
=LtvSummStr(SELECTION(),7)
=ConSummStr(SELECTION(),1)
=TmSummStr(SELECTION(),3)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),8)
=RecommendStr(SELECTION(),5)
=UpdateBullets('C:\AREAS\STATREV2.XLS'!RecBullets,2)
=RETURN(TRUE)
```

Screen31

```
=FORMULA.GOTO('C:\AREAS\STATREV2.XLS'!SummText)+SELECT(ACTIVE.CELL())
=LtvSummStr(SELECTION(),5)
=ConSummStr(SELECTION(),1)
=TmSummStr(SELECTION(),1)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=UpdateBullets('C:\AREAS\STATREV2.XLS'!RecBullets,1)
=RETURN(TRUE)
```

Screen32

```
=FORMULA.GOTO('C:\AREAS\STATREV2.XLS'!SummText)+SELECT(ACTIVE.CELL())
=LtvSummStr(SELECTION(),5)
=ConSummStr(SELECTION(),2)
=TmSummStr(SELECTION(),1)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),2)
=UpdateBullets('C:\AREAS\STATREV2.XLS'!RecBullets,2)
=RETURN(TRUE)
```

Screen33

```
=FORMULA.GOTO('C:\AREAS\STATREV2.XLS'!SummText)+SELECT(ACTIVE.CELL())
=LtvSummStr(SELECTION(),5)
=ConSummStr(SELECTION(),1)
=TmSummStr(SELECTION(),2)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),4)
=UpdateBullets('C:\AREAS\STATREV2.XLS'!RecBullets,2)
=RETURN(TRUE)
```

Screen34

```
=FORMULA.GOTO('C:\AREAS\STATREV2.XLS'!SummText)+SELECT(ACTIVE.CELL())
=LtvSummStr(SELECTION(),5)
=ConSummStr(SELECTION(),2)
=TmSummStr(SELECTION(),2)
=UpdateBullets('C:\AREAS\STATREV2.XLS'!SummBullets,3)
=FORMULA.GOTO('C:\AREAS\STATREV2.XLS'!RecText)+SELECT(ACTIVE.CELL())
=RecommendStr(SELECTION(),7)
=RecommendStr(SELECTION(),2)
=UpdateBullets('C:\AREAS\STATREV2.XLS'!RecBullets,2)
=RETURN(TRUE)
```

Screen35

```
=FORMULA.GOTO('C:\AREAS\STATREV2.XLS'!SummText)+SELECT(ACTIVE.CELL())
=LtvSummStr(SELECTION(),5)
=ConSummStr(SELECTION(),1)
```

|   |   |   |
|---|---|---|
|   | =TmSummStr(SELECTION(),3)<br>=UpdateBullets('C:\AREAS\STATREV2.XLS'!SummBullets,3)<br>=FORMULA.GOTO('C:\AREAS\STATREV2.XLS'!RecText)+SELECT(ACTIVE.CELL())<br>=RecommendStr(SELECTION(),7)<br>=RecommendStr(SELECTION(),5)<br>=UpdateBullets('C:\AREAS\STATREV2.XLS'!RecBullets,2)<br>=RETURN(TRUE) |   |
|   | Screen36 |   |
|   | =FORMULA.GOTO('C:\AREAS\STATREV2.XLS'!SummText)+SELECT(ACTIVE.CELL())<br>=LtvSummStr(SELECTION(),5)<br>=ConSummStr(SELECTION(),2)<br>=TmSummStr(SELECTION(),3)<br>=UpdateBullets('C:\AREAS\STATREV2.XLS'!SummBullets,3)<br>=FORMULA.GOTO('C:\AREAS\STATREV2.XLS'!RecText)+SELECT(ACTIVE.CELL())<br>=RecommendStr(SELECTION(),7)<br>=RecommendStr(SELECTION(),5)<br>=RecommendStr(SELECTION(),2)<br>=UpdateBullets('C:\AREAS\STATREV2.XLS'!RecBullets,3)<br>=RETURN(TRUE) |   |
|   | Proceed |   |
| procIndex<br>procX<br>procY | =ACTIVATE("STATREV2.XLS")+SELECT('C:\AREAS\STATREV2.XLS'!ProceedText)<br>=GET.OBJECT(4)<br>=GET.OBJECT(5)<br>=GET.OBJECT(6)<br>=SELECT('C:\AREAS\STATREV2.XLS'!RecommendArrow)<br>=FORMAT.MOVE(DEREF(procX)-20,DEREF(procY)+5,DEREF(procIndex))<br>=RETURN(TRUE) |   |
|   | Caution |   |
| cautIndex<br>cautX<br>cautY | =ACTIVATE("STATREV2.XLS")+SELECT('C:\AREAS\STATREV2.XLS'!CautionText)<br>=GET.OBJECT(4)<br>=GET.OBJECT(5)<br>=GET.OBJECT(6)<br>=SELECT('C:\AREAS\STATREV2.XLS'!RecommendArrow)<br>=FORMAT.MOVE(DEREF(cautX)-20,DEREF(cautY)+5,DEREF(cautIndex))<br>=RETURN(TRUE) |   |
|   | Suspend |   |
| suspIndex<br>suspX<br>suspY | =ACTIVATE("STATREV2.XLS")+SELECT('C:\AREAS\STATREV2.XLS'!SuspendText)<br>=GET.OBJECT(4)<br>=GET.OBJECT(5)<br>=GET.OBJECT(6)<br>=SELECT('C:\AREAS\STATREV2.XLS'!RecommendArrow)<br>=FORMAT.MOVE(DEREF(suspX)-20,DEREF(suspY)+5,DEREF(suspIndex))<br>=RETURN(TRUE) |   |
|   | UpdateBullets |   |
| ubColumn<br>ubStartRow<br>ubEndRow | =ARGUMENT("ubArea",8)<br>=ARGUMENT("ubNumBulls",2)<br>=FORMULA.GOTO(ubArea)<br>="C"&COLUMN(ACTIVE.CELL())<br>="R"&ROW(ACTIVE.CELL())<br>="R"&(ROW(ACTIVE.CELL())+ubNumBulls-1)<br>=SELECT(ubStartRow&ubColumn&":"&ubEndRow&ubColumn)<br>=FORMULA.FILL("•")<br>=RETURN(TRUE) |   |
|   | LtvSummStr |   |
|   | =ARGUMENT("ltvssLoc",8)<br>=ARGUMENT("ltvssId",1)<br>=ARGUMENT("ltvssPrefix",2)<br>=SET.NAME("ltvssStr",DEREF(OFFSET(ltvStatics,ltvssId-1,0,1,1)))<br>=IF(ISNA(ltvssPrefix))<br>=   SET.NAME("ltvssPrefix","")<br>=   SET.NAME("ltvssStr",UPPER(MID(ltvssStr,1,1))&MID(ltvssStr,2,LEN(ltvssStr)))<br>=END.IF()<br>=FORMULA(ltvssPrefix<vssStr,ltvssLoc)<br>=SELECT(OFFSET(SELECTION(),1,0))<br>=RETURN(TRUE) | select next cell |

| ConSummStr | |
|---|---|
| =ARGUMENT("conssLoc",8)<br>=ARGUMENT("conssId",1)<br>=ARGUMENT("conssPrefix",2)<br>=SET.NAME("conssStr",DEREF(OFFSET(conStatics,conssId-1,0,1,1)))<br>=IF(ISNA(conssPrefix))<br>=   SET.NAME("conssPrefix","")<br>=   SET.NAME("conssStr",UPPER(MID(conssStr,1,1))&MID(conssStr,2,LEN(conssStr)))<br>=END.IF()<br>=IF(conssId=2)<br>=   SET.NAME("conssStr",SUBSTITUTE(conssStr,"%1%",ConReasonStr()))<br>=END.IF()<br>=FORMULA(conssPrefix&conssStr,conssLoc)<br>=SELECT(OFFSET(SELECTION(),1,0))<br>=RETURN(TRUE) | *select next cell* |

| TrnSummStr | |
|---|---|
| =ARGUMENT("trnssLoc",8)<br>=ARGUMENT("trnssId",1)<br>=ARGUMENT("trnssPrefix",2)<br>=SET.NAME("trnssStr",DEREF(OFFSET(trnStatics,trnssId-1,0,1,1)))<br>=IF(ISNA(trnssPrefix))<br>=   SET.NAME("trnssPrefix","")<br>=   SET.NAME("trnssStr",UPPER(MID(trnssStr,1,1))&MID(trnssStr,2,LEN(trnssStr)))<br>=END.IF()<br>=FORMULA(trnssPrefix&trnssStr,trnssLoc)<br>=SELECT(OFFSET(SELECTION(),1,0))<br>=RETURN(TRUE) | *select next cell* |

| ConReasonStr | |
|---|---|
| =SET.NAME("crsStr","")<br>=SET.NAME("crsStr1","")<br>=SET.NAME("crsStr2","")<br>=SET.NAME("crsStr3","")<br>=SET.NAME("crsCnt",0)<br>=IF(ConformSP=FALSE)<br>=   SET.NAME("crsCnt",crsCnt+1)+SET.NAME("crsStr"&crsCnt,"sales price")<br>=END.IF()<br>=IF(ConformSF=FALSE)<br>=   SET.NAME("crsCnt",crsCnt+1)+SET.NAME("crsStr"&crsCnt,"sq. ft.")<br>=END.IF()<br>=IF(ConformPPSF=FALSE)<br>=   SET.NAME("crsCnt",crsCnt+1)+SET.NAME("crsStr"&crsCnt,"price/sq. ft.")<br>=END.IF()<br>=IF(crsCnt=1)<br>=   SET.NAME("crsStr",crsStr1)<br>=ELSE.IF(crsCnt=2)<br>=   SET.NAME("crsStr",crsStr1&" and "&crsStr2)<br>=ELSE.IF(crsCnt=3)<br>=   SET.NAME("crsStr",crsStr1&", "&crsStr2&", and "&crsStr3)<br>=END.IF()<br>=RETURN(crsStr) | |

| RecommendStr | |
|---|---|
| =ARGUMENT("rsLoc",8)<br>=ARGUMENT("rsId",1)<br>=SET.NAME("rsStr",DEREF(OFFSET(RecommendStatics,rsId-1,0,1,1)))<br>=IF(rsId=2)<br>=   SET.NAME("rsStr",SUBSTITUTE(rsStr,"%1%",ConReasonStr()))<br>=ELSE.IF(rsId=3)<br>=   SET.NAME("rsStr",SUBSTITUTE(rsStr,"%1%",MaxLtvStr()))<br>=   SET.NAME("rsStr",SUBSTITUTE(rsStr,"%2%",TEXT(lcl.Rate6,"+0.0%;-0.0%;0")))<br>=ELSE.IF(rsId=6)<br>=   IF(OR((AREAS.XLW)REFDATA.XLS!LTV=0,ISBLANK((AREAS.XLW)REFDATA.XLS!LTV)))<br>=      SET.NAME("rsStr","Confirm minimum value or loan amount for subject")<br>=   ELSE()<br>=      SET.NAME("rsStr",SUBSTITUTE(rsStr,"%1%",TEXT((AREAS.XLW)REFDATA.XLS!LOAN_AMT,<br>=      SET.NAME("rsStr",SUBSTITUTE(rsStr,"%2%",TEXT((AREAS.XLW)ESTIMATE.XLM!CopyProp<br>=   END.IF()<br>=END.IF()<br>=FORMULA(rsStr,rsLoc)<br>=SELECT(OFFSET(SELECTION(),1,0))<br>=RETURN(TRUE) | *select next cell* |

| MaxLtvStr |
|---|
| =SET.NAME("mlStr","") |
| =IF((AREAS.XLW)REFDATA.XLS!LTV=actualLtv) |
| =  SET.NAME("mlStr","at") |
| =ELSE.IF((AREAS.XLW)REFDATA.XLS!LTV<actualLtv) |
| =  SET.NAME("mlStr",TEXT(ABS(ltvDiff),"0%")&" above") |
| =ELSE() |
| =  SET.NAME("mlStr",TEXT(ABS(ltvDiff),"0%")&" below") |
| =END.IF() |
| =RETURN(mlStr) |

```c
/***********************************************************************\
*                                                                       *
*       cfgutil.c                                                       *
*                                                                       *
*       @(#)cfgutil.c  1.21    9/5/91                                   *
\***********************************************************************/
#include <stdio.h>
#ifndef MSC51
#define MSC51
#endif
#ifdef MSC51
#include <stdlib.h>
#include <dos.h>
include <float.h> define NEWLINE_SIZE 2      /* dos newline character sequence */
define RESIDUAL 0          /* residual byte count at EOF */
else define NEWLINE_SIZE 1      /* UNIX newline character sequence size */
define RESIDUAL 0          /* residual byte count at end of file */
endif include <math.h>
include <string.h>
#include <ctype.h>
#include "exuisl.h"

#include "cfgutil.h"
include <toolbox.h> define MISSING_VALUE 1.0e+37
define FUNCNAME      ((LPSTR) "UTILITIES")

#define malloc Malloc
#define free Free
#define sscanf StrScanf
define fgets FileGets define DEBUG 0
define SHOW_LINES 0

LPVOID Malloc(long);

VOID Free(LPVOID);

int   bAddMissing;   //Boolean if true add missing symbol node to all groups.
char *ScaleList[]    = { "MANUAL",    //Scale Mode
                         "AUTO",
                         "ALL_MANUAL",
                         "ALL_AUTO",
                         NULL
                       };
char *FnList[]       = { "LOG",       //Scale Function
                         "LIN",
                         "Z",    /* scale by mean and standard deviation */
                         "NONE",
                         "ALL_LOG",
                         "ALL_LIN",
                         "ALL_Z",
                         "ALL_NONE",
                         NULL
                       };
char *TypeList[]     = { "BINARY",    //Logical Representation
                         "CONTINUOUS",
                         "GROUP",
                         "EXCLUDE",
                         "ID",
                         NULL
                       };
char *InOutList[]    = { "INPUT",     //Logical Slab
                         "TARGET",
                         "NONE",
                         NULL
```

```c
char *SymbList[]    = { "NUMERIC",   //logical type
                        "SYMBOLIC",
                        NULL
                      };
```

```
/******************************************************************\
 *                                                                  *
\******************************************************************/
char            string[80];
tCnt            FieldCnt = 0L;
```

```
/******************************************************************\
 *                                                                  *
 *      MatchScale                                                  *
 *                                                                  *
\******************************************************************/
int MatchScale(Scale)
char *  Scale;
{
        int     i;

for (i=0;ScaleList[i]!=NULL;i++) {
            if (!lstrcmpi((LPSTR)ScaleList[i],(LPSTR)Scale))
                return(i);
        }
        if ( !lstrcmpi((LPSTR)FnList[i],(LPSTR)"ALL") ) return(0);
        wsprintf( string,"Unknown Scale: %s",Scale);
        MessageBox(NULL, string, FUNCNAME, EXMB_ERR);
        return(0);
}
/******************************************************************\
 *                                                                  *
 *      MatchType - match logical type and return ordinal value.    *
 *                                                                  *
\******************************************************************/
int MatchType( Type )
char *  Type;
{
        int     i;

for (i = 0;TypeList[i] != NULL;i++) {
            if (!lstrcmpi((LPSTR)TypeList[i],(LPSTR)Type))
                    return(i);
        }
        wsprintf( string, "Unknown Type: %s", Type );
        MessageBox(NULL, string, FUNCNAME, EXMB_ERR);
}
/******************************************************************\
 *                                                                  *
 *      MatchSymbolic                                               *
 *      Match representation string and return ordinal.             *
\******************************************************************/
int MatchSymbolic(Symbolic)
char *  Symbolic;
{
        int     i;

for (i = 0; SymbList[i] != NULL; i++) {
            if ( !lstrcmpi((LPSTR)SymbList[i], (LPSTR)Symbolic) )
                return(i);
        }
        wsprintf(string, "Unknown Variable Class: %s", Symbolic);
        MessageBox(NULL, string, FUNCNAME, EXMB_ERR);
}
/******************************************************************\
 *                                                                  *
 *      MatchSlab                                                   *
 *      Match Slab string and return ordinal.                       *
\******************************************************************/
int MatchSlab(Slab)
char *  Slab;
{
        int     i;
        StrTrim(Slab);
        for (i = 0; InOutList[i] != NULL; i++) {
            if ( !lstrcmpi((LPSTR)InOutList[i], (LPSTR)Slab) )
                return(i);
        }
        wsprintf(string, "Unknown Slab Class: %s", Slab);
        MessageBox(NULL, string, FUNCNAME, EXMB_ERR);
}
/******************************************************************\
 *                                                                  *
 *      MatchFn                                                     *
 *      Match Scale function string and return ordinal.             *
\******************************************************************/
int MatchFn(Fn)
char *  Fn;
{
```

```
        int     i;

for (i = 0;FnList[i] != NULL;i++)
            if ( !lstrcmpi((LPSTR)FnList[i],(LPSTR)Fn) ) return(i);
        if ( !lstrcmpi((LPSTR)FnList[i],(LPSTR)"ALL") ) return(0);
        wsprintf( string, "Unknown Function Type: %s",Fn);
        MessageBox(NULL, string, FUNCNAME, EXMB_ERR);
        return(0);
}

/****************************************************************\
*                                                                *
*       free_linked_list - free the linked list used for symbolic I/O  *
*       of the source file.                                      *
*                                                                *
\****************************************************************/
void free_linked_list( pRec )
tpRecord        pRec;
{
        tpField         pField;
        tpField         pNext;

if (pRec != NULL) {
        pField = pRec->pField;

while( pField != NULL ) {
            pNext = pField->Next;
            free( pField );     /* free this node */
            pField = pNext;
        }
        free( pRec );           /* free the root  */
        pRec = NULL;
    }
}
/****************************************************************\
*                                                                *
*       FindField                                                *
*       Searches the pRec chain for a tField with the same name as Name.  *
*       Arguments:                                               *
*         pRec - Header to tField chain.                         *
*         Name - Name of tField to find.                         *
*       Return:                                                  *
*         Pointer to tField.                                     *
\****************************************************************/
tpField FindField(pRec,Name)
tpRecord        pRec;
LPSTR           Name;
{
        tpField         pField;

pField = pRec->pField;
        while (pField != NULL) {
            if ( !lstrcmpi((LPSTR)pField->Name,(LPSTR)Name) ) return(pField);
            pField = pField->Next;
        }
        wsprintf((LPSTR) string, "Can't find field: %s", Name);
        MessageBox(NULL, string, FUNCNAME, EXMB_ERR);
}
/****************************************************************\
*                                                                *
*       FindFieldByIdKnet                                        *
*       Searches the pRec chain for a tField with the given KnetId.  *
*       Arguments:                                               *
*         pRec - Header to tField chain.                         *
*         Id - The KnetId value to match.                        *
*       Return:                                                  *
*         Pointer to tField.                                     *
*       Notes:                                                   *
*         Traverses the list via the KnetNext pointer.           *
\****************************************************************/
tpField FindFieldByIdKnet(pRec,Id)
tpRecord        pRec;
int             Id;
{
        tpField         pField;

pField = pRec->pField;
        while (pField != NULL) {
            if (pField->Id == Id)  return(pField);
            pField = pField->Next;
        }
        return(NULL);
}
/****************************************************************\
*                                                                *
*       FindFieldById                                            *
*       Searches the pRec chain for a tField with the given Id.  *
*       Arguments:                                               *
*         pRec - Header to tField chain.                         *
*         Id - The Id value to match.                            *
```

```
*       Return:                                                          *
*           Pointer to tField.                                           *
*       Notes:                                                           *
*           Traverses the list via the Next pointer.                     *
\***********************************************************************/
tpField    FindFieldById(pRec,Id)
tpRecord        pRec;
int             Id;
{
        tpField         pField;

pField = pRec->pField;
        while (pField != NULL) {
            if (pField->Id == Id)   return(pField);
            pField = pField->Next;
        }
//      wsprintf((LPSTR) string, "Can't find field: %d", Id);
//          duMessage((LPSTR) string);
        return(NULL);
}

/***********************************************************************\
*                                                                         *
*       check - used for fscanf return values                             *
*                                                                         *
\***********************************************************************/
tBool check( a, b )
int     a;
int     b;
{
        if( a == b )
            return( TRUE );
        else
            return( FALSE );
}

/***********************************************************************\
*                                                                         *
*       ReadCllRecord - read the .CFG file and load the information into  *
*           a list of tFields.                                            *
*                                                                         *
\***********************************************************************/
tpRecord    ReadCllRecord( FName )
//tpRecord far * ReadCllRecord( FName )
LPSTR   FName;
{
//      FILE *          pFh;
//      tpRecord far *   pRec;
//      tpField far *    newField;
        int             pFh;
        tpRecord         pRec;
        tpField          newField;
        int              index;
static  char             buffer[120];
        LPSTR            pbuffer = buffer;
        WORD             length = 120;
static  char             szError[80];

bAddMissing = FALSE;
        FieldCnt = (tCnt)0;
        pRec    = (tpRecord ) malloc(sizeof(tRecord));
//      pRec    = (tpRecord far *) malloc(sizeof(tRecord));
        if( pRec == NULL ) {
            MessageBox(NULL, "Insufficient Memory", FUNCNAME, EXMB_ERR);
            return(NULL);
        }
        pRec->pField = NULL;
        pRec->nTimeSlices = 1;                  //HEG pFh         = _lopen(FName,OF_READ);
        if (pFh < 0) {
            MessageBox(NULL, "File not found", FUNCNAME, EXMB_ERR);
            return(NULL);
        }
        /* read length */
        if( fgets( pbuffer, length, pFh ) == FALSE ){
            wsprintf((LPSTR)szError," Early EOF on CLL file %s\n", FName );
            MessageBox(NULL, szError, FUNCNAME, EXMB_ERR);
            return(NULL);
        }
        if(!check( sscanf(buffer, "Record Length=%d",(LPINT)&pRec->Length), 1)){
            wsprintf((LPSTR)szError," Bad read of Record length from CLL file\n");
            MessageBox(NULL, szError, FUNCNAME, EXMB_ERR);
            return(NULL);
        }
        pRec->Length += NEWLINE_SIZE;
        /********
         * Skip a line
         ********/
        if( fgets( pbuffer, length, pFh ) == FALSE ) {
            wsprintf((LPSTR)szError," Early EOF on CLL file %s\n", FName );
            MessageBox(NULL, szError, FUNCNAME, EXMB_ERR);
            return(NULL);
```

```c
            }
            if( fgets( pbuffer, length, pFh ) == FALSE ) {
                wsprintf((LPSTR)szError," Early EOF on CLL file %s\n", FName );
                MessageBox(NULL, szError, FUNCNAME, EXMB_ERR);
                return(NULL);
            }
            if( !check(sscanf(buffer, "%d", (LPINT)&index), 1)) {
                wsprintf((LPSTR)szError," Bad read of index from CLL file\n");
                MessageBox(NULL, szError, FUNCNAME, EXMB_ERR);
                return(NULL);
            }
            if (index != -1) {
//              newField = (tpField far *) malloc(sizeof(tField));
                newField = (tpField ) malloc(sizeof(tField));
                if (newField == NULL) {
                    MessageBox(NULL, "Insufficient Memory", FUNCNAME, EXMB_ERR);
                    return(NULL);
                }
//read in value.
newField->Derivative = 0;
newField->nTimeSlice = 0;

newField->NbrSymbols = 0;
                newField->DivFlag = 0;
                newField->MissingValue = 0;
                pRec->pField = newField;
            } else {
                pRec->pField = NULL;
                pRec->pFieldLast = NULL;
            }
            while (index != -1) {

FieldCnt += (tCnt)MyReadField(pFh, newField, index);
                /* skip a line */
//              if( fgets( pbuffer, length, pFh ) == FALSE ) {
//                  wsprintf((LPSTR)szError," Early EOF on CLL file %s\n", FName );
//                      duMessage((LPSTR)szError);
//                  return(NULL);
//              }
                if( fgets( pbuffer, length, pFh ) == FALSE ) {
                    wsprintf((LPSTR)szError," Early EOF on CLL file %s\n", FName );
                    MessageBox(NULL, szError, FUNCNAME, EXMB_ERR);
                    return(NULL);
                }
                if( !check(sscanf(buffer, "%d", (LPINT)&index), 1) ) {
                    wsprintf((LPSTR)szError," Bad read of index from CLL file\n");
                    MessageBox(NULL, szError, FUNCNAME, EXMB_ERR);
                    return(NULL);
                }
                if (index != -1) {
                    newField->Next = (tpField )malloc(sizeof(tField));
//                  newField->Next = (tpField far *)malloc(sizeof(tField));
                    if (newField->Next == NULL) {
                        MessageBox(NULL, "Insufficient Memory",
                            FUNCNAME, EXMB_ERR);
                        return(NULL);
                    }
//read in value.
newField->Next->Derivative = 0;
newField->Next->nTimeSlice = 0;

newField->Next->NbrSymbols = 0;
                    newField->Next->DivFlag = 0;
//these field are not used
                    newField->DivInfo.DivValue = 1;
                    lstrcpy((LPSTR)newField->DivInfo.DivFieldName,
                            (LPSTR)"");
                    newField->DivInfo.DivField = NULL;
                    newField = newField->Next;
                } else {
                    newField->Next = NULL;
                    pRec->pFieldLast = newField;
                }
            }
            _lclose(pFh);
            CountSlices(pRec);
            return(pRec);
}
/*******************************************************************\
* Name:                                                              *
*     CountSlices - Find the highest numbered time slice.            *
*     Time slice indexes start at zero so add one.                   *
* Arguments:                                                         *
*     pRec - Head of tField chain.                                   *
\*******************************************************************/ void CountSlices(tpRecord  pRec)
{
    tpField  pField;

pRec->nTimeSlices = 0;
    pField = pRec->pField;
    while (pField != NULL) {
```

```
            if ((pField->nTimeSlice + 1) > pRec->nTimeSlices)
                pRec->nTimeSlices = pField->nTimeSlice + 1;
            pField = pField->Next;
        }
    pRec->nTimeSlices;
}

/**************************************************************************\
 *                                                                          *
 *      ReadField - This routine reads the configuration linked list        *
 *      from a data file.  This allows scaling and symbolic variable        *
 *      name information to be used by other SCALER, MODEL, or EVALUATE.    *
 *                                                                          *
\**************************************************************************/ int ReadField( ConFile, pField, index )
int             ConFile;
tpField         pField;
int             index;
{
        int             i;
        int             local_index;
static  char            Name[80];
static  char            buffer[120];
        LPSTR           pbuffer = buffer;
        WORD            length = 120;
static  char            szError[80];
        int             SymbolLength;

pField->Id = index;
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Name= %s", (LPSTR) Name);
        lstrcpy((LPSTR) pField->Name, (LPSTR) Name );
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Type= %d", (LPINT)&(pField->Type));
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Slab= %d", (LPINT)&(pField->Slab));
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Size= %d", (LPINT)&(pField->Field_Size));
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
//if cfg contains DROP type set to continuous or group
        if (pField->Type > 4)
            if (pField->Field_Size > 1)
                pField->Type = GROUP;
            else
                pField->Type = CONTINUOUS;

sscanf( buffer,
                "Start= %d Length= %d",
                (LPINT)&pField->Start,
                (LPINT)&pField->Length
              );
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "RecCnt= %ld", (LPINT)&pField->RecCnt);
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer,
                "Min= %lf   Max= %lf",
                (double far *) &pField->Min,
                (double far *) &pField->Max
              );
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
```

```c
        }
        sscanf( buffer, "Sum= %lf", (double far *) &pField->Sum);
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Mean= %lf",(double far *) &pField->Mean);
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Standard Deviation= %lf", (double far *)&pField->StdDev);
        if ( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "Symbolic= %d", (LPINT)&pField->SymbolicFlag);
        if (pField->SymbolicFlag == SYMBOLIC || pField->Type == GROUP) {
            if (pField->Type == BINARY)
                pField->Field_Size = 2;
            pField->Symbol =
                (char * far *)malloc(pField->Field_Size * sizeof(char far *));
            if(pField->Symbol == NULL)
                MessageBox(NULL, "Insufficient Memory", FUNCNAME, EXMB_ERR);
            if (pField->Length > 10)
                SymbolLength = pField->Length + 2;
            else
                SymbolLength = 11;
            for (i = 0; i < pField->Field_Size; i++) {
                pField->Symbol[i] =
                    (char far *)malloc(SymbolLength * sizeof(char));
                if (pField->Symbol[i] == NULL) {
                    MessageBox(NULL, "Insufficient Memory",
                        FUNCNAME, EXMB_ERR);
                    return(NULL);
                }
            }
            for (i = 0; i < pField->Field_Size; i++) {
                if( fgets( pbuffer, length, ConFile ) == FALSE ) {
                    wsprintf((LPSTR)szError," Early EOF on CLL file \n" );
                    MessageBox(NULL, szError, FUNCNAME, EXMB_ERR);
                    return(NULL);
                }
                if (2 > sscanf( buffer, "%d: %s", (LPINT)&local_index,
                    (LPSTR)pField->Symbol[i]))
                    lstrcpy((LPSTR)pField->Symbol[i],(LPSTR)"\0");
                else if (lstrcmp((LPSTR)"(MISSING)",(LPSTR)pField->Symbol[i])
                    == 0)
                    bAddMissing = TRUE;
//3/26/91 always init
//              lstrcpy((LPSTR)pField->Symbol[i],(LPSTR)"\0");
            }
        } else {
            pField->Symbol = NULL;
        }
        if( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer,
                "ScaleMode= %d  ScaleFn= %d",
                (LPINT)&pField->ScaleMode,
                (LPINT)&pField->ScaleFn
              );
//none mode no longer supported, set to auto mode.
        if (pField->ScaleMode == 2)
            pField->ScaleMode = 1;
        if( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer, "DivFlag= %d", (LPINT)&pField->DivFlag);
        if( fgets( pbuffer, length, ConFile ) == FALSE ) {
            wsprintf((LPSTR)szError," Early EOF on CLL file \n" );
            MessageBox(NULL, szError, FUNCNAME, EXMB_ERR);
            return(NULL);
        }
        sscanf( buffer,
                "Divisor= %lf  Range= %lf",
                (double far *) &pField->LogDivisor,
                (double far *) &pField->Range
              );
        lstrcpy( (LPSTR)pField->DivInfo.DivFieldName, (LPSTR)"" );
        pField->Value = 0.0;
        return( (int)pField->Field_Size );
}
```

```
/****************************************************************\
*                                                                *
*     MyReadField - This routine reads the configuration linked list  *
*     from a data file.  This allows scaling and symbolic variable    *
*     name information to be used by other SCALER, MODEL, or EVALUATE. *
*                                                                *
\****************************************************************/ int MyReadField(int fp, tpField  pField, int Index) {
static  char szBuffer[256];
  LPSTR pszBuffer = szBuffer;
  WORD  nLength = 256;
static  char Name[40];
  LPSTR pszName = Name;
static  char Value[40];
  LPSTR pszValue = Value;

pField->MissingValue = 0;
  pField->Id = Index;
  while ((fgets( pszBuffer, nLength, fp ) == TRUE) &&
         (lstrlen(StrTrim(pszBuffer)) > 0)) {
            Parse(pszBuffer, pField, fp);
  } if (pField->Type == GROUP || pField->SymbolicFlag == SYMBOLIC) {
     if (pField->MissingValue < 0 || pField->MissingValue > 32000)
         pField->MissingValue = 0;
     pField->MissingValue = (int)pField->MissingValue;
     if  ((int)pField->MissingValue < 0 ||
          (int)pField->MissingValue >= (int)pField->Field_Size)
         pField->MissingValue = 0;
  }
  return (pField->Field_Size);
}

/****************************************************************\
*                                                                *
*     Parse - This funtion parses the passed in string and load the read *
*     in values to the appropriate slots.                        *
\****************************************************************/ int Parse(LPSTR pszBuffer, tpField pField, int fp)
{
    int     nIndex;
static char     szString[256];
    LPSTR       pszString = szString;
    int     nSlot;
static char     token[30];
    LPSTR pszToken = token;
static char     name[80];
static char     value[80];
    LPSTR       pszName = name;
    LPSTR       pszValue = value;
    int SymbolLength;

pszName = StrTok(pszBuffer,(LPSTR) " ");
    pszValue = StrTok((LPSTR)NULL,(LPSTR) " ");
//sscanf(szBuffer,"%s %s",name, value);
    while(pszName != NULL &&
         pszValue != NULL &
         (lstrlen(pszValue) > 0) &&
         (lstrlen(pszName) > 0)) {
        if (lstrcmp(pszName,(LPSTR)"Name=") == 0) {
           lstrcpy((LPSTR)pField->Name,pszValue);
        }
        else if (lstrcmp(pszName,(LPSTR)"Type=") == 0) {
            if (sscanf(value,"%d",(LPINT) &pField->Type) < 1)
               pField->Type = MatchType(pszValue);
        }
        else if (lstrcmp(pszName,(LPSTR)"Slab=") == 0) {
            if (sscanf(value,"%d",(LPINT) &pField->Slab) < 1)
                pField->Slab = MatchSlab(pszValue);
        }
        else if (lstrcmp(pszName,(LPSTR)"ScaleMode=") == 0) {
            if (sscanf(value,"%d",(LPINT) &pField->ScaleMode) < 1)
                pField->ScaleMode = MatchScale(pszValue);
        }
        else if (lstrcmp(pszName,(LPSTR)"ScaleFn=") == 0) {
            if (sscanf(value,"%d",(LPINT) &pField->ScaleFn) < 1)
                pField->ScaleFn = MatchFn(pszValue);
        }
        else if (lstrcmp(pszName,(LPSTR)"Symbolic=") == 0) {
            if (sscanf(value,"%d",(LPINT) &pField->SymbolicFlag) < 1)
                pField->SymbolicFlag = MatchSymbolic(pszValue);
//if symbolic load the symbol table.
//allocate symbol table.
            if (pField->SymbolicFlag == SYMBOLIC && pField->Type == BINARY)
                pField->NbrSymbols = 2;
            if (pField->SymbolicFlag == SYMBOLIC || pField->Type == GROUP) {
                if (pField->NbrSymbols > 0)
                    pField->Symbol =
                        (char * far *)malloc(pField->NbrSymbols * sizeof(char far *));
                if (pField->Length > 10)
                    SymbolLength = pField->Length + 2;
```

```c
            else
                SymbolLength = 11;
            for (nIndex=0; nIndex < pField->NbrSymbols; nIndex++) {
                pField->Symbol[nIndex] =
                    (char far *)malloc(SymbolLength * sizeof(char));
                fgets(pszString,256, fp);
                if (2 > sscanf( szString, "%d: %s", (LPINT) &nSlot,
                    (LPSTR)pField->Symbol[nIndex]))
                        lstrcpy((LPSTR)pField->Symbol[nIndex],(LPSTR)"\0");
                else if (lstrcmp((LPSTR)"{MISSING}",
                    (LPSTR) pField->Symbol[nIndex]) == 0)
                        bAddMissing = TRUE;
                if (nSlot != nIndex)
                    Debug((LPSTR)"Error read symbol table contents.");
            }
        }
    }
    else if (lstrcmp(pszName,(LPSTR)"Size=") == 0) {
        pField->Field_Size = atoi(pszValue);
//to be compatible with old code.
        if (pField->Type == GROUP)
            pField->NbrSymbols = pField->Field_Size;
    }
    else if (lstrcmp(pszName,(LPSTR)"NbrOfSymbols=") == 0) {
        pField->NbrSymbols = atoi(pszValue);
    }
    else if (lstrcmp(pszName,(LPSTR)"Start=") == 0) {
        pField->Start = atoi(pszValue);
    }
    else if (lstrcmp(pszName,(LPSTR)"RecCnt=") == 0) {
        pField->RecCnt = atol(pszValue);
    }
    else if (lstrcmp(pszName,(LPSTR)"Length=") == 0) {
        pField->Length = atoi(pszValue);
    }
    else if (lstrcmp(pszName,(LPSTR)"DivFlag=") == 0) {
        pField->DivFlag = atoi(pszValue);
    }
    else if (lstrcmp(pszName,(LPSTR)"Min=") == 0) {
        pField->Min = (double)atof(pszValue);
    }
    else if (lstrcmp(pszName,(LPSTR)"Max=") == 0) {
        pField->Max = (double)atof(pszValue);
    }
    else if (lstrcmp(pszName,(LPSTR)"MissingValue=") == 0) {
        pField->MissingValue = (double)atof(pszValue);
    }
    else if (lstrcmp(pszName,(LPSTR)"Range=") == 0) {
        pField->Range = (double)atof(pszValue);
    }
    else if (lstrcmp(pszName,(LPSTR)"Derivative=") == 0) {
        pField->Derivative = (int)atoi(pszValue);
    }
    else if (lstrcmp(pszName,(LPSTR)"TimeSlice=") == 0) {
        pField->nTimeSlice = (int)atoi(pszValue);
    }
    else if (lstrcmp(pszName,(LPSTR)"Sum=") == 0) {
        pField->Sum = (double)atof(pszValue);
    }
    else if (lstrcmp(pszName,(LPSTR)"Mean=") == 0) {
        pField->Mean = (double)atof(pszValue);
    }
    else if (lstrcmp(pszName,(LPSTR)"Divisor=") == 0) {
        pField->LogDivisor = (double)atof(pszValue);
    }
    else if (lstrcmp(pszName,(LPSTR)"Standard") == 0) {
        if (lstrcmp(pszValue,(LPSTR)"Deviation=") == 0) {
            pszToken = StrTok((LPSTR)NULL, (LPSTR)" ");
            pField->StdDev = (double)atof(pszToken);
        }
    }
    else if (lstrcmp(pszName,(LPSTR)"StdDev=") == 0) {
        pField->StdDev = (double)atof(pszValue);
    }
    pszName = StrTok((LPSTR)NULL,(LPSTR)" ");
    pszValue = StrTok((LPSTR)NULL,(LPSTR)" ");
    } //end while
    return(TRUE);
}
/************** Read Data Dictionary *************/

/*****************************************************************\
 *                                                                 *
 *   ReadDataDict - read the .DCT file and load the information into *
 *        a list of tFields.                                       *
 *                                                                 *
\*****************************************************************/
tpRecord   ReadDataDict( FName )
char * FName;
{
//      FILE *        pFh;
        int           pFh;
        tpRecord      pRec;
        tpField       newField;
        int           index;
static char           buffer[120];
        LPSTR         pbuffer = buffer;
```

```
             int            length = 120;
//           char           szError[80];

//           bAddMissing = FALSE;
             FieldCnt = (tCnt)0;
             pRec     = (tpRecord ) malloc(sizeof(tRecord));
             if( pRec == NULL) {
                 MessageBox(NULL, "Insufficient Memory", FUNCNAME, EXMB_ERR);
                 return(NULL);
             }
             pRec->Length = 0;
             pRec->pField = NULL;
             pRec->pFieldLast = NULL;
             pRec->nTimeSlices = 1;         //HEG
             pFh      = _lopen(FName,OF_READ);
             if (pFh < 0) {
                 MessageBox(NULL, "File not found", FUNCNAME, EXMB_ERR);
                 return(NULL);
             }
             /********
              * Skip option information for now.
              ********/
             while ( (fgets( pbuffer, length, pFh ) == TRUE) &&
                     lstrcmp(StrTrim(pbuffer),(LPSTR)"variables") != 0);
//if eof exit.
             index = 0;
             while ( (fgets( pbuffer, length, pFh ) == TRUE) &&
                     lstrcmp(StrTrim(pbuffer),(LPSTR)"endvars") != 0) {
                 newField = (tpField ) malloc(sizeof(tField));

if (newField == NULL) {
                     MessageBox(NULL, "Insufficient Memory", FUNCNAME, EXMB_ERR);
                     return(NULL);
                 }

InitpField(newField);
                 if (pRec->pFieldLast == NULL && pRec->pField == NULL) {
                     pRec->pField = newField;
                     pRec->pFieldLast = newField;
                 }
                 else {
                     pRec->pFieldLast->Next = newField;
                     pRec->pFieldLast = newField;
                 }
                 DCTParse(buffer, newField);
                 index--;
                 newField->Id = index;
//obsolete slots.
                 newField->DivInfo.DivValue = 1;
                 lstrcpy((LPSTR)newField->DivInfo.DivFieldName,
                             (LPSTR)"");
                 newField->DivInfo.DivField = NULL;
             }
             _lclose(pFh);
             return(pRec);
         }

/*****************************************************************************\
*                                                                             *
*       Parse - This funtion parses the passed in string and load the read    *
*       in values to the appropriate slots.                                   *
*       Format: offset size type name.                                        *
\*****************************************************************************/ int DCTParse(LPSTR pszBuffer, tpField pField)
{
static char    token[30];
    LPSTR pszToken = token;

pszToken = StrTok(pszBuffer,(LPSTR)" ");
    pField->Start = atoi(pszToken) - 1;
    pszToken = StrTok((LPSTR)NULL,(LPSTR)" ");
    pField->Length = atoi(pszToken);
    pszToken = StrTok((LPSTR)NULL,(LPSTR)" ");
    if (lstrcmp(pszToken,(LPSTR)"c") == 0) {
       pField->Type = GROUP;
       pField->SymbolicFlag = SYMBOLIC;
       pField->Symbol =
           (char * far *)malloc(pField->Field_Size * sizeof(char far *));
       pField->Symbol[0] =
               (char far *)malloc(11 * sizeof(char));
       lstrcpy((LPSTR)pField->Symbol[0],(LPSTR)"\0");
    }
    else
       pField->SymbolicFlag = NUMERIC;
    pszToken = StrTok((LPSTR) NULL, (LPSTR) " ");
    lstrcpy((LPSTR) pField->Name,pszToken);
    return(TRUE);
}
/*************** End read Data Dictionary ********************/

/*************** Scaling Functions ***************************/
```

```
/****************************************************************\
*                                                                *
*       LogScale                                                 *
*                                                                *
\****************************************************************/
double LogScale(pField)
tpField         pField;
{
        double Min,Max;
        double top;

Min = pField->Min;
        Max = pField->Max;
        if ( Min == Max ||
             pField->Value == (double) 0.0 ||
             Min == (double) 0.0
           )
             return((double) 0.0);
        if (pField->Value < Min) pField->Value = Min;
        top = log (pField->Value / Min);
        return(top / pField->LogDivisor);
}
/****************************************************************\
*                                                                *
*       InvLogScale                                              *
*                                                                *
\****************************************************************/
double InvLogScale(pField)
tpField         pField;
{
        if (pField->Type == GROUP) return(pField->Value);
        return(pField->Min * exp(pField->Value));
}
/****************************************************************\
*                                                                *
*       ZScale                                                   *
*                                                                *
\****************************************************************/
double ZScale(pField)
tpField         pField;
{
        double temp;

if (pField->StdDev == (double)0.0)
          return((double)0.0);
        temp = (pField->Value - pField->Mean) / pField->StdDev;
        return(temp);
}
/****************************************************************\
*                                                                *
*       InvZScale                                                *
*                                                                *
\****************************************************************/
double InvZScale(pField)
tpField         pField;
{
        double temp;

temp = (pField->Value * pField->StdDev) + pField->Mean;
        return(temp);
}
/****************************************************************\
*                                                                *
*       LinearScale                                              *
*       3/24/91 group types are not scaled.                      *
\****************************************************************/
double LinearScale(pField)
tpField         pField;
{
        double value;
        if (pField->Type == GROUP)
            value = pField->Value;
        else if (pField->Min == pField->Max || pField->Range == 0)
            value = (double) 0.0;
        else
            value = 2.0*((pField->Value - pField->Min) / pField->Range) - 1.0;
        return( value );
}
/****************************************************************\
*                                                                *
*       InvLinearScale                                           *
*                                                                *
\****************************************************************/
double InvLinearScale(pField)
tpField         pField;
{
        double value;
        if (pField->Min == pField->Max)
            value = pField->Mean;
        else if (pField->Type == GROUP)
            value = pField->Value;
        else
            value = (pField->Range * (pField->Value + 1)/2.0) + pField->Min;
        return( value );
```

```c
double InvScale (tpField   pField)
{
        if (pField->ScaleFn == FN_LOG)
                return(InvLogScale(pField));
        else if (pField->ScaleFn == FN_LIN)
                return(InvLinearScale(pField));
        else if (pField->ScaleFn == FN_Z)
                return(InvZScale(pField));

}
double Scale (tpField   pField)
{
        if (pField->ScaleFn == FN_LOG)
                return(LogScale(pField));
        else if (pField->ScaleFn == FN_LIN)
                return(LinearScale(pField));
        else if (pField->ScaleFn == FN_Z)
                return(ZScale(pField));

}

//count the number of field less those EXCLUDED.
//count the number of fields actually written out to SCL
//BINARY and CONTINUOUS symbolic write out one value but may have many fields.
//Field size is used for symbol table allocation.
/***********************************************************\
*  GetFieldCount                                             *
*     Count the number of fields, less variables that are ID or  *
*     EXCLUDED.  nly group variables have more than one field.  *
*  Arguments:                                                *
*     tRecord - Head of tField chain.                        *
*  Return Value:                                             *
*     The number of fields.                                  *
\***********************************************************/ int GetFieldCount(tpRecord   pRecord)
{
    tpField   pField;
    int       count = 0;
    pField = pRecord->pField;
    while ( pField != NULL) {
       if (pField->Type != EXCLUDE && pField->Type != ID) {
          if (pField->Type == GROUP)
              count += pField->Field_Size;
          else
              count++;
       }
       pField = pField->Next;
    }
    return(count);
}

//initialize fields of a new pfield.
void InitpField(tpField   pField)
{
            pField->Field_Size    = 1;
            pField->NbrSymbols    = 0;
            pField->Slab          = INPUT;
            pField->Mean          = 0.0;
            pField->Min           = DBL_MAX;
            pField->Max           = -DBL_MAX;
            pField->Value         = 0.0;
            pField->StdDev        = 0.0;
            pField->Sum           = 0.0;
            pField->SumOfSqrs     = 0.0;
            pField->Range         = 0.0;
            pField->RecCnt        = 0;
            pField->ScaleMode     = MatchScale("AUTO");
            pField->ScaleFn       = MatchFn("LIN");
            pField->LogDivisor    = (double) 0.0;
            pField->Type          = CONTINUOUS;
            pField->SymbolicFlag  = NUMERIC;
            pField->DivFlag       = 0;
            pField->Derivative    = 0;
            pField->nTimeSlice    = 0;
            pField->MissingValue  = 0;
            pField->MissingFlag   = FALSE;
            pField->Next = NULL;
            pField->Symbol = NULL;
            pField->SymbolChain = NULL;
            pField->FirstDeriv[0] = 0;
            pField->FirstDeriv[1] = 0;
            pField->SecondDeriv[0] = 0;
            pField->SecondDeriv[1] = 0;
}
/***********************************************************\
*                                                            *
*                          END OF FILE                       *
*                                                            *
\***********************************************************/
```

```
/*********************************************************************
 * $Header$
 * $Source$
 * $Log$
 *
 * Description:
 *      Routines for getting the decision explanation slab
 *
 *********************************************************************/ include "exuisl.h"
include "knet.h"
include <math.h> define FUNCNAME        ((LPSTR) "EXGETCONTRIBUTION")

extern tU16bit      nNum;
extern tU16bit      nBinary;
extern tU16bit      nGroup;
extern tU16bit      nSymGroups;
extern tpRecord             pRec;
extern tpField      pField;

long SortByStrength(tpStsIndexKnet, long);

tpField  FindFieldByIdKnet(tpRecord, int);

/*********************************************************************
 * FUNCTION: ExGetContribution(LPVOID, LONG, BOOL)
 *
 * PURPOSE:
 *      Gets a data structure from the decision explanation slab and
 *      puts it into a two dimensional EXCEL array. The function must
 *      an array of 4 dimensions.
 *
 * EXCEL REGISTER CALL
 *      REGISTER("EXUISL","EXGETCONTRIBUTION", ">PJI")
 */
VOID FAR PASCAL ExGetContribution(pContrib, Netsid, bGrpFlag)
    LPVOID      pContrib;       // pointer to EXCEL array to fill
    LONG        Netsid;         // Knet id in low word
    BOOL        bGrpFlag;       // 0 - don't display group variables
                                // 1 - display group variables
{
    tId                 KNetid;
    tpStsIndexKnet      pStsContrib;
    tStsDecideKnet      StsDecide;
    tCnt                cnt;
    tpOper              pOper = (tpOper) pContrib;
    long                indx;
    long                indx2;
    long                arindx;
    long                arindx2;
    int                 rows;
    int                 cols;
    int                 numVars;
    double              NetOutold;
    double              NetOutnew;

/* check the array */
    if (pOper->Type != OPER_ARRAY) {
        MessageBox(NULL, "Must be an array of numbers", FUNCNAME, EXMB_ERR);
        goto egress;
    }
    rows = pOper->Value.Array.iRows;
    cols = pOper->Value.Array.iColumns;
    numVars = nBinary + nNum + nSymGroups;

if ((rows != numVars) || (cols != 4)) {
        MessageBox(NULL, "Array is the wrong size", FUNCNAME, EXMB_ERR);
//      goto egress;
    } pOper = (tpOper) (pOper->Value.Array.pArray);
    for(indx=0;indx < rows; indx++){
        pOper[indx * 4].Type = OPER_EMPTY;
        pOper[indx * 4 + 1].Type = OPER_EMPTY;
        pOper[indx * 4 + 2].Type = OPER_EMPTY;
        pOper[indx * 4 + 3].Type = OPER_EMPTY;
    }

/* get the net id */
    KNetid = (tId) LOWORD(Netsid);

/* allocate space for the decision explanation */
    pStsContrib = (tStsIndexKnet *) Malloc(numVars * sizeof(tStsIndexKnet));

/* get the decision slab states */
    if (GetSts(KNetid, SlabDexpKnet, FIRST_PE_NBR, numVars,
            pStsContrib, &cnt) == FALSE) {
        PrintErr(pProcNil);
```

```
        }

/* get the decision slab states */
        if (GetSts(KNetid, SlabDecideKnet, FIRST_PE_NBR, 1,
                &StsDecide, &cnt) == FALSE) {
            PrintErr(pProcNil);
        } pField = pRec->pField;

while(pField->Slab != TARGET) {
            pField = pField->Next;
        }

//      NetOutold = (double)(StsDecide.Value* 0.46384879 + 12.196264);
        NetOutold = (double)(StsDecide.Value* pField->StdDev + pField->Mean);
        NetOutold = exp( NetOutold );

for(indx = 0; indx < numVars; indx++) {
            NetOutnew = (double)(pStsContrib[indx].Value * pField->StdDev
                + pField->Mean);
            pStsContrib[indx].Value = (tF32bit)(NetOutold - exp(NetOutnew));

}

SortByStrength(pStsContrib, (long) numVars);

indx = 0;
        arindx = 0;
        arindx2 = 0;
//      pOper = (tpOper) (pOper->Value.Array.pArray);

while((pStsContrib[indx].Value >= (tF32bit) 0.0) && (indx < numVars)) {
            pField = FindFieldByIdKnet(pRec,(int)pStsContrib[indx].Id);
            if((pField->Type == CONTINUOUS && !bGrpFlag) || (bGrpFlag)) {
                pOper[arindx * 4].Type = OPER_DOUBLE;
                pOper[arindx * 4].Value.Double = (tF64bit) pStsContrib[indx].Id;
                pOper[arindx * 4 + 1].Type = OPER_DOUBLE;
                pOper[arindx * 4 + 1].Value.Double =
                    (tF64bit) pStsContrib[indx].Value;
                arindx++;
            }
            indx++;
        } indx = numVars - 1;

while((pStsContrib[indx].Value < (tF32bit) 0.0) && (indx >= 0)) {
            indx2 = (numVars - 1) - indx;
            pField = FindFieldByIdKnet(pRec,(int)pStsContrib[indx].Id);
            if((pField->Type == CONTINUOUS && !bGrpFlag) || (bGrpFlag)) {
                pOper[arindx2 * 4 + 2].Type = OPER_DOUBLE;
                pOper[arindx2 * 4 + 2].Value.Double =
                    (tF64bit) pStsContrib[indx].Id;
                pOper[arindx2 * 4 + 3].Type = OPER_DOUBLE;
                pOper[arindx2 * 4 + 3].Value.Double =
                    (tF64bit) pStsContrib[indx].Value;
                arindx2++;
            }
            indx--;
        } egress:
    Free(pStsContrib);
    return;

}

/**********************************************************************
 * $Header$
 * $Source$
 * $Log$
 *
 * Description:
 *     Routines for getting the decision slab
 *
 **********************************************************************/ include "exuisl.h"
include "knet.h"

#define FUNCNAME        ((LPSTR) "EXGETDECISION")

/**********************************************************************
 * FUNCTION: ExGetDecision(LPVOID, LONG)
 *
 * PURPOSE:
 *     Gets a data structure from the decision slab and puts it into
 *     an EXCEL array of 5 floats. The function must be in a 1 X 5 array.
 *
 * EXCEL REGISTER CALL
 *     REGISTER("EXUISL","EXGETDECISION", ">PJ")
 */
```

```c
VOID FAR PASCAL ExGetDecision(pDecide, Netsid)
    LPVOID      pDecide;        // pointer to EXCEL array to fill
    LONG        Netsid;         // Knet id in low word
{
    tId                 KNetid;
    tStsDecideKnet      StsDecide;
    tLclKnet            Lcl;
    tCnt                cnt;
    tpOper              pOper = (tpOper) pDecide;
    int                 rows;
    int                 cols;

/* check the array */
    if (pOper->Type != OPER_ARRAY) {
        MessageBox(NULL, "Must be an array of numbers", FUNCNAME, EXMB_ERR);
        goto egress;
    }
    rows = pOper->Value.Array.iRows;
    cols = pOper->Value.Array.iColumns;
    if (rows * cols != 5) {
        MessageBox(NULL, "Array is wrong size", FUNCNAME, EXMB_ERR);
        goto egress;
    }
    if ((rows != 1) && (cols != 1)) {
        MessageBox(NULL, "Array must be 1 X 5", FUNCNAME, EXMB_ERR);
        goto egress;
    }

/* get the net id */
    KNetid = (tId) LOWORD(Netsid);

/* get the decision slab states */
    if (GetSts(KNetid, SlabDecideKnet, FIRST_PE_NBR, 1,
            &StsDecide, &cnt) == FALSE) {
        PrintErr(pProcNil);
    }

GetLcl(KNetid, SlabOutKnet, FIRST_PE_NBR, (tCnt)1,
            &Lcl, &cnt);

pOper = (tpOper) (pOper->Value.Array.pArray);
    pOper->Type = OPER_DOUBLE;
    pOper->Value.Double = (tF64bit) StsDecide.Decision;
    (++pOper)->Type = OPER_DOUBLE;
    pOper->Value.Double = (tF64bit) StsDecide.MinPremise;
    (++pOper)->Type = OPER_DOUBLE;
    pOper->Value.Double = (tF64bit) StsDecide.Value;
    (++pOper)->Type = OPER_DOUBLE;
    pOper->Value.Double = (tF64bit) StsDecide.Certainty;
    (++pOper)->Type = OPER_DOUBLE;
    pOper->Value.Double = (tF64bit) StsDecide.Decisiveness;

egress:
    return;

}

/****************************************************************
 * $Header$
 * $Source$
 * $Log$
 *
 * Description:
 *     Routines for getting the output state from the MBPN network
 *
 ****************************************************************/ include "exuisl.h"
include "mbpn.h"

#define FUNCNAME        ((LPSTR) "EXGETOUTPUTSTATE")

extern tId    MNetid2;

/****************************************************************
 * FUNCTION: ExGetOutputState(LONG)
 *
 * PURPOSE:
 *     Gets the output state from the MBPN network.
 *
 * EXCEL REGISTER CALL
 *     REGISTER("EXUISL","EXGETOUTPUTSTATE", "EJ")
 */
tpF64bit FAR PASCAL ExGetOutputState(Netsid)
    LONG        Netsid;         // Netid of Mbpn in high word
{
    tId                 MNetid;
    HANDLE              hStates = NULL;
    tpStsMbpn           pOutputState;
    static tF64bit      dOutput = 0;
    tCnt                cnt;

/* get the net id */
    MNetid = (tId) HIWORD(Netsid);
```

```c
    /* allocate a data buffer */
    if ((hStates = GlobalAlloc(GPTR, (DWORD) (sizeof (tStsMbpn)))) == NULL) {
        MessageBox(NULL, "GlobalAlloc Failed", FUNCNAME, EXMB_ERR);
        goto egress;
    }
    if ((pOutputState = (tpStsMbpn) GlobalLock(hStates)) == NULL) {
        MessageBox(NULL, "GlobalLock Failed", FUNCNAME, EXMB_ERR);
        goto egress;
    }

/* get the output state */
    if (GetSts(MNetid2, SlabOutMbpn, FIRST_PE_NBR, 1,
            pOutputState, &cnt) == FALSE) {
        *pOutputState = 0;
        PrintErr(pProcNil);
    } dOutput = (tF64bit) *pOutputState;

egress:
    if (hStates != NULL) {
        hStates = GlobalFree(hStates);
    }
    return(&dOutput);
}

/**********************************************************************
 * $Header$
 * $Source$
 * $Log$
 *
 * Description:
 *      excel interface for KNET LoadNet
 *
 *
 **********************************************************************/ include <malloc.h>
include <stdlib.h>
#include "exuisl.h"
include "glob.h"
#include "knet.h"
#include "mbpn.h"
#include "mac.h"
#include "err02.h"
#include "err03.h"

#define FUNCNAME        ((LPSTR) "EXLOADDBMWKNET")

tId             MNetid2 = NULL;
extern tU16bit          nNum;
extern tU16bit          nBinary;
extern tU16bit          nGroup;
extern tU16bit          nSymGroups;
extern tpRecord                 pRec;
extern tpField          pField;

void Move_Weights( tpCtsMbpn, tId, tpCtsKnet, tId );

void move_slab_weights( tId, tNum, tNum, tId, tNum, tCnt, tNum, tCnt );

void set_Cfgfilename(LPSTR);

void set_Rwtfilename(LPSTR);

void create_linklist(void);

BOOL regwts_init(void);

tpCnt BuildMap(tpRecord);

tCnt RemapInputLayerSO( tId , tpCtsMbpn, tpCnt);

int GetFieldCount(tpRecord);

/**********************************************************************
 * FUNCTION: ExLoadDbmwKnet(LPSTR)
 *
 * PURPOSE:
 *      Takes the MBPN Constants and Weight file created by the DBMW,
 *      converts them to KNET, and loads KNET. Also loads neurocomputer
 *      during this process. Returns Netid of Mbpn in high word, Knet in
 *      low word.
 *
 * EXCEL REGISTER CALL
 *      REGISTER("EXUISL","EXLOADDBMWKNET", "JC")
 */
DWORD FAR PASCAL ExLoadDbmwKnet(NetFileName)
    LPSTR       NetFileName;    // name of constants file
{
    tCtsKnet    CtsKnet;
    tCtsMbpn    CtsMbpn;
    tpCnt       pMap;
```

```c
    tId         KNetid = NULL;
    tId         MNetid = NULL;
    int         i;
    tS08bit     bLinearOutput;

/* initialize neurocomputer */
    if (LoadNcp ((LPSTR)"uisl", &Ncpid) == FALSE) {
        PrintErr(pProcNil);
        return(NULL);
    }

/* retrieve network constants from file */
    if (ReadCts(NetFileName, &CtsMbpn, sizeof (tCtsMbpn)) == FALSE) {
        FreeNcp(Ncpid);
        PrintErr(pProcNil);
        return(NULL);
    }

/* sets the cfg file name global variable */
    set_Cfgfilename(NetFileName);

/* sets the regression weights file name global variable */
    set_Rwtfilename(NetFileName);

/* initializes the regression weights file */
    regwts_init();

/* creates the link list */
    create_linklist();

/* convert Mbpn constants to Knet constants */
    bLinearOutput = CtsMbpn.rt.LinearOutput;
    CtsMbpn.rt.LearnFlag = FALSE;
    CtsKnet.lt.OutputSize    = CtsMbpn.lt.OutputSize;
    CtsKnet.lt.ContinuousSize = nNum;
    CtsKnet.lt.BooleanSize   = nBinary;
    CtsKnet.lt.SymbolicSize  = nSymGroups;
    CtsKnet.lt.TotalSymbolCount = nGroup;
    CtsKnet.lt.cHidSlabs     = CtsMbpn.lt.cHidSlabs;
    CtsKnet.lt.RandomSeed    = CtsMbpn.lt.RandomSeed;
    CtsKnet.lt.InitWeightMax = CtsMbpn.lt.InitWeightMax;
    CtsKnet.lt.InitWeightMin = -(CtsKnet.lt.InitWeightMax);
    CtsKnet.lt.ConnectInputs = CtsMbpn.lt.ConnectInputs;
    CtsKnet.rt.OutputAlpha   = CtsMbpn.rt.OutputAlpha;
    CtsKnet.rt.OutputBeta    = CtsMbpn.rt.OutputBeta;
    CtsKnet.rt.DecideThreshold = (tF32bit) 0.0;
    CtsKnet.rt.WtsUpdateFlag = CtsMbpn.rt.WtsUpdateFlag;
    CtsKnet.rt.BatchSize     = CtsMbpn.rt.BatchSize;
    CtsKnet.rt.OperateMode   = KNET_OPERATE;
    CtsKnet.rt.StatsFlag     = FALSE;
    CtsKnet.rt.DExplainFlag  = TRUE;
    CtsKnet.rt.CExplainFlag  = TRUE;
    CtsKnet.rt.IKAFlag       = FALSE;
    for(i=0; i < MBPN_MAX_HID_SLABS; i++) {

CtsKnet.lt.HiddenSize[i]  = CtsMbpn.lt.HiddenSize[i];
        CtsKnet.rt.HiddenAlpha[i] = CtsMbpn.rt.HiddenAlpha[i];
        CtsKnet.rt.HiddenBeta[i]  = CtsMbpn.rt.HiddenBeta[i];
    }

//#if 0 // Let's get MBPN to work first
    /* Load Knet Network Constants */
    if (LoadNet((tId) Ncpid, "KNET1", NOWTS+NOSTS+NOLCL, &CtsKnet,
                (tCnt) sizeof (tCtsKnet), &KNetid) == FALSE) {
        PrintErr(pProcNil);
        FreeNcp(Ncpid);
        return(NULL);
    }
//#endif /* Load Mbpn Network Constants and Weights */
    if (LoadNet((tId) Ncpid, NetFileName, WTS+STS+LCL, &CtsMbpn,
                (tCnt) sizeof (tCtsMbpn), &MNetid) == FALSE) {
        PrintErr(pProcNil);
        FreeNet(KNetid);
        FreeNcp(Ncpid);
        return(NULL);
    }

/* Load second Mbpn Network Constants and Weights */
    if (LoadNet((tId) Ncpid, NetFileName, WTS+STS+LCL, &CtsMbpn,
                (tCnt) sizeof (tCtsMbpn), &MNetid2) == FALSE) {
        PrintErr(pProcNil);
        FreeNet(KNetid);
        FreeNcp(Ncpid);
        return(NULL);
    } pMap = BuildMap(pRec);
    RemapInputLayerSO(MNetid, &CtsMbpn, pMap);
    Free(pMap);
```

```c
    /* Load Knet Weights */

Move_Weights( &CtsMbpn, MNetid, &CtsKnet, KNetid);

return((DWORD)(MAKELONG(KNetid, MNetid)));
} void Move_Weights( pCtsMbpn, Net1, pCtsKnet, Net2 )
    tpCtsMbpn   pCtsMbpn;
    tId         Net1;
    tpCtsKnet   pCtsKnet;
    tId         Net2;
{
    tpWtsKnet pKWts;
    int i;
    tCnt cRet1, cRet2;
    tCnt IPatSize;
    tCnt OPatSize;

int n_slabs = (int)pCtsMbpn->lt.cHidSlabs;

IPatSize = pCtsKnet->lt.TotalSymbolCount + pCtsKnet->lt.ContinuousSize + pCtsKnet->lt.BooleanSize;
    OPatSize = pCtsKnet->lt.OutputSize;

/* move input to outputs weights if there.. */ if( pCtsMbpn->lt.ConnectInputs ){ pKWts = (tWtsKnet *)Malloc( (int)(IPatSize+2)*sizeof(tWtsKnet));

if( pKWts == NULL ){
            MessageBox(NULL, "Malloc Failure",FUNCNAME,EXMB_ERR);
        }
        for( i = 0; i < (int)OPatSize; i++ ){ switch (n_slabs) {
            case 0:
            case 1:
              if(!GetWts( Net1, (tNum)SlabOutMbpn, (tNum)i,
                  (tCnt)PeOutMbpnFromPrev, (tNum)(1+pCtsMbpn->lt.HiddenSize[0]),
                     (tNum)(IPatSize),
                     (tPtr)pKWts, (tPtr)&cRet1))
                        MessageBox(NULL, "Move weights error",
                            FUNCNAME,EXMB_ERR);
              if(!PutWts( Net2, (tNum)SlabOutKnet, (tNum)i,
                  (tCnt)PeOutKnetFromPrev, (tNum)(1+pCtsMbpn->lt.HiddenSize[0]),
                     (tNum)(IPatSize),
                     (tPtr)pKWts, (tPtr)&cRet2))
                        MessageBox(NULL, "Move weights error",
                            FUNCNAME,EXMB_ERR);
              break;

case 2:
              if(!GetWts( Net1, (tNum)SlabOutMbpn, (tNum)i,
                  (tCnt)PeOutMbpnFromPrev, (tNum)(1+pCtsMbpn->lt.HiddenSize[1]),
                     (tNum)(IPatSize),
                     (tPtr)pKWts, (tPtr)&cRet1))
                        MessageBox(NULL, "Move weights error",
                            FUNCNAME,EXMB_ERR);
              if(!PutWts( Net2, (tNum)SlabOutKnet, (tNum)i,
                  (tCnt)PeOutKnetFromPrev, (tNum)(1+pCtsMbpn->lt.HiddenSize[1]),
                     (tNum)(IPatSize),
                     (tPtr)pKWts, (tPtr)&cRet2))
                        MessageBox(NULL, "Move weights error",
                            FUNCNAME,EXMB_ERR);
              break;

case 3:
              if(!GetWts( Net1, (tNum)SlabOutMbpn, (tNum)i,
                  (tCnt)PeOutMbpnFromPrev, (tNum)(1+pCtsMbpn->lt.HiddenSize[2]),
                     (tNum)(IPatSize),
                     (tPtr)pKWts, (tPtr)&cRet1))
                        MessageBox(NULL, "Move weights error",
                            FUNCNAME,EXMB_ERR);
              if(!PutWts( Net2, (tNum)SlabOutKnet, (tNum)i,
                  (tCnt)PeOutKnetFromPrev, (tNum)(1+pCtsMbpn->lt.HiddenSize[2]),
                     (tNum)(IPatSize),
                     (tPtr)pKWts, (tPtr)&cRet2))
                        MessageBox(NULL, "Move weights error",
                            FUNCNAME,EXMB_ERR);
              break;
            } if( cRet1 != cRet2 || cRet1 == 0 ){
              MessageBox(NULL, "Weight count not equal",FUNCNAME,EXMB_ERR);
            }
```

```c
    }
    Free( pKWts );
} switch( n_slabs ){ case 0:
        break;     /* all weights already moved */ case 1:
        move_slab_weights( Net1, (tNum)SlabOutMbpn,
            (tNum)PeOutMbpnFromPrev, Net2,
            (tNum)SlabOutKnet,
                (tCnt)OPatSize,
                    (tNum)PeOutKnetFromPrev,
                        ((tCnt)pCtsKnet->lt.HiddenSize[0]+1) );
        move_slab_weights( Net1, (tNum)SlabHid0Mbpn,
            (tNum)PeHid0MbpnFromPrev, Net2,
            (tNum)SlabHid0Knet,
                (tCnt)pCtsKnet->lt.HiddenSize[0],
                    (tNum)PeHid0KnetFromPrev,
                        ((tCnt)IPatSize+1) );
        break;
    case 2:
        move_slab_weights( Net1, (tNum)SlabOutMbpn,
            (tNum)PeOutMbpnFromPrev, Net2,
            (tNum)SlabOutKnet,
                (tCnt)OPatSize,
                    (tNum)PeOutKnetFromPrev,
                        ((tCnt)pCtsKnet->lt.HiddenSize[1]+1) );
        move_slab_weights( Net1, (tNum)SlabHid1Mbpn,
            (tNum)PeHid1MbpnFromPrev, Net2,
            (tNum)SlabHid1Knet,
                (tCnt)pCtsKnet->lt.HiddenSize[1],
                    (tNum)PeHid1KnetFromPrev,
                        ((tCnt)pCtsKnet->lt.HiddenSize[0]+1) );
        move_slab_weights( Net1, (tNum)SlabHid0Mbpn,
            (tNum)PeHid0MbpnFromPrev, Net2,
            (tNum)SlabHid0Knet,
                (tCnt)pCtsKnet->lt.HiddenSize[0],
                    (tNum)PeHid0KnetFromPrev,
                        ((tCnt)IPatSize+1) );
        break;
    case 3:
        move_slab_weights( Net1, (tNum)SlabOutMbpn,
            (tNum)PeOutMbpnFromPrev, Net2,
            (tNum)SlabOutKnet,
                (tCnt)OPatSize,
                    (tNum)PeOutKnetFromPrev,
                        ((tCnt)pCtsKnet->lt.HiddenSize[2]+1) );
        move_slab_weights( Net1, (tNum)SlabHid2Mbpn,
            (tNum)PeHid2MbpnFromPrev, Net2,
            (tNum)SlabHid2Knet,
                (tCnt)pCtsKnet->lt.HiddenSize[2],
                    (tNum)PeHid2KnetFromPrev,
                        ((tCnt)pCtsKnet->lt.HiddenSize[1]+1) );
        move_slab_weights( Net1, (tNum)SlabHid1Mbpn,
            (tNum)PeHid1MbpnFromPrev, Net2,
            (tNum)SlabHid1Knet,
                (tCnt)pCtsKnet->lt.HiddenSize[1],
                    (tNum)PeHid1KnetFromPrev,
                        ((tCnt)pCtsKnet->lt.HiddenSize[0]+1) );
        move_slab_weights( Net1, (tNum)SlabHid0Mbpn,
            (tNum)PeHid0MbpnFromPrev, Net2,
            (tNum)SlabHid0Knet,
                (tCnt)pCtsKnet->lt.HiddenSize[0],
                    (tNum)PeHid0KnetFromPrev,
                        ((tCnt)IPatSize+1) );
        break;

}

} void move_slab_weights( Net1, Mbpnslab_id, Mbpnweight_class,
    Net2, Knetslab_id, slab1_size, Knetweight_class, slab2_size )
    tId      Net1;
    tNum     Mbpnslab_id;
    tNum     Mbpnweight_class;
    tId      Net2;
    tNum     Knetslab_id;
    tCnt     slab1_size;
    tNum     Knetweight_class;
    tCnt     slab2_size;
{
    tWtsKnet *pKWts;
    tCnt i;
    tCnt cRet1, cRet2;

pKWts = (tWtsKnet *)Malloc( (int)(slab2_size+2)*sizeof(tWtsKnet));
    if( pKWts == NULL ){
        MessageBox(NULL, "Malloc Failure",FUNCNAME,EXMB_ERR);
    }
```

```
    for( i = 0; i < slab1_size; i++ ){ if(!GetWts( Net1, (tNum)Mbpnslab_id, (tNum)i,
            (tCnt)Mbpnweight_class, (tNum)0, (tNum)slab2_size,
                (tPtr)pKWts, (tPtr)&cRet1))
                    MessageBox(NULL, "Move weights error",FUNCNAME,EXMB_ERR);

if(!PutWts( Net2, (tNum)Knetslab_id, (tNum)i,
            (tCnt)Knetweight_class, (tNum)0, (tNum)slab2_size,
                (tPtr)pKWts, (tPtr)&cRet2))
                    MessageBox(NULL, "Move weights error",FUNCNAME,EXMB_ERR);
        if( cRet1 != cRet2 || cRet1 == 0 ){
            MessageBox(NULL, "Weight count not equal",FUNCNAME,EXMB_ERR);
        }

}
    Free( pKWts );

}
/*************************************************\
* Name:                                            *
*    BuildKnetMap - build a vector to map from the *
* user defined order of nodes to the order required*
* by knet (continuous, binary, followed by group). *
* Variables:                                       *
*    pRec - Header of variable linked list.        *
* Return Value:                                    *
*    Pointer to mapping array.                     *
\*************************************************/ tpCnt BuildMap(pRec)
tpRecord    pRec;
{
    int     nNodeCnt;
    tpField pField;
    tpCnt   pMap;
    tpCnt   pMapPtr;
    int     i;
    int     nCounter = 0;

nNodeCnt = GetFieldCount(pRec);
    pMap = (tpCnt) Malloc((long)(nNodeCnt * sizeof(tCnt)));

pMapPtr = pMap;
    pField = pRec->pField;
    while(pField != NULL) {
        if (pField->Slab == INPUT)  {
            if (pField->Type == CONTINUOUS)
                *pMapPtr = nCounter++;
            pMapPtr += pField->Field_Size;
        }
        pField = pField->Next;
    }
    pMapPtr = pMap;
    pField = pRec->pField;
    while(pField != NULL) {
        if (pField->Slab == INPUT) {
            if (pField->Type == BINARY)
                *pMapPtr = nCounter++;
            pMapPtr += pField->Field_Size;
        }
        pField = pField->Next;
    }
    pMapPtr = pMap;
    pField = pRec->pField;
    while(pField != NULL) {
        if (pField->Slab == INPUT) {
            if (pField->Type == GROUP)
                for (i=0; i < pField->Field_Size; i++)
                    *(pMapPtr++) = nCounter++;
            else
                pMapPtr++;
        }
        pField = pField->Next;
    }
    return(pMap);
}

/******************************************************************\
*
* Name:        RemapInputLayerSO
*
* Purpose:     To remap the input layer for single logical output nets.
*
* Returns:     Zero on success, negative on failure.
*
\******************************************************************/
tCnt RemapInputLayerSO( NetId, pCts, Map )
tId             NetId;
tpCtsMbpn       pCts;
tpCnt           Map;
{
    tCnt                i,j;
    static  tCnt        cSlab[2];
```

```
    static    tNum              Class[2];
    static    tNum              Slab[2];
    static    tNum              Icn[2];
    tCnt               iS;
    tCnt               Isize;
    tCnt               cWts;
    static    tpF32bit          pWts[2];
    int                ItoO;

Isize = pCts->lt.InputSize;
    for ( i = 0; i < 2; i++ ) {
        pWts[i] = (tpF32bit)Malloc((long) ((size_t)Isize * (size_t)sizeof(tF32bit)) );
    }
    /********
     * Store Hidden0 and Output layer information.
     ********/
    Slab[0]  = (tNum)SlabHid0Mbpn;
    Slab[1]  = (tNum)SlabOutMbpn;
    Class[0] = (tNum)PeHid0MbpnFromPrev;
    Class[1] = (tNum)PeOutMbpnFromPrev;
    Icn[0]   = (tNum)1;
    if ( pCts->lt.cHidSlabs > 0 ) {
        Icn[1]   = (tNum)pCts->lt.HiddenSize[pCts->lt.cHidSlabs - 1] + 1;
        cSlab[0] = (tCnt)pCts->lt.HiddenSize[0];
    } else {
        Icn[1]   = (tNum)1;
        cSlab[0] = (tCnt)0;
    }
    cSlab[1] = (tCnt)pCts->lt.OutputSize;

if(pCts->lt.ConnectInputs )
    ItoO = 2;
else
    ItoO = 1;
    for ( iS = 0; iS < ItoO; iS++ ) {
//      if ( cSlab[iS] > 0 ) {
            for ( i = 0; i < cSlab[iS]; i++ ) {
                if ( GetWts( (tId)    NetId,
                             (tNum) ( FIRST_SLAB_NBR  + Slab[iS]  ),
                             (tNum) ( FIRST_PE_NBR    + i         ),
                             (tCnt) ( FIRST_CLASS_NBR + Class[iS] ),
                             (tNum) ( FIRST_ICN_NBR   + Icn[iS]   ),
                             (tNum)   Isize,
                             (tPtr)   pWts[0],
                             (tPtr)   &cWts
                           ) == FALSE || cWts != Isize ) {
                    PrintErr(pProcNil);
                    return        ( eGetWtsFailed );
                }
                for ( j = 0; j < Isize; j++ )
                    (pWts[1])[Map[j]] = (pWts[0])[j];
                if ( PutWts( (tId)    NetId,
                             (tNum) ( FIRST_SLAB_NBR  + Slab[iS]  ),
                             (tNum) ( FIRST_PE_NBR    + i         ),
                             (tCnt) ( FIRST_CLASS_NBR + Class[iS] ),
                             (tNum) ( FIRST_ICN_NBR   + Icn[iS]   ),
                             (tNum)   Isize,
                             (tPtr)   pWts[1],
                             (tPtr)   &cWts
                           ) == FALSE || cWts != Isize ) {
                    PrintErr(pProcNil);
                    return        ( ePutWtsFailed );
                }
            }
//      }
    }
    Free( pWts[0] );
    Free( pWts[1] );
    return(0);
}

/**********************************************************************
 * $Header$
 * $Source$
 * $Log$
 *
 * Description:
 *     Entry and exit routines for EXUISL.DLL routine. This library
 *     provides an interface between the MWUISL.DLL and EXCEL in order
 *     to allow EXCEL to call MWUISL APIs.
 **********************************************************************/ include "exuisl.h"
include "glob.h"
#include "toolbox.h"

/**********************************************************************
 * FUNCTION: LibMain(HANDLE, WORD, WORD, LPSTR)
 *
 * PURPOSE:  Is called by LibEntry.  LibEntry is called by Windows when
 *           the DLL is loaded.  The LibEntry routine is provided in
 *           the LIBENTRY.OBJ in the SDK Link Libraries disk.  (The
 *           source LIBENTRY.ASM is also provided.)
```

```
 *          LibEntry initializes the DLL's heap, if a HEAPSIZE value is
 *          specified in the DLL's DEF file.  Then LibEntry calls --
 *          LibMain.  The LibMain function below satisfies that call.
 *
 *          The LibMain function should perform additional initialization
 *          tasks required by the DLL.  In this example, no initialization
 *          tasks are required.  LibMain should return a value of 1 if
 *          the initialization is successful.
 *
 */
int FAR PASCAL LibMain(hModule, wDataSeg, cbHeapSize, lpszCmdLine)
HANDLE  hModule;
WORD    wDataSeg;
WORD    cbHeapSize;
LPSTR   lpszCmdLine;
{
    if (cbHeapSize == 0)
        return(0);

hInstance = hModule;

return(1);
}

/************************************************************************
 *  FUNCTION:  WEP(int)
 *
 *  PURPOSE:   Performs cleanup tasks when the DLL is unloaded.  WEP() is
 *             called automatically by Windows when the DLL is unloaded (no
 *             remaining tasks still have the DLL loaded).  It is strongly
 *             recommended that a DLL have a WEP() function, even if it does
 *             nothing but returns success (1), as in this example.
 *
 */
int FAR PASCAL WEP (bSystemExit)
int bSystemExit;
{
    return(1);
}
            /*

Malloc

*/
            #include "exuisl.h"

#define     FUNCNAME ((LPSTR) "MEMORY")

LPVOID Malloc(lsize)
            long        lsize;
            {
                HANDLE  hmem;
                LPSTR   pmem;

if(lsize == (long) 0)
                lsize = (long) 1;
                if ((hmem = GlobalAlloc(GPTR, (DWORD) lsize)) == NULL) {
                    MessageBox(NULL, "GlobalAlloc Failed", FUNCNAME, EXMB_ERR);
                    return(NULL);
                }
                if ((pmem = GlobalLock(hmem)) == NULL) {
                    MessageBox(NULL, "GlobalLock Failed", FUNCNAME, EXMB_ERR);
                    GlobalFree(hmem);
                    return(NULL);
                } return(pmem);
            }

/*

Free

*/

VOID Free(pmem)
            LPVOID      pmem;
            {
                HANDLE  hmem;

if ((hmem = (HANDLE) (GlobalHandle(HIWORD(pmem)))) != NULL) {
                    GlobalFree(hmem);
                }.
            }
```

ERROR MODEL SOURCE CODE

```c
#include <math.h>
#include <stdio.h>
#include <string.h>
#include "exuisl.h"
#include <toolbox.h>
//#include <dutil.h>

// Move to global.h  definition file
// start here
// stop here
#define FUNCNAME      ((LPSTR) "EXERRSCORE")

extern double far    *Reg;
extern double far     *Regwts;
extern long          rwt_index;

LPSTR get_Rwtfilename(void);

/* -----------------------------------------------------------------------

FUNCTION: ExErrScore()

EXCEL REGISTER CALL REGISTER("EXUISL","EXERRSCORE",">I")

MODULE NAME:  read_regwts

DESCRIPTION:  Read in the regression weights.

CALLED BY:

CALLS: none

INPUTS:  The AREAS "*.rwt" regression weights file.

OUTPUTS: The regression error model score.

-------------------------------------------------------------------- */
LONG FAR PASCAL ExErrScore()
{
   long    indx;
   long    rc=0;                 /* return code                    */
   double     score;

/* regwts, the regression weights array, is global              */ for ( indx = 0; indx < rwt_index; indx++) {
        score = score + Reg[indx] * Regwts[indx];
   } if (score <= .057)
       rc = 1;
   else if (score <= .0743)
       rc = 2;
   else if (score <= .095)
       rc = 3;
   else if (score <= .1282)
       rc = 4;
   else
       rc = 5;

return(rc);
}
```

```
/*************************************************************/
/*                        AREAS                              */
/*************************************************************/
options nocenter linesize=79 pagesize=23 obs=max;

libname in '../data';
libname out '../data';

data out.train out.test;
  set in.epmaster;

pred_sp2 = pred_sp * pred_sp;
  pred_sp3 = pred_sp2 * pred_sp;

apnpdif = abs( pred_sp - apn_comp )/pred_sp;
  apnpdif2 = apnpdif * apnpdif;
  apnpdif3 = apnpdif2 * apnpdif;

zippdif = abs( pred_sp - zip_comp )/pred_sp;
  zippdif2 = zippdif * zippdif;
  zippdif3 = zippdif2 * zippdif;

if mnth891 = . then do;
    mnth891 = 0;
    mnth8912 = 0;
    mnth8913 = 0;
    mnth891_ = 1;
  end;
  else do;
    mnth8912 = mnth891*mnth891;
    mnth8913 = mnth8912*mnth891;
    mnth891_ = 0;
  end;

ASRCall = 0;
  ASRCap6 = 0;
  ASRCap7 = 0;
  ASRCct6 = 0;
  ASRCmap = 0;
  ASRCzip = 0;
  if APNSRC = 'all' then ASRCall = 1;
  else if APNSRC = 'ap6' then ASRCap6 = 1;
  else if APNSRC = 'ap7' then ASRCap7 = 1;
  else if APNSRC = 'ct6' then ASRCct6 = 1;
  else if APNSRC = 'map' then ASRCmap = 1;
  else if APNSRC = 'zip' then ASRCzip = 1;
  else do;
    ASRCall = -1;
    ASRCap6 = -1;
    ASRCap7 = -1;
    ASRCct6 = -1;
    ASRCmap = -1;
    ASRCzip = -1;
  end;

MSRCall = 0;
  MSRCct6 = 0;
  MSRCmap = 0;
  MSRCzip = 0;
  if MAPSRC = 'all' then MSRCall = 1;
  else if MAPSRC = 'ct6' then MSRCct6 = 1;
  else if MAPSRC = 'map' then MSRCmap = 1;
  else if MAPSRC = 'zip' then MSRCzip = 1;
  else do;
    MSRCall = -1;
    MSRCct6 = -1;
    MSRCmap = -1;
    MSRCzip = -1;
  end;

AIRCONDA = 0;
  AIRCONDC = 0;
  AIRCONDN = 0;
```

```
AIRCONDX = 0;
if AIR_COND = 'A' then AIRCONDA = 1;
else if AIR_COND = 'C' then AIRCONDC = 1;
else if AIR_COND = 'N' then AIRCONDN = 1;
else if AIR_COND = 'X' then AIRCONDX = 1;
else do;
   AIRCONDA = -1;
   AIRCONDC = -1;
   AIRCONDN = -1;
   AIRCONDX = -1;
end;

BAFLCNDF = 0;
BAFLCNDG = 0;
if BA_FLCND = 'F' then BAFLCNDF = 1;
else if BA_FLCND = 'G' then BAFLCNDG = 1;
else do;
   BAFLCNDF = -1;
   BAFLCNDG = -1;
end;

BAFLMATC = 0;
BAFLMATV = 0;
BAFLMATX = 0;
if BA_FLMAT = 'C' then BAFLMATC = 1;
else if BA_FLMAT = 'V' then BAFLMATV = 1;
else if BA_FLMAT = 'X' then BAFLMATX = 1;
else do;
   BAFLMATC = -1;
   BAFLMATV = -1;
   BAFLMATX = -1;
end;

BAWNCONF = 0;
BAWNCONG = 0;
if BA_WNCON = 'F' then BAWNCONF = 1;
else if BA_WNCON = 'G' then BAWNCONG = 1;
else do;
   BAWNCONF = -1;
   BAWNCONG = -1;
end;

BAWNMATC = 0;
BAWNMATF = 0;
if BA_WNMAT = 'C' then BAWNMATC = 1;
else if BA_WNMAT = 'F' then BAWNMATF = 1;
else do;
   BAWNMATC = -1;
   BAWNMATF = -1;
end;

FLRMATA = 0;
FLRMATC = 0;
FLRMATS = 0;
FLRMATT = 0;
FLRMATV = 0;
FLRMATW = 0;
FLRMATX = 0;
if FLR_MAT = 'A' then FLRMATA = 1;
else if FLR_MAT = 'C' then FLRMATC = 1;
else if FLR_MAT = 'S' then FLRMATS = 1;
else if FLR_MAT = 'T' then FLRMATT = 1;
else if FLR_MAT = 'V' then FLRMATV = 1;
else if FLR_MAT = 'W' then FLRMATW = 1;
else if FLR_MAT = 'X' then FLRMATX = 1;
else do;
   FLRMATA = -1;
   FLRMATC = -1;
   FLRMATS = -1;
   FLRMATT = -1;
   FLRMATV = -1;
   FLRMATW = -1;
   FLRMATX = -1;
end;
```

```
FLZONEN = 0;
FLZONEY = 0;
if FL_ZONE = 'N' then FLZONEN = 1;
else if FL_ZONE = 'Y' then FLZONEY = 1;
else do;
   FLZONEN = -1;
   FLZONEY = -1;
end;

FNDINFN = 0;
FNDINFY = 0;
if FND_INF = 'N' then FNDINFN = 1;
else if FND_INF = 'Y' then FNDINFY = 1;
else do;
   FNDINFN = -1;
   FNDINFY = -1;
end;

FNDSETLN = 0;
FNDSETLY = 0;
if FND_SETL = 'N' then FNDSETLN = 1;
else if FND_SETL = 'Y' then FNDSETLY = 1;
else do;
   FNDSETLN = -1;
   FNDSETLY = -1;
end;

FRPLTYPB = 0;
FRPLTYPG = 0;
FRPLTYPN = 0;
FRPLTYPW = 0;
FRPLTYPX = 0;
FRPLTYPY = 0;
if FRPL_TYP = 'B' then FRPLTYPB = 1;
else if FRPL_TYP = 'G' then FRPLTYPG = 1;
else if FRPL_TYP = 'N' then FRPLTYPN = 1;
else if FRPL_TYP = 'W' then FRPLTYPW = 1;
else if FRPL_TYP = 'X' then FRPLTYPX = 1;
else if FRPL_TYP = 'Y' then FRPLTYPY = 1;
else do;
   FRPLTYPB = -1;
   FRPLTYPG = -1;
   FRPLTYPN = -1;
   FRPLTYPW = -1;
   FRPLTYPX = -1;
   FRPLTYPY = -1;
end;
HOAn = 0;
HOAy = 0;
if HOA = 'n' then HOAn = 1;
else if HOA = 'y' then HOAy = 1;
else do;
   HOAn = -1;
   HOAy = -1;
end;

IMPTYPEA = 0;
IMPTYPED = 0;
IMPTYPEX = 0;
if IMP_TYPE = 'A' then IMPTYPEA = 1;
else if IMP_TYPE = 'D' then IMPTYPED = 1;
else if IMP_TYPE = 'X' then IMPTYPEX = 1;
else do;
   IMPTYPEA = -1;
   IMPTYPED = -1;
   IMPTYPEX = -1;
end;

LANDSCPA = 0;
LANDSCPI = 0;
LANDSCPX = 0;
if LANDSCAP = 'A' then LANDSCPA = 1;
else if LANDSCAP = 'I' then LANDSCPI = 1;
else if LANDSCAP = 'X' then LANDSCPX = 1;
else do;
```

```
      LANDSCPA = -1;
      LANDSCPI = -1;
      LANDSCPX = -1;
end;

LOTSHAPI = 0;
LOTSHAPR = 0;
LOTSHAPX = 0;
if LOT_SHAP = 'I' then LOTSHAPI = 1;
else if LOT_SHAP = 'R' then LOTSHAPR = 1;
else if LOT_SHAP = 'X' then LOTSHAPX = 1;
else do;
   LOTSHAPI = -1;
   LOTSHAPR = -1;
   LOTSHAPX = -1;
end;

MANHOMEN = 0;
MANHOMEY = 0;
if MAN_HOME = 'N' then MANHOMEN = 1;
else if MAN_HOME = 'Y' then MANHOMEY = 1;
else do;
   MANHOMEN = -1;
   MANHOMEY = -1;
end;

OWNTYPED = 0;
OWNTYPEP = 0;
OWNTYPEC = 0;
OWNTYPEO = 0;
if OWN_TYPE = 'D' then OWNTYPED = 1;
else if OWN_TYPE = 'P' then OWNTYPEP = 1;
else if OWN_TYPE = 'C' then OWNTYPEC = 1;
else if OWN_TYPE = 'O' then OWNTYPEO = 1;
else do;
   OWNTYPED = -1;
   OWNTYPEP = -1;
   OWNTYPEC = -1;
   OWNTYPEO = -1;
end;

PARCLSZO = 0;
PARCLSZT = 0;
PARCLSZU = 0;
PARCLSZX = 0;
if PARCLSIZ = 'O' then PARCLSZO = 1;
else if PARCLSIZ = 'T' then PARCLSZT = 1;
else if PARCLSIZ = 'U' then PARCLSZU = 1;
else if PARCLSIZ = 'X' then PARCLSZX = 1;
else do;
   PARCLSZO = -1;
   PARCLSZT = -1;
   PARCLSZU = -1;
   PARCLSZX = -1;
end;

POOLTYPB = 0;
POOLTYPH = 0;
POOLTYPP = 0;
POOLTYPS = 0;
if POOLTYPE = 'B' then POOLTYPB = 1;
else if POOLTYPE = 'P' then POOLTYPP = 1;
else if POOLTYPE = 'H' then POOLTYPH = 1;
else if POOLTYPE = 'S' then POOLTYPS = 1;
else do;
   POOLTYPB = -1;
   POOLTYPH = -1;
   POOLTYPP = -1;
   POOLTYPS = -1;
end;

PCONDA = 0;
PCONDF = 0;
PCONDG = 0;
if P_COND = 'A' then PCONDA = 1;
```

```
else if P_COND = 'F' then PCONDF = 1;
else if P_COND = 'G' then PCONDG = 1;
else do;
   PCONDA = -1;
   PCONDF = -1;
   PCONDG = -1;
end;

PDOROPNN = 0;
PDOROPNY = 0;
if P_DOROPN = 'N' then PDOROPNN = 1;
else if P_DOROPN = 'Y' then PDOROPNY = 1;
else do;
   PDOROPNN = -1;
   PDOROPNY = -1;
end;

PSTRAGEC = 0;
PSTRAGEG = 0;
PSTRAGEN = 0;
PSTRAGEX = 0;
if P_STRAGE = 'G' then PSTRAGEG = 1;
else if P_STRAGE = 'C' then PSTRAGEC = 1;
else if P_STRAGE = 'N' then PSTRAGEN = 1;
else if P_STRAGE = 'X' then PSTRAGEX = 1;
else do;
   PSTRAGEG = -1;
   PSTRAGEC = -1;
   PSTRAGEN = -1;
   PSTRAGEX = -1;
end;

ROOFTYPA = 0;
ROOFTYPB = 0;
ROOFTYPC = 0;
ROOFTYPI = 0;
ROOFTYPK = 0;
ROOFTYPS = 0;
ROOFTYPT = 0;
ROOFTYPX = 0;
if ROOFTYPE = 'A' then ROOFTYPA = 1;
else if ROOFTYPE = 'B' then ROOFTYPB = 1;
else if ROOFTYPE = 'C' then ROOFTYPC = 1;
else if ROOFTYPE = 'I' then ROOFTYPI = 1;
else if ROOFTYPE = 'K' then ROOFTYPK = 1;
else if ROOFTYPE = 'S' then ROOFTYPS = 1;
else if ROOFTYPE = 'T' then ROOFTYPT = 1;
else if ROOFTYPE = 'X' then ROOFTYPX = 1;
else do;
   ROOFTYPA = -1;
   ROOFTYPB = -1;
   ROOFTYPC = -1;
   ROOFTYPI = -1;
   ROOFTYPK = -1;
   ROOFTYPS = -1;
   ROOFTYPT = -1;
   ROOFTYPX = -1;
end;

SITEINFB = 0;
SITEINFC = 0;
SITEINFE = 0;
SITEINFG = 0;
SITEINFL = 0;
SITEINFM = 0;
SITEINFN = 0;
SITEINFO = 0;
SITEINFV = 0;
SITEINFW = 0;
SITEINFX = 0;
if SITE_INF = 'B' then SITEINFB = 1;
else if SITE_INF = 'C' then SITEINFC = 1;
```

```
      else if SITE_INF = 'E' then SITEINFC = 1;
      else if SITE_INF = 'G' then SITEINFG = 1;
      else if SITE_INF = 'L' then SITEINFL = 1;
      else if SITE_INF = 'M' then SITEINFM = 1;
      else if SITE_INF = 'N' then SITEINFN = 1;
      else if SITE_INF = 'O' then SITEINFO = 1;
      else if SITE_INF = 'V' then SITEINFV = 1;
      else if SITE_INF = 'W' then SITEINFW = 1;
      else if SITE_INF = 'X' then SITEINFX = 1;
      else do;
         SITEINFB = -1;
         SITEINFC = -1;
         SITEINFE = -1;
         SITEINFG = -1;
         SITEINFL = -1;
         SITEINFM = -1;
         SITEINFN = -1;
         SITEINFO = -1;
         SITEINFV = -1;
         SITEINFW = -1;
         SITEINFX = -1;
      end;

SISTMR = 0;
      SISTMU = 0;
      if SI_STM = 'R' then SISTMR = 1;
      else if SI_STM = 'U' then SISTMU = 1;
      else do;
         SISTMR = -1;
         SISTMU = -1;
      end;

SISTTA = 0;
      SISTTC = 0;
      SISTTX = 0;
      if SI_STT = 'A' then SISTTA = 1;
      else if SI_STT = 'C' then SISTTC = 1;
      else if SI_STT = 'X' then SISTTX = 1;
      else do;
         SISTTA = -1;
         SISTTC = -1;
         SISTTX = -1;
      end;

STRYSFD1 = 0;
      STRYSFD2 = 0;
      STRYSFD3 = 0;
      STRYSFD4 = 0;
      if STRYSFDU = '1' then STRYSFD1 = 1;
      else if STRYSFDU = '2' then STRYSFD2 = 1;
      else if STRYSFDU = '3' then STRYSFD3 = 1;
      else if STRYSFDU = '4' then STRYSFD4 = 1;
      else do;
         STRYSFD1 = -1;
         STRYSFD2 = -1;
         STRYSFD3 = -1;
         STRYSFD4 = -1;
      end;

STYLECDB = 0;
      STYLECDM = 0;
      STYLECDN = 0;
      STYLECDO = 0;
      STYLECDR = 0;
      STYLECDS = 0;
      STYLECDT = 0;
      STYLECDX = 0;
      if STYLECOD = 'B' then STYLECDB = 1;
      else if STYLECOD = 'M' then STYLECDM = 1;
      else if STYLECOD = 'N' then STYLECDN = 1;
      else if STYLECOD = 'O' then STYLECDO = 1;
      else if STYLECOD = 'R' then STYLECDR = 1;
      else if STYLECOD = 'S' then STYLECDS = 1;
      else if STYLECOD = 'T' then STYLECDT = 1;
      else if STYLECOD = 'X' then STYLECDX = 1;
```

```
      else do;
        STYLECDB = -1;
        STYLECDM = -1;
        STYLECDN = -1;
        STYLECDO = -1;
        STYLECDR = -1;
        STYLECDS = -1;
        STYLECDT = -1;
        STYLECDX = -1;
      end;
   TOPOCODH = 0;
   TOPOCODL = 0;
   TOPOCODR = 0;
   TOPOCODS = 0;
   TOPOCODX = 0;
   if TOPOCODE = 'H' then TOPOCODH = 1;
   else if TOPOCODE = 'L' then TOPOCODL = 1;
   else if TOPOCODE = 'R' then TOPOCODR = 1;
   else if TOPOCODE = 'S' then TOPOCODS = 1;
   else if TOPOCODE = 'X' then TOPOCODX = 1;
   else do;
     TOPOCODH = -1;
     TOPOCODL = -1;
     TOPOCODR = -1;
     TOPOCODS = -1;
     TOPOCODX = -1;
   end;

WALEXTTC = 0;
   WALEXTTT = 0;
   WALEXTTW = 0;
   WALEXTTX = 0;
   WALEXTTZ = 0;
   if WAL_EXTT = 'C' then WALEXTTC = 1;
   else if WAL_EXTT = 'T' then WALEXTTT = 1;
   else if WAL_EXTT = 'W' then WALEXTTW = 1;
   else if WAL_EXTT = 'X' then WALEXTTX = 1;
   else if WAL_EXTT = 'Z' then WALEXTTZ = 1;
   else do;
     WALEXTTC = -1;
     WALEXTTT = -1;
     WALEXTTW = -1;
     WALEXTTX = -1;
     WALEXTTZ = -1;
   end;

if AGE = . then do;
     AGE = 0;
     AGE2 = 0;
     AGE3 = 0;
     AGE_ = 1;
   end;
   else do;
     AGE2 = AGE*AGE;
     AGE3 = AGE2*AGE;
     AGE_ = 0;
   end;

if APNDIFAG = . then do;
     APNDIFAG = 0;
     APNDFAG2 = 0;
     APNDFAG3 = 0;
     APNDFAG_ = 1;
   end;
   else do;
     APNDFAG2 = APNDIFAG*APNDIFAG;
     APNDFAG3 = APNDFAG2*APNDIFAG;
     APNDFAG_ = 0;
   end;

if APNDIFBA = . then do;
     APNDIFBA = 0;
     APNDFBA2 = 0;
     APNDFBA3 = 0;
     APNDFBA_ = 1;
```

```
      end;
   else do;
      APNDFBA2 = APNDIFBA*APNDIFBA;
      APNDFBA3 = APNDFBA2*APNDIFBA;
      APNDFBA_ = 0;
   end;

if APNDIFBE = . then do;
      APNDIFBE = 0;
      APNDFBE2 = 0;
      APNDFBE3 = 0;
      APNDFBE_ = 1;
   end;
   else do;
      APNDFBE2 = APNDIFBE*APNDIFBE;
      APNDFBE3 = APNDFBE2*APNDIFBE;
      APNDFBE_ = 0;
   end;

if APNDIFFP = . then do;
      APNDIFFP = 0;
      APNDFFP2 = 0;
      APNDFFP3 = 0;
      APNDFFP_ = 1;
   end;
   else do;
      APNDFFP2 = APNDIFFP*APNDIFFP;
      APNDFFP3 = APNDFFP2*APNDIFFP;
      APNDFFP_ = 0;
   end;

if APNDIFGA = . then do;
      APNDIFGA = 0;
      APNDFGA2 = 0;
      APNDFGA3 = 0;
      APNDFGA_ = 1;
   end;
   else do;
      APNDFGA2 = APNDIFGA*APNDIFGA;
      APNDFGA3 = APNDFGA2*APNDIFGA;
      APNDFGA_ = 0;
   end;

if APNDIFRM = . then do;
      APNDIFRM = 0;
      APNDFRM2 = 0;
      APNDFRM3 = 0;
      APNDFRM_ = 1;
   end;
   else do;
      APNDFRM2 = APNDIFRM*APNDIFRM;
      APNDFRM3 = APNDFRM2*APNDIFRM;
      APNDFRM_ = 0;
   end;

if APNDIFSQ = . then do;
      APNDIFSQ = 0;
      APNDFSQ2 = 0;
      APNDFSQ3 = 0;
      APNDFSQ_ = 1;
   end;
   else do;
      APNDFSQ2 = APNDIFSQ*APNDIFSQ;
      APNDFSQ3 = APNDFSQ2*APNDIFSQ;
      APNDFSQ_ = 0;
   end;

if APN_COMP = . then do;
      APN_COMP = 0;
      APNCOMP2 = 0;
      APNCOMP3 = 0;
      APNCOMP_ = 1;
   end;
   else do;
      APNCOMP2 = APN_COMP*APN_COMP;
      APNCOMP3 = APNCOMP2*APN_COMP;
      APNCOMP_ = 0;
   end;
```

```
   if BA_NUM = . then do;
     BA_NUM = 0;
     BA_NUM2 = 0;
     BA_NUM3 = 0;
     BA_NUM_ = 1;
   end;
   else do;
     BA_NUM2 = BA_NUM*BA_NUM;
     BA_NUM3 = BA_NUM2*BA_NUM;
     BA_NUM_ = 0;
   end;

if BEDRMS_N = . then do;
     BEDRMS_N = 0;
     BEDRMSN2 = 0;
     BEDRMSN3 = 0;
     BEDRMSN_ = 1;
   end;
   else do;
     BEDRMSN2 = BEDRMS_N*BEDRMS_N;
     BEDRMSN3 = BEDRMSN2*BEDRMS_N;
     BEDRMSN_ = 0;
   end;

if ECONLIFE = . then do;
     ECONLIFE = 0;
     ECONLIF2 = 0;
     ECONLIF3 = 0;
     ECONLIF_ = 1;
   end;
   else do;
     ECONLIF2 = ECONLIFE*ECONLIFE;
     ECONLIF3 = ECONLIF2*ECONLIFE;
     ECONLIF_ = 0;
   end;

if EQUIP = . then do;
     EQUIP = 0;
     EQUIP2 = 0;
     EQUIP3 = 0;
     EQUIP_ = 1;
   end;
   else do;
     EQUIP2 = EQUIP*EQUIP;
     EQUIP3 = EQUIP2*EQUIP;
     EQUIP_ = 0;
   end;

if FRPL_NUM = . then do;
     FRPL_NUM = 0;
     FRPLNUM2 = 0;
     FRPLNUM3 = 0;
     FRPLNUM_ = 1;
   end;
   else do;
     FRPLNUM2 = FRPL_NUM*FRPL_NUM;
     FRPLNUM3 = FRPLNUM2*FRPL_NUM;
     FRPLNUM_ = 0;
   end;

if LN_LOT = . then do;
     LN_LOT = 0;
     LN_LOT2 = 0;
     LN_LOT3 = 0;
     LN_LOT_ = 1;
   end;
   else do;
     LN_LOT2 = LN_LOT*LN_LOT;
     LN_LOT3 = LN_LOT2*LN_LOT;
     LN_LOT_ = 0;
   end;

if OIMPS = . then do;
     OIMPS = 0;
     OIMPS2 = 0;
     OIMPS3 = 0;
     OIMPS_ = 1;
   end;
```

```
  else do;
    OIMPS2 = OIMPS*OIMPS;
    OIMPS3 = OIMPS2*OIMPS;
    OIMPS_ = 0;
  end;

if P_SPACES = . then do;
    P_SPACES = 0;
    PSPACES2 = 0;
    PSPACES3 = 0;
    PSPACES_ = 1;
  end;
  else do;
    PSPACES2 = P_SPACES*P_SPACES;
    PSPACES3 = PSPACES2*P_SPACES;
    PSPACES_ = 0;
  end;

if REMODEL = . then do;
    REMODEL = 0;
    REMODEL2 = 0;
    REMODEL3 = 0;
    REMODEL_ = 1;
  end;
  else do;
    REMODEL2 = REMODEL*REMODEL;
    REMODEL3 = REMODEL2*REMODEL;
    REMODEL_ = 0;
  end;

if R_TOT_N = . then do;
    R_TOT_N = 0;
    R_TOT_N2 = 0;
    R_TOT_N3 = 0;
    R_TOT_N_ = 1;
  end;
  else do;
    R_TOT_N2 = R_TOT_N*R_TOT_N;
    R_TOT_N3 = R_TOT_N2*R_TOT_N;
    R_TOT_N_ = 0;
  end;

if SQ_FT_LA = . then do;
    SQ_FT_LA = 0;
    SQ_FTLA2 = 0;
    SQ_FTLA3 = 0;
    SQ_FTLA_ = 1;
  end;
  else do;
    SQ_FTLA2 = SQ_FT_LA*SQ_FT_LA;
    SQ_FTLA3 = SQ_FTLA2*SQ_FT_LA;
    SQ_FTLA_ = 0;
  end;

if ZIPCMPAG = . then do;
    ZIPCMPAG = 0;
    ZIPCMAG2 = 0;
    ZIPCMAG3 = 0;
    ZIPCMAG_ = 1;
  end;
  else do;
    ZIPCMAG2 = ZIPCMPAG*ZIPCMPAG;
    ZIPCMAG3 = ZIPCMAG2*ZIPCMPAG;
    ZIPCMAG_ = 0;
  end;

if ZIPCMPBA = . then do;
    ZIPCMPBA = 0;
    ZIPCMBA2 = 0;
    ZIPCMBA3 = 0;
    ZIPCMBA_ = 1;
  end;
  else do;
    ZIPCMBA2 = ZIPCMPBA*ZIPCMPBA;
    ZIPCMBA3 = ZIPCMBA2*ZIPCMPBA;
    ZIPCMBA_ = 0;
  end;
```

```
if ZIPCMPBE = . then do;
   ZIPCMPBE = 0;
   ZIPCMBE2 = 0;
   ZIPCMBE3 = 0;
   ZIPCMBE_ = 1;
end;
else do;
   ZIPCMBE2 = ZIPCMPBE*ZIPCMPBE;
   ZIPCMBE3 = ZIPCMBE2*ZIPCMPBE;
   ZIPCMBE_ = 0;
end;

if ZIPCMPFP = . then do;
   ZIPCMPFP = 0;
   ZIPCMFP2 = 0;
   ZIPCMFP3 = 0;
   ZIPCMFP_ = 1;
end;
else do;
   ZIPCMFP2 = ZIPCMPFP*ZIPCMPFP;
   ZIPCMFP3 = ZIPCMFP2*ZIPCMPFP;
   ZIPCMFP_ = 0;
end;

if ZIPCMPGA = . then do;
   ZIPCMPGA = 0;
   ZIPCMGA2 = 0;
   ZIPCMGA3 = 0;
   ZIPCMGA_ = 1;
end;
else do;
   ZIPCMGA2 = ZIPCMPGA*ZIPCMPGA;
   ZIPCMGA3 = ZIPCMGA2*ZIPCMPGA;
   ZIPCMGA_ = 0;
end;

if ZIPCMPRM = . then do;
   ZIPCMPRM = 0;
   ZIPCMRM2 = 0;
   ZIPCMRM3 = 0;
   ZIPCMRM_ = 1;
end;
else do;
   ZIPCMRM2 = ZIPCMPRM*ZIPCMPRM;
   ZIPCMRM3 = ZIPCMRM2*ZIPCMPRM;
   ZIPCMRM_ = 0;
end;

if ZIPCMPSQ = . then do;
   ZIPCMPSQ = 0;
   ZIPCMSQ2 = 0;
   ZIPCMSQ3 = 0;
   ZIPCMSQ_ = 1;
end;
else do;
   ZIPCMSQ2 = ZIPCMPSQ*ZIPCMPSQ;
   ZIPCMSQ3 = ZIPCMSQ2*ZIPCMPSQ;
   ZIPCMSQ_ = 0;
end;

if ZIP_COMP = . then do;
   ZIP_COMP = 0;
   ZIPCOMP2 = 0;
   ZIPCOMP3 = 0;
   ZIPCOMP_ = 1;
end;
else do;
   ZIPCOMP2 = ZIP_COMP*ZIP_COMP;
   ZIPCOMP3 = ZIPCOMP2*ZIP_COMP;
   ZIPCOMP_ = 0;
end;
```

```
keep
  obsno
  epflag
  APERR
  pred_sp
  pred_sp2
  pred_sp3
  apnpdif
  apnpdif2
  apnpdif3
  zippdif
  zippdif2
  zippdif3
  mnth891
  mnth8912
  mnth8913
  mnth891_
  ASRCall
  ASRCap6
  ASRCap7
  ASRCct6
  ASRCmap
  ASRCzip
  MSRCall
  MSRCct6
  MSRCmap
  MSRCzip
  AIRCONDA
  AIRCONDC
  AIRCONDN
  AIRCONDX
  BAFLCNDF
  BAFLCNDG
  BAFLMATC
  BAFLMATV
  BAFLMATX
  BAWNCONF
  BAWNCONG
  BAWNMATC
  BAWNMATF
  FLRMATA
  FLRMATC
  FLRMATS
  FLRMATT
  FLRMATV
  FLRMATW
  FLRMATX
  FLZONEN
  FLZONEY
  FNDINFN
  FNDINFY
  FNDSETLN
  FNDSETLY
  FRPLTYPB
  FRPLTYPG
  FRPLTYPN
  FRPLTYPW
  FRPLTYPX
  FRPLTYPY
  HOAn
  HOAy
  IMPTYPEA
  IMPTYPED
  IMPTYPEX
  LANDSCPA
  LANDSCPI
  LANDSCPX
  LOTSHAPI
  LOTSHAPR
  LOTSHAPX
  MANHOMEN
  MANHOMEY
  OWNTYPEC
  OWNTYPED
  OWNTYPEO
```

```
OWNTYPEP
PARCLSZO
PARCLSZT
PARCLSZU
PARCLSZX
POOLTYPB
POOLTYPH
POOLTYPP
POOLTYPS
PCONDA
PCONDF
PCONDG
PDOROPNN
PDOROPNY
PSTRAGEC
PSTRAGEG
PSTRAGEN
PSTRAGEX
ROOFTYPA
ROOFTYPB
ROOFTYPC
ROOFTYPI
ROOFTYPK
ROOFTYPS
ROOFTYPT
ROOFTYPX
SITEINFB
SITEINFC
SITEINFE
SITEINFG
SITEINFL
SITEINFM
SITEINFN
SITEINFO
SITEINFV
SITEINFW
SITEINFX
SISTMR
SISTMU
SISTTA
SISTTC
SISTTX
STRYSFD1
STRYSFD2
STRYSFD3
STRYSFD4
STYLECDB
STYLECDM
STYLECDN
STYLECDO
STYLECDR
STYLECDS
STYLECDT
STYLECDX
TOPOCODH
TOPOCODL
TOPOCODR
TOPOCODS
TOPOCODX
WALEXTTC
WALEXTTT
WALEXTTW
WALEXTTX
WALEXTTZ
AGE
AGE2
AGE3
AGE_
APNDIFAG
APNDFAG2
APNDFAG3
APNDFAG_
APNDIFBA
APNDFBA2
APNDFBA3
```

APNDFBA_
APNDIFBE
APNDFBE2
APNDFBE3
APNDFBE_
APNDIFFP
APNDFFP2
APNDFFP3
APNDFFP_
APNDIFGA
APNDFGA2
APNDFGA3
APNDFGA_
APNDIFRM
APNDFRM2
APNDFRM3
APNDFRM_
APNDIFSQ
APNDFSQ2
APNDFSQ3
APNDFSQ_
APN_COMP
APNCOMP2
APNCOMP3
APNCOMP_
BA_NUM
BA_NUM2
BA_NUM3
BA_NUM_
BEDRMS_N
BEDRMSN2
BEDRMSN3
BEDRMSN_
ECONLIFE
ECONLIF2
ECONLIF3
ECONLIF_
EQUIP
EQUIP2
EQUIP3
EQUIP_
FRPL_NUM
FRPLNUM2
FRPLNUM3
FRPLNUM_
LN_LOT
LN_LOT2
LN_LOT3
LN_LOT_
OIMPS
OIMPS2
OIMPS3
OIMPS_
P_SPACES
PSPACES2
PSPACES3
PSPACES_
REMODEL
REMODEL2
REMODEL3
REMODEL_
R_TOT_N
R_TOT_N2
R_TOT_N3
R_TOT_N_
SQ_FT_LA
SQ_FTLA2
SQ_FTLA3
SQ_FTLA_
ZIPCMPAG
ZIPCMAG2

```
    ZIPCMAG3
    ZIPCMAG_
    ZIPCMPBA
    ZIPCMBA2
    ZIPCMBA3
    ZIPCMBA_
    ZIPCMPBE
    ZIPCMBE2
    ZIPCMBE3
    ZIPCMBE_
    ZIPCMPFP
    ZIPCMFP2
    ZIPCMFP3
    ZIPCMFP_
    ZIPCMPGA
    ZIPCMGA2
    ZIPCMGA3
    ZIPCMGA_
    ZIPCMPRM
    ZIPCMRM2
    ZIPCMRM3
    ZIPCMRM_
    ZIPCMPSQ
    ZIPCMSQ2
    ZIPCMSQ3
    ZIPCMSQ_
    ZIP_COMP
    ZIPCOMP2
    ZIPCOMP3
    ZIPCOMP_
 ;

if flag = 'train' then epflag = 'trn';
 else if flag = 'test' then epflag = 'tst';

/* The 'else' code below looks dubious to me - Curt */
 else do;
    randval = ranuni( 1234 );
    if randval < 0.85 then epflag = 'trn';
    else epflag = 'tst';
 end;

obsno = _n_;

if epflag = 'trn' then output out.train;
 else output out.test;

run;

/******************************************************************/
options linesize=79 pagesize=23 nocenter obs=max;
/******************************************************************/ libname inl '../data';
libname out '../data';
/******************************************************************/ proc reg data=out.train outest=out.eregout;
   model aperr =
      pred_sp pred_sp2 pred_sp3 apnpdif apnpdif2 apnpdif3
      zippdif zippdif2 zippdif3 mnth891 mnth8912 mnth8913 mnth891_
      ASRCall ASRCap6 ASRCap7 ASRCct6 ASRCmap ASRCzip
      MSRCall MSRCct6 MSRCmap MSRCzip
      AIRCONDA AIRCONDC AIRCONDN AIRCONDX BAFLCNDF BAFLCNDG
      BAFLMATC BAFLMATV BAFLMATX BAWNCONF BAWNCONG BAWNMATC
      BAWNMATF FLRMATA FLRMATC FLRMATS FLRMATT FLRMATV
      FLRMATW FLRMATX FLZONEN FLZONEY FNDINFN FNDINFY FNDSETLN FNDSETLY
      FRPLTYPB FRPLTYPG FRPLTYPN FRPLTYPW FRPLTYPX FRPLTYPY
      HOAn HOAy IMPTYPEA
      IMPTYPED IMPTYPEX LANDSCPA LANDSCPI LANDSCPX LOTSHAPI LOTSHAPR
      LOTSHAPX MANHOMEN MANHOMEY OWNTYPEC OWNTYPEO OWNTYPED OWNTYPEP
      PARCLSZO PARCLSZT
      PARCLSZU PARCLSZX POOLTYPB POOLTYPH POOLTYPP POOLTYPS PCONDA PCONDF PCONDG
      PDOROPNN PDOROPNY
```

```
     PSTRAGEC PSTRAGEG PSTRAGEN PSTRAGEX ROOFTYPA ROOFTYPB ROOFTYPC ROOFTYPI
  ROOFTYPK ROOFTYPS ROOFTYPT ROOFTYPX
  SITEINFB SITEINFC SITEINFE SITEINFG
  SITEINFL SITEINFM SITEINFN SITEINFO SITEINFV SITEINFW SITEINFX
  SISTMR SISTMU
  SISTTA SISTTC SISTTX STRYSFD1 STRYSFD2 STRYSFD3 STRYSFD4
  STYLECDB STYLECDM
  STYLECDN STYLECDO STYLECDR STYLECDS STYLECDT STYLECDX TOPOCODH
  TOPOCODL TOPOCODR TOPOCODS TOPOCODX WALEXTTC WALEXTTT WALEXTTW
  WALEXTTX WALEXTTZ AGE AGE2 AGE3 AGE_ APNDIFAG APNDFAG2 APNDFAG3
  APNDFAG_ APNDIFBA APNDFBA2 APNDFBA3 APNDFBA_ APNDIFBE APNDFBE2
  APNDFBE3 APNDFBE_ APNDIFFP APNDFFP2 APNDFFP3 APNDFFP_ APNDIFGA
  APNDFGA2 APNDFGA3 APNDFGA_ APNDIFRM APNDFRM2 APNDFRM3 APNDFRM_
  APNDIFSQ APNDFSQ2 APNDFSQ3 APNDFSQ_ APN_COMP APNCOMP2 APNCOMP3
  APNCOMP_ BA_NUM BA_NUM2 BA_NUM3 BA_NUM_ BEDRMS_N BEDRMSN2 BEDRMSN3
  BEDRMSN_ ECONLIFE ECONLIF2 ECONLIF3 ECONLIF_ EQUIP EQUIP2 EQUIP3
  EQUIP_ FRPL_NUM FRPLNUM2 FRPLNUM3 FRPLNUM_ LN_LOT LN_LOT2 LN_LOT3
  LN_LOT_ P_SPACES PSPACES2 PSPACES3
  PSPACES_ REMODEL REMODEL2 REMODEL3 REMODEL_ R_TOT_N R_TOT_N2
  R_TOT_N3 R_TOT_N_ SQ_FT_LA SQ_FTLA2 SQ_FTLA3 SQ_FTLA_ ZIPCMPAG
  ZIPCMAG2 ZIPCMAG3 ZIPCMAG_ ZIPCMPBA ZIPCMBA2 ZIPCMBA3 ZIPCMBA_
  ZIPCMPBE ZIPCMBE2 ZIPCMBE3 ZIPCMBE_ ZIPCMPFP ZIPCMFP2 ZIPCMFP3
  ZIPCMFP_ ZIPCMPGA ZIPCMGA2 ZIPCMGA3 ZIPCMGA_ ZIPCMPRM ZIPCMRM2
  ZIPCMRM3 ZIPCMRM_ ZIPCMPSQ ZIPCMSQ2 ZIPCMSQ3 ZIPCMSQ_ ZIP_COMP
  ZIPCOMP2 ZIPCOMP3 ZIPCOMP_
  / selection=stepwise ;
run;

proc score
   data=out.train
   score=out.eregout
   out=out.eptrain
   predict
   type=parms;
   id
      aperr
   ;
   var
      pred_sp pred_sp2 pred_sp3 apnpdif apnpdif2 apnpdif3
      zippdif zippdif2 zippdif3 mnth891 mnth8912 mnth8913 mnth891_
   ASRCall ASRCap6 ASRCap7 ASRCct6 ASRCmap ASRCzip
   MSRCall MSRCct6 MSRCmap MSRCzip
   AIRCONDA AIRCONDC AIRCONDN AIRCONDX BAFLCNDF BAFLCNDG
   BAFLMATC BAFLMATV BAFLMATX BAWNCONF BAWNCONG BAWNMATC
   BAWNMATF FLRMATA FLRMATC FLRMATV FLRMATF FLRMATW
   FLRMATW FLRMATX FLZONEN FLZONEY FNDINFN FNDINFY FNDSETLN FNDSETLY
   FRPLTYPB FRPLTYPG FRPLTYPN FRPLTYPW FRPLTYPX FRPLTYPY
   HOAn HOAy IMPTYPEA
   IMPTYPED IMPTYPEX LANDSCPA LANDSCPI LANDSCPX LOTSHAPI LOTSHAPR
   LOTSHAPX MANHOMEN MANHOMEY OWNTYPEC OWNTYPEO OWNTYPED OWNTYPEP
   PARCLSZO PARCLSZT
   PARCLSZU PARCLSZX POOLTYPB POOLTYPH POOLTYPP POOLTYPS PCONDA PCONDF PCONDG
   PDOROPNN PDOROPNY
   PSTRAGEC PSTRAGEG PSTRAGEN PSTRAGEX ROOFTYPA ROOFTYPB ROOFTYPC ROOFTYPI
   ROOFTYPK ROOFTYPS ROOFTYPT ROOFTYPX
   SITEINFB SITEINFC SITEINFE SITEINFG
   SITEINFL SITEINFM SITEINFN SITEINFO SITEINFV SITEINFW SITEINFX
   SISTMR SISTMU
   SISTTA SISTTC SISTTX STRYSFD1 STRYSFD2 STRYSFD3 STRYSFD4
   STYLECDB STYLECDM
   STYLECDN STYLECDO STYLECDR STYLECDS STYLECDT STYLECDX TOPOCODH
   TOPOCODL TOPOCODR TOPOCODS TOPOCODX WALEXTTC WALEXTTT WALEXTTW
   WALEXTTX WALEXTTZ AGE AGE2 AGE3 AGE_ APNDIFAG APNDFAG2 APNDFAG3
   APNDFAG_ APNDIFBA APNDFBA2 APNDFBA3 APNDFBA_ APNDIFBE APNDFBE2
   APNDFBE3 APNDFBE_ APNDIFFP APNDFFP2 APNDFFP3 APNDFFP_ APNDIFGA
   APNDFGA2 APNDFGA3 APNDFGA_ APNDIFRM APNDFRM2 APNDFRM3 APNDFRM_
   APNDIFSQ APNDFSQ2 APNDFSQ3 APNDFSQ_ APN_COMP APNCOMP2 APNCOMP3
   APNCOMP_ BA_NUM BA_NUM2 BA_NUM3 BA_NUM_ BEDRMS_N BEDRMSN2 BEDRMSN3
   BEDRMSN_ ECONLIFE ECONLIF2 ECONLIF3 ECONLIF_ EQUIP EQUIP2 EQUIP3
   EQUIP_ FRPL_NUM FRPLNUM2 FRPLNUM3 FRPLNUM_ LN_LOT LN_LOT2 LN_LOT3
   LN_LOT_ P_SPACES PSPACES2 PSPACES3
   PSPACES_ REMODEL REMODEL2 REMODEL3 REMODEL_ R_TOT_N R_TOT_N2
   R_TOT_N3 R_TOT_N_ SQ_FT_LA SQ_FTLA2 SQ_FTLA3 SQ_FTLA_ ZIPCMPAG
   ZIPCMAG2 ZIPCMAG3 ZIPCMAG_ ZIPCMPBA ZIPCMBA2 ZIPCMBA3 ZIPCMBA_
   ZIPCMPBE ZIPCMBE2 ZIPCMBE3 ZIPCMBE_ ZIPCMPFP ZIPCMFP2 ZIPCMFP3
```

```
        ZIPCMFP_ ZIPCMPGA ZIPCMGA2 ZIPCMGA3 ZIPCMGA_ ZIPCMPRM ZIPCMRM2
        ZIPCMRM3 ZIPCMRM_ ZIPCMPSQ ZIPCMSQ2 ZIPCMSQ3 ZIPCMSQ_ ZIP_COMP
        ZIPCOMP2 ZIPCOMP3 ZIPCOMP_
    ;
run;

proc corr;
    var aperr model1;
run;

proc print data=out.eptrain (obs=50);
run;

proc score
    data=out.test
    score=out.eregout
    out=out.eptest
    predict
    type=parms;
    id
      aperr
    ;
    var
        pred_sp pred_sp2 pred_sp3 apnpdif apnpdif2 apnpdif3
        zippdif zippdif2 zippdif3 mnth891 mnth8912 mnth8913 mnth891_
        ASRCall ASRCap6 ASRCap7 ASRCct6 ASRCmap ASRCzip
        MSRCall MSRCct6 MSRCmap MSRCzip
        AIRCONDA AIRCONDC AIRCONDN AIRCONDX BAFLCNDF BAFLCNDG
        BAFLMATC BAFLMATV BAFLMATX BAWNCONF BAWNCONG BAWNMATC
        BAWNMATF FLRMATA FLRMATC FLRMATS FLRMATT FLRMATV
        FLRMATW FLRMATX FLZONEN FLZONEY FNDINFN FNDINFY FNDSETLN FNDSETLY
        FRPLTYPB FRPLTYPG FRPLTYPN FRPLTYPW FRPLTYPX FRPLTYPY
        HOAn HOAy IMPTYPEA
        IMPTYPED IMPTYPEX LANDSCPA LANDSCPI LANDSCPX LOTSHAPI LOTSHAPR
        LOTSHAPX MANHOMEN MANHOMEY OWNTYPEC OWNTYPEO OWNTYPED OWNTYPEP
        PARCLSZO PARCLSZT
        PARCLSZU PARCLSZX POOLTYPB POOLTYPH POOLTYPP POOLTYPS PCONDA PCONDF PCONDG
        PDOROPNN PDOROPNY
        PSTRAGEC PSTRAGEG PSTRAGEN PSTRAGEX ROOFTYPA ROOFTYPB ROOFTYPC ROOFTYPI
        ROOFTYPK ROOFTYPS ROOFTYPT ROOFTYPX
        SITEINFB SITEINFC SITEINFE SITEINFG
        SITEINFL SITEINFM SITEINFN SITEINFO SITEINFV SITEINFW SITEINFX
        SISTMR SISTMU
        SISTTA SISTTC SISTTX STRYSFD1 STRYSFD2 STRYSFD3 STRYSFD4
        STYLECDB STYLECDM
        STYLECDN STYLECDO STYLECDR STYLECDS STYLECDT STYLECDX TOPOCODH
        TOPOCODL TOPOCODR TOPOCODS WALEXTTC WALEXTTT WALEXTTW
        WALEXTTX WALEXTTZ AGE AGE2 AGE3 AGE_ APNDIFAG APNDFAG2 APNDFAG3
        APNDFAG_ APNDIFBA APNDFBA2 APNDFBA3 APNDFBA_ APNDIFBE APNDFBE2
        APNDFBE3 APNDFBE_ APNDIFFP APNDFFP2 APNDFFP3 APNDFFP_ APNDIFGA
        APNDFGA2 APNDFGA3 APNDFGA_ APNDIFRM APNDFRM2 APNDFRM3 APNDFRM_
        APNDIFSQ APNDFSQ2 APNDFSQ3 APNDFSQ_ APN_COMP APNCOMP2 APNCOMP3
        APNCOMP_ BA_NUM BA_NUM2 BA_NUM3 BA_NUM_ BEDRMS_N BEDRMSN2 BEDRMSN3
        BEDRMSN_ ECONLIFE ECONLIF2 ECONLIF3 ECONLIF_ EQUIP EQUIP2 EQUIP3
        EQUIP_ FRPL_NUM FRPLNUM2 FRPLNUM3 FRPLNUM_ LN_LOT LN_LOT2 LN_LOT3
        LN_LOT_ P_SPACES PSPACES2 PSPACES3
        PSPACES_ REMODEL REMODEL2 REMODEL3 REMODEL_ R_TOT_N R_TOT_N2
        R_TOT_N3 R_TOT_N_ SQ_FT_LA SQ_FTLA2 SQ_FTLA3 SQ_FTLA_ ZIPCMPAG
        ZIPCMAG2 ZIPCMAG3 ZIPCMAG_ ZIPCMPBA ZIPCMBA2 ZIPCMBA3 ZIPCMBA_
        ZIPCMPBE ZIPCMBE2 ZIPCMBE3 ZIPCMBE_ ZIPCMPFP ZIPCMFP2 ZIPCMFP3
        ZIPCMFP_ ZIPCMPGA ZIPCMGA2 ZIPCMGA3 ZIPCMGA_ ZIPCMPRM ZIPCMRM2
        ZIPCMRM3 ZIPCMRM_ ZIPCMPSQ ZIPCMSQ2 ZIPCMSQ3 ZIPCMSQ_ ZIP_COMP
        ZIPCOMP2 ZIPCOMP3 ZIPCOMP_
    ;
run;

proc corr;
    var aperr model1;
run;

proc print data=out.eptest (obs=50);
run;
```

```
options linesize=80 pagesize=500 nocenter obs=max;

libname out '../data';

data _null_;
   set out.eregout;
   format default = e20.;
   put _all_;
run;

/********************************************************************/ options linesize=79 pagesize=64 nocenter obs=max;

/********************************************************************/ filename inf1
      '../data/model.both.log';

libname out '../data';

filename tagfile
      '../data/model.tag';

/********************************************************************/ data tag;
      infile tagfile;
      input nobs flag $5.0;
      keep flag;
   run;

data out.ph2log;
      infile inf1;
      input nobs acsp prsp;
      drop nobs acsp prsp lact_sp lpred_sp mean stddev;

mean = XX;
      stddev = XX;

lact_sp = (acsp * stddev + mean);
      lpred_sp= (prsp * stddev + mean);
      act_sp = round(exp(lact_sp),1);
      pred_sp = round(exp(lpred_sp),1);
      error = act_sp - pred_sp;
      abserror = abs(error);
      pcerr = error / act_sp;
      aperr = abserror / act_sp;
      errlog = lact_sp - lpred_sp;
   run;

data out.ph2log;
      merge out.ph2log tag;
   run;

/********************************************************************/ libname in1 '../../sas';
   libname outep '../data';
   options pagesize=64 linesize=79 obs=max;

/********************************************************************/ data outep.ep_ph2;
      set in1.trim;
      asp =  value_pr ;
      obsno = _N_;
   run;
```

```
options linesize=79 pagesize=64 nocenter obs=max;

/******************************************************************/ libname out '../data';

/******************************************************************/ data out.epmaster;
  merge out.ep_ph2 out.ph2log;
run;

/******************************************************************/
options linesize=79 pagesize=23 nocenter obs=max;
/******************************************************************/ libname out '/bs2/prj/areas/model/sacramen/regerr/data';

/******************************************************************/ data eval;
  set out.epmast2;
  keep aperr pred_ape;
  if epflag = 'tst';
run;

proc rank groups=10 data=eval out=eval;
  var aperr pred_ape;
  ranks aperank modrank;
run;

/******************************************************************/ proc sort data=eval;
  by modrank;
run;

proc univariate noprint data=eval;
  var aperr;
  by modrank;
  output
    out=erreval
    pctlpts=1 2 5 10 20 25 30 40 50 60 70 75 80 90 95 98 99
    pctlpre=ape
  ;
run;

proc print data=erreval;
run;

#!/bin/csh -f

# This script reads the cfg file and regression weights and writes
# out the regression weights in the order of the cfg file with comments
# that indicate which variable the weight is associated with.

# Execute print.sas in the reg directory.  This does a put _all_
# on the regression coefficient data set.  Copy print.log from the
# reg directory to this directory and call it "coeffs".

# Edit the file "coeffs" to delete junk, convert spaces to newlines
# (using tr) and convert all "=" signs to spaces.

# Bring over file trim.cfg from boanov/dat.
# Generate (from cfg) a file with the following format:

#       seq_no varname type slab symbols (for categories)

# Use "readcfg.awk".
# Call this file "cfg.var"
# Must make sure that slab=input.
# Must make sure that the missing symbol is not included.
# DONE
```

```
awk -f readcfg.awk < trim.cfg \
    | awk '($4=="INPUT"){print}' \
    | sort +0 -1 \
    > cfg.var

# Split "cfg.var" into "contin.var" and "categor.var" and
# perform joins with the name translation tables in "contin" and
# "categor".

grep "CONTINUOUS" cfg.var > cfgcontin.var
sort contin > regcontin.var
join regcontin.var cfgcontin.var > contin.join grep "GROUP" cfg.var > cfgcategor.var
sort categor > regcategor.var
join regcategor.var cfgcategor.var > categor.join

# ******************************************************************
# Find all variables that do not match.
alias minus 'comm -23'

# (for continuous variables)
awk '{print $1}' < regcontin.var > treg  # Continuous vars in regmod
awk '{print $1}' < cfgcontin.var > tcfg  # Continuous vars in cfg
echo "Number of continuous variables in reg data set:"
cat treg | wc -l
echo "Number of continuous variables in cfg:"
cat tcfg | wc -l
echo "Number of continuous variables in merged file:"
cat contin.join | wc -l
echo "Continuous variables in reg data set but not in cfg:"
minus treg tcfg | more
echo "Continuous variables in cfg but not in reg data set:"
minus tcfg treg | more

# (for categorical variables)
awk '{print $1}' < regcategor.var > treg      # Categorical vars in regmod
awk '{print $1}' < cfgcategor.var > tcfg      # Categorical vars in cfg
echo "Number of categorical variables in reg data set:"
cat treg | wc -l
echo "Number of categorical variables in cfg:"
cat tcfg | wc -l
echo "Number of categorical variables in merged file:"
cat categor.join | wc -l
echo "Categorical variables in reg data set but not in cfg:"
minus treg tcfg | more
echo "Categorical variables in cfg but not in reg data set:"
minus tcfg treg | more
rm tcfg treg
# ******************************************************************
# Find all symbols that do not match.
# cfgcategor.var looks like this:

# AIR_COND 1 GROUP INPUT A C N X
BA_FLCND 2 GROUP INPUT A F G awk '{printf"%s",$1;for(i=5;i<=NF;i++)printf" %s",$i;printf"\n";}' \
    < cfgcategor.var > tcfg regcategor.var looks like this:

AIR_COND AIRCOND A C N X
BA_FLCND BAFLCND A F G awk '{printf"%s",$1;for(i=3;i<=NF;i++)printf" %s",$i;printf"\n";}' \
    < regcategor.var > treg echo 'Differences between cfg and reg symbol tables:'
diff tcfg treg

******************************************************************

# Generate a file with the following format:

#       varname seq_no type base_shortname symbols

```

```
# Get varname, seq_no, and type from cfgcategor.var:

# cfgcategor.var looks like this:
# AIR_COND 1 GROUP INPUT A C N X
# We just to merge the first three columns of cfgcategor.var with
# regcategor.var.

awk '{print $1,$2,$3}' < cfgcategor.var | join - regcategor.var > categor.join

*********************************************************************

# Explode variables into multiple variables using the name translations.
# Generate a file with the following format:

#        shortname seq_no symbol_no type base_varname symbol

# Call this file "exploded.var".

# contin.join looks like this:
# base_varname base_shortname seq_no type slab
# AGE AGE 36 CONTINUOUS INPUT
# APNDIFAG APNDFAG 58 CONTINUOUS INPUT
awk -f explodecont.awk < contin.join > explodecont.var categor.join looks like this:
base_varname seq_no type base_shortname symbols
# AIR_COND 1 GROUP AIRCOND A C N X
# BA_FLCND 2 GROUP BAFLCND A F G
awk -f explodecat.awk < categor.join > explodecat.var

# Concatenate and sort the categorical and continuous variables.
cat explodecont.var explodecat.var | tr a-z A-Z | sort +0 -1 > exploded.var

*********************************************************************

Perform a join to merge "coeffs" with "exploded.var".

# coeffs looks like this:

# INTERCEP 7.1151787420315E-03
# PRED_SP .
PRED_SP2 2.3344423517252E-13 exploded.var looks like this:

AGE 36 1 CONTINUOUS AGE 1
AGE2 36 2 CONTINUOUS AGE 2 tr a-z A-Z < coeffs | sort +0 -1 > tcoeffs
join -a1 tcoeffs exploded.var | sort -n +2 -4 > tjoin

# *********************************************************************
# Find records that do not match up and investigate why they don't match.

awk '{print $1}' < tcoeffs > treg
awk '{print $1}' < exploded.var > tcfg
echo "Number of exploded variables in regmod:"
cat treg | wc -l
echo "Number of exploded variables in cfg:"
cat tcfg | wc -l
echo "Number of exploded variables in merged file:"
cat tjoin | wc -l
echo "Exploded variables in regmod but not in cfg:"
minus treg tcfg | more
echo "Exploded variables in cfg but not in regmod:"
minus tcfg treg | more

# *********************************************************************

# Perform final cleanup of the coefficient file:

awk -f cleanup.awk < tjoin > final.coeffs echo "Number of entries in final coefficient file:"
wc final.coeffs

# *********************************************************************
```

```
/Name/{ c++; printf "%s", $2; }
/Type/{ printf " %d %s", c, $2; }
/Slab/{ printf " %s", $2; }
/:/{ if( $2 != "{MISSING}" ) printf " %s", $2; }
/ScaleMode/{ printf "\n" }

# From: base_varname seq_no type base_shortname symbols
# To:   shortname seq_no symbol_no type base_varname symbol
{
        for( i=5; i<= NF; i++ ){
                printf "%s%s %d %d %s %s %s\n", $4, $i, $2, i-4, $3, $1, $i;
        }
}

# From: base_varname base_shortname seq_no type slab
# To:   shortname seq_no symbol_no type base_varname symbol
{
        printf "%s %d %d %s %s %s\n",   $1,      $3, 1, $4, $1, "1";
        printf "%s%s %d %d %s %s %s\n", $2, "2", $3, 2, $4, $1, "2";
        printf "%s%s %d %d %s %s %s\n", $2, "3", $3, 3, $4, $1, "3";
        printf "%s%s %d %d %s %s %s\n", $2, "_", $3, 4, $4, $1, "_";
}
```

DATABASE CREATION AND AGGREGATION ROUTINES

SOURCE CODE

```
/****            MODIFY.SAS            ****/
/** Cleans data and adds a few fields **/ options  linesize=79 pagesize=64 obs=max;
libname  inl '.';

data inl.newclean;
  set inl.newsrc56;

%include './minmax56.sas';

/* EQUIP and REMODEL are in model, but are unreliable */
equip = . ;
remodel = . ;

/* AGE */
label age = 'age of house' ;
tempyr = year_blt * 1 ;
if min_yrb <= tempyr <= (1900 + year)
  then age = (1900 + year) - tempyr ;
else
  age = . ;

/* AIR_COND */
if   air_cond = 'I'
  or air_cond = 'S'
    then air_cond = 'X' ;

/*      APPRYEAR */
/* deletes public records */
if appryear < 71 then
  delete;

/* BA_FLCND */
select (ba_flcnd);
  when ('F');
  when ('G');
  when ('P') ba_flcnd = 'F';
  when ('A') ba_flcnd = 'G';
  otherwise ba_flcnd = " ";
end;
```

```
/* BA_NUM */
if ba_num > 7 or ba_num < 0.5
  then ba_num = .;

/* BA_WNCON */
select (ba_wncon);
  when ('F');
  when ('G');
  when ('P') ba_wncon = 'F';
  when ('A') ba_wncon = 'G';
  otherwise ba_wncon = " ";
end;

/* BA_WNMAT */
select (ba_wnmat);
  when ('C');
  when ('F');
  when ('E') ba_wnmat = 'F';
  when ('O') ba_wnmat = 'F';
  when ('M') ba_wnmat = 'C';
  otherwise ba_wnmat = " ";          Mod-1
end;

/* BEDRMS_N */
if bedrms_n > 10
  then bedrms_n = . ;

/* CEN_TRCT */
if cen_trct < cent_min or cen_trct >= cent_max
  then cen_trct = .;

/* ECONLIFE */
if irecolfl >= 3 and irecolfh >= 3 then
  econlife = mean(irecolfl,irecolfh);
else
  econlife = . ;

/* FRPL_NUM */
if frpl_num > 5
  then frpl_num = .;

/* FRPL_TYP */
if frpl_typ = 'S'
  then frpl_typ = 'X';

/* HOA */
if hoa_dues > 0
  then hoa = 'y';
  else hoa = 'n';

/* IMP_TYPE */
if  imp_type = 'E'
  or imp_type = 'W'
    then imp_type = 'X';
else if imp_type = 'Z'
  or   imp_type = 'R'
    then imp_type = 'A';

/* LOT_AREA */
/* convert acres to sq ft, if necessary */
if lot_code = 'A' or lot_area < 50
  then  lot_area = lot_area * 43560;

/* truncate lot areas above 10 acres */
if lot_area > 435600
  then lot_area = 435600;

if lot_area < 500
  then lot_area = .;

ln_lot = log(lot_area);

/* LOT_SHAP */
if lot_shap = 'S'
  then lot_shap = ' ';
```

```
/* MAN_HOME */
if man_home = 'X'
  then man_home = ' ';

/* OWN_TYPE */
/* own_type normally left blank for S(ingle family) homes */
if own_type = 'S'
  then own_type = ' ';

/* P_COND */
select (p_cond);
  when ('A');
  when ('G');
  when ('F');
  when ('P') p_cond = 'F';
  otherwise p_cond = " ";
end;

/* P_SPACES */
if p_spaces > 7
  then p_spaces = .;

/* P_STRAGE */
if p_strage= 'C'
 then p_strage= 'X';
else if p_strage= 'O'
  then p_strage= 'C';

if p_strage= 'X'
  then p_strage= ' ';

/* POOLTYPE */
if pooltype = 'O' or pooltype = 'I'
  then pooltype = ' ';

/* PRP_ZIP */
if     (prp_zip < low_zip)
    or (prp_zip >= hi_zip)
  then prp_zip  = .;

/* R_TOT_N */
if r_tot_n < 3 or r_tot_n > 18
  then r_tot_n = . ;

/* ROOFTYPE */
if  rooftype = 'E'
  or rooftype = 'W'
    then rooftype = 'X' ;

/* SI_STT */
if   si_stt = 'D'
  or si_stt = 'G'
  or si_stt = 'N'
    then si_stt = 'X' ;

/* SITE_INF */
/* 'site info' shouldn't be O(cean) for inland counties */
if site_inf = 'O'
  and (  st_cntyc = 'CA33'  /* Riverside     */
      or st_cntyc = 'CA36'  /* San Bernadino */
      or st_cntyc = 'CA34'  /* Sacramento    */
      or st_cntyc = 'CA43'  /* Santa Clara   */
      or st_cntyc = 'CA07'  /* Contra Costa  */
      or st_cntyc = 'CA01'  /* Alameda       */
      )
    then site_inf = ' ';

/* SQ_FT_LA */
if sq_ft_la < 500
    or sq_ft_la >= 6000
      then delete;

/* STRYSFDU */
if strysfdu > '4' or strysfdu < '0'
  then strysfdu = ' ';
else if strysfdu = '4'
  then strysfdu = '3';
``` mod-3

```
else if strysfdu = '0'
  then strysfdu = '1';

/* STYLECOD */
if    stylecod = 'A'
  or stylecod = 'L'
    then stylecod = 'X' ;
else if stylecod = 'V'
  then stylecod = 'T' ;

/* VALUE_PR */
label value_pr = 'value of housing unit' ;
label ln_sale = 'log of value_pr' ;

/* value of housing unit equals closing sales price, except that commitment */
/* price can be used instead if closing price is missing or too low          */
value_pr = sl_pr_cl;

if value_pr = . or value_pr < min_pr then
  value_pr = sl_pr_co;
if (min_pr <= value_pr < max_pr);

ln_sale = log(value_pr) ;   /* log of sale price */

/* WAL_EXTT */
if    wal_extt= 'A'
  or wal_extt= 'B'
  or wal_extt= 'D'
  or wal_extt= 'H'
  or wal_extt= 'L'
  or wal_extt= 'O'
  or wal_extt= 'V'
    then wal_extt = 'X' ;

/* Extract MAPSEG, PNUM6, and PNUM7 */

/* Save original APN for later comparison to reformatted APN */
old_apn = apn;

label pnum6 = 'page number';
label pnum7 = 'block number';
length pnum6 $11 pnum7 $12;

if apn = ' ' then do;
  pnum6 = ' ';
  pnum7 = ' ';
end;
else do;
  if st_cntyc = 'CA38' then      /* SF County omits book # */
    apn = '00 ' || apn;

length book $6 block $6 parcel $6;

/* APN format: <book>-<block>-<parcel> */
  book = scan(apn,1);
  book = right(book);
  book = translate(book,'0',' ');

if st_cntyc ne 'CA56' then do
    block = scan(apn,2);
      parcel = scan(apn,3);
  end;
  else do                        /* skip 2nd segment of APN in Ventura County */
    block = scan(apn,3);
      parcel = scan(apn,4);
``` mod-4

```
    p_doropn
    p_spaces
    p_strage
    pnum6
    pnum7
    prp_zip

/* These address variables are retained for informational purposes only */
    prpstdir
    prp_city
    prp_st
    prp_std
    prp_st_f
    prp_st_n
    prp_st_s
    prp_untn
/***************************************************************/ remodel
    rooftype
    r_tot_n
    site_inf
    si_stm
    si_stt
    sq_ft_la
    strysfdu
    stylecod
    st_cntyc
    topocode
    value_pr
    wal_extt
    year
    z_match
    ;

run;

/***************************************************************/
/*                       DEDUPE.SAS                            */
/*              Eliminates duplicate properties                */
/***************************************************************/ options linesize=79 pagesize=64 obs=max;
libname inl '.';

proc sort  data=inl.clean  sortsize=4000000;
  by z_match year month;
run;

/* eliminate duplicates */
data inl.clean;
  set inl.clean;

drop old_apn;

by z_match year month;
  if first.month;
run;

*****************************************************************;
*                         PHASE1.SAS                            ;
*     This program creates monthly groupings of property sales  ;
*****************************************************************;

options linesize=79 pagesize=64 obs=max;
libname inl '.';

%macro calcmon(yr,mon);

data inl.tsp23 inl.tsp22 inl.tsp21 inl.tsp20 inl.tsp19 inl.tsp18 inl.tsp17
     inl.tsp16 inl.tsp15 inl.tsp14 inl.tsp13 inl.tsp12 inl.tsp11 inl.tsp10
     inl.tsp9  inl.tsp8  inl.tsp7  inl.tsp6  inl.tsp5  inl.tsp4  inl.tsp3
     inl.tsp2  inl.tsp1  inl.tsp0;
```

```
set inl.clean;

curr = &yr*12 + &mon;
yrmon = year*12 + month;
drop curr yrmon;

if      yrmon = curr    then output inl.tsp0;
   else if yrmon = curr-1  then output inl.tsp1;
   else if yrmon = curr-2  then output inl.tsp2;
   else if yrmon = curr-3  then output inl.tsp3;
   else if yrmon = curr-4  then output inl.tsp4;
   else if yrmon = curr-5  then output inl.tsp5;
   else if yrmon = curr-6  then output inl.tsp6;
   else if yrmon = curr-7  then output inl.tsp7;
   else if yrmon = curr-8  then output inl.tsp8;
   else if yrmon = curr-9  then output inl.tsp9;
   else if yrmon = curr-10 then output inl.tsp10;
   else if yrmon = curr-11 then output inl.tsp11;
   else if yrmon = curr-12 then output inl.tsp12;
   else if yrmon = curr-13 then output inl.tsp13;
   else if yrmon = curr-14 then output inl.tsp14;
   else if yrmon = curr-15 then output inl.tsp15;
   else if yrmon = curr-16 then output inl.tsp16;
   else if yrmon = curr-17 then output inl.tsp17;
   else if yrmon = curr-18 then output inl.tsp18;
   else if yrmon = curr-19 then output inl.tsp19;
   else if yrmon = curr-20 then output inl.tsp20;
   else if yrmon = curr-21 then output inl.tsp21;
   else if yrmon = curr-22 then output inl.tsp22;
   else if yrmon = curr-23 then output inl.tsp23;

run;

%mend calcmon;

*************************************************************;

%calcmon(92,6);
```

*Pha-1*

```
*************************************************************;
*                     MEDCOMPS.SAS                           ;
* This routine makes the 12 month windows for the median databases ;
*************************************************************;

options linesize=79 pagesize=64 obs=max ;
libname inl '.';

%macro calcmed(yr,mon);

data
   inl.med23 inl.med22 inl.med21 inl.med20 inl.med19 inl.med18 inl.med17
   inl.med16 inl.med15 inl.med14 inl.med13 inl.med12 inl.med11 inl.med10
   inl.med9  inl.med8  inl.med7  inl.med6  inl.med5  inl.med4  inl.med3
   inl.med2  inl.med1  inl.med0;

set inl.clean;

keep pnum6 pnum7 totrm gar_sp fp apn cen_trct mapseg landscap st_cntyc
     prp_zip prp_city prp_st prp_st_n prp_st_s year month sp bed bath
     square homage lot;

sp = value_pr;
bed = bedrms_n;
bath = ba_num;
square = sq_ft_la;
homage = age;
lot = ln_lot;
totrm = r_tot_n;
fp = frpl_num;
gar_sp = p_spaces;
```

```
curr = &yr*12 + &mon;
yrmon = year*12 + month;

if ((curr-12) <= yrmon <= (curr-1)) then output inl.med0;
if ((curr-13) <= yrmon <= (curr-2)) then output inl.med1;
if ((curr-14) <= yrmon <= (curr-3)) then output inl.med2;
if ((curr-15) <= yrmon <= (curr-4)) then output inl.med3;
if ((curr-16) <= yrmon <= (curr-5)) then output inl.med4;
if ((curr-17) <= yrmon <= (curr-6)) then output inl.med5;
if ((curr-18) <= yrmon <= (curr-7)) then output inl.med6;
if ((curr-19) <= yrmon <= (curr-8)) then output inl.med7;
if ((curr-20) <= yrmon <= (curr-9)) then output inl.med8;
if ((curr-21) <= yrmon <= (curr-10)) then output inl.med9;
if ((curr-22) <= yrmon <= (curr-11)) then output inl.med10;
if ((curr-23) <= yrmon <= (curr-12)) then output inl.med11;
if ((curr-24) <= yrmon <= (curr-13)) then output inl.med12;
if ((curr-25) <= yrmon <= (curr-14)) then output inl.med13;
if ((curr-26) <= yrmon <= (curr-15)) then output inl.med14;
if ((curr-27) <= yrmon <= (curr-16)) then output inl.med15;
if ((curr-28) <= yrmon <= (curr-17)) then output inl.med16;
if ((curr-29) <= yrmon <= (curr-18)) then output inl.med17;
if ((curr-30) <= yrmon <= (curr-19)) then output inl.med18;
if ((curr-31) <= yrmon <= (curr-20)) then output inl.med19;
if ((curr-32) <= yrmon <= (curr-21)) then output inl.med20;
if ((curr-33) <= yrmon <= (curr-22)) then output inl.med21;
if ((curr-34) <= yrmon <= (curr-23)) then output inl.med22;
if ((curr-35) <= yrmon <= (curr-24)) then output inl.med23;

run;

%mend calcmed;
```

Med-1

```
*************************************************************;
                          MEAN_STD.SAS
  This program computes means and standard deviations across the various
  neighborhoods for a number of variables, including sales price.
*************************************************************/ options linesize = 79 pagesize = 64 obs = max;
libname inl V603 '../.';
libname outl V603 '.';

%macro calc (bmon,emon) ;

%do x = &bmon %to &emon ;

title 'data sets medmon and spmon ' ;

proc univariate round = .01 noprint data = inl.med&x;
   output out = all&x n = allcnt
          median = allspmed allbemed allbamed allsqmed allagmed
                   allomed allrmmed allgamed allfpmed
          std    = allspstd allbestd allbastd allsqstd allagstd
                   allostd allrmstd allgastd allfpstd;
   var sp bed bath square homage lot totrm gar_sp fp;
run;

*********************************************;

proc sort data = inl.med&x sortsize = 4000000;
   by st_cntyc cen_trct;
run;

proc sort data = inl.tsp&x sortsize = 4000000;
   by st_cntyc cen_trct;
run;
title 'data a cen_trct data set';

proc univariate round = .01 noprint data = inl.med&x;
   by st_cntyc cen_trct;
   output out = c6&x n = c6cnt
```

```
        median = c6spmed c6bemed c6bamed c6sqmed c6agmed
                 c6lomed c6rmmed c6gamed c6fpmed
        std    = c6spstd c6bestd c6bastd c6sqstd c6agstd
                 c6lostd c6rmstd c6gastd c6fpstd;
     var sp bed bath square homage lot totrm gar_sp fp;
run;

data tlsp&x;
   merge c6&x(in = c) inl.tsp&x (in = f);
   by st_cntyc cen_trct;
   if f;
run;
*****************************************;
data tlsp&x ;
   retain allspmed allbemed allbamed allsqmed allagmed
      alllomed allrmmed allgamed allfpmed
         allspstd allbestd allbastd allsqstd allagstd
      alllostd allrmstd allgastd allfpstd;
if _n_ = 1 then set all&x ;
set tlsp&x ;
run;

***********************************;  mea-1
title 'census variables form tlspmon' ;
proc print data = tlsp&x(obs = 10);
   output out = a7&x n = a7cnt
        median = a7spmed a7bemed a7bamed a7sqmed a7agmed
                 a7lomed a7rmmed a7gamed a7fpmed
        std    = a7spstd a7bestd a7bastd a7sqstd a7agstd
                 a7lostd a7rmstd a7gastd a7fpstd;
     var sp bed bath square homage lot totrm gar_sp fp;
run;

data tlsp&x;
   merge a7&x(in = a) tlsp&x(in = f);
   by st_cntyc pnum7;
   if f;
run;

title 'tlspmon a7 variables' ;
proc print data = tlsp&x(obs = 10);
   var pnum7 a7spmed a7bemed a7bamed a7sqmed a7agmed
             a7lomed a7rmmed a7gamed a7fpmed
             a7spstd a7bestd a7bastd a7sqstd a7agstd
             a7lostd a7rmstd a7gastd a7fpstd a7cnt value_pr;
run;

title;

*********************************************;
*********************************************;

title 'Reference   ';

data outl.sp&x;  /* Do we want to drop some of these variables ?? */
   set tlsp&x;

drop
a7spmed a7bemed a7bamed a7sqmed a7agmed a7lomed a7rmmed a7gamed a7fpmed
a7spstd a7bestd a7bastd a7sqstd a7agstd a7lostd a7rmstd a7gastd a7fpstd
a6spmed a6bemed a6bamed a6sqmed a6agmed a6lomed a6rmmed a6gamed a6fpmed
a6spstd a6bestd a6bastd a6sqstd a6agstd a6lostd a6rmstd a6gastd a6fpstd
mcspmed mcbemed mcbamed mcsqmed mcagmed mclomed mcrmmed mcgamed mcfpmed
mcspstd mcbestd mcbastd mcsqstd mcagstd mclostd mcrmstd mcgastd mcfpstd
c6spmed c6bemed c6bamed c6sqmed c6agmed c6lomed c6rmmed c6gamed c6fpmed
c6spstd c6bestd c6bastd c6sqstd c6agstd c6lostd c6rmstd c6gastd c6fpstd
z5spmed z5bemed z5bamed z5sqmed z5agmed z5lomed z5rmmed z5gamed z5fpmed
z5spstd z5bestd z5bastd z5sqstd z5agstd z5lostd z5rmstd z5gastd z5fpstd
allspmed allbemed allbamed allsqmed allagmed alllomed allrmmed
allgamed allfpmed
allspstd allbestd allbastd allsqstd allagstd alllostd allrmstd
allgastd allfpstd
a7cnt a6cnt mccnt c6cnt z5cnt allcnt ;
```

```
    apn_comp = a7spmed;
    apncmpbe = a7bemed;
    apncmpba = a7bamed;
    apncmpsq = a7sqmed;
    apncmpag = a7agmed;
    apncmplo = a7lomed;
    apncmprm = a7rmmed;
    apncmpga = a7gamed;
    apncmpfp = a7fpmed;

apn_std = a7spstd;
    apnstdbe = a7bestd;
    apnstdba = a7bastd;
    apnstdsq = a7sqstd;
    apnstdag = a7agstd;
    apnstdlo = a7lostd;
    apnstdrm = a7rmstd;
    apnstdga = a7gastd;
    apnstdfp = a7fpstd;

apnsrc = 'ap7' ;
apnsrcn = a7cnt;

if a7cnt < 1 or pnum7 = '          ' then do;
       if a6cnt >= 1 and pnum6 ne '         ' then do;
         apn_comp = a6spmed;
         apncmpbe = a6bemed;
         apncmpba = a6bamed;
         apncmpsq = a6sqmed;
         apncmpag = a6agmed;
         apncmplo = a6lomed;
         apncmprm = a6rmmed;
         apncmpga = a6gamed;
         apncmpfp = a6fpmed;

apn_std = a6spstd;
         apnstdbe = a6bestd;
         apnstdba = a6bastd;
         apnstdsq = a6sqstd;
         apnstdag = a6agstd;
         apnstdlo = a6lostd;
         apnstdrm = a6rmstd;
         apnstdga = a6gastd;
         apnstdfp = a6fpstd;

apnsrc = 'ap6' ;
apnsrcn = a6cnt;
       end;
       else if mccnt >= 3 and mapseg ne '         ' then do;
         apn_comp = mcspmed;
         apncmpbe = mcbemed;
         apncmpba = mcbamed;
         apncmpsq = mcsqmed;
         apncmpag = mcagmed;
         apncmplo = mclomed;
         apncmprm = mcrmmed;
         apncmpga = mcgamed;
         apncmpfp = mcfpmed;

apn_std = mcspstd;
         apnstdbe = mcbestd;
         apnstdba = mcbastd;
         apnstdsq = mcsqstd;
         apnstdag = mcagstd;
         apnstdlo = mclostd;
         apnstdrm = mcrmstd;
         apnstdga = mcgastd;
         apnstdfp = mcfpstd;
```

```
            apnsrc = 'map' ;
            apnsrcn = mccnt;
               end;
                  else if c6cnt >= 5 and cen_trct ne . then do;
                     apn_comp = c6spmed;
                     apncmpbe = c6bemed;
                     apncmpba = c6bamed;
                     apncmpsq = c6sqmed;
                     apncmpag = c6agmed;
                     apncmplo = c6lomed;
                     apncmprm = c6rmmed;
                     apncmpga = c6gamed;
                     apncmpfp = c6fpmed;

apn_std = c6spstd;                    Mea-3
                     apnstdbe = c6bestd;
                     apnstdba = c6bastd;
                     apnstdsq = c6sqstd;
                     apnstdag = c6agstd;
                     apnstdlo = c6lostd;
                     apnstdrm = c6rmstd;
                     apnstdga = c6gastd;
                     apnstdfp = c6fpstd;

apnsrc = 'ct6' ;
            apnsrcn = c6cnt;
               end;
                  else if z5cnt >= 5 and prp_zip ne '     ' then do ;
                     apn_comp = z5spmed;
                     apncmpbe = z5bemed;
                     apncmpba = z5bamed;
                     apncmpsq = z5sqmed;
                     apncmpag = z5agmed;
                     apncmplo = z5lomed;
                     apncmprm = z5rmmed;
                     apncmpga = z5gamed;
                     apncmpfp = z5fpmed;

apn_std = z5spstd;
                     apnstdbe = z5bestd;
                     apnstdba = z5bastd;
                     apnstdsq = z5sqstd;
                     apnstdag = z5agstd;
                     apnstdlo = z5lostd;
                     apnstdrm = z5rmstd;
                     apnstdga = z5gastd;
                     apnstdfp = z5fpstd;

apnsrc = 'zip' ;
            apnsrcn = z5cnt;
               end;
                  else do ;
                     apn_comp = allspmed;
                     apncmpbe = allbemed;
                     apncmpba = allbamed;
                     apncmpsq = allsqmed;
                     apncmpag = allagmed;
                     apncmplo = alllomed;
                     apncmprm = allrmmed;
                     apncmpga = allgamed;
                     apncmpfp = allfpmed;

apn_std = allspstd;
                     apnstdbe = allbestd;
                     apnstdba = allbastd;
                     apnstdsq = allsqstd;
                     apnstdag = allagstd;
                     apnstdlo = alllostd;
                     apnstdrm = allrmstd;
                     apnstdga = allgastd;
                     apnstdfp = allfpstd;

apnsrc = 'all' ;
            apnsrcn = allcnt;
               end;
            end;

*******************************;                Mea-4
```

```
        zip_comp = z5spmed;
        zipcmpbe = z5bemed;
        zipcmpba = z5bamed;
        zipcmpsq = z5sqmed;
        zipcmpag = z5agmed;
        zipcmplo = z5lomed;
        zipcmprm = z5rmmed;
        zipcmpga = z5gamed;
        zipcmpfp = z5fpmed;

zip_std = z5spstd;
        zipstdbe = z5bestd;
        zipstdba = z5bastd;
        zipstdsq = z5sqstd;
        zipstdag = z5agstd;
        zipstdlo = z5lostd;
        zipstdrm = z5rmstd;
        zipstdga = z5gastd;
        zipstdfp = z5fpstd;

zipsrc = 'zip' ;
    zipsrcn = z5cnt;

if z5cnt < 5 or prp_zip = '     ' then do;
            zip_comp = allspmed;
            zipcmpbe = allbemed;
            zipcmpba = allbamed;
            zipcmpsq = allsqmed;
            zipcmpag = allagmed;
            zipcmplo = alllomed;
            zipcmprm = allrmmed;
            zipcmpga = allgamed;
            zipcmpfp = allfpmed;

zip_std = allspstd;
            zipstdbe = allbestd;
            zipstdba = allbastd;
            zipstdsq = allsqstd;
            zipstdag = allagstd;
            zipstdlo = alllostd;
            zipstdrm = allrmstd;
            z_pstdga = allgastd;
            z_pstdfp = allfpstd;

zipsrc = 'all' ;
    zipsrcn = allcnt;
    end;

run;

***************************************************************;

%end ;
    %mend calc ;

********************************************;

%calc (0,23);
```

Meg-5

```
/****************************************************************
                              P1FIN.SAS
  This program combines the monthly groupings of property sales into a single
   data set.
****************************************************************/ options linesize=79 pagesize=64 obs=max;
    libname in1 '.';

data in1.final ;
set
    in1.sp0
    in1.sp1
    in1.sp2
```

```
    inl.sp3
    inl.sp4
    inl.sp5
    inl.sp6
    inl.sp7
    inl.sp8
    inl.sp9
    inl.sp10
    inl.sp11
    inl.sp12
    inl.sp13
    inl.sp14
    inl.sp15
    inl.sp16
    inl.sp17
    inl.sp18
    inl.sp19
    inl.sp20
    inl.sp21
    inl.sp22
    inl.sp23
;

rec_id = _n_;
random = ranuni(11) ;

if ba_num = .
   then ba_num = apncmpba ;
if bedrms_n = .
   then bedrms_n = apncmpbe ;
if age = . then
   age = apncmpag ;
if lot_area = .
   then lot_area = apncmplo ;
if r_tot_n = .
   then r_tot_n = apncmprm ;
if p_spaces = .
   then p_spaces = apncmpga ;
if frpl_num = .
   then frpl_num = apncmpfp ;

run;

proc sort
data=inl.final sortsize=4000000;
by random;
run;

/************************************************************************
                              MODEL.SAS
   This program implements the final-step data preparation for modelling
*************************************************************************/ options  linesize=79  pagesize=64  obs=max;
libname inl '.';

data  inl.modelt;
set inl.final ;

%include './minmaxXX.sas';

/* eliminate records in which APN_COMP is outside the plausible range  */
if (min_pr <= apn_comp <= max_pr);
if (min_pr <= zip_comp <= max_pr);

apn_comp = log( apn_comp );
zip_comp = log( zip_comp );

apndifag= age      - apncmpag ;
apndifba= ba_num   - apncmpba ;
apndifbe= bedrms_n - apncmpbe ;
apndiffp= frpl_num - apncmpfp ;
apndifga= p_spaces - apncmpga ;
apndifrm= r_tot_n  - apncmprm ;
apndifsq= sq_ft_la - apncmpsq ;
```

```
/* Keep only those fields used in the production model, */
/* plus APN, which is a unique identifier              */
keep
 age
 air_cond
 apn
 apnsrc
 apn_comp
 apndifag
 apndifba
 apndifbe
 apndiffp
 apndifga
 apndifrm
 apndifsq
 ba_flcnd
 ba_flmat
 ba_num
 ba_wncon
 ba_wnmat
 bedrms_n
 econlife
 equip
 flr_mat
 fl_zone
 fnd_inf
 fnd_setl
 frpl_num
 frpl_typ
 hoa
 imp_type
 landscap
 ln_lot
 ln_sale
 lot_shap
```

*Model-1*

*(178)*

What is claimed is:

1. A computer-implemented process for appraising a real estate property, comprising the steps of:
   - collecting training data;
   - developing a predictive model from the training data;
   - storing the predictive model;
   - obtaining individual property data for the real estate property;
   - generating a signal indicative of an appraised value for the real estate property responsive to application of the obtained individual property data to the stored predictive model;
   - developing an error model from the training data;
   - storing the error model; and
   - generating a signal indicative of an error range for the appraised value responsive to application of the individual property data to the stored error model.

2. The computer-implemented process of claim 1, wherein the error model comprises a regression model.

3. A computer-implemented process for appraising a real estate property, comprising the steps of:
   - collecting training data;
   - developing a predictive model from the training data;
   - storing the predictive model;
   - obtaining individual property data for the real estate property;
   - generating a signal indicative of an appraised value for the real estate property responsive to application of the obtained individual property data to the stored predictive model;
   - developing a lower percentile error model from the training data;
   - developing an upper percentile error model from the training data;
   - storing the lower percentile error model;
   - storing the upper percentile error model;
   - generating a signal indicative of a lower bound value for the real estate property responsive to application of the obtained individual property data to the stored lower percentile error model; and
   - generating a signal indicative of an upper bound value for the real estate property responsive to application of the obtained individual property data to the stored upper percentile error model.

4. The computer-implemented process of claim 3, wherein:
   - the lower percentile error model is a computer-implemented neural network; and
   - the upper percentile error model is a computer-implemented neural network.

5. A computer-implemented process for appraising a real estate property, comprising the steps of:
   - obtaining individual property training data describing past real estate sales;
   - aggregating the obtained property training data into area training data sets, each area training data set describing a plurality of sales within a geographic area;
   - developing a predictive model from the training data;
   - storing the predictive model;
   - obtaining individual property data for the real estate property; and
   - generating a signal indicative of an appraised value for the real estate property responsive to application of the obtained individual property data to the stored predictive model.

6. The computer-implemented process of claim 5, wherein the step of aggregating is repeated using successively larger geographic areas until the number of sales within the geographic area over a predetermined time period exceeds a predetermined number.

7. A computer-implemented process for appraising a real estate property, comprising the steps of:
   - collecting training data;

performing the iterative substeps of:
applying input data to a predictive model;
ranking output data produced thereby responsive to a measure of quality; and
adjusting operation of the model responsive to the results of the ranking substep;
storing the predictive model;
obtaining individual property data for the real estate property; and
generating a signal indicative of an appraised value for the real estate property responsive to application of the obtained individual property data to the stored predictive model.

8. The computer-implemented process of claim 7, wherein the predictive model comprises a computer-implemented neural network having a plurality of interconnected processing elements, each processing element comprising:
a plurality of inputs;
a plurality of weights, each associated with a corresponding input to generate weighted inputs;
combining means, coupled to the weighted inputs, for combining the weighted inputs; and
a transfer function, coupled to the combining means, for processing the combined weighted inputs to produce an output.

9. A computer-implemented process for appraising a real estate property, comprises the steps of:
selecting a geographic area surrounding the real estate property;
obtaining area data for the geographic area;
collecting training data;
developing a predictive model from the training data;
storing the predictive model;
obtaining individual property data for the real estate property; and
generating a signal indicative of an appraised value for the real estate property responsive to application of the obtained individual property data and the obtained area data to the stored predictive model.

10. The computer-implemented process of claim 9, further comprising the steps of:
developing an error model from the training data;
storing the error model; and
generating a signal indicative of an error range for the appraised value responsive to application of the individual property data to the stored error model.

11. The computer-implemented process of claim 10, wherein the error model comprises a regression model.

12. The computer-implemented process of claim 9, further comprising the steps of:
developing a lower percentile error model from the training data;
developing an upper percentile error model from the training data;
storing the lower percentile error model;
storing the upper percentile error model;
generating a signal indicative of a lower bound value for the real estate property responsive to application of the obtained individual property data to the stored lower percentile error model; and
generating a signal indicative of an upper bound value for the real estate property responsive to application of the obtained individual property data to the stored upper percentile error model.

13. The computer-implemented process of claim 12, wherein:
the lower percentile error model is a computer-implemented neural network; and
the upper percentile error model is a computer-implemented neural network.

14. A computer-implemented process for appraising a real estate property, comprising the steps of:
collecting training data;
developing a predictive model from the training data;
storing the predictive model;
obtaining individual property data for the real estate property, the individual property data comprising a plurality of elements;
generating a signal indicative of an appraised value for the real estate property responsive to application of the obtained individual property data to the stored predictive model; and
for each element of the individual property data:
determining a relative contribution of the element to the appraised value;
determining from each relative contribution a reason code value; and
generating a signal indicative of the reason code value.

15. A system for appraising a real estate property, comprising:
a predictive model for determining an appraised value for the real estate property;
training data input means, coupled to the predictive model, for obtaining training data;
training data aggregation means, coupled to the training data input means, for aggregating the training data into training data sets, each training data set describing a plurality of sales within a geographic area;
a model development component, coupled to the predictive model, for training the predictive model from the training data;
a storage device for storing the trained predictive model;
individual property data input means, coupled to the predictive model, for obtaining individual property data and sending the individual property data to the predictive model;
area data input means, coupled to the individual property data input means and to the predictive model, for selecting a geographic area surrounding the real estate property, obtaining area data, and sending the area data to the predictive model; and
an output device, coupled to the predictive model, for generating a signal indicative of the appraised value.

16. The system of claim 15, wherein the predictive model comprises a neural network.

17. The system of claim 15, further comprising:
an error model for determining an error range for the appraised value;
and wherein:
the training data input means is coupled to the error model;
the model development component trains the error model from the training data;
the storage device stores the trained error model;
the individual property data input means is coupled to the error model and sends the individual property data to the error model;
the area data input means is coupled to the error model and sends the area data to the error model; and the output device generates a signal indicative of the error range.

18. The system of claim 17, wherein the error model comprises a regression model.

19. The system of claim 15, further comprising:

a lower percentile error model for determining an lower bound for the appraised value;

an upper percentile error model for determining an upper bound for the appraised value;

and wherein:

the training data input means is coupled to the error model;

the model development component trains the lower percentile error model and the upper percentile error model from the training data;

the storage device stores the trained lower percentile error model and the trained upper percentile error model;

the individual property data input means is coupled to the lower percentile error model and the upper percentile error model, and sends the individual property data to the lower percentile error model and the upper percentile error model;

the area data input means is coupled to the lower percentile error model and the upper percentile error model and sends the area data to the lower percentile error model and the upper percentile error model; and the output device generates a signal indicative of the lower bound and the upper bound for the appraised value.

20. The system of claim 19, wherein:

the lower percentile error model comprises a neural network; and the upper percentile error model comprises a neural network.

* * * * *

(12) POST-GRANT REVIEW CERTIFICATE (8th)

United States Patent  
Jost et al.

(10) Number: US 5,361,201 J1
(45) Certificate Issued: Jan. 12, 2016

(54) REAL ESTATE APPRAISAL USING PREDICTIVE MODELING

(75) Inventors: Allen Jost; Jennifer Nelson; Krishna Gopinathan; Craig Smith

(73) Assignees: Corelogic Information Resources, LLC; Corelogic Dorado, LLC; Corelogic, Inc.; Corelogic Solutions, LLC; Corelogic Tax Services, LLC; Corelogic Valuation Services, LLC; Corelogic Real Estate Information Services, LLC

Trial Numbers:

CBM2012-00007 filed Sep. 19, 2012
CBM2014-00027 filed Nov. 9, 2013

Petitioners: Interthinx, Inc.; Redfin Corporation

Patent Owner: Corelogic Solutions, LLC

Post-Grant Review Certificate for:

Patent No.: 5,361,201
Issued: Nov. 1, 1994
Appl. No.: 07/963,908
Filed: Oct. 19, 1992

The results of joined CBM2012-00007 and CBM2014-00027 are reflected in this post-grant review certificate under 35 U.S.C. 328(b).

POST-GRANT REVIEW CERTIFICATE
U.S. Patent 5,361,201 J1
Trial No. CBM2012-00007
Certificate Issued Jan. 12, 2016

AS A RESULT OF THE POST-GRANT REVIEW PROCEEDING, IT HAS BEEN DETERMINED THAT:

Claims 1, 6, 9 and 10 are cancelled.

Claims 2-4, 7, 8 and 11-20 are disclaimed.

\* \* \* \* \*